US012112700B2

(12) United States Patent
Cheng et al.

(10) Patent No.: US 12,112,700 B2
(45) Date of Patent: Oct. 8, 2024

(54) PIXEL CIRCUIT AND DRIVING METHOD THEREFOR, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Tianyi Cheng, Beijing (CN); Haigang Qing, Beijing (CN); Hongda Cui, Beijing (CN); Sifei Ai, Beijing (CN); Guowei Zhao, Beijing (CN); Yang Yu, Beijing (CN); Li Wang, Beijing (CN); Baoyun Wu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/273,788

(22) PCT Filed: Jul. 29, 2022

(86) PCT No.: PCT/CN2022/109160
§ 371 (c)(1),
(2) Date: Jul. 24, 2023

(87) PCT Pub. No.: WO2023/006100
PCT Pub. Date: Feb. 2, 2023

(65) Prior Publication Data

US 2024/0078976 A1 Mar. 7, 2024

(30) Foreign Application Priority Data

Jul. 30, 2021 (WO) ................ PCT/CN2021/109884

(51) Int. Cl.
*G09G 3/3233* (2016.01)

(52) U.S. Cl.
CPC ..... *G09G 3/3233* (2013.01); *G09G 2310/061* (2013.01); *G09G 2310/08* (2013.01)

(58) Field of Classification Search
CPC ........... G09G 3/3233; G09G 2310/061; G09G 2310/08
See application file for complete search history.

(56) References Cited

U.S. PATENT DOCUMENTS

| | | | |
|---|---|---|---|
| 11,211,011 | B2 | 12/2021 | Kim et al. |
| 11,404,003 | B2 | 8/2022 | Jeong et al. |

(Continued)

FOREIGN PATENT DOCUMENTS

| | | | |
|---|---|---|---|
| CN | 107274830 | A | 10/2017 |
| CN | 107610651 | A | 1/2018 |

(Continued)

OTHER PUBLICATIONS

International Search Report for PCT/CN2021/109884 Mailed Apr. 26, 2022.

(Continued)

*Primary Examiner* — Lixi C Simpson
(74) *Attorney, Agent, or Firm* — Ling Wu; Stephen Yang; Ling and Yang Intellectual Property

(57) ABSTRACT

Disclosed is a pixel circuit arranged in a display substrate, which comprises a first driving mode and a second driving mode. Content displayed in the display substrate comprises multiple display frames. In the first driving mode and the second driving mode, the display frames comprise refresh frames. A signal of a second scanning line is the same as that of a third scanning line. The time of which the signal of the second scanning line is an active level signal comprises a first refresh time period, a second refresh time period and a third refresh time period, which sequentially occur at intervals. During the second refresh time period, a signal of a first (Continued)

scanning line is an inactive level signal. The voltage of a signal at a reset voltage end is a positive voltage, and the voltage of a signal at a first initial voltage end is a negative voltage.

20 Claims, 48 Drawing Sheets

(56) References Cited

U.S. PATENT DOCUMENTS

| | | | | |
|---|---|---|---|---|
| 2013/0057532 | A1 | 3/2013 | Lee et al. | |
| 2014/0139566 | A1 | 5/2014 | Han | |
| 2018/0130410 | A1 | 5/2018 | Gao et al. | |
| 2019/0371238 | A1 | 12/2019 | Gao et al. | |
| 2020/0160787 | A1 | 5/2020 | Wang et al. | |
| 2020/0273411 | A1 | 8/2020 | Gao et al. | |
| 2021/0110771 | A1 | 4/2021 | Lee et al. | |
| 2021/0125543 | A1* | 4/2021 | Kim | G09G 3/3225 |
| 2021/0183312 | A1* | 6/2021 | Kim | G09G 3/3266 |
| 2021/0225282 | A1 | 7/2021 | Cho et al. | |
| 2021/0407386 | A1 | 12/2021 | Li et al. | |
| 2022/0343852 | A1 | 10/2022 | Wang et al. | |

FOREIGN PATENT DOCUMENTS

| | | | |
|---|---|---|---|
| CN | 108735155 | A | 11/2018 |
| CN | 109285500 | A | 1/2019 |
| CN | 109599062 | A | 4/2019 |
| CN | 110047432 | A | 7/2019 |
| CN | 110517639 | A | 11/2019 |
| CN | 110867162 | A | 3/2020 |
| CN | 111462694 | A | 7/2020 |
| CN | 111508426 | A | 8/2020 |
| CN | 111739470 | A | 10/2020 |
| CN | 111862890 | A | 10/2020 |
| CN | 113160740 | A | 7/2021 |
| CN | 113178170 | A | 7/2021 |
| KR | 20130026338 | A | 3/2013 |
| KR | 20150064543 | A | 6/2015 |

OTHER PUBLICATIONS

International Search Report for PCT/CN2022/109160 Mailed Sep. 9, 2022.

Office Action dated May 6, 2022 for Chinese Patent Application No. 202180002058.8 and English Translation.

European Search Report for 21951400.7 Mailed Feb. 6, 2024.

Office Action dated May 22, 2024 for U.S. Appl. No. 17/777,287.

* cited by examiner

PIXEL CIRCUIT AND DRIVING METHOD THEREFOR, AND DISPLAY APPARATUS

CROSS-REFERENCE TO RELATED APPLICATIONS

The present application is a U.S. National Phase Entry of International Application No. PCT/CN2022/109160 having an international filing date of Jul. 29, 2022, which claims priority to International Application No. PCT/CN2021/109884, filed to the CNIPA on Jul. 30, 2021, and entitled "Pixel Circuit and Driving Method therefor, and Display Apparatus". The entire contents of the above-identified applications are hereby incorporated by reference.

TECHNICAL FIELD

Embodiments of the present disclosure relate to, but are not limited to, the field of display technologies, and in particular to a pixel circuit and a drive method therefor, and a display apparatus.

BACKGROUND

An Organic Light Emitting Diode (OLED) and a Quantum dot Light Emitting Diode (QLED) are active light emitting display devices and have advantages of self-illumination, a wide angle of view, a high contrast ratio, low power consumption, an extremely high reaction speed, lightness and thinness, bendability, and a low cost, etc. With continuous development of display technologies, a flexible display apparatus (Flexible Display) with an OLED or a QLED as a light emitting device and a Thin Film Transistor (TFT for short) for performing signal controlling has become a mainstream product in current display field.

SUMMARY

The following is a summary of subject matters described herein in detail. The summary is not intended to limit the protection scope of claims.

In a first aspect, the present disclosure provides a pixel circuit disposed in a display substrate, the display substrate includes a first drive mode and a second drive mode, a refresh rate of the first drive mode is less than that of the second drive mode, content displayed by the display substrate includes a plurality of display frames, in the first drive mode and the second drive mode, a display frame includes a refresh frame, in the pixel circuit, a compensation control circuit includes a first transistor, a gate of the first transistor is electrically connected with a first scan line, a first initialization circuit includes a second transistor, a gate of the second transistor is electrically connected with an initialization control line, a drain of the second transistor is electrically connected with a first initial voltage terminal, a reset circuit includes a third transistor, a gate of the third transistor is electrically connected with a second scan line, a drain of the third transistor is electrically connected with a reset voltage terminal; a data writing circuit includes a fourth transistor; a gate of the fourth transistor is electrically connected with a fourth scan line, a drain of the fourth transistor is electrically connected with a data line, and a second initialization circuit includes a seventh transistor; a gate of the seventh transistor is electrically connected with a third scan line, a drain of the seventh transistor is electrically connected with a second initial voltage terminal, and a light emitting control circuit includes a fifth transistor and a sixth transistor, gates of the fifth transistor and the sixth transistor are electrically connected with a light emitting control line.

A signal of the second scan line is the same as a signal of the third scan line, and time when the signal of the second scan line is an active level signal includes a first refresh time period, a second refresh time period, and a third refresh time period which sequentially occur at intervals, during the second refresh time period, a signal of the first scan line is an inactive level signal.

A voltage of a signal of the reset voltage terminal is a positive voltage, a voltage of a signal of the first initial voltage terminal is a negative voltage, and a difference between the voltage of the signal of the reset voltage terminal and the voltage of the signal of the first initial voltage terminal is greater than a threshold difference.

In some exemplary implementation modes, during the first refresh time period, the signal of the first scan line is an active level signal, and signals of the initialization control line, the fourth scan line, and the light emitting control line are inactive level signals; during the second refresh time period, the signals of the initialization control line, the fourth scan line, and the light emitting control line are inactive level signals; during the third refresh time period, signals of the first scan line, the initialization control line, the fourth scan line, and the light emitting control line are inactive level signals.

In some exemplary implementation modes, time when a signal of the initialization control line is an active level signal includes a fourth refresh time period and a fifth refresh time period, the fourth refresh time period occurs between the first refresh time period and the second refresh time period, and the fifth refresh time period occurs between the second refresh time period and the third refresh time period; during the fourth refresh time period and the fifth refresh time period, the signal of the first scan line is an active level signal, and signals of the second scan line, the fourth scan line, and the light emitting control line are inactive level signals.

In some exemplary implementation modes, time when a signal of the fourth scan line is an active level signal occurs between the fifth refresh time period and the third refresh time period, and when the signal of the fourth scan line is an active level signal, the signal of the first scan line is an active level signal, and signals of the second scan line, the initialization control line, and the light emitting control line are inactive level signals; a duration for which the signal of the fourth scan line is an active level signal is less than a duration of any one of the first refresh time period to the third refresh time period.

In some exemplary implementation modes, time when the signal of the first scan line is an active level signal includes a sixth refresh time period and a seventh refresh time period which sequentially occur at intervals; the first refresh time period and the fourth refresh time period are located within the sixth refresh time period, the second refresh time period is located between the sixth refresh time period and the seventh refresh time period, and time when a signal of the fourth scan line is an active level signal and the fifth refresh time period are located within the seventh refresh time period; during the sixth refresh time period and the seventh refresh time period, a signal of the light emitting control line is an inactive level signal.

In some exemplary implementation modes, when a signal of the light emitting control line is an active level signal, signals of the first scan line, the second scan line, the fourth scan line, and the initialization control line are inactive level signals.

In some exemplary implementation modes, in the first drive mode, the display frame further includes at least one hold frame, in the hold frame, signals of the first scan line and the fourth scan line are inactive level signals; time when the signal of the second scan line is the active level signal includes a plurality of first hold time periods which sequentially occur at intervals, and time when a signal of the initialization control line is an active level signal includes a plurality of second hold time periods which sequentially occur at intervals; the plurality of first hold time periods and the plurality of second hold time periods are alternately disposed, and a first hold time period occurs before a first second hold time period.

In some exemplary implementation modes, a voltage value of the signal of the reset voltage terminal is about 7 volts to 8 volts, and a voltage value of the signal of the first initial voltage terminal is about −5 volts to −7 volts.

In a second aspect, the present disclosure also provides a pixel circuit disposed in a display substrate, the display substrate includes a first drive mode and a second drive mode, a refresh rate of the first drive mode is less than that of the second drive mode, content displayed by the display substrate includes a plurality of display frames, in the first drive mode, a display frame includes a refresh frame and at least one hold frame, in the second drive mode, the display frame includes a refresh frame, in the pixel circuit, a first control circuit includes a first transistor; a gate of the first transistor is electrically connected with a first scan line; a compensation control circuit includes a second transistor; a gate of the second transistor is electrically connected with a second scan line; a first initialization circuit includes a third transistor; a gate of the third transistor is electrically connected with an initialization control line; a reset circuit includes a fourth transistor; a gate of the fourth transistor is electrically connected with a third scan line; a light emitting control circuit includes a fifth transistor and a sixth transistor; gates of the fifth transistor and the sixth transistor are electrically connected with a light emitting control line, and the gates are electrically connected with the light emitting control line; a second initialization circuit includes a seventh transistor; a gate of the seventh transistor is electrically connected with a fourth scan line; a data writing circuit includes an eighth transistor; a gate of the eighth transistor is electrically connected with the second scan line, and a drain of the eighth transistor is electrically connected with a data line; the display substrate further includes a first drive chip and a second drive chip, wherein the first drive chip is configured to generate a data signal, the second drive chip is configured to generate an adjustment signal, and the first drive chip and the second drive chip are different chips; a signal of the second scan line is an active level signal during a portion of the refresh frame and a portion of the hold frame, a signal of the data line is a data signal during a portion of the refresh frame, and the signal of the data line is an adjustment signal during a portion of the hold frame.

In some exemplary implementation modes, signals of the third scan line, the fourth scan line, and the initialization control line are the same.

In some exemplary implementation modes, in the refresh frame, when the signal of the second scan line is an active level signal, a signal of the first scan line is an active level signal, and signals of the third scan line and the light emitting control line are inactive level signals; a duration for which the signal of the second scan line is an active level signal is less than a duration for which the signal of the first scan line is an active level signal, and is less than a duration for which a signal of the third scan line is an active level signal.

In some exemplary implementation modes, in the refresh frame, time when a signal of the third scan line is an active level signal includes a first time period and a second time period which sequentially occur at intervals; during the first time period, a signal of the first scan line is an active level signal, and signals of the second scan line and the light emitting control line are inactive level signals; during the second time period, signals of the first scan line, the second scan line, and the light emitting control line are inactive level signals; a sum of a duration of the first time period and a duration of the second time period is less than a duration for which the signal of the first scan line is an active level signal.

In some exemplary implementation modes, in the refresh frame and the hold frame, signals of the first scan line, the second scan line, and the third scan line are inactive level signals when a signal of the light emitting control line is an active level signal.

In some exemplary implementation modes, in the hold frame, a signal of the first scan line is an inactive level signal.

In some exemplary implementation modes, in the hold frame, time when a signal of the third scan line is an active level signal includes: a third time period and a fourth time period which sequentially occur at intervals; during the third time period and the fourth time period, signals of the third scan line and the light emitting control line are inactive level signals, and time when the signal of the second scan line is an active level signal is located between the third time period and the fourth time period.

In a third aspect, the present disclosure also provides a drive method of a pixel circuit, which is configured to drive the pixel circuit described above. A working process of the pixel circuit in a refresh frame includes: a first refresh phase, a third refresh phase, and a sixth refresh phase which sequentially occur, wherein a first refresh time period is the first refresh phase, a second refresh time period is the third refresh phase, and a third refresh time period is the sixth refresh phase; in the first refresh phase, a first transistor writes a signal of a third node into a first node in response to a signal of a first scan line, a third transistor writes a signal of a reset voltage terminal into a second node in response to a signal of a second scan line, and a seventh transistor writes a second initial signal into an anode of an organic light emitting diode in response to a signal of a third scan line; in the third refresh phase and the sixth refresh phase, the third transistor writes the signal of the reset voltage terminal into the second node in response to the signal of the second scan line, and the seventh transistor writes the second initial signal into the anode of the organic light emitting diode in response to the signal of the third scan line.

In some exemplary implementation modes, the working process of the pixel circuit in the refresh frame further includes: a second refresh phase, a fourth refresh phase, a fifth refresh phase, and a light emitting phase which sequentially occur, wherein a fourth refresh time period is the second refresh phase, a fifth refresh time period is the fourth refresh phase, time when a signal of the fourth scan line is an active level signal is the fifth refresh phase, time when a signal of a light emitting control line is an active level signal is the light emitting phase, and the light emitting phase occurs after the sixth refresh phase; in the second refresh phase and the fourth refresh phase, the first transistor writes the signal of the third node into the first node in response to the signal of the first scan line, and the second transistor writes a first initial voltage into the third node in response to a signal of an initialization control line; in the fifth refresh phase, the first transistor writes the signal of the third node into the first node in response to the signal of the first scan line, and the fourth transistor writes a signal of a data line into the second node in response to a signal of the fourth scan line; in the light emitting phase, the third transistor generates a drive current between the second node and the third node in response to a control signal of the first node, and the fifth transistor and the sixth transistor write a high voltage signal into the second node and write a signal of the third node into an anode of an organic light emitting diode in response to a signal of the light emitting control line.

In some exemplary implementation modes, in the first drive mode, a display frame includes: at least one hold frame, and a working process of the pixel circuit in the hold frame includes: a plurality of first hold phases and a plurality of second hold phases, a first hold time period is a first hold phase and a second hold time period is a second hold phase; in the first hold phase, the third transistor writes a signal of the reset voltage terminal into the second node in response to a signal of the second scan line, and the seventh transistor writes a second initial voltage into the anode of the organic light emitting diode in response to a signal of the third scan line; in the second hold phase, the second transistor writes a first initial signal into the third node in response to a signal of an initialization control line.

In a fourth aspect, the present disclosure also provides a drive method of a pixel circuit, which is configured to drive the pixel circuit described above. A working process of the pixel circuit in a refresh frame includes a first data writing phase, and a working process of the pixel circuit in a hold frame includes a second data writing phase, the method includes: in the first data writing phase, a first transistor writes a signal of a connection node into a first node in response to a signal of a first scan line, a second transistor writes a signal of a third node into the connection node in response to a signal of a second scan line, and an eighth transistor writes a data signal into a second node in response to a signal of the second scan line; in the second data writing phase, the second transistor writes the signal of the third node into the connection node in response to the signal of the second scan line, and the eighth transistor writes an adjustment signal into the second node in response to a signal of the second scan line.

In some exemplary implementation modes, the working process of the pixel circuit in the refresh frame further includes: a first refresh-reset phase, a second refresh-reset phase, and a light emitting phase which sequentially occur, the first data writing phase occurs between the first refresh-reset phase and the second refresh-reset phase; in the first refresh-reset phase, the first transistor writes a signal of the connection node into the first node in response to a signal of the first scan line, the third transistor writes a first initialization voltage into the connection node in response to a signal of the initialization control line, the fourth transistor writes a signal of the reset voltage line into the second node in response to a signal of a third scan line, and a seventh transistor writes a second initial voltage into an anode of an organic light emitting diode in response to a signal of a fourth scan line; in the second refresh-reset phase, the third transistor writes the first initialization voltage into the connection node in response to the signal of the initialization control line, the fourth transistor writes the signal of the reset voltage line into the second node in response to the signal of the third scan line, and the seventh transistor writes the second initial voltage into the anode of the organic light emitting diode in response to the signal of the fourth scan line; in the light emitting phase, a drive transistor generates a drive current between the second node and the third node in response to a control signal of the first node, and a fifth transistor and a sixth transistor write a high voltage signal into the second node and write a signal of the third node into the anode of the organic light emitting diode in response to a signal of a light emitting control line.

In some exemplary implementation modes, the working process of the pixel circuit in the hold frame further includes: a first hold-reset phase and a second hold-reset phase which sequentially occur at intervals, the second data writing phase occurs between the first hold-reset phase and the second hold-reset phase; in the first hold-reset phase and the second hold-reset phase, the third transistor writes a first initialization voltage into the connection node in response to a signal of an initialization control line, a fourth transistor writes a signal of a reset voltage line into the second node in response to a signal of a third scan line, and a seventh transistor writes a second initial voltage into an anode of an organic light emitting diode in response to a signal of a fourth scan line.

In a fifth aspect, the present disclosure also provides a display apparatus including the pixel circuit described above.

Other aspects may be comprehended upon reading and understanding drawings and detailed description.

BRIEF DESCRIPTION OF DRAWINGS

Accompanying drawings are used for providing further understanding of technical solutions of the present disclosure, constitute a part of the specification, and are used for explaining the technical solutions of the present disclosure together with the embodiments of the present disclosure, but not to constitute limitations on the technical solutions of the present disclosure. Shapes and sizes of various components in the drawings do not reflect actual scales, but are only intended to schematically illustrate contents of the present disclosure.

DETAILED DESCRIPTION

Figure 1:
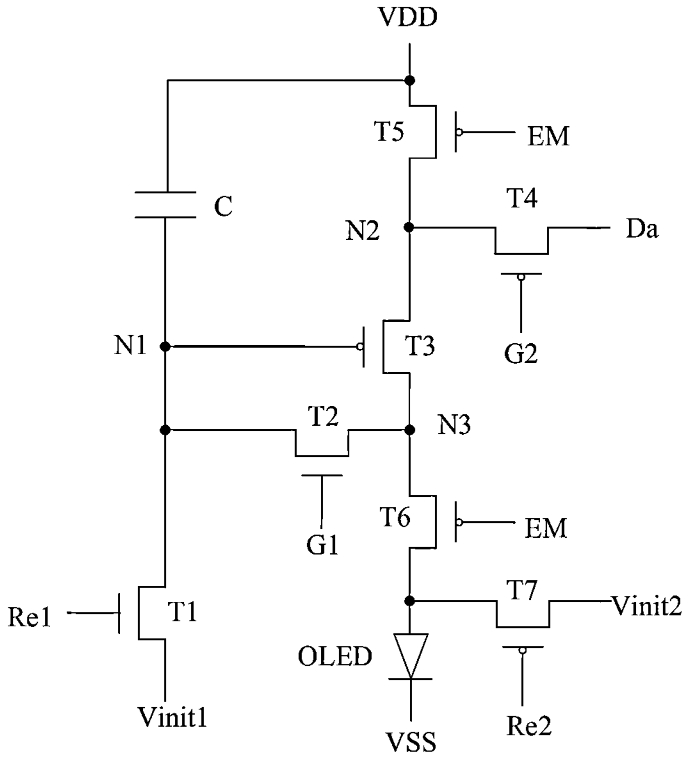
FIG. 1 (Prior Art)
FIG. 1 is a schematic diagram of a circuit structure of a pixel drive circuit in the related art.

Example embodiments will now be described more fully with reference to the accompanying drawings. However, example embodiments may be implemented in a variety of forms and should not be construed as being limited to examples set forth herein. Rather, these embodiments are provided so that the present disclosure will be more comprehensive and complete, and concepts of the example embodiments will be fully conveyed to those of skills in the art. Same reference numerals in the drawings represent identical or similar structures and thus their detailed description will be omitted.

Terms "an", "a", and "the" are used for indicating existence of one or more elements/components/etc. Terms "include" and "have" are used for indicating an open-ended inclusive meaning and mean that there may be another element/component/etc. existing in addition to listed elements/components/etc.

As shown in FIG. 1, FIG. 1 is a schematic diagram of a circuit structure of a pixel drive circuit in the related art. The pixel drive circuit may include: a drive transistor T3, a first transistor T1, a second transistor T2, a fourth transistor T4, a fifth transistor T5, a sixth transistor T6, a seventh transistor T7, and a capacitor C. The drive transistor T3 has a gate connected with a first node N1, a first electrode connected with a second node N2, and a second electrode connected with a third node N3; the fourth transistor T4 has a first electrode connected with a data signal terminal Da, a second electrode connected with a second node N2, and a gate connected with a gate drive signal terminal G2; the fifth transistor T5 has a first electrode connected with a first power supply terminal VDD, a second electrode connected with the second node N2, and a gate connected with an enabling signal terminal EM; the second transistor T2 has a first electrode connected with the first node N1, a second electrode connected with the third node N3, and a gate connected with a gate drive signal terminal G1; the sixth transistor T6 has a first electrode connected with the third node N3, a second electrode connected with a first electrode of the seventh transistor T7, a gate connected with the enabling signal terminal EM, the seventh transistor T7 has a second electrode connected with a second initial signal terminal Vinit2, and a gate connected with a second reset signal terminal Re2; the first transistor T1 has a first electrode connected with the first node N1, a second electrode connected with a first initial signal terminal Vinit1, and a gate connected with a first reset signal terminal Re1, and the capacitor C is connected between the first power supply terminal VDD and the first node N1. The pixel drive circuit may be connected with a light emitting unit OLED, and used for driving the light emitting unit OLED to emit light, and the light emitting unit OLED may be connected between the second electrode of the sixth transistor T6 and a power supply terminal VSS. Among them, the first transistor T1 and the second transistor T2 may be N-type transistors, for example, the first transistor T1 and the second transistor T2 may be N-type metal oxide transistors, and an N-type metal oxide transistor has a relatively small leakage current so that leakage of electricity of a node N through the first transistor T1 and the second transistor T2 in a light emitting phase may be avoided. Meanwhile, the drive transistor T3, the fourth transistor T4, the fifth transistor T5, the sixth transistor T6, and the seventh transistor T7 may be P-type transistors. For example, the drive transistor T3, the fourth transistor T4, the fifth transistor T5, the sixth transistor T6, and the seventh transistor T7 may be P-type low temperature polycrystalline silicon transistors having a relatively high carrier mobility, thereby facilitating achievement of a display panel with a high resolution, a high reaction speed, a high pixel density, and a high aperture ratio. The first initial signal terminal and the second initial signal terminal may output a same voltage signal or different voltage signals according to an actual situation.

Figure 2:
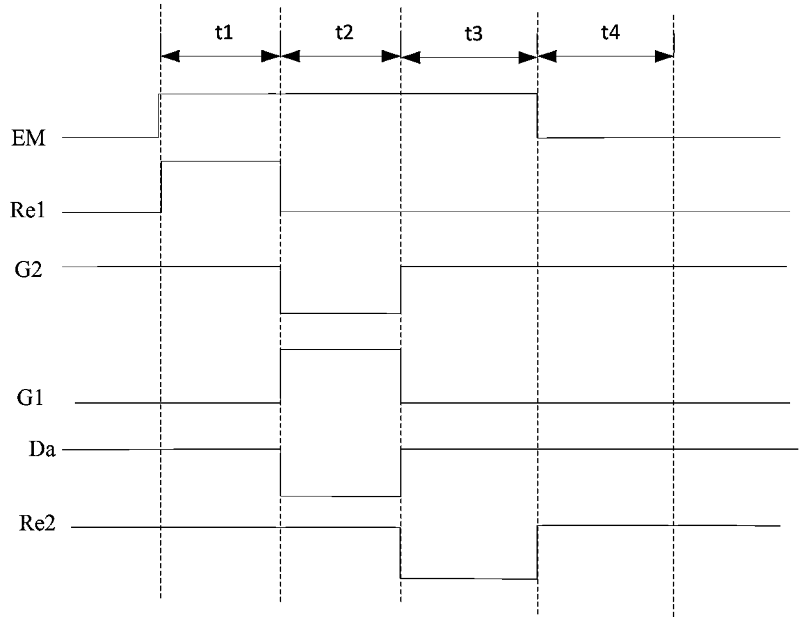
FIG. 2 (Prior Art)
FIG. 2 is a timing diagram of each node of a pixel drive circuit in FIG. 1 in a drive method.

FIG. 2 is a timing diagram of each node of the pixel drive circuit of FIG. 1 in a drive method. Herein, G1 represents a timing of the gate drive signal terminal G1, G2 represents a timing of the gate drive signal terminal G2, Re1 represents a timing of the first reset signal terminal Re1, Re2 represents a timing of the second reset signal terminal Re2, EM represents a timing of the enabling signal terminal EM, Da represents a timing of the data signal terminal Da, and N1 represents a timing of the first node N1. The drive method of the pixel drive circuit may include a first reset phase t1, a threshold compensation phase t2, a second reset phase t3, and a light emitting phase t4. In the first reset phase t1, the first reset signal terminal Re1 outputs a high-level signal, the first transistor T1 is turned on, and the first initial signal terminal Vinit1 inputs an initial signal to the first node N1. In the threshold compensation phase t2, the gate drive signal terminal G1 outputs a high-level signal, the gate drive signal terminal G2 outputs a low-level signal, the fourth transistor T4 and the second transistor T2 are turned on, meanwhile the data signal terminal Da outputs a drive signal to write a voltage Vdata+Vth into the node N, wherein Vdata is a voltage of the drive signal and Vth is a threshold voltage of the drive transistor T3. In the second reset phase t3, the second reset signal terminal Re2 outputs a low-level signal, the seventh transistor T7 is turned on, and the second initial signal terminal Vinit2 inputs an initial signal to the second electrode of the sixth transistor T6. In the light emitting phase t4, the enabling signal terminal EM outputs a low-level signal, the sixth transistor T6 and the fifth transistor T5 are turned on, and the drive transistor T3 emits light under an action of the voltage Vdata+Vth stored in the capacitor C. According to a formula for an output current of a drive transistor $I=(\mu WCox/2L)(Vgs-Vth)^2$, wherein μ is a carrier mobility; Cox is a gate capacitance amount per unit area, W is a width of a channel of the drive transistor, L is a length of the channel of the drive transistor, Vgs is a gate-source voltage difference of the drive transistor, and Vth is a threshold voltage of the drive transistor, the output current of the drive transistor in the pixel drive circuit of the present disclosure is $I=(\mu WCox/2L)(Vdata+Vth-Vdd-Vth)^2$. The pixel drive circuit may avoid an influence of a threshold of the drive transistor on its output current.

Figure 3:
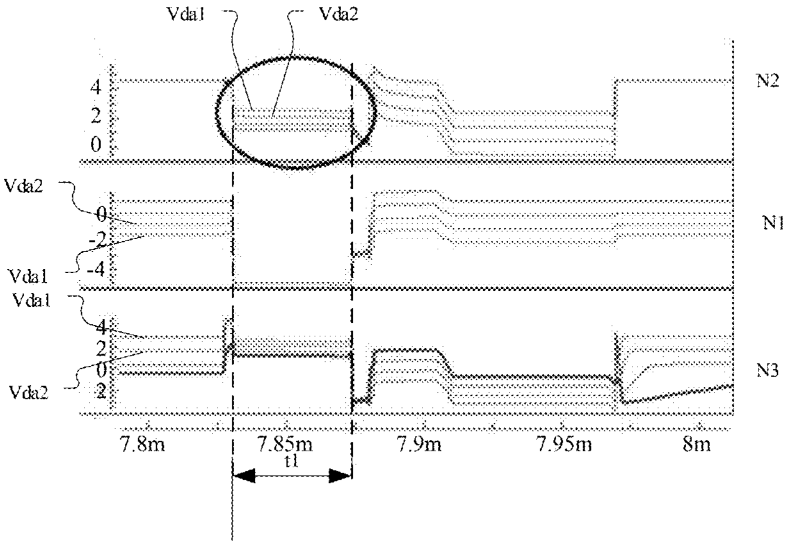
FIG. 3 (Prior Art)
FIG. 3 is a simulation timing diagram of a first node, a second node, and a third node of the pixel drive circuit in FIG. 1 in the drive method shown in FIG. 2.

In the related art, there is a parasitic capacitance between a gate and a source of a drive transistor in a pixel drive circuit. In a reset phase of the pixel drive circuit, a gate voltage of the drive transistor is initialized to an initial voltage, and a source voltage of the drive transistor is changed correspondingly under a coupling action of the above parasitic capacitance. When different gray scales are reset in the reset phase, variation amounts of the gate voltage of the drive transistor are different, so variation amounts of the source voltage of the drive transistor are also different, which in turn causes Vgs (gate-source voltage difference) of the drive transistor to be different after the reset phase is completed. As shown in FIG. 3, which is a simulation timing diagram of a first node, a second node, and a third node of the pixel drive circuit in FIG. 1 in the drive method shown in FIG. 2. N1 represents a timing diagram of the first node N1, N2 represents a timing diagram of the second node N2, N3 represents a timing diagram of the third node N3, FIG. 3 specifically shows a timing diagram of each node of the pixel drive circuit shown in FIG. 1 under four kinds of data signals, in a reset phase t1 in FIG. 3, the first node N1 under the four kinds of data signals needs to be reset, and this exemplary embodiment is explained with a timing of each node under two kinds of data signals. As shown in FIG. 3, a timing of each node under a first data signal is shown as a curve Vda1 and a timing of each node under a second data signal is shown as a curve Vda2. Since voltages of the first data signal and the second data signal are different, before the reset phase t1, a voltage of the first node N1 is different, a voltage of the third node N3 is also different, and a voltage of the second node is all a voltage of the first power supply terminal VDD; in the reset phase t1, voltages of the first node N1 under two kinds of data signals are all pulled down to an initial voltage. Since a pull-down variation amount of the first node N1 under the first data signal is less than a pull-down variation amount of the first node N1 under the second data signal, a pull-down variation amount of the second node under the first data signal is less than a pull-down variation amount of the second node N2 under the second data signal, i.e., in the reset phase, a voltage of the second node N2 under the first data signal is less than a voltage of the second node N2 under the second data signal, so Vgs (gate-source voltage difference) of the drive transistor is different under different data signals. At the same time, since the Vgs of the drive transistor will affect its threshold voltage, a display panel will have afterimage and flicker problems. For example, when the display panel is converted from a black-and-white picture to a picture with a same gray scale, since threshold voltages of the drive transistor in pixels corresponding to the black-and-white picture are different, after the conversion to the picture with the same gray scale, different gray scales will be displayed respectively in a region where a black-and-white picture of a previous frame is located, that is, an afterimage problem appears.

Figure 4:
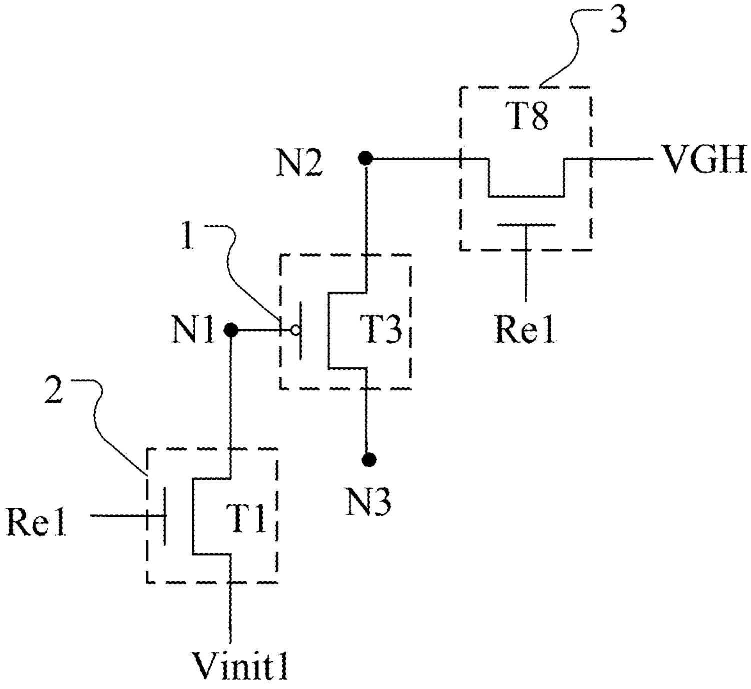
FIG. 4 is a schematic diagram of a structure of a pixel drive circuit according to an exemplary embodiment of the present disclosure.

Based on this, an exemplary embodiment provides a pixel drive circuit, as shown in FIG. 4, which is a schematic diagram of a structure of a pixel drive circuit according to an exemplary embodiment of the present disclosure. The pixel drive circuit may include: a drive circuit 1, a first reset circuit 2, and a second reset circuit 3, the drive circuit 1 is connected with the first node N1 and the second node N2, and is configured to output a drive current according to a voltage difference between the first node N1 and the second node N2; the first reset circuit 2 is connected with the first node N1, the first initial signal terminal Vinit1, and the first reset signal terminal Re1, and is configured to transmit a signal of the first initial signal terminal Vinit1 to the first node N1 in response to a signal of the first reset signal terminal Re1; the second reset circuit 3 is connected with the second node N2 and the first power supply terminal VGH, and is configured to transmit a signal of the first power supply terminal VGH to the second node N2 in response to a control signal.

In the exemplary embodiment, in a reset phase, the pixel drive circuit may transmit the signal of the first initial signal terminal Vinit1 to the first node N1 by using the first reset circuit 2, at the same time, transmit the signal of the first power supply terminal VGH to the second node N2 by using the second reset circuit 3, so that the pixel drive circuit may reset a gate-source voltage difference of a drive transistor to a same value under different data signals, thereby improving problems of afterimage and flicker of a display panel.

In the exemplary embodiment, as shown in FIG. 4, the drive circuit 1 may also be connected with a third node N3, and the drive circuit 1 may include a drive transistor T3 having a gate connected with the first node N1, a first electrode connected with the second node N2, and a second electrode connected with the third node N3. Among them, the drive transistor T3 may be a P-type transistor, for example, the drive transistor T3 may be a P-type low temperature poly silicon transistor, and the drive transistor T3 may input a drive current to the third node according to a voltage difference between the first node N1 and the second node N2.

It should be understood that in another exemplary embodiment, the drive transistor T3 may be an N-type transistor, and when the drive transistor T3 is the N-type transistor, the drive transistor may input a drive current to the second node according to a voltage difference between the first node N1 and the second node N2. In addition, the drive circuit 1 may also include multiple drive transistors which may be connected in parallel between the second node and the third node.

In the exemplary embodiment, as shown in FIG. 4, the first reset circuit 2 may include a first transistor T1 having a gate connected with the first reset signal terminal Re1, a first electrode connected with the first initial signal terminal Vinit1, and a second electrode connected with the first node N1. A turn-on level of the second reset circuit 3 may have a same polarity as a turn-on level of the first reset circuit 2, the second reset circuit 3 may also be connected with the first reset signal terminal Re1, and may be configured to transmit a signal of the first power supply terminal VGH to the second node N2 in response to a signal of the first reset signal terminal Re1. As shown in FIG. 4, the second reset circuit 3 may include an eighth transistor T8 having a gate connected with the first reset signal terminal Re1, a first electrode connected with the first power supply terminal VGH, and a second electrode connected with the second node N2.

It should be noted that the pixel drive circuit needs to turn on the drive transistor T3 in a threshold compensation phase, so a voltage difference Vinit1−Vgh between the first initial signal terminal Vinit1 and the first power supply terminal VGH needs to be less than a threshold voltage of the drive transistor T3, wherein Vinit1 is a voltage of the first initial signal terminal and Vgh is a voltage of the first power supply terminal VGH. In addition, in another exemplary embodiment, the second reset circuit 3 may also transmit a signal of another signal terminal to the second node in response to a control signal, to reset the second node.

In the exemplary embodiment, each of the first transistor T1 and the eighth transistor T8 may be an oxide transistor, for example, semiconductor materials of the first transistor T1 and the eighth transistor T8 may be indium gallium zinc oxide, and correspondingly, the first transistor T1 and the eighth transistor T8 may be N-type transistors. The oxide transistor has a relatively small turn-off leakage current, so that a leakage current of the first node N1 flowing through the first transistor T1 and a leakage current of the second node N2 flowing through the eighth transistor T8 may be reduced.

Figure 5:
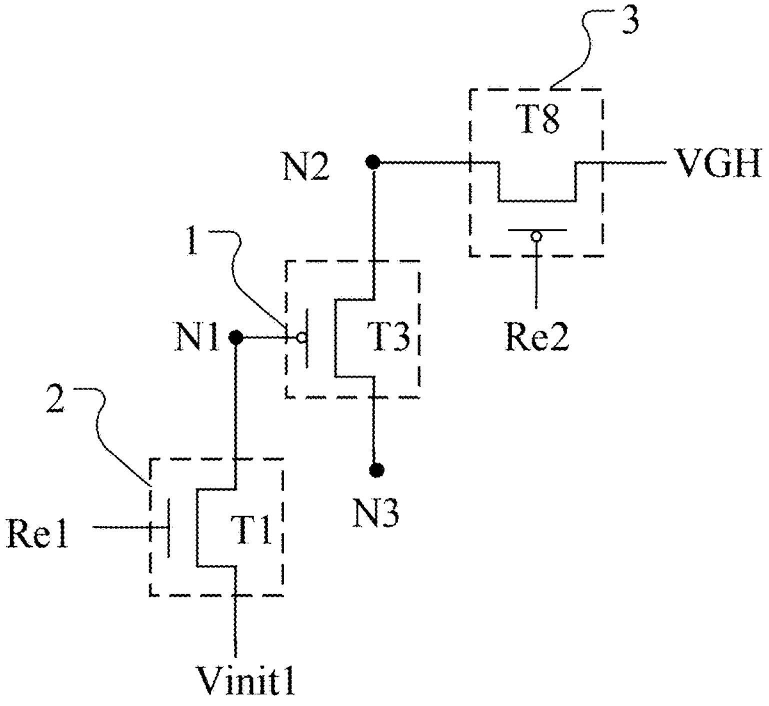
FIG. 5 is a schematic diagram of a structure of a pixel drive circuit according to another exemplary embodiment of the present disclosure.

It should be understood that in another exemplary embodiment, a polarity of a turn-on level of the second reset circuit 3 may also be opposite to a polarity of a turn-on level of the first reset circuit 2. For example, as shown in FIG. 5, FIG. 5 is a schematic diagram of a structure of a pixel drive circuit according to another exemplary embodiment of the present disclosure. The second reset circuit 3 may also be connected with the second reset signal terminal Re2, and the second reset circuit 3 may be configured to transmit a signal of the first power supply terminal VGH to the second node N2 in response to a signal of the second reset signal terminal Re2. Among them, a polarity of the signal of the second reset signal terminal Re2 may be opposite to a polarity of a signal of the first reset signal terminal Re1. The first reset circuit 2 may include an N-type first transistor T1 having a gate connected with the first reset signal terminal Re1, a first electrode connected with the first initial signal terminal Vinit1, and a second electrode connected with the first node N1. The second reset circuit 3 may include a P-type eighth transistor T8 having a gate connected with the second reset signal terminal Re2, a first electrode connected with the first power supply terminal VGH, and a second electrode connected with the second node N2.

Figure 6:
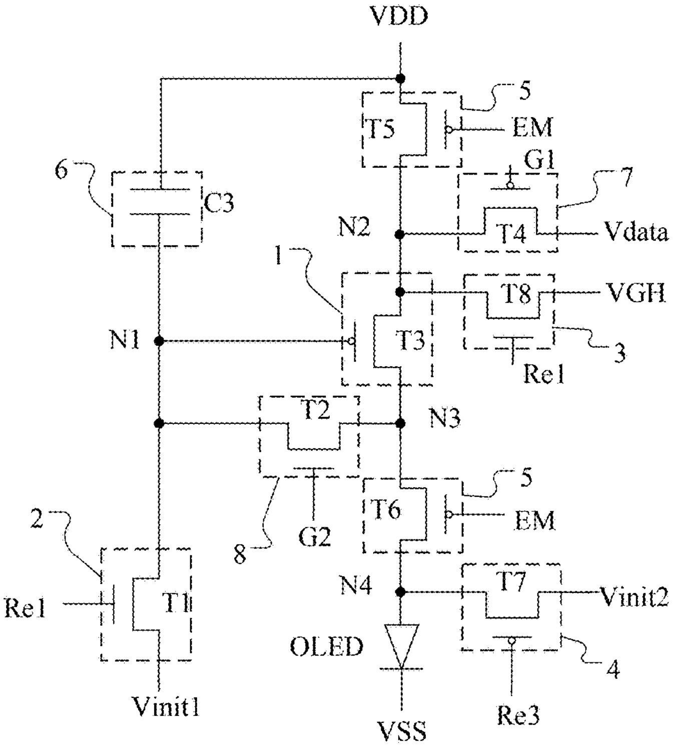
FIG. 6 is a schematic diagram of a structure of a pixel drive circuit according to another exemplary embodiment of the present disclosure.

In the exemplary embodiment, as shown in FIG. 6, FIG. 6 is a schematic diagram of a structure of a pixel drive circuit according to another exemplary embodiment of the present disclosure. The pixel drive circuit may further include: a control circuit 5, and a coupling circuit 6. The control circuit 5 is connected with a second power supply terminal VDD, a second node N2, a third node N3, a fourth node N4, and an enabling signal terminal EM, and is configured to transmit a signal of the second power supply terminal VDD to the second node N2 in response to a signal of the enabling signal terminal EM, and is configured to connect the third node N3 and the fourth node N4 in response to the signal of the enabling signal terminal EM; the coupling circuit 6 is connected between the second power supply terminal VDD and the first node N1.

In the exemplary embodiment, as shown in FIG. 6, the pixel drive circuit may further include: a data writing circuit 7 and a threshold compensation circuit 8. The data writing circuit is connected with the second node N2, a data signal terminal Vdata, and a first gate drive signal terminal G1, and is configured to transmit a signal of the data signal terminal Vdata to the second node N2 in response to a signal of the first gate drive signal terminal G1. The threshold compensation circuit 8 may be connected with the first node N1 and the third node N3, and is configured to connect the first node N1 and the third node N3 in response to a control signal. The data writing circuit 7 and the threshold compensation circuit 8 are configured to be turned on in a threshold compensation phase to write a compensation voltage Vdata+Vth into the first node N1, wherein Vdata is a voltage of the data signal terminal and Vth is a threshold voltage of a drive transistor. It should be understood that, in another exemplary embodiment, there is another way to write the compensation voltage into the first node N1. For example, the data writing circuit may be connected with the third node N3, the data signal terminal Vdata, and the first gate drive signal terminal G1, and the data writing circuit is configured to transmit a signal of the data signal terminal Vdata to the third node N3 in response to a signal of the first gate drive signal terminal G1, at the same time, the threshold compensation circuit 8 may be connected with the first node N1 and the second node N2, and the threshold compensation circuit 8 may be configured to connect the first node N1 and the second node N2 in response to a control signal. When the data writing circuit 7 and the threshold compensation circuit 8 are turned on, the pixel drive circuit may also write the compensation voltage Vdata+Vth to the first node N1.

In the exemplary embodiment, as shown in FIG. 6, the fourth node N4 may be configured to be connected with a light emitting unit OLED, the light emitting unit OLED may be a light emitting diode, another electrode of the light emitting unit OLED may be connected with a fourth power supply terminal VSS, and a voltage of the fourth power supply terminal VSS is less than a voltage of the second power supply terminal VDD. The pixel drive circuit may further include a third reset circuit 4, the third reset circuit 4 is connected with the fourth node N4 and a second initial signal terminal Vinit2, and is configured to transmit a signal of the second initial signal terminal Vinit2 to the fourth node N4 in response to a control signal. Among them, writing an initial signal to the fourth node N4 may eliminate a carrier that is not recombined on an internal light emitting interface of the light emitting diode and alleviate aging of the light emitting diode.

In the exemplary embodiment, as shown in FIG. 6, the control circuit 5 may include a fifth transistor T5 and a sixth transistor T6, the fifth transistor T5 has a gate connected with the enabling signal terminal EM, a first electrode connected with the second power supply terminal VDD, and a second electrode connected with the second node N2; the sixth transistor T6 has a gate connected with the enabling signal terminal EM, a first electrode connected with the third node N3, and a second electrode connected with the fourth node N4. The coupling circuit 6 may include a third capacitor C3, and the third capacitor C3 is connected between the second power supply terminal VDD and the first node N1.

In the exemplary embodiment, as shown in FIG. 6, a polarity of a turn-on level of the threshold compensation circuit 8 may be opposite to a polarity of a turn-on level of the data writing circuit 7; the threshold compensation circuit 8 may also be connected with a second gate drive signal terminal G2, the threshold compensation circuit 8 is configured to connect the first node N1 and the third node N3 in response to a signal of the second gate drive signal terminal G2; among them, a polarity of the signal of the first gate drive signal terminal G1 may be opposite to a polarity of the signal of the second gate drive signal terminal G2. The data writing circuit 7 may include a fourth transistor T4, the fourth transistor T4 has a gate connected with the first gate drive signal terminal G1, a first electrode connected with the data signal terminal Vdata, and a second electrode connected with the second node N2; the threshold compensation circuit 8 may include a second transistor T2, the second transistor T2 has a gate connected with the second gate drive signal terminal G2, a first electrode connected with the first node N1, and a second electrode connected with the third node N3; among them, the fourth transistor T4 may be a P-type transistor, for example, the fourth transistor T4 may be a P-type low temperature polycrystalline silicon transistor, and a low temperature polycrystalline silicon transistor has a relatively high carrier mobility, thereby improving a response speed of the fourth transistor T4; the second transistor T2 may be an N-type transistor, for example, the second transistor T2 may be an oxide transistor, and a semiconductor material of the second transistor T2 may be indium gallium zinc oxide. Setting the second transistor T2 as the oxide transistor may reduce a leakage current of the pixel drive circuit flowing through the second transistor at the first node N1 of a light emitting node.

It should be understood that, in another exemplary embodiment, both the fourth transistor T4 and the second transistor T2 may also be N-type transistors or P-type transistors, and correspondingly, the fourth transistor T4 and the second transistor T2 may also share a same gate drive signal terminal.

In the exemplary embodiment, as shown in FIG. 6, the third reset circuit 4 may also be connected with a third reset signal terminal Re3, and the third reset circuit 4 may be configured to transmit a signal of the second initial signal terminal Vinit2 to the fourth node N4 in response to a signal of the third reset signal terminal Re3. The third reset circuit 4 may include a seventh transistor T7, the seventh transistor T7 has a gate connected with the third reset signal terminal Re3, a first electrode connected with the second initial signal terminal Vinit2, and a second electrode connected with the fourth node N4. Among them, the seventh transistor T7 may be a P-type transistor, for example, the seventh transistor T7 may be a P-type low temperature polycrystalline silicon transistor, and a low temperature polycrystalline silicon transistor has a relatively high carrier mobility, so that the seventh transistor T7 has a relatively fast response speed.

Figure 7:
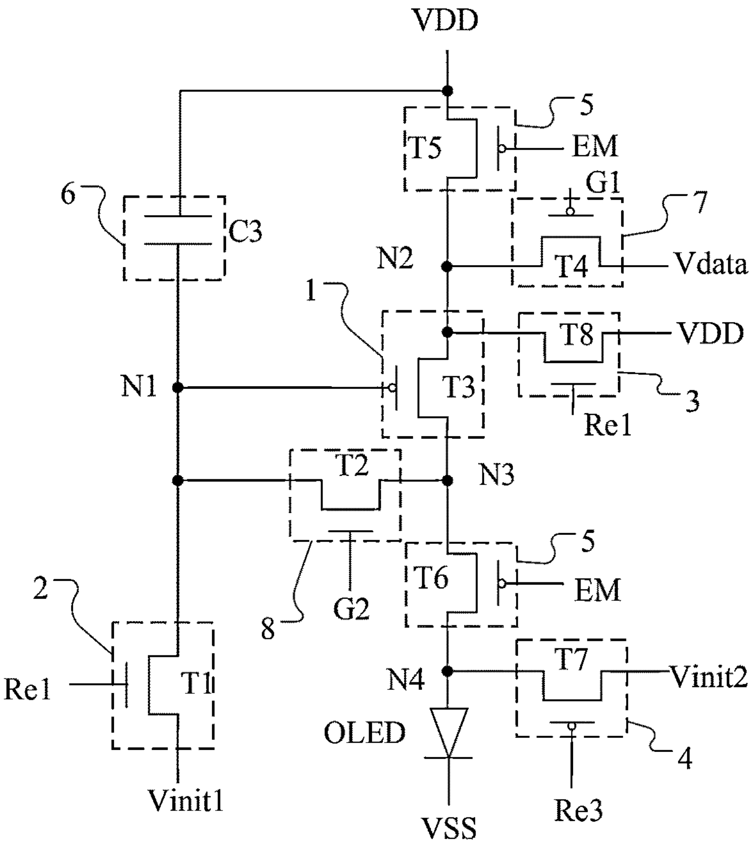
FIG. 7 is a schematic diagram of a structure of a pixel drive circuit according to another exemplary embodiment of the present disclosure.

In the exemplary embodiment, as shown in FIG. 6, the first electrode of the eighth transistor T8 and the first electrode of the fifth transistor T5 are respectively connected with different power supply terminals, It should be understood that, in another exemplary embodiment, as shown in FIG. 7, FIG. 7 is a schematic diagram of a structure of a pixel drive circuit according to another exemplary embodiment of the present disclosure, the first electrode of the eighth transistor T8 and the first electrode of the fifth transistor T5 may be connected with a same power supply terminal, that is, the second power supply terminal VDD may share the first power supply terminal VGH.

Figure 8:
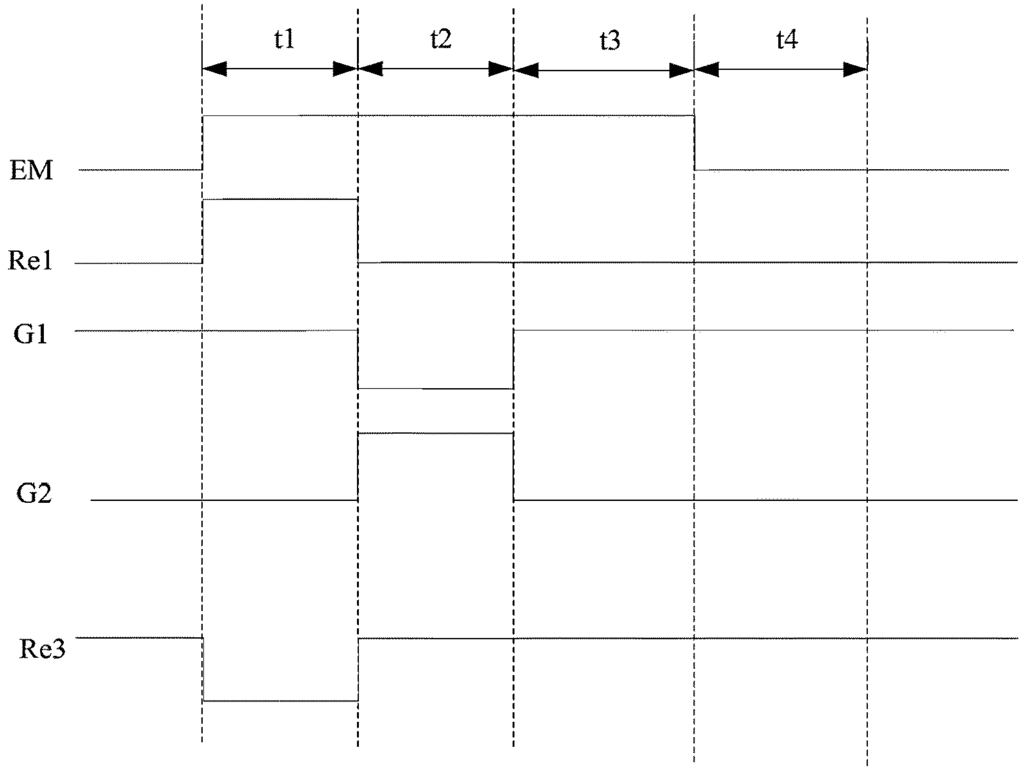
FIG. 8 is a timing diagram of each node of the pixel drive circuit in FIG. 7 in a drive method.

As shown in FIG. 8, FIG. 8 is a timing diagram of each node of the pixel drive circuit in FIG. 7 in a drive method, wherein G1 represents a timing of a first gate drive signal terminal, G2 represents a timing of a second gate drive signal terminal, Re1 represents a timing of a first reset signal terminal, Re3 represents a timing of a third reset signal terminal, and EM represents a timing of an enabling signal terminal. The drive method of the pixel drive circuit may include four phases: a reset phase t1, a threshold compensation phase t2, a buffer phase t3, and a light emitting phase t4. Among them, in the reset phase t1, the enabling signal terminal EM, the first reset signal terminal Re1, and the first gate drive signal terminal output high-level signals, the second gate drive signal terminal G2 and the third reset signal terminal Re3 output low-level signals, a first transistor T1, a seventh transistor T7, and an eighth transistor T8 are turned on, a first initial signal terminal Vinit1 inputs a first initial signal to a first node N1, a first power supply terminal VDD inputs a power supply signal to a second node N2, and a second initial signal terminal Vinit2 inputs a second initial signal to a fourth node, wherein voltages of the first initial signal and the second initial signal may be the same or different. In the threshold compensation phase t2, the enabling signal terminal EM, the second gate drive signal terminal G2, and the third reset signal terminal output high-level signals, the first reset signal terminal Re1 and the first gate drive signal terminal G1 output low-level signals, a second transistor T2 and a fourth transistor T4 are turned on, and a data signal terminal Vdata writes a compensation voltage Vdata+Vth into the first node N1, wherein Vdata is a voltage of the data signal terminal and Vth is a threshold voltage of a drive transistor. In the buffer phase t3, the enabling signal terminal EM, the third reset signal terminal Re3, and the first gate drive signal terminal G1 output high-level signals, the second gate drive signal terminal G2 and the first reset signal terminal Re1 output low-level signals, and all transistors are turned off. In the light emitting phase t4, the third reset signal terminal Re3 and the first gate drive signal terminal G1 output high-level signals, the enabling signal terminal EM, the second gate drive signal terminal G2, and the first reset signal terminal Re1 output low-level signals, a fifth transistor T5 and a sixth transistor T6 are turned on, and a drive transistor T3 emits light under an action of the voltage Vdata+Vth stored in a third capacitor C3. It should be understood that, in another exemplary embodiment, the drive method may also not include the buffer phase, and the first transistor T1 and the seventh transistor T7 may also be turned on at different phases. In the threshold compensation phase t2, a duration of an active level (low level) of the first gate drive signal terminal G1 may be less than a duration of an active level (high level) of the second gate drive signal terminal G2. In this threshold compensation phase t2, the first gate drive signal terminal G1 may scan a row of pixel drive circuits, and the second gate drive signal terminal G2 may scan multiple rows of pixel drive circuits row by row, for example, two rows of pixel drive circuits.

Figure 9:
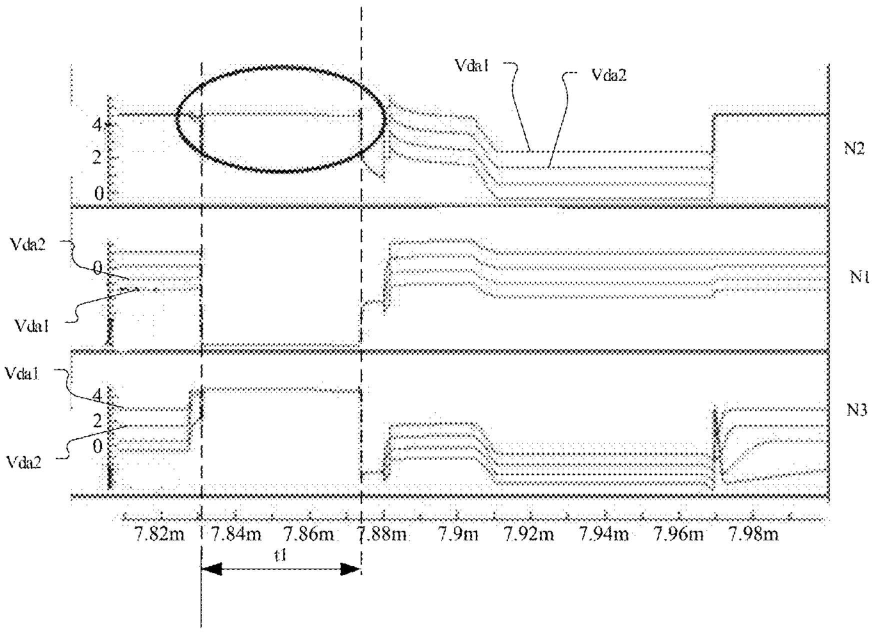
FIG. 9 is a simulation timing diagram of a first node, a second node, and a third node of the pixel drive circuit in FIG. 7 in the drive method shown in FIG. 8.

FIG. 9 is a simulation timing diagram of a first node, a second node, and a third node of the pixel drive circuit in FIG. 7 in the drive method shown in FIG. 8. N1 represents a timing diagram of the first node N1, N2 represents a timing diagram of the second node N2, N3 represents a timing diagram of the third node N3, among them, FIG. 9 specifically shows a timing diagram of each node of the pixel drive circuit shown in FIG. 7 under four kinds of data signals, in a reset phase t1 in FIG. 9, the first node N1 under the four kinds of data signals needs to be reset, and the exemplary embodiment is explained with a timing of each node under two kinds of data signals. As shown in FIG. 9, a timing of each node under a first data signal is shown as a curve Vda1 and a timing of each node under a second data signal is shown as a curve Vda2. As shown in FIG. 9, since voltages of the first data signal and the second data signal are different, before the reset phase t1, a voltage of the first node N1 is different, a voltage of the third node N3 is also different, and a voltage of the second node is all a voltage of the first power supply terminal VDD; in the reset phase t1, voltages of the first node N1 under the two kinds of data signals are pulled down to a voltage of the first initial signal, meanwhile a voltage of the second node N2 is also initialized to the voltage of the first power supply terminal VDD, so that at the end of the reset phase, a gate-source voltage difference of a drive transistor under the first data signal is equal to a gate-source voltage difference of the drive transistor under the second data signal, and thus the pixel drive circuit may improve a problem of afterimage due to a difference of gate-source voltage differences of the drive transistor under different data signals.

An exemplary embodiment of the present disclosure also provides a drive method of a pixel drive circuit, which is used for driving the above pixel drive circuit.

Herein, the method includes: in a reset phase, a signal of the first initial signal terminal Vinit1 is transmitted to the first node N1 by using the first reset circuit 2, at the same time, a signal of the first power supply terminal VGH is transmitted to the second node N2 by using the second reset circuit 3. The pixel drive method has been described in detail in the above contents and will not be repeated here.

An exemplary embodiment also provides a display panel which may include the above pixel drive circuit. The display panel may be applied to a display apparatus such as a mobile phone, a tablet computer, and a television.

As shown in FIG. 1, in the related art, there is a parasitic capacitance between the first node N1 and the gate drive signal terminal G1. As shown in FIG. 2, at the end of the threshold compensation phase t2, a signal of the gate drive signal terminal G1 changes from a high level to a low level, under a coupling action of this parasitic capacitance, a voltage of the first node N1 is pulled down by the gate drive signal terminal G1, so that a maximum voltage of a data signal terminal cannot achieve display of 0 gray scale (a black picture), or if 0 gray scale needs to be displayed normally, the data signal terminal needs to provide a larger voltage signal.

Figure 10:
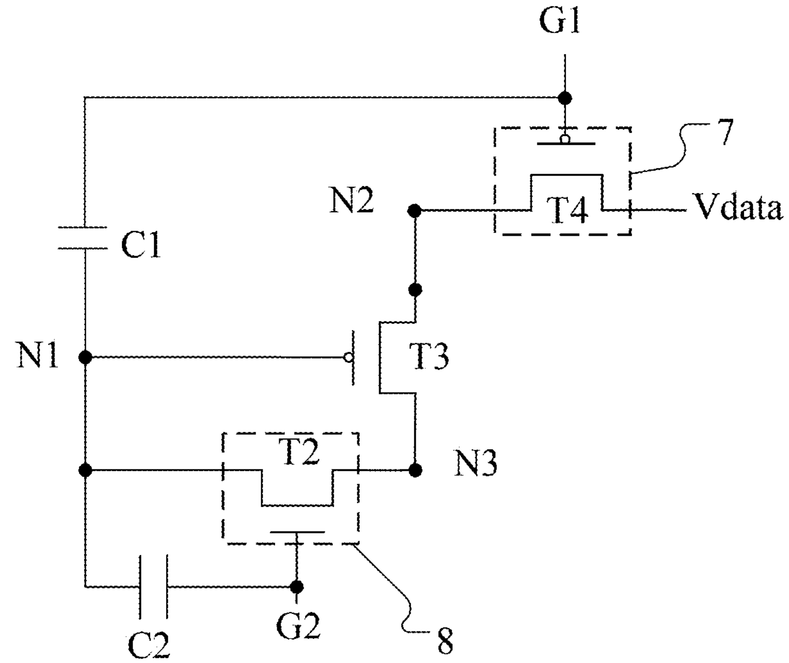
FIG. 10 is a schematic diagram of a structure of a pixel drive circuit according to an exemplary embodiment of the present disclosure.

Based on this, an exemplary embodiment provides a pixel drive circuit, as shown in FIG. 10, which is a schematic diagram of a structure of a pixel drive circuit according to an exemplary embodiment of the present disclosure, wherein the pixel drive circuit may include: a drive transistor T3, a data writing circuit 7, a threshold compensation circuit 8, a first capacitor C1, a second capacitor C2, the drive transistor T3 has a gate connected with a first node N1, a first electrode connected with a second node N2, and a second electrode connected with a third node N3; the data writing circuit 7 is connected with the second node N2 and a data signal terminal Vdata, and is configured to transmit a signal of the data signal terminal Vdata to the second node N2 in response to a signal of a first gate drive signal terminal G1; the threshold compensation circuit 8 is connected with the first node N1, the third node N3, and a second gate drive signal terminal G2, and is configured to connect the first node N1 and the third node N3 in response to a signal of the second gate drive signal terminal G2; the first capacitor C1 is connected between the first node N1 and the first gate drive signal terminal G1; the second capacitor C2 is connected between the first node N1 and the second gate drive signal terminal G2; wherein a turn-on level of the data writing circuit 7 is a low level, a turn-on level of the threshold compensation circuit 8 is a high level, and a capacitance value of the first capacitor C1 is greater than a capacitance value of the second capacitor C2.

In the exemplary embodiment, in a threshold compensation phase, the first gate drive signal terminal G1 may output a low-level signal and the second gate drive signal terminal G2 may output a high-level signal, thereby achieving that a compensation voltage Vdata+Vth is written into the first node N1, Vdata is a voltage of the data signal terminal and Vth is a threshold voltage of the drive transistor T3. After the threshold compensation phase is finished, a signal of the first gate drive signal terminal G1 changes from a low level to a high level, and the first node N1 is pulled high by the first gate drive signal terminal G1 under a coupling action of the first capacitor C1; a signal of the second gate drive signal terminal G2 changes from a high level to a low level, and the first node N1 is pulled low by the second gate drive signal terminal G2 under a coupling action of the second capacitor C2. Since the capacitance value of the first capacitor C1 is greater than the capacitance value of the second capacitor C2, the first node N1 is generally pulled high. Therefore, a source drive circuit disposed corresponding to the pixel drive circuit only needs to provide a relatively small voltage signal to the data signal terminal to achieve display of a limit gray scale (a minimum gray scale or a maximum gray scale) of the pixel drive circuit, that is, a display panel to which the pixel drive circuit is applied may have relatively small power consumption.

In the exemplary embodiment, the drive transistor T3 may be a P-type transistor, for example, the drive transistor may be a P-type low temperature poly silicon transistor. When the drive transistor T3 is the P-type transistor, the larger a voltage at the first node N1 is, the smaller an output current of the drive transistor T3 is, that is, the pixel drive circuit can reduce a data signal voltage output by the source drive circuit at 0 gray scale. It should be understood that, in another exemplary embodiment, the drive transistor T3 may be an N-type transistor, and when the drive transistor T3 is the N-type transistor, the larger the voltage at the first node N1 is, the larger the output current of the drive transistor T3 is, that is, the pixel drive circuit can reduce a data signal voltage output by the source drive circuit at the maximum gray scale.

In the exemplary embodiment, the capacitance value of the first capacitor C1 is C1, the capacitance value of the second capacitor C2 is C2, and C1/C2 may be greater than or equal to 1.5 and less than or equal to 4, for example, C1/C2 may be 1.5, 2, 2.3, 2.5, 3, 3.5, and 4. Among them, the larger a value of C1/C2 is, the more obvious an effect that the first node N1 is pulled up is.

| | | | Vdata-L0 (V) | | | |
|---|---|---|---|---|---|---|
| C1/C2 | C1 (fF) | C2 (fF) | R | G | B | ΔV |
| 2.2 | 5.48 | 2.46 | | 6.2 | | |
| 1.35 | 5.8 | 4.31 | 6.72 | 6.77 | 6.51 | 0.12 |
| 1.73 | 6.94 | 4.02 | 6.51 | 6.58 | 6.32 | 0.31 |
| 2.05 | 6.94 | 3.39 | 6.42 | 6.46 | 6.2 | 0.43 |
| 2.3 | 7.92 | 3.44 | 6.29 | 6.36 | 6.09 | 0.53 |

As shown in the above table, Vdata-L0 represents a voltage of a data signal required for each color sub-pixel at 0 gray scale, and ΔV represents a difference between a maximum output voltage of the source drive circuit and a voltage of a maximum data signal required at 0 gray scale, wherein the maximum output voltage of the source drive circuit is 6.89 V. Among them, multiple groups of data corresponding to C1/C2 of 1.35, 1.73, 2.05, and 2.3 are multiple groups of data under a same design structure (except C1/C2, other structures are the same), and data corresponding to C1/C2 of 2.2 is data under another design structure. According to this table, it may be seen that under the same design structure, the larger C1/C2 is, the more obvious the effect of the first node N1 is pulled up is, and thus the smaller a voltage of a required data signal at 0 gray scale.

In the exemplary embodiment, as shown in FIG. 10, the data writing circuit 7 may include: a P-type fourth transistor T4, for example, the fourth transistor T4 may be a P-type low temperature polycrystalline silicon transistor, the fourth transistor T4 has a gate connected with the first gate drive signal terminal G1, a first electrode connected with the second node N2, and a second electrode connected with the data signal terminal Vdata. The threshold compensation circuit 8 may include: an N-type second transistor T2, for example, the second transistor T2 may be an N-type oxide transistor, a semiconductor material of the oxide transistor may be indium gallium zinc oxide, the second transistor T2 has a gate connected with the second gate drive signal terminal G2, a first electrode connected with the first node N1, and a second electrode connected with the third node N3.

Figure 11:
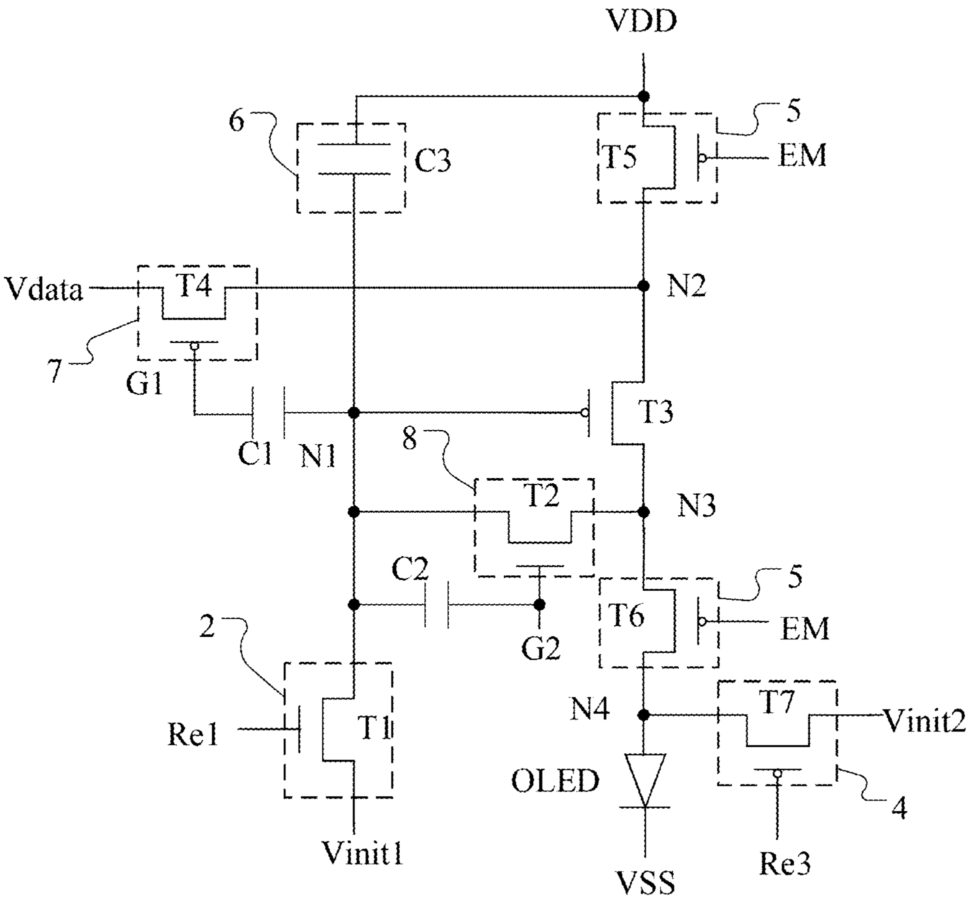
FIG. 11 is a schematic diagram of a structure of a pixel drive circuit according to another exemplary embodiment of the present disclosure.

In the exemplary embodiment, as shown in FIG. 11, FIG. 11 is a schematic diagram of a structure of a pixel drive circuit according to another exemplary embodiment of the present disclosure. The pixel drive circuit may further include: a control circuit 5, and a coupling circuit 6. The control circuit 5 may be connected with a second power supply terminal VDD, a second node N2, a third node N3, a fourth node N4, an enabling signal terminal EM, and the control circuit 5 may be configured to transmit a signal of the second power supply terminal VDD to the second node N2 in response to a signal of the enabling signal terminal EM, and configured to connect the third node N3 and the fourth node N4 in response to the signal of the enabling signal terminal EM. The coupling circuit 6 may be connected between the first node N1 and the second power supply terminal VDD. It should be understood that, in another exemplary embodiment, the control circuit 5 may also be configured to transmit a signal of the second power supply terminal VDD to the third node N3 in response to a signal of the enabling signal terminal EM, and configured to connect the second node N2 and the fourth node N4 in response to the signal of the enabling signal terminal EM.

In the exemplary embodiment, as shown in FIG. 11, the pixel drive circuit may further include a first reset circuit 2, and the first reset circuit 2 may be connected with the first node N1, a first initial signal terminal Vinit1, and a first reset signal terminal Re1. The first reset circuit 2 may be configured to transmit a signal of the first initial signal terminal Vinit1 to the first node N1 in response to a signal of the first reset signal terminal Re1.

In the exemplary embodiment, as shown in FIG. 11, the fourth node N4 may be configured to be connected with a light emitting unit OLED. The pixel drive circuit may further include a third reset circuit 4, the third reset circuit 4 is connected with the fourth node N4, a second initial signal terminal Vinit2, and a third reset signal terminal Re3, and the third reset circuit 4 may be configured to transmit a signal of the second initial signal terminal Vinit2 to the fourth node N4 in response to a signal of the third reset signal terminal Re3. Another terminal of the light emitting unit OLED may be connected with a third power supply terminal VSS, and the light emitting unit OLED may be a light emitting diode. Writing an initial signal to the fourth node N4 may eliminate a carrier that is not recombined on an internal light emitting interface of the light emitting diode and alleviate aging of the light emitting diode.

In the exemplary embodiment, as shown in FIG. 11, the coupling circuit 6 may include a third capacitor C3 connected between the first node N1 and the second power supply terminal VDD. Among them, a capacitance value of the third capacitor C3 may be greater than a capacitance value of the first capacitor C1, and the capacitance value of the third capacitor C3 may be greater than a capacitance value of the second capacitor C2. Setting the third capacitor C3 to have a relatively large capacitance value may increase a charge storage capability of the third capacitor C3, thereby increasing a maximum duration of a light emitting phase. The control circuit 5 may include a fifth transistor T5 and a sixth transistor T6. The fifth transistor T5 has a gate connected with the enabling signal terminal EM, a first electrode connected with the second power supply terminal VDD, and a second electrode connected with the second node N2. The sixth transistor T6 has a gate connected with the enabling signal terminal EM, a first electrode connected with the third node N3, and a second electrode connected with the fourth node N4. The first reset circuit 2 may include: a first transistor T1, the first transistor T1 has a gate connected with the first reset signal terminal Re1, a first electrode connected with the first initial signal terminal Vinit1, and a second electrode connected with the first node N1. The third reset circuit 4 may include a seventh transistor T7, the seventh transistor T7 has a gate connected with the third reset signal terminal Re3, a first electrode connected with the second initial signal terminal Vinit2, and a second electrode connected with the fourth node N4.

Among them, the first transistor T1 and the second transistor T2 may be N-type transistors, a semiconductor material of the N-type transistors may be indium gallium zinc oxide, and an oxide transistor has a relatively small turn-off leakage current, so that a leakage current of the first node N1 flowing through the first transistor T1 and the second transistor T2 in the light emitting phase may be reduced. The fourth transistor T4, the fifth transistor T5, the sixth transistor T6, and the seventh transistor T7 may be P-type transistors, for example, the fourth transistor T4, the fifth transistor T5, the sixth transistor T6, and the seventh transistor T7 may be P-type low temperature polycrystalline silicon transistors, and a P-type low temperature polycrystalline silicon transistor has a relatively high carrier mobility, thereby facilitating achievement of a display panel with a high resolution, a high reaction speed, a high pixel density, and a high aperture ratio.

Figure 12:
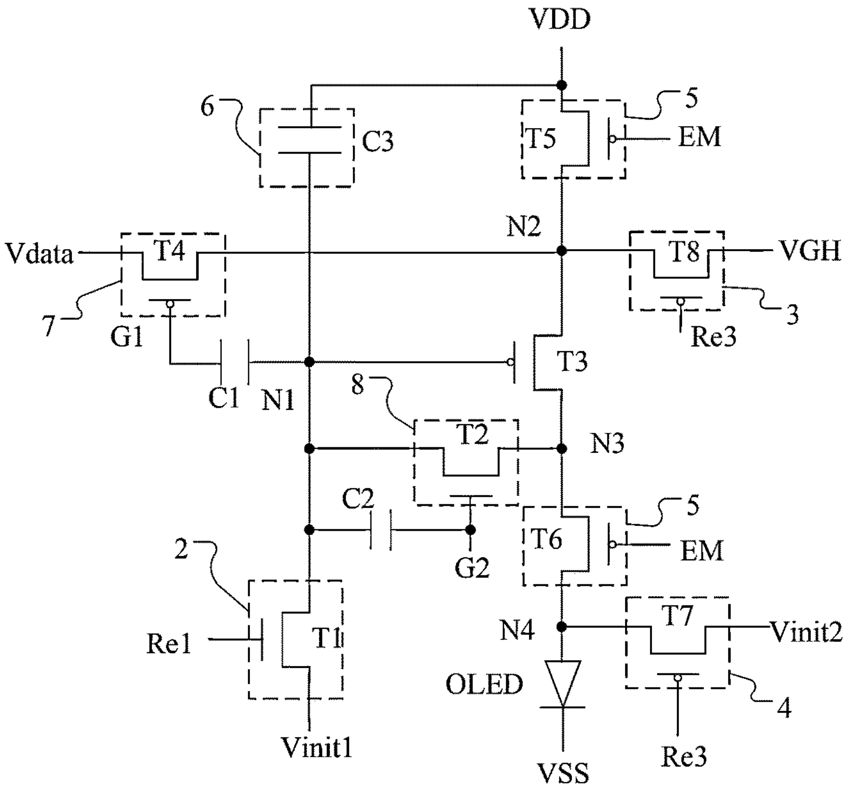
FIG. 12 is a schematic diagram of a structure of a pixel drive circuit according to another exemplary embodiment of the present disclosure.

FIG. 12 is a schematic diagram of a structure of a pixel drive circuit according to another exemplary embodiment of the present disclosure. The pixel drive circuit may also include a second reset circuit 3. The second reset circuit 3 may be connected with the second node N2 and a first power supply terminal VGH, and the second reset circuit 3 may be configured to transmit a signal of the first power supply terminal VGH to the second node N2 in response to a control signal. In the exemplary embodiment, a polarity of a turn-on level of a first reset circuit may be opposite to a polarity of a turn-on level of a third reset circuit, a polarity of a signal of a first reset signal terminal Re1 may be opposite to a polarity of a signal of a third reset signal terminal Re3, and a polarity of a turn-on level of the second reset circuit 3 may be opposite to a polarity of a turn-on level of the first reset circuit 2. The second reset circuit 3 may also be connected with the third reset signal terminal Re3, and the second reset circuit 3 may be configured to transmit a signal of the first power supply terminal VGH to the second node N2 in response to a signal of the third reset signal terminal Re3.

In the exemplary embodiment, there is a parasitic capacitance between a gate and a source of a drive transistor in the pixel drive circuit. In a reset phase of the pixel drive circuit, a gate voltage of the drive transistor is initialized to an initial voltage, and under a coupling action of the above parasitic capacitance, a source voltage of the drive transistor is correspondingly changed. When different gray scales are reset in the reset phase, variation amounts of the gate voltage of the drive transistor are different, so that variation amounts of the source voltage of the drive transistor are also different, which in turn causes Vgs (gate-source voltage difference) of the drive transistor to be different after the reset phase is completed. At the same time, since the Vgs of the drive transistor will affect its threshold voltage, a display panel will have an afterimage problem. For example, when the display panel is converted from a black-and-white picture to a picture with a same gray scale, since threshold voltages of the drive transistor in pixels corresponding to the black-and-white picture are different, after the conversion to the picture with the same gray scale, different gray scales will be respectively displayed in a region where a black-and-white picture of a previous frame is located, that is, the afterimage problem appears. In the exemplary embodiment, the pixel drive circuit may transmit a signal of the first initial signal terminal Vinit1 to the first node N1 by using the first reset circuit 2 in the reset phase, at the same time, transmit a signal of the first power supply terminal VGH to the second node N2 by using the second reset circuit 3, so that under different data signals, the pixel drive circuit may reset a gate-source voltage difference of the drive transistor to a same value, thereby improving the afterimage problem of the display panel.

In the exemplary embodiment, the second reset circuit 3 may include: an eighth transistor T8. The eighth transistor T8 has a gate connected with the third reset signal terminal Re3, a first electrode connected with the first power supply terminal VGH, and a second electrode connected with the second node N2. Among them, the eighth transistor T8 may be a P-type transistor. It should be understood that, in another exemplary embodiment, a polarity of a turn-on level of a second reset circuit may be the same as a polarity of a turn-on level of a first reset circuit, the second reset circuit may be connected with a first reset signal terminal, and the second reset circuit may be configured to transmit a signal of a first power supply terminal VGH to a second node in response to a signal of the first reset signal terminal. Accordingly, the eighth transistor may be an N-type transistor, and a semiconductor material of the N-type transistor may be indium gallium zinc oxide. The first power supply terminal VGH may also share the second power supply terminal VDD, for example, the second reset circuit may be connected with a second power supply terminal VDD.

Figure 13:
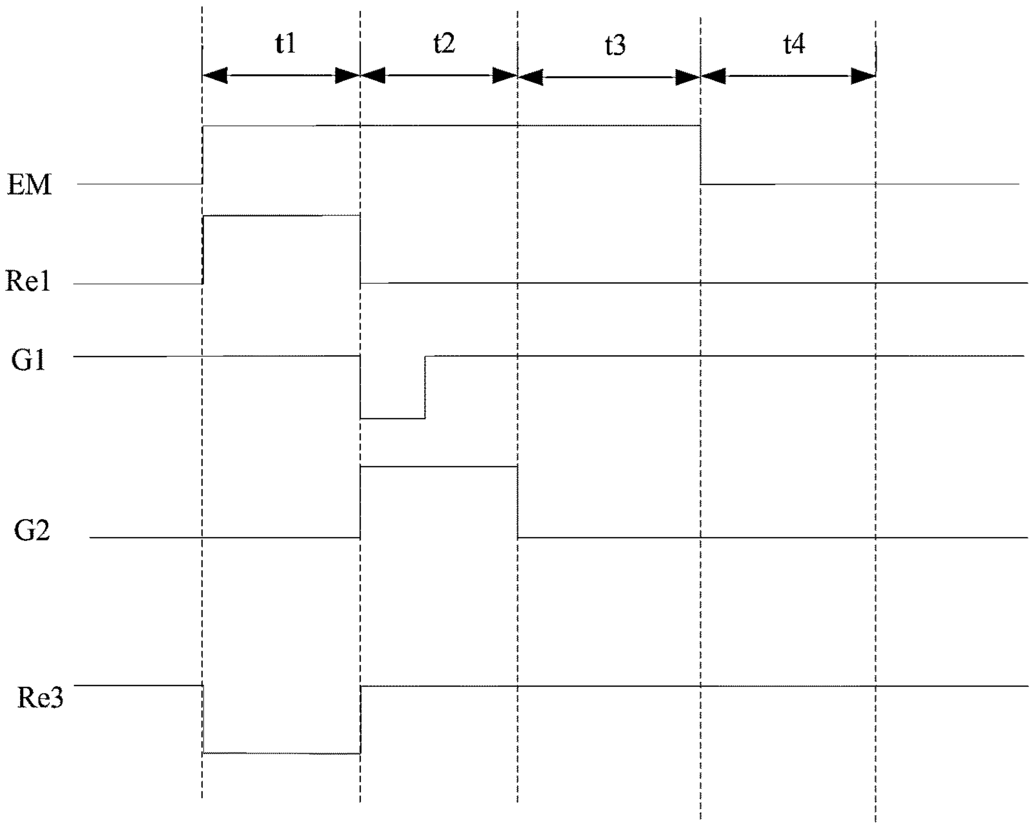
FIG. 13 is a timing diagram of each node of the pixel drive circuit in FIG. 12 in a drive method.

As shown in FIG. 13, FIG. 13 is a timing diagram of each node of the pixel drive circuit in FIG. 12 in a drive method. Herein, G1 represents a timing of a first gate drive signal terminal, G2 represents a timing of a second gate drive signal terminal, Re1 represents a timing of a first reset signal terminal, Re3 represents a timing of a third reset signal terminal, and EM represents a timing of an enabling signal terminal. The drive method of the pixel drive circuit may include four phases: a reset phase t1, a threshold compensation phase t2, a buffer phase t3, and a light emitting phase t4. Among them, in the reset phase t1, the enabling signal terminal EM, the first reset signal terminal Re1, and the first gate drive signal terminal output high-level signals, the second gate drive signal terminal G2 and the third reset signal terminal Re3 output low-level signals, a first transistor T1, a seventh transistor T7, and an eighth transistor T8 are turned on, a first initial signal terminal Vinit1 inputs a first initial signal to a first node N1, a first power supply terminal VDD inputs a power supply signal to a second node N2, and a second initial signal terminal Vinit2 inputs a second initial signal to a fourth node, wherein voltages of the first initial signal and the second initial signal may be the same or different. In the threshold compensation phase t2, the enabling signal terminal EM, the second gate drive signal terminal G2, and the third reset signal terminal output high-level signals, the first reset signal terminal Re1 outputs a low-level signal, the first gate drive signal terminal G1 outputs a low-level signal during at least part of the threshold compensation phase t2, a second transistor T2 and a fourth transistor T4 are turned on, and a data signal terminal Vdata writes a compensation voltage Vdata+Vth into the first node N1, wherein Vdata is a voltage of the data signal terminal and Vth is a threshold voltage of a drive transistor. In the buffer phase t3, the enabling signal terminal EM, the third reset signal terminal Re3, and the first gate drive signal terminal G1 output high-level signals, the second gate drive signal terminal G2 and the first reset signal terminal Re1 output low-level signals, and all transistors are turned off. In the light emitting phase t4, the third reset signal terminal Re3 and the first gate drive signal terminal G1 output high-level signals, the enabling signal terminal EM, the second gate drive signal terminal G2, and the first reset signal terminal Re1 output low-level signals, a fifth transistor T5 and a sixth transistor T6 are turned on, and a drive transistor T3 emits light under an action of the voltage Vdata+Vth stored in a capacitor C. In the exemplary embodiment, in the threshold compensation phase t2, a duration of an active level (low level) of the first gate drive signal terminal G1 may be less than a duration of an active level (high level) of the second gate drive signal terminal G2. In the threshold compensation phase t2, the first gate drive signal terminal G1 may scan a row of pixel drive circuits, and the second gate drive signal terminal G2 may scan multiple rows of pixel drive circuits row by row, for example, the second gate drive signal terminal G2 may scan two rows of pixel drive circuits row by row. It should be understood that, in another exemplary embodiment, the drive method may also not include the buffer phase, and the first transistor T1 and the seventh transistor T7 may also be turned on at different phases. The duration of the active level (low level) of the first gate drive signal terminal G1 may also be equal to the duration of the active level (high level) of the second gate drive signal terminal G2.

Figure 14:
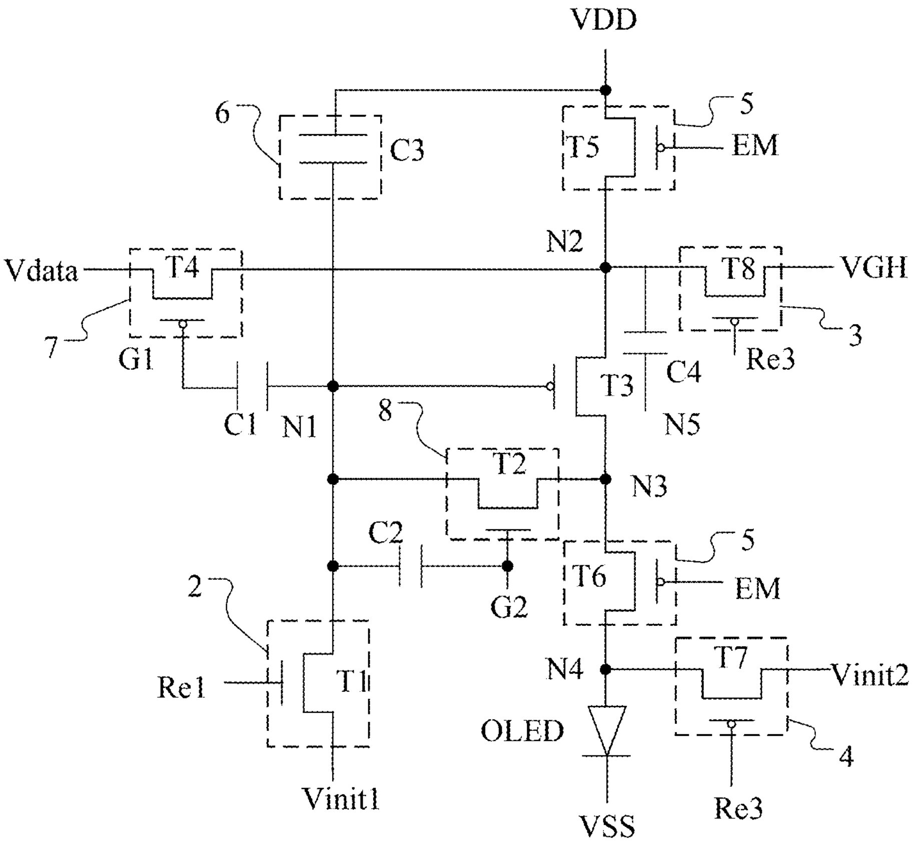
FIG. 14 is a schematic diagram of a structure of a pixel drive circuit according to another exemplary embodiment of the present disclosure.

As shown in FIG. 14, FIG. 14 is a schematic diagram of a structure of a pixel drive circuit according to another exemplary embodiment of the present disclosure. The pixel drive circuit may further include a fourth capacitor C4, a first electrode of the fourth capacitor C4 may be connected with a second node N2, a second power supply terminal VDD may charge the fourth capacitor C4 in a light emitting phase of the pixel drive circuit, and the fourth capacitor C4 may maintain a high level of the second node N2 at a beginning moment of a reset phase, so that this setting may speed up writing of a high-level signal from a first power supply terminal VGH to the second node N2 in the reset phase. A second electrode of the fourth capacitor C4 may be connected with a fifth node N5. When an equipotential conductive part of the fifth node N5 has a pull-down action before a threshold compensation phase or at a beginning phase, the fifth node N5 will have a pull-down action on the second node N2, thus resulting in differences in a voltage of the second node N2 at different positions of a display panel. For example, the equipotential conductive part of the fifth node N5 may be a first gate line for providing a first gate drive signal terminal G1, the first gate line may be partially overlapped with an equipotential conductive part of the second node N2, so that a partial structure of the first gate line may be used for forming the second electrode of the fourth capacitor C4. The first gate line changes from a high level to a low level at a beginning phase of the threshold compensation phase, so that the first gate line will pull down the voltage of the second node N2. In the exemplary embodiment, an overlapping area of the equipotential conductive part of the second node N2 and the first gate line may be reduced as much as possible, so as to reduce a pull-down effect of the first gate line on the second node N2. Among them, a capacitance value C4 of the fourth capacitor C4 may be less than a capacitance value of a second capacitor C2, and the fourth capacitor C4 may be 0.5 fF to 4 fF, for example, 0.5 fF, 2 fF, and 4 fF. The capacitance value C4 of the fourth capacitor C4 may also be less than half of a capacitance value of a first capacitor C1, for example, the capacitance value C4 of the fourth capacitor C4 may be ⅓, ¼, or ⅕, etc. of the capacitance value of the first capacitor C1.

In the exemplary embodiment, as shown in FIG. 12 and FIG. 14, the pixel drive circuit needs to turn on the drive transistor T3 in the threshold compensation phase, so a voltage difference Vinit1−Vgh between the first initial signal terminal Vinit1 and the first power supply terminal VGH needs to be less than a threshold voltage Vth of the drive transistor T3, wherein Vinit1 is a voltage of the first initial signal terminal and Vgh is a voltage of the first power supply terminal VGH. Among them, Vinit1 may be −2 V~−6 V, such as −2 V, −3 V, −4 V, −5 V, and −6 V. Vinit1−Vgh may be less than a*Vth, a may be 2~7, for example, a may be 2, 4, 6, and 7, etc. Vth may be −2 V~−5 V, such as −2 V, −3 V, and −5 V. Vgh may be greater than 1.5 times of Vth, for example, Vgh may be 1.6 times, 1.8 times, or 2 times of Vth, etc.

Figure 15:
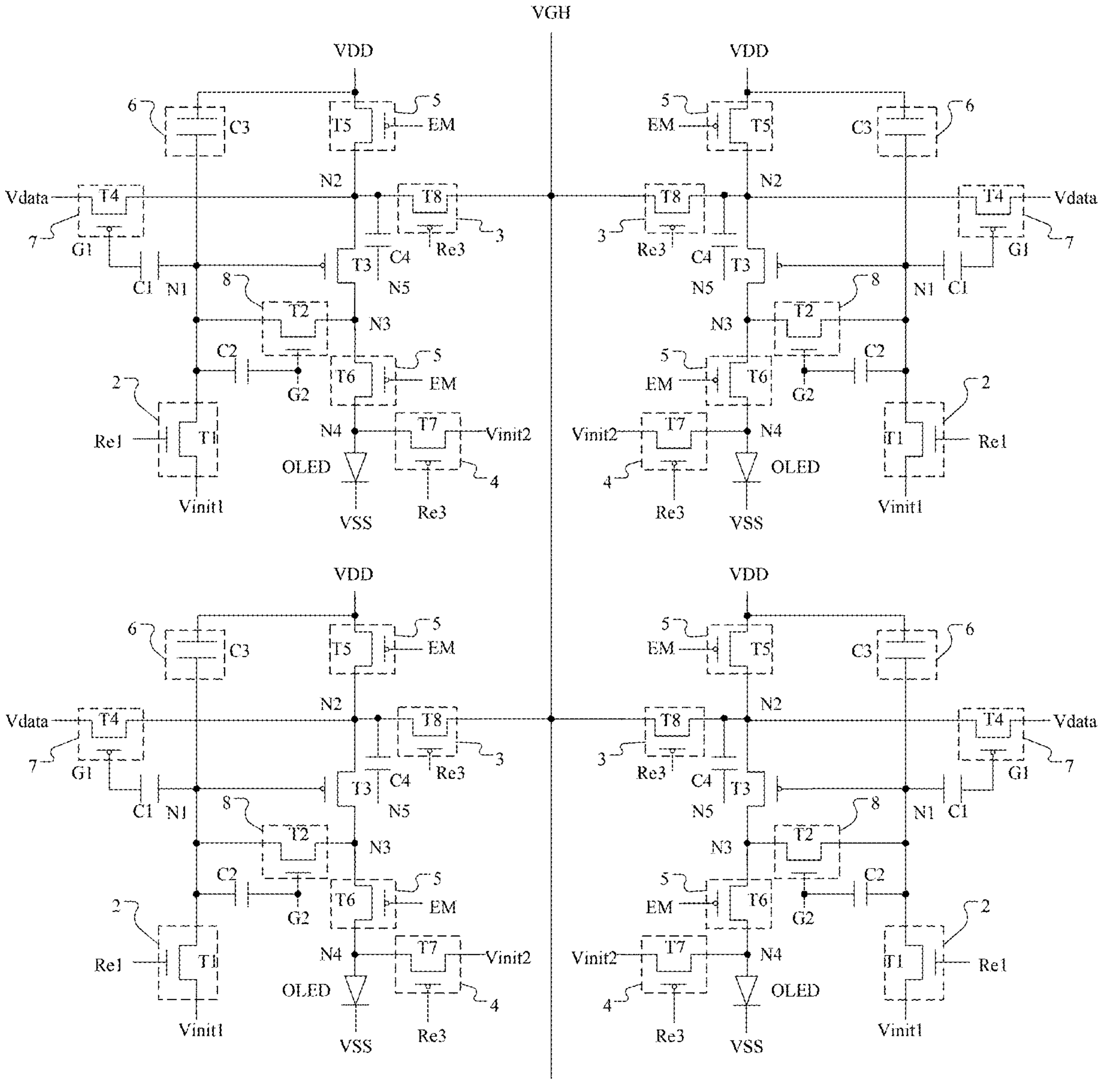
FIG. 15 is a distribution diagram of a pixel drive circuit in a display panel according to an exemplary embodiment of the present disclosure.

FIG. 15 is a distribution diagram of a pixel drive circuit in a display panel according to an exemplary embodiment of the present disclosure. Two adjacent columns of pixel circuits may be connected with a first power supply line VGH extending in a same column direction, the first power supply line VGH is configured to provide a first power supply terminal to the pixel drive circuit, and the first power supply line VGH may be located between the above two adjacent columns of pixel drive circuits. As shown in FIG. 15, in a same pixel row, two pixel circuits in adjacent columns may be mirrored to facilitate wiring.

Figure 16:
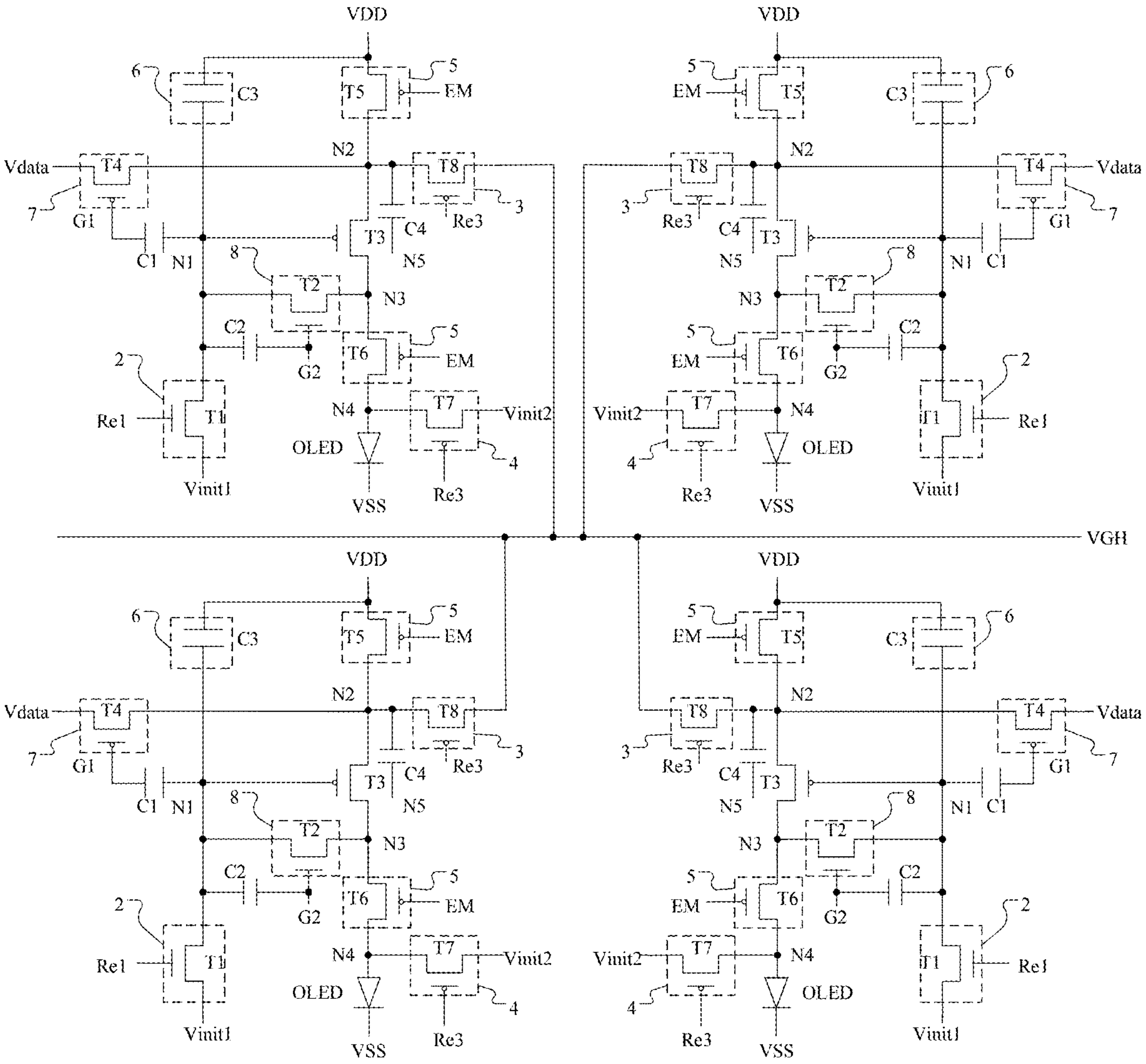
FIG. 16 is a distribution diagram of a pixel drive circuit in a display panel according to another exemplary embodiment of the present disclosure.

FIG. 16 is a distribution diagram of a pixel drive circuit in a display panel according to another exemplary embodiment of the present disclosure. Two adjacent rows of pixel circuits may be connected with a first power supply line VGH extending in a same row direction, the first power supply line VGH is configured to provide a first power supply terminal to the pixel drive circuit, and the first power supply line VGH may be located between the above two adjacent rows of pixel drive circuits. As shown in FIG. 16, in a same pixel row, two pixel circuits in adjacent columns may be mirrored to facilitate wiring.

Figure 17:
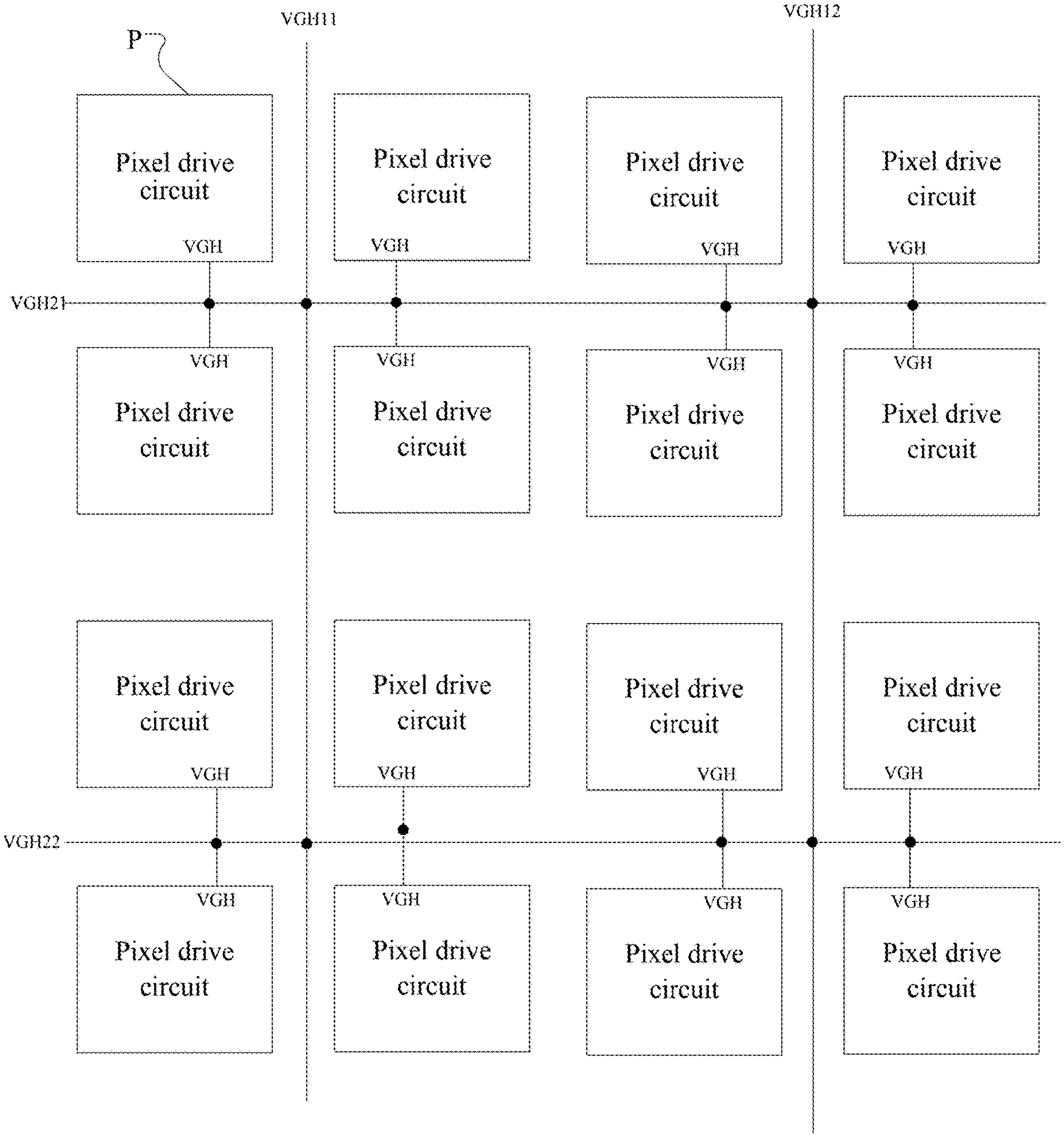
FIG. 17 is a distribution diagram of a pixel drive circuit in a display panel according to another exemplary embodiment of the present disclosure.

FIG. 17 is a distribution diagram of a pixel drive circuit in a display panel according to another exemplary embodiment of the present disclosure. The display panel may include multiple pixel drive circuits P distributed in an array, and multiple first power supply lines VGH11, VGH12, VGH21, and VGH22, each of the first power supply lines VGH11, VGH12, VGH21, and VGH22 may be configured to provide a first power supply terminal. As shown in FIG. 17, first power supply lines VGH11 and VGH12 extend along a column direction, and first power supply lines VGH21 and VGH22 extend along a row direction. Two adjacent rows of pixel circuits may be connected with a first power supply line extending in a same row direction, the first power supply line VGH may be located between the above two adjacent rows of pixel drive circuits, and the first power supply lines extending along the column direction may be connected with multiple first power supply lines extending along the row direction intersecting with the first power supply lines, so that multiple power supply lines may form a grid structure. Among them, the first power supply lines extending along the column direction may be located in a region where a red pixel drive circuit is located. In addition, in a same pixel row, two pixel circuits in adjacent columns may be mirrored to facilitate wiring.

An embodiment of the present disclosure also provides a drive method of a pixel drive circuit, which is used for driving the above pixel drive circuit. The method includes following contents.

In a reset phase, a high-level signal is inputted to the enabling signal terminal EM, the first reset signal terminal Re1, and the first gate drive signal terminal G1, and a low-level signal is inputted to the second gate drive signal terminal G2 and the third reset signal terminal Re3.

In a threshold compensation phase, a high-level signal is inputted to the enabling signal terminal EM, the second gate drive signal terminal G2, and the third reset signal terminal Re3, and a low-level signal is inputted to the first reset signal terminal Re1 and the first gate drive signal terminal G1.

In a light emitting phase, a high-level signal is inputted to the third reset signal terminal Re3 and the first gate drive signal terminal G1, and a low-level signal is inputted to the enabling signal terminal EM, the second gate drive signal terminal G2, and the first reset signal terminal Re1.

The drive method has been described in detail in the above contents and will not be repeated here.

Figure 18:
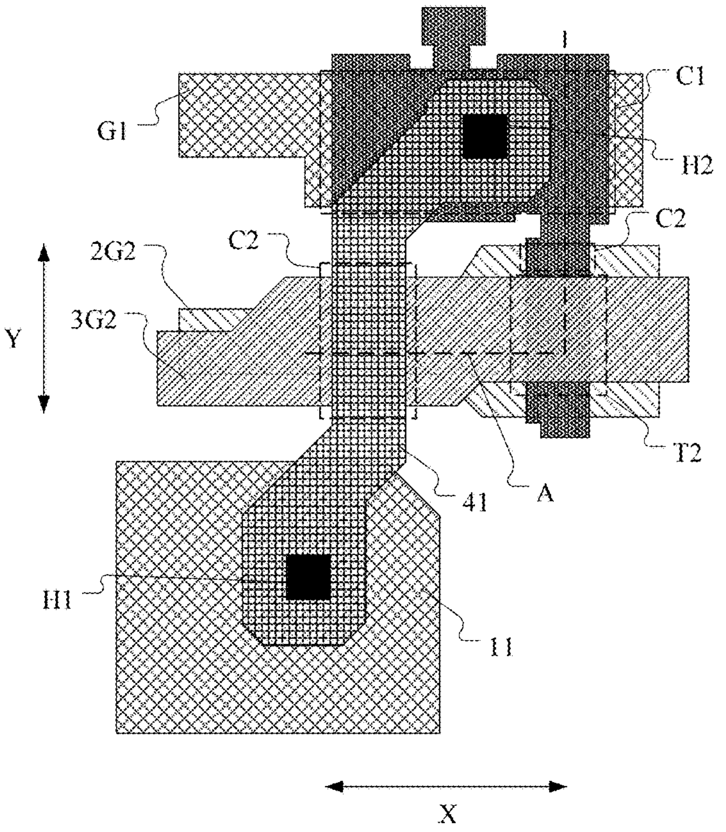
FIG. 18 is a partial structural layout of a display panel according to an exemplary embodiment of the present disclosure.
Figure 19:
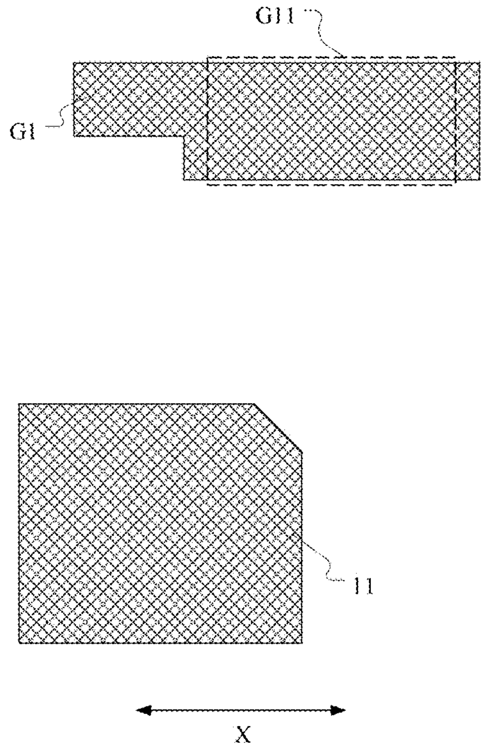
FIG. 19 is a structural layout of a first conductive layer in FIG. 18.
Figure 20:
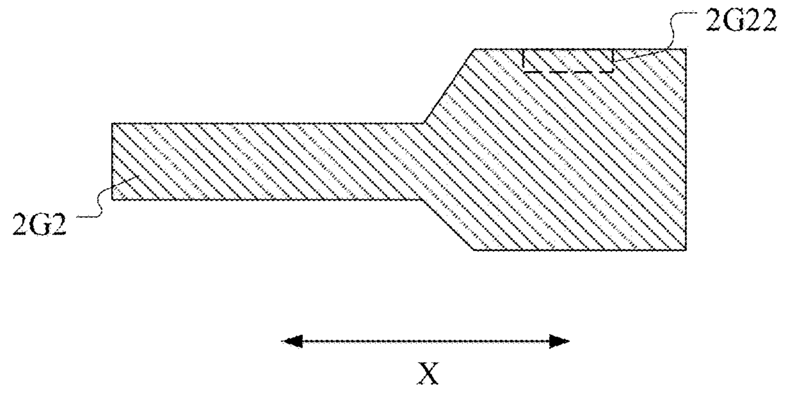
FIG. 20 is a structural layout of a second conductive layer in FIG. 18.
Figure 21:
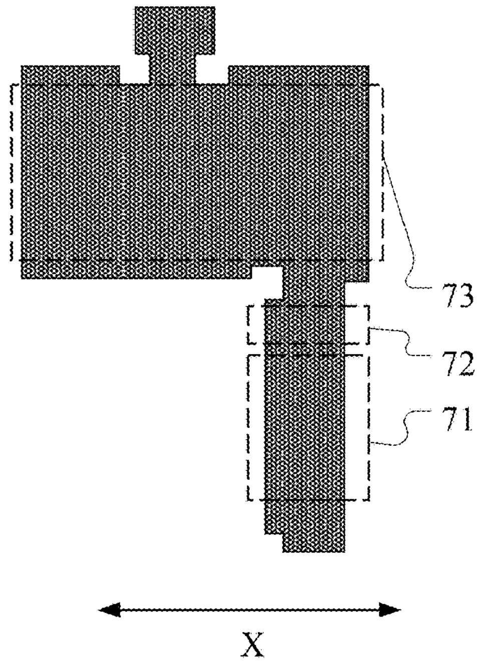
FIG. 21 is a structural layout of a second active layer in FIG. 18.
Figure 22:
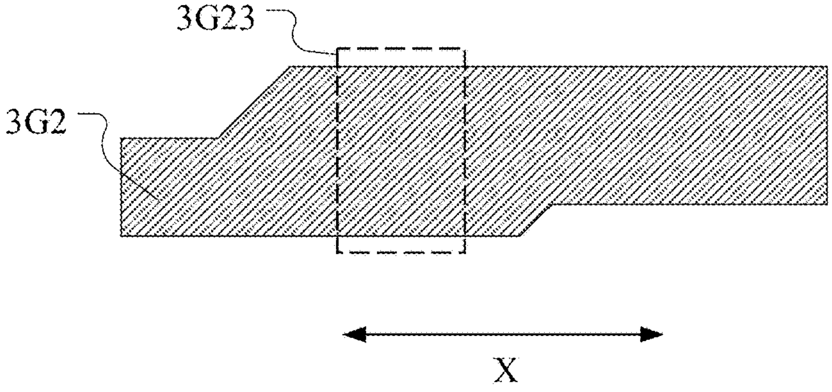
FIG. 22 is a structural layout of a third conductive layer in FIG. 18.
Figure 23:
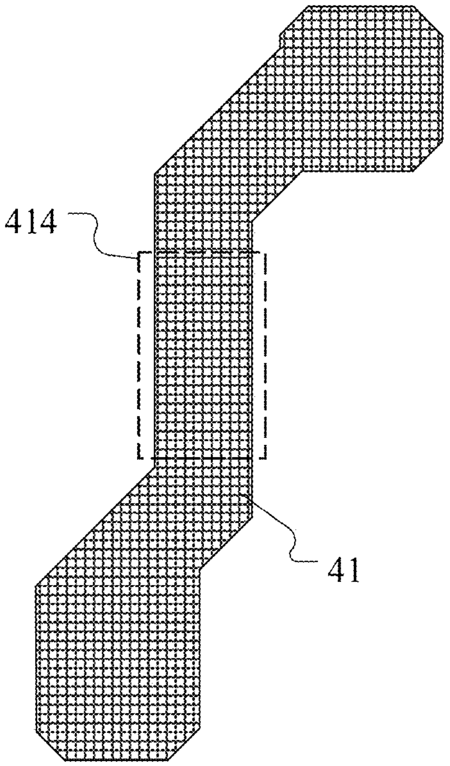
FIG. 23 is a structural layout of a fourth conductive layer in FIG. 18.
Figure 24:
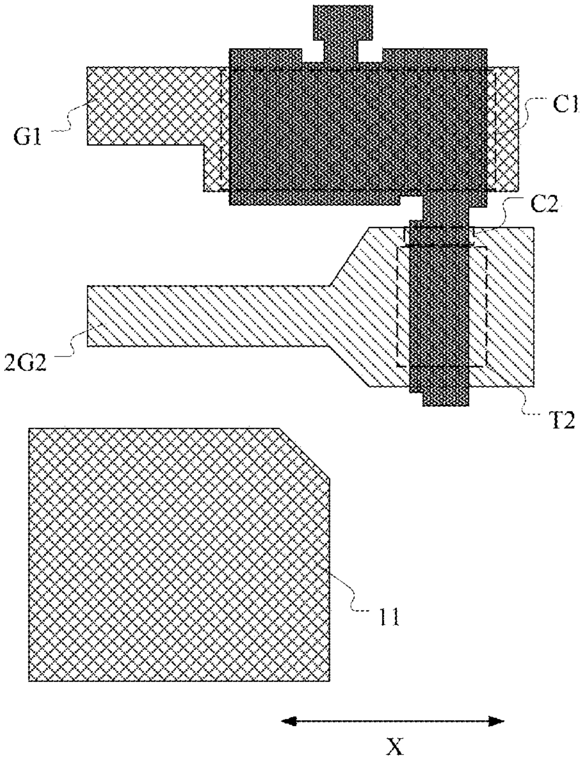
FIG. 24 is a structural layout of the first conductive layer, the second conductive layer, and the second active layer in FIG. 18.
Figure 25:
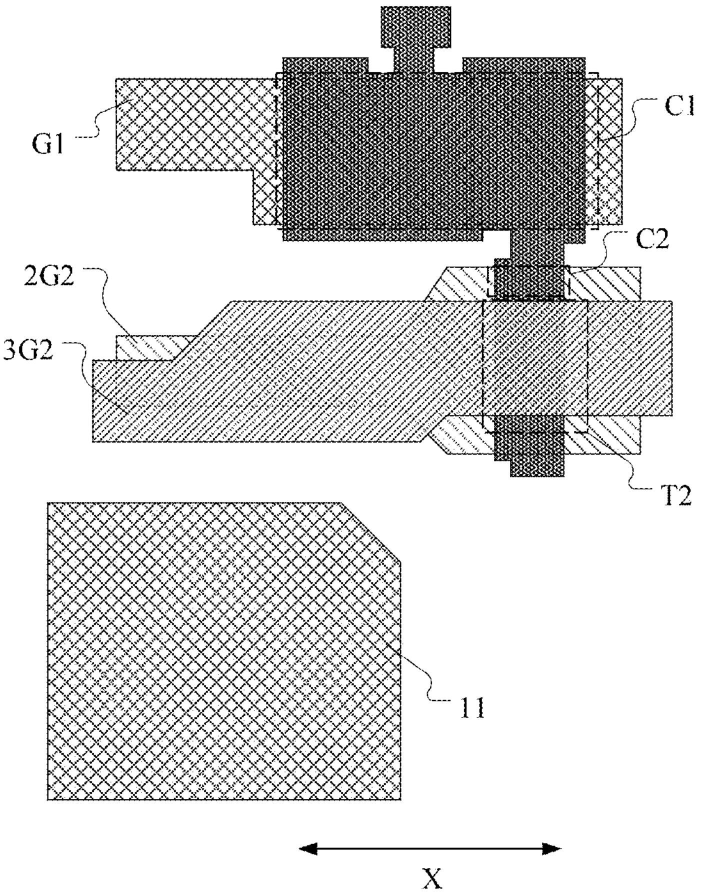
FIG. 25 is a structural layout of the first conductive layer, the second conductive layer, the second active layer, and the third conductive layer in FIG. 18.

An exemplary embodiment also provides a display panel, wherein the display panel may include the above pixel drive circuit. The display panel may be applied to a display apparatus such as a mobile phone, a tablet computer, and a television. The pixel drive circuit in the display panel may be shown in FIG. 10, wherein the display panel may include a base substrate, a first conductive layer, a second conductive layer, a second active layer, a third conductive layer, and a fourth conductive layer which are sequentially stacked, wherein an insulation layer may also be disposed between the above hierarchical structures. As shown in FIG. 18 to FIG. 25, FIG. 18 is a partial structural layout of a display panel according to an exemplary embodiment of the present disclosure, FIG. 19 is a structural layout of a first conductive layer in FIG. 18, FIG. 20 is a structural layout of a second conductive layer in FIG. 18, FIG. 21 is a structural layout of a second active layer in FIG. 18, FIG. 22 is a structural layout of a third conductive layer in FIG. 18, FIG. 23 is a structural layout of a fourth conductive layer in FIG. 18, FIG. 24 is a structural layout of the first conductive layer, the second conductive layer, and the second active layer in FIG. 18, and FIG. 25 is a structural layout of the first conductive layer, the second conductive layer, the second active layer, and the third conductive layer in FIG. 18.

As shown in FIG. 18, FIG. 19, and FIG. 24, the first conductive layer may include a first conductive part 11 and a first gate line G1. The first conductive part 11 may be used for forming a gate of the drive transistor T3, an orthographic projection of the first gate line G1 on the base substrate may extend along a first direction X, the first gate line G1 may be connected with a gate of a fourth transistor T4, for example, a partial structure of the first gate line G1 may be used for forming the gate of the fourth transistor.

As shown in FIG. 18, FIG. 20, and FIG. 24, the second conductive layer may include a second gate line 2G2, an orthographic projection of the second gate line 2G2 on the base substrate may extend along the first direction X, the second gate line 2G2 may be connected with a gate of a second transistor, for example, a partial structure of the second gate line 2G2 may be used for forming a bottom gate of the second transistor.

As shown in FIG. 18, FIG. 21, and FIG. 24, the second active layer may include a first active part 71, a second active part 72, and a third active part 73. The second active part 72 is connected between the first active part 71 and the third active part 73, the first active part 71 may be used for forming a channel region of the second transistor T2, and the orthographic projection of the second gate line 2G2 on the base substrate may cover an orthographic projection of the first active part 71 on the base substrate. A material of the second active layer may be indium gallium zinc oxide.

As shown in FIG. 18, FIG. 22, and FIG. 25, the third conductive layer may include a third gate line 3G2. An orthographic projection of the third gate line 3G2 on the base substrate may extend along the first direction X, the orthographic projection of the third gate line 3G2 on the base substrate may cover the orthographic projection of the first active part 71 on the base substrate, and a partial structure of the third gate line 3G2 may be used for forming a top gate of the second transistor. In the display panel, a conductorization processing may be performed on the second active layer by using a third conductive part as a mask, that is, a region of the second active layer covered by the third conductive layer forms a channel region of a transistor, and a region of the second active layer not covered by the third conductive layer forms a conductor structure.

As shown in FIG. 18 and FIG. 23, the fourth conductive layer may include a connection part 41, the connection part 41 may be connected with the first conductive part 11 through a via H1 and connected with the third active part 73 through a via H2.

Figure 26:
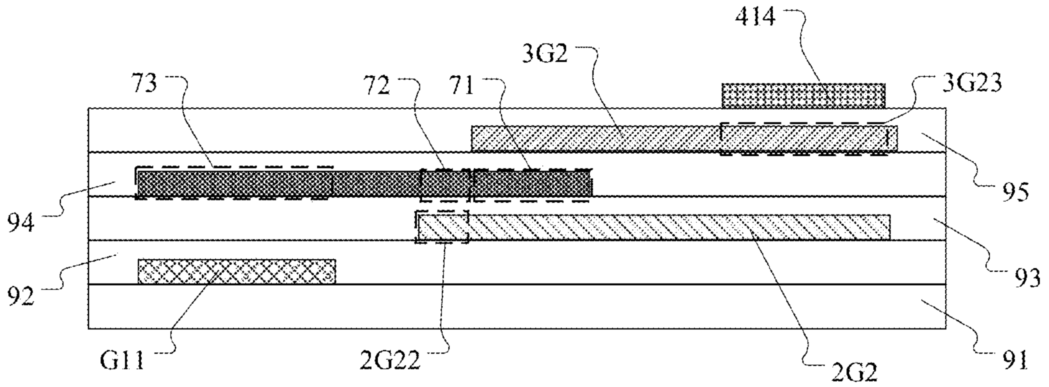
FIG. 26 is a partial sectional view taken along a dotted line A in FIG. 18.

As shown in FIG. 26, which is a partial sectional view taken along a dotted line A in FIG. 18, the display panel may further include a first insulation layer 92, a second insulation layer 93, a third insulation layer 94, and a dielectric layer 95. A base substrate 91, the first conductive layer, the first insulation layer 92, the second conductive layer, the second insulation layer 93, the second active layer, the third insulation layer 94, the third conductive layer, the dielectric layer 95, and the fourth conductive layer are sequentially stacked. The first insulation layer 92, the second insulation layer 93, and the third insulation layer 94 may include a silicon oxide layer. The dielectric layer 95 may include a silicon nitride layer. A material of the fourth conductive layer may include a metal material, for example, may be molybdenum, aluminum, copper, titanium, niobium, one of them or an alloy, or a molybdenum/titanium alloy or a laminate or the like, or may be a titanium/aluminum/titanium laminate. Materials of the first conductive layer, the second conductive layer, and the third conductive layer may be molybdenum, aluminum, copper, titanium, niobium, one of them or an alloy, or a molybdenum/titanium alloy or a laminate or the like.

As shown in FIG. 18 to FIG. 26, the first gate line G1 may include a first extension part G11, an orthographic projection of the first extension part G11 on the base substrate may be overlapped with an orthographic projection of the third active part 73 on the base substrate. The first extension part G11 may be used for forming a first electrode of a first capacitor C1, and the third active part 73 may be used for forming a second electrode of the first capacitor C1. The second gate line 2G2 may include a second extension part 2G22, an orthographic projection of the second extension part 2G22 on the base substrate may coincide with an orthographic projection of the second active part 72 on the base substrate, and an orthographic projection of the third gate line 3G2 on the base substrate is located on a side of the orthographic projection of the second active part 72 on the base substrate, i.e., the orthographic projection of the third gate line 3G2 on the base substrate is not overlapped with the orthographic projection of the second active part 72 on the base substrate, for example, as shown in FIG. 18, the orthographic projection of the third gate line 3G2 on the base substrate may be located on a side of the orthographic projection of the second active part 72 on the base substrate in a second direction Y. The second direction Y may intersect with the first direction X, for example, the second direction Y may be perpendicular to the first direction X. The second extension part 2G22 may be used for forming a portion of a first electrode of a second capacitor C2, and the second active part 72 may be used for forming a portion of a second electrode of the second capacitor C2; the third gate line 3G2 may include a third extension part 3G23, the connection part 41 may include a fourth extension part 414, the orthographic projection of the third extension part 3G23 on the base substrate may coincide with an orthographic projection of the fourth extension part 414 on the base substrate, the third extension part 3G23 may be used for forming a portion of the first electrode of the second capacitor C2, and the fourth extension part 414 may be used for forming a portion of the second electrode of the second capacitor C2. A size of the orthographic projection of the third active part 73 on the base substrate in the first direction X may be greater than a size of the orthographic projection of the second active part 72 on the base substrate in the first direction X, this setting may increase a capacitance value of the first capacitor C1. Among them, in the exemplary embodiment, the capacitance value of the first capacitor may be adjusted by adjusting the size of the orthographic projection of the third active part 73 on the base substrate in the first direction X, and the size of the orthographic projection of the third active part 73 on the base substrate in the first direction X may be 5 um to 20 um, such as 5 um, 9.7 um, 12 um, 15.55 um, and 50 um. In addition, in the exemplary embodiment, the capacitance value of the first capacitor C1 may also be adjusted by adjusting a thickness of the first insulation layer 92 and the second insulation layer 93 at the third active part 73, for example, in the exemplary embodiment, the thickness of the first insulation layer 92 and/or the second insulation layer 93 at the third active part 73 may be reduced to increase the capacitance value of the first capacitor C1. In the exemplary embodiment, a capacitance value of the second capacitor may also be adjusted by adjusting a size of the orthographic projection of the fourth extension part 414 on the base substrate in the first direction X, the smaller the size of the orthographic projection of the fourth extension part 414 on the base substrate in the first direction X is, the smaller the capacitance value of the second capacitor is, and the size of the orthographic projection of the fourth extension part 414 on the base substrate in the first direction may be 2 um to 4 um, such as 4 um, 3.7 um, 3.5 um, 2.95 um, 2.2 um, and 2 um. In addition, in the exemplary embodiment, the capacitance value of the second capacitor may also be adjusted by adjusting a size of the orthographic projection of the second extension part 2G22 on the base substrate in the second direction Y, and the smaller the size of the orthographic projection of the second extension part 2G22 on the base substrate in the second direction Y is, the smaller the capacitance value of the second capacitor is.

It should be noted that, as shown in FIG. 18 and FIG. 26, in a region where the fourth extension part 414 is located, the orthographic projection of the third gate line 3G2 on the base substrate covers the orthographic projection of the second gate line 2G2 on the base substrate. Although the orthographic projection of the second gate line 2G2 in this region on the base substrate is overlapped with the orthographic projection of the fourth extension part 414 on the base substrate, an area change of the orthographic projection of the second gate line 2G2 in this region on the base substrate does not affect the capacitance value of the second capacitor due to a shielding effect of the third gate line 3G2. Similarly, in a region where the first extension part G11 is located, the orthographic projection of the third active part 73 on the base substrate covers an orthographic projection of the connection part 41 on the base substrate. Although the orthographic projection of the connection part 41 in this region on the base substrate is overlapped with the orthographic projection of the first extension part G11 on the base substrate, an area change of the orthographic projection of the connection part 41 in this region on the base substrate does not affect the capacitance value of the first capacitor due to a shielding effect of the third active part 73.

As shown in FIG. 27 to FIG. 45, which are explanatory drawings of another group of exemplary embodiments of the pixel drive circuit of the present disclosure.

In the embodiments of the present disclosure, a transistor refers to an element that at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

It may be understood by those of skills in the art that transistors used in all the embodiments of the present disclosure may be thin film transistors, field effect transistors, or other devices with same characteristics. In the specification, a first electrode may be a drain electrode, and a second electrode may be a source electrode. Or, the first electrode may be a source electrode, and the second electrode may be a drain electrode. In a case that transistors with opposite polarities are used or that a direction of a current is changed during circuit operation, functions of the "source electrode" and the "drain electrode" may sometimes be exchanged. Therefore, the "source electrode" and the "drain electrode" may be exchanged in the specification.

In this specification, a "connection" includes a case where constitute elements are connected together through an element with some electrical effect. The "element with some electrical effect" is not particularly limited as long as electrical signals may be sent and received between the connected constituent elements. Examples of the "element with some electrical effect" not only include electrodes and wirings, but also include switching elements such as transistors, resistors, inductors, capacitors, and other elements with various functions, etc.

Figure 27:
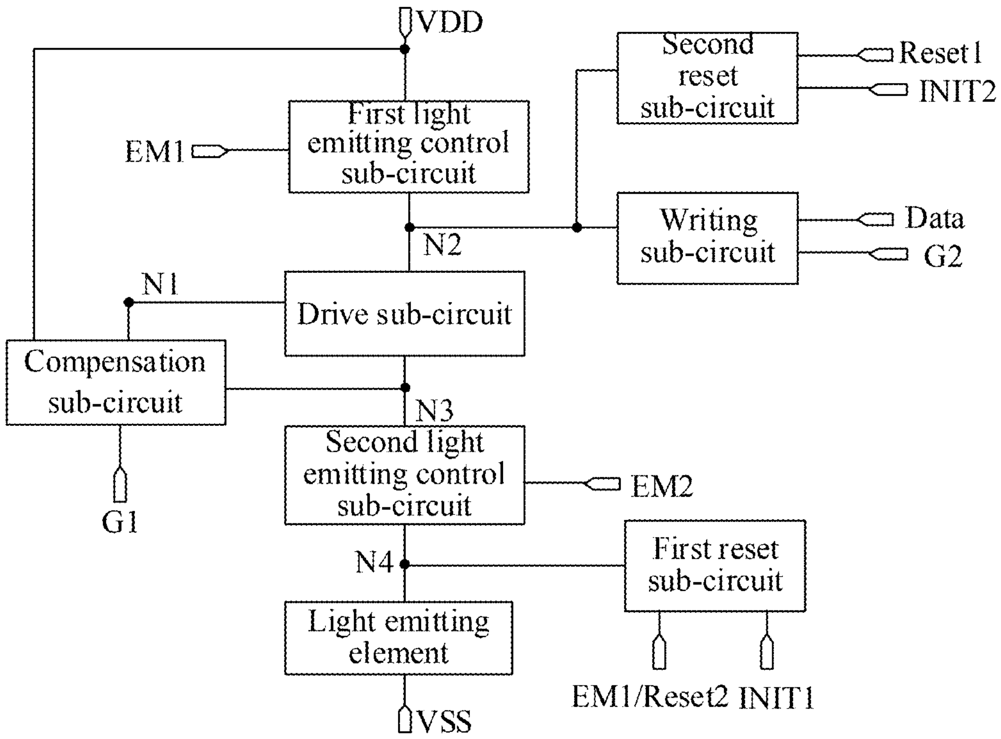
FIG. 27 is a first schematic diagram of a structure of a pixel circuit according to an embodiment of the present disclosure.
Figure 28:
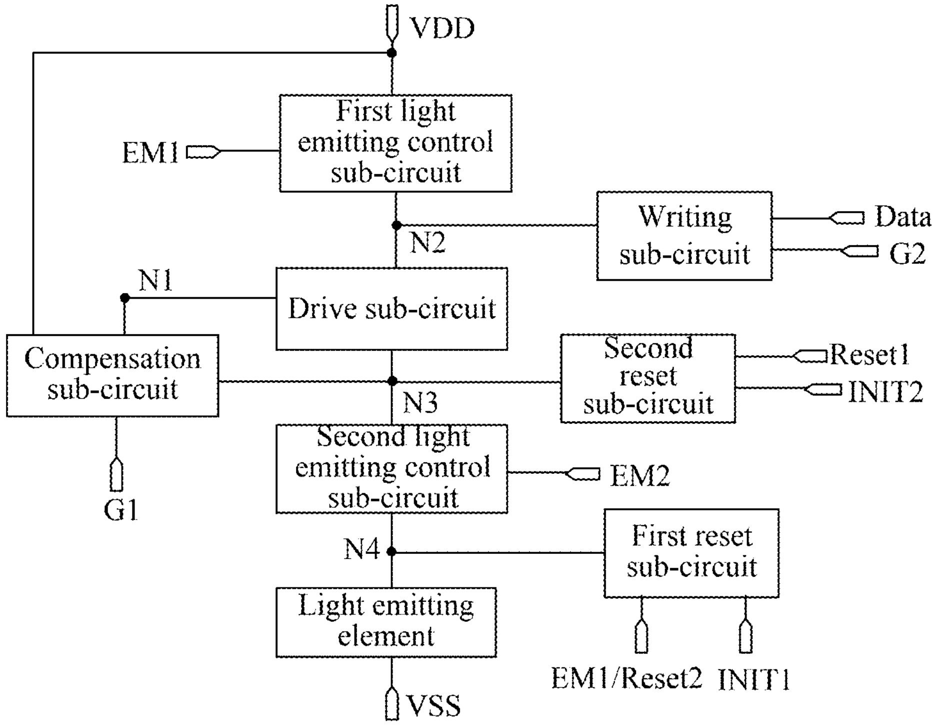
FIG. 28 is a second schematic diagram of a structure of a pixel circuit according to an embodiment of the present disclosure.

FIG. 27 and FIG. 28 are schematic diagrams of structures of two kinds of pixel circuits according to an exemplary embodiment of the present disclosure. As shown in FIG. 27 and FIG. 28, a pixel circuit according to an embodiment of the present disclosure includes a drive sub-circuit, a first reset sub-circuit, a second reset sub-circuit, and a light emitting element.

Among them, the drive sub-circuit is connected with a first node N1, a second node N2, and a third node N3 respectively, and is configured to generate a drive current between the second node N2 and the third node N3 in response to a control signal of the first node N1.

The first reset sub-circuit is connected with a first reset signal line INIT1 and an anode terminal of the light emitting element respectively, is further connected with a first light emitting control signal line EM1 or a second reset control signal line Reset2, and is configured to write a first reset signal provided by the first reset signal line INIT1 into the anode terminal of the light emitting element in response to a signal of the first light emitting control signal line EM1 or the second reset control signal line Reset2.

The second reset sub-circuit is connected with a first reset control signal line Reset1 and a second reset signal line INIT2 respectively, is further connected with the second node N2 or the third node N3, and is configured to write a second reset signal provided by the second reset signal line INIT2 into a first electrode or a second electrode of the drive sub-circuit in response to a signal of the first reset control signal line Reset1; and the second reset signal is greater than the first reset signal.

In some exemplary implementation modes, an absolute value of the second reset signal is greater than 1.5 times of a threshold voltage of the drive sub-circuit.

In some exemplary implementation modes, an amplitude value of the second reset signal is greater than 0.

Exemplarily, the second reset signal is generally a reset voltage of 4 V to 10 V, the first reset signal is generally a reset voltage of −2 V to −6 V, the threshold voltage of the drive sub-circuit is generally −5 V to −2 V, and optionally, the threshold voltage of the drive sub-circuit may be −3 V.

In some exemplary implementation modes, as shown in FIG. 27 and FIG. 28, the pixel circuit further includes a writing sub-circuit, a compensation sub-circuit, a first light emitting control sub-circuit, and a second light emitting control sub-circuit.

Among them, the writing sub-circuit is connected with a second scan signal line G2, a data signal line Data, and the second node N2 respectively, and is configured to write a data signal of the data signal line Data into the second node N2 in response to a signal of the second scan signal line G2.

The compensation sub-circuit is connected with a first power supply line VDD, a first scan signal line G1, the first node N1, and the third node N3 respectively, and is configured to write a first reset signal or a second reset signal of the third node N3 into the first node N1 in response to a signal of the first scan signal line G1, and is further configured to compensate the first node N1 in response to the signal of the first scan signal line G1.

The first light emitting control sub-circuit is connected with the first light emitting control signal line EM1, the first power supply line VDD, and the second node N2 respectively, and is configured to provide a signal of the first power supply line VDD to the second node N2 in response to a signal of the first light emitting control signal line EM1.

The second light emitting control sub-circuit is connected with the second light emitting control signal line EM2, the third node N3, and a fourth node respectively, and is configured to write a first reset signal of the fourth node N4 into the third node N3 in response to a signal of the second light emitting control signal line EM2, and is further configured to allow a drive current to flow between the third node N3 and the fourth node N4 in response to the signal of the second light emitting control signal line EM2.

In some exemplary implementation modes, when the second reset sub-circuit writes a second reset signal into the second node N2, the drive sub-circuit is further configured to write the second reset signal of the second node N2 into the third node N3 in response to a control signal of the first node N1.

In some exemplary implementation modes, as shown in FIG. 27 and FIG. 28, one terminal of the light emitting element is connected with the fourth node N4, and the other terminal of the light emitting element is connected with a second power supply line VSS.

Figure 29:
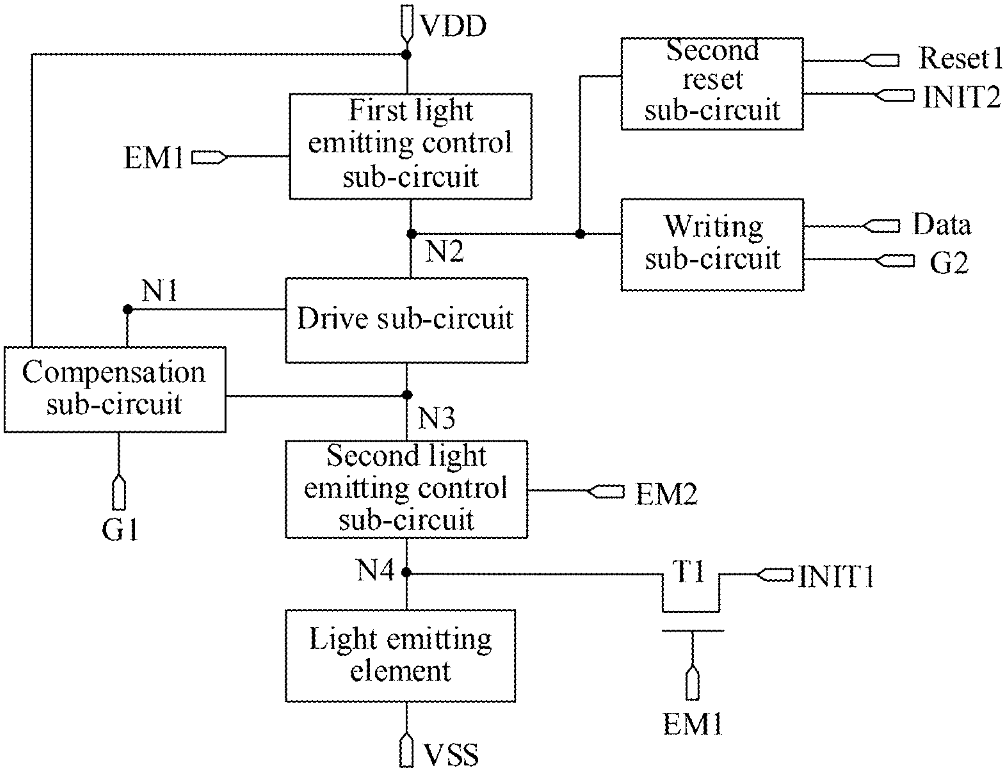
FIG. 29 is a schematic diagram of a structure of a first reset sub-circuit according to an embodiment of the present disclosure.

In some exemplary implementation modes, as shown in FIG. 29, a first reset sub-circuit includes a first transistor T1.

Among them, a control electrode of the first transistor T1 is connected with a first light emitting control signal line EM1 or a second reset control signal line Reset2 (not shown in the figure), a first electrode of the first transistor T1 is connected with a first reset signal line INIT1, and a second electrode of the first transistor T1 is connected with a fourth node N4.

FIG. 29 shows an exemplary structure of the first reset sub-circuit. Those skilled in the art may easily understand that an implementation mode of the first reset sub-circuit is not limited thereto, as long as a function thereof can be achieved.

Figure 30:
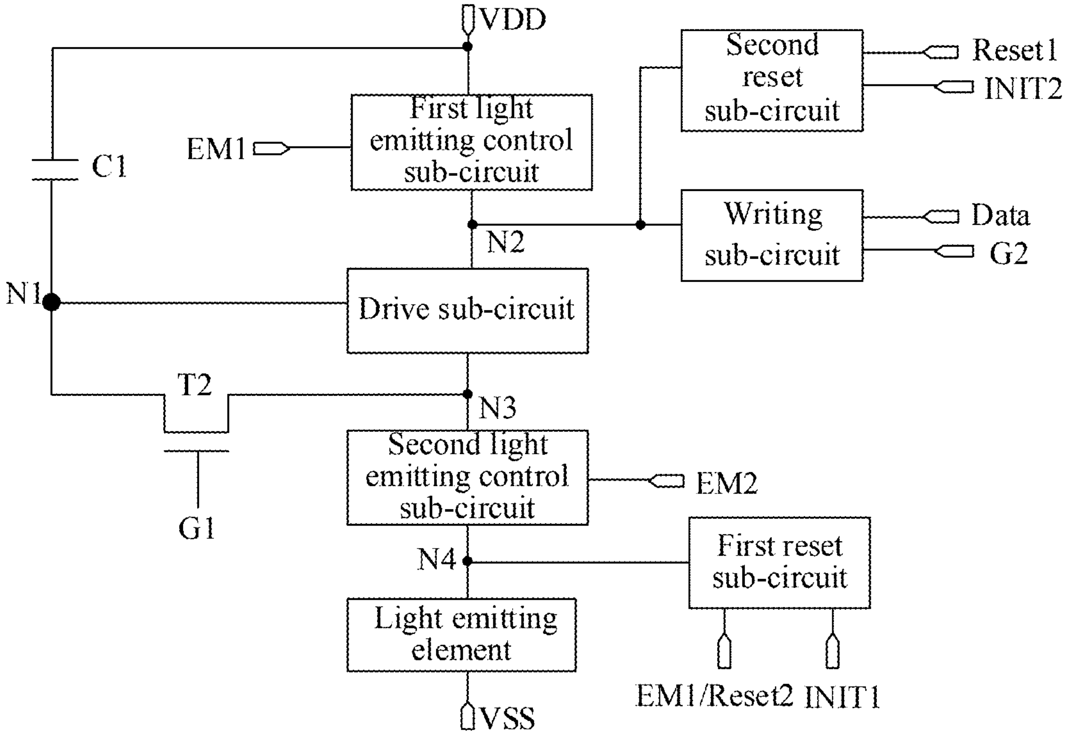
FIG. 30 is a schematic diagram of a structure of a compensation sub-circuit according to an embodiment of the present disclosure.

In some exemplary implementation modes, as shown in FIG. 30, a compensation sub-circuit includes a second transistor T2 and a first capacitor C1.

Among them, a control electrode of the second transistor T2 is connected with a first scan signal line G1, a first electrode of the second transistor T2 is connected with a third node N3, and a second electrode of the second transistor T2 is connected with a first node N1.

One terminal of the first capacitor C1 is connected with the first node N1, and the other terminal of the first capacitor C1 is connected with a first power supply line VDD.

FIG. 30 shows an exemplary structure of the compensation sub-circuit. Those of skills in the art may easily understand that an implementation mode of the compensation sub-circuit is not limited to this, as long as a function thereof can be achieved.

Figure 31:
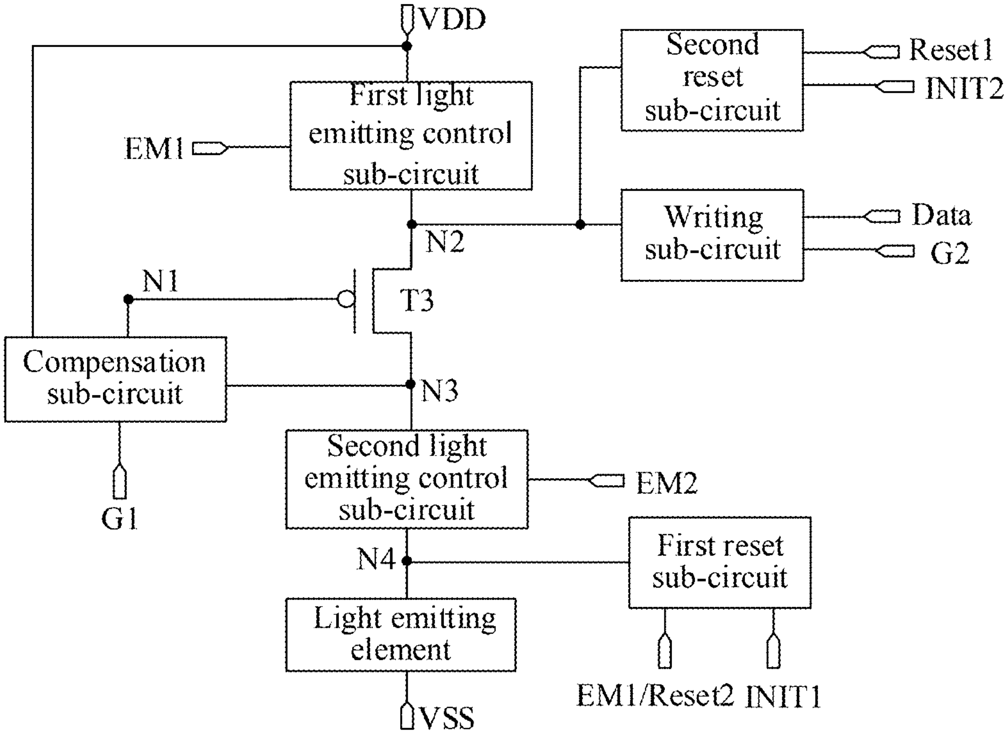
FIG. 31 is a schematic diagram of a structure of a drive sub-circuit according to an embodiment of the present disclosure.

In some exemplary implementation modes, as shown in FIG. 31, a drive sub-circuit includes a third transistor T3.

Among them, a control electrode of the third transistor T3 is connected with a first node N1, a first electrode of the third transistor T3 is connected with a second node N2, and a second electrode of the third transistor T3 is connected with a third node N3.

FIG. 31 shows an exemplary structure of the drive sub-circuit. Those of skills in the art may easily understand that an implementation mode of the drive sub-circuit is not limited to this, as long as a function thereof can be achieved.

Figure 32:
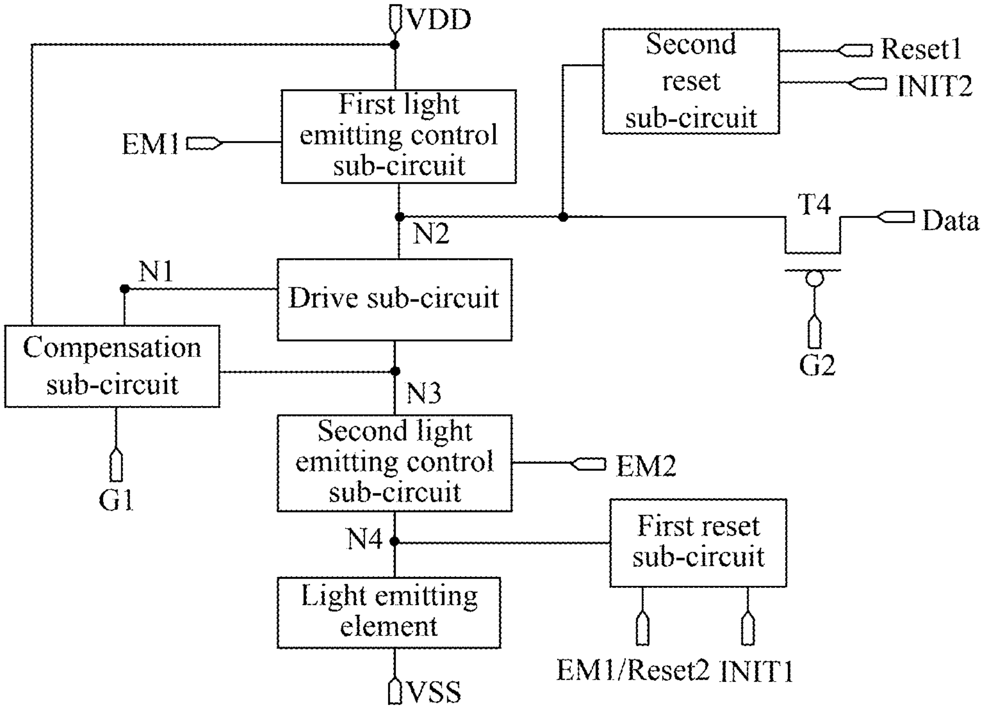
FIG. 32 is a schematic diagram of a structure of a writing sub-circuit according to an embodiment of the present disclosure.

In some exemplary implementation modes, as shown in FIG. 32, a writing sub-circuit includes a fourth transistor T4.

Among them, a control electrode of the fourth transistor T4 is connected with a second scan signal line G2, a first electrode of the fourth transistor T4 is connected with a data signal line Data, and a second electrode of the fourth transistor T4 is connected with a second node N2.

FIG. 32 shows an exemplary structure of the writing sub-circuit. Those of skills in the art may easily understand that an implementation mode of the writing sub-circuit is not limited to this, as long as a function thereof can be achieved.

Figure 33:
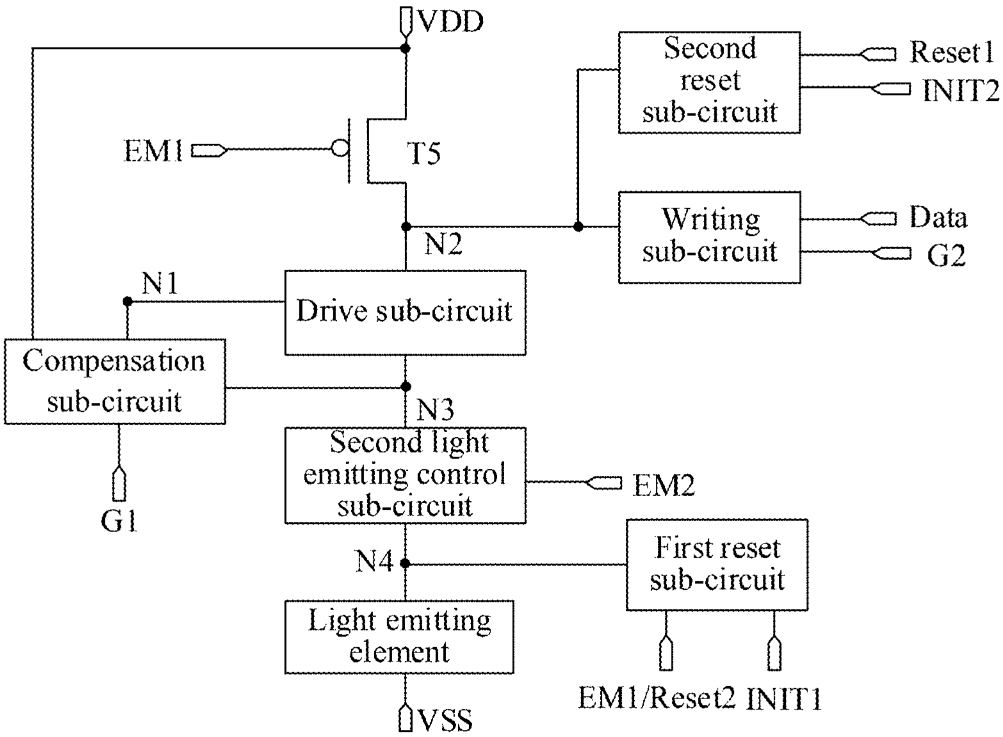
FIG. 33 is a schematic diagram of a structure of a first light emitting control sub-circuit according to an embodiment of the present disclosure.

In some exemplary implementation modes, as shown in FIG. 33, a first light emitting control sub-circuit includes a fifth transistor T5.

Among them, a control electrode of the fifth transistor T5 is connected with a first light emitting control signal line EM1, a first electrode of the fifth transistor T5 is connected with a first power supply line VDD, and a second electrode of the fifth transistor T5 is connected with a second node N2.

FIG. 33 shows an exemplary structure of the first light emitting control sub-circuit. Those of skills in the art may easily understand that an implementation mode of the first light emitting control sub-circuit is not limited to this, as long as a function thereof can be achieved.

Figure 34:
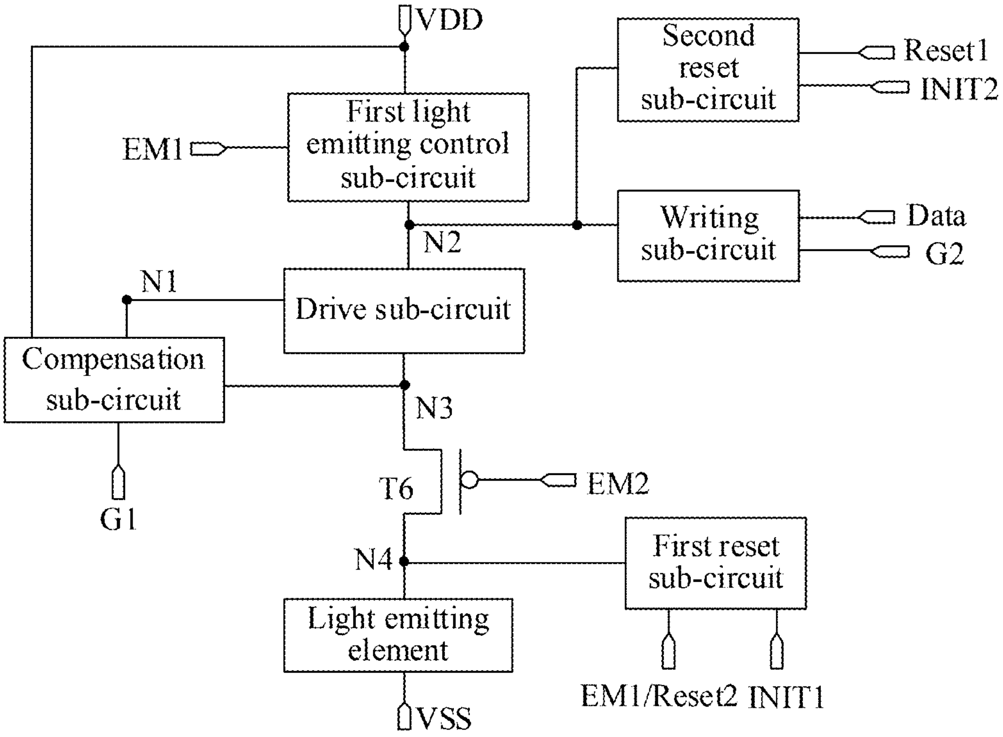
FIG. 34 is a schematic diagram of a structure of a second light emitting control sub-circuit according to an embodiment of the present disclosure.

In some exemplary implementation modes, as shown in FIG. 34, a second light emitting control sub-circuit includes a sixth transistor T6.

Among them, a control electrode of the sixth transistor T6 is connected with a second light emitting control signal line EM2, a first electrode of the sixth transistor T6 is connected with a third node N3, and a second electrode of the sixth transistor T6 is connected with a fourth node N4.

FIG. 34 shows an exemplary structure of the second light emitting control sub-circuit. Those of skills in the art may easily understand that an implementation mode of the second light emitting control sub-circuit is not limited to this, as long as a function thereof can be achieved.

Figure 35:
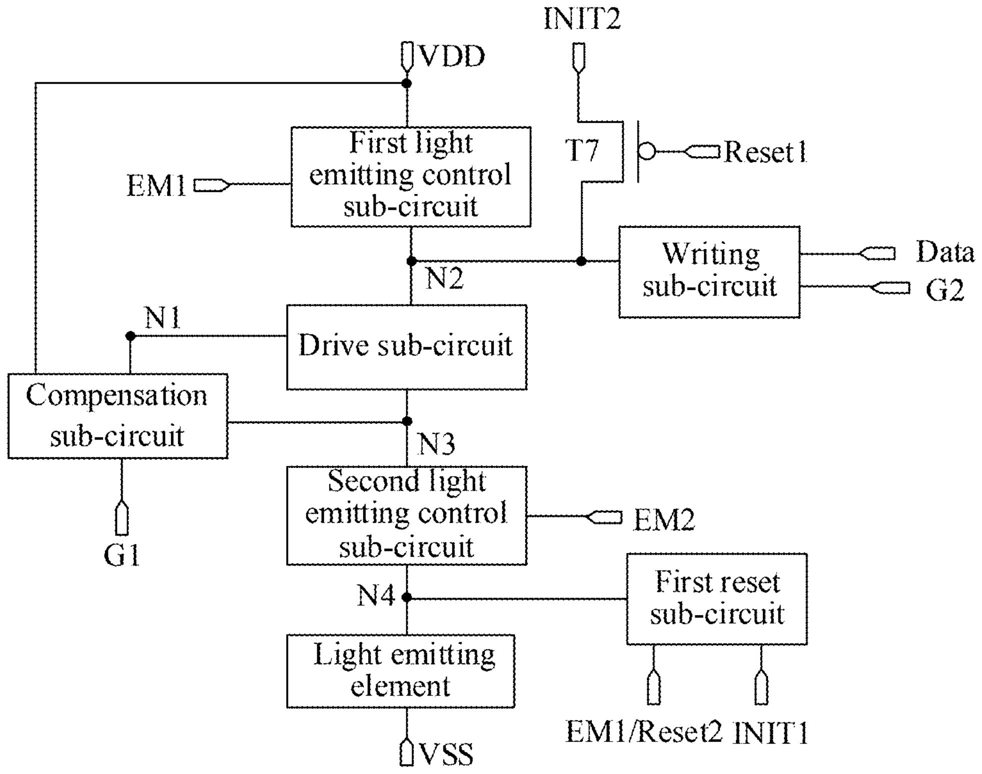
FIG. 35 is a first schematic diagram of a structure of a second reset sub-circuit according to an embodiment of the present disclosure.

In some exemplary implementation modes, as shown in FIG. 35, a second reset sub-circuit includes a seventh transistor T7.

Among them, a control electrode of the seventh transistor T7 is connected with a reset control signal line Reset, a first electrode of the seventh transistor T7 is connected with a second reset signal line INIT2, and a second electrode of the seventh transistor T7 is connected with a second node N2.

Figure 36:
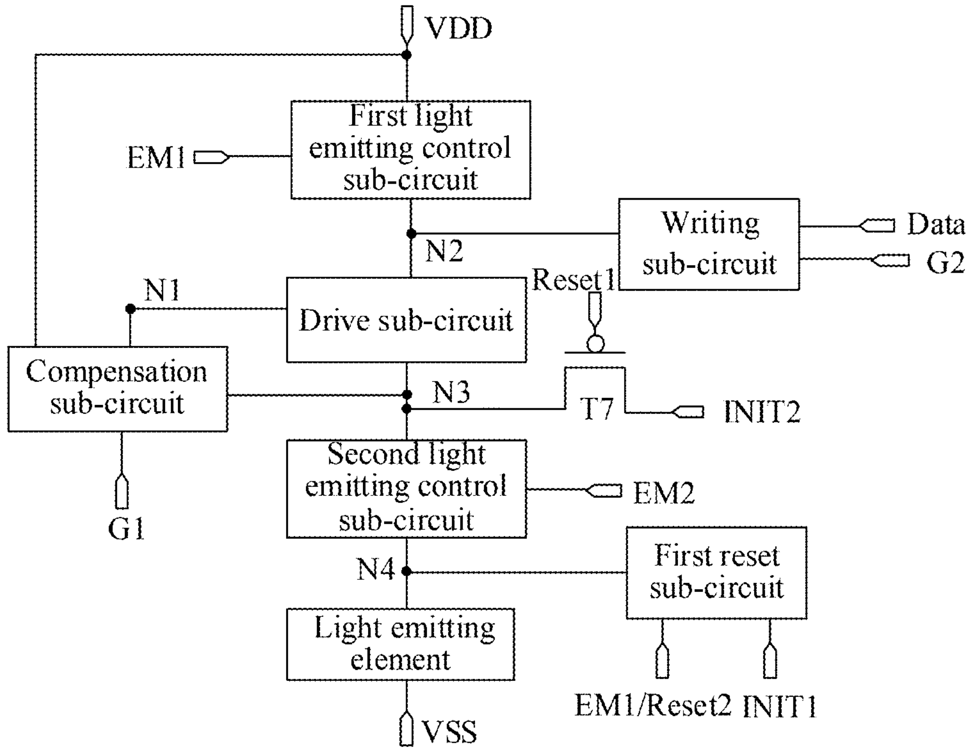
FIG. 36 is a second schematic diagram of a structure of a second reset sub-circuit according to an embodiment of the present disclosure.

In some exemplary implementation modes, as shown in FIG. 36, a second reset sub-circuit includes a seventh transistor T7.

Among them, a control electrode of the seventh transistor T7 is connected with a reset control signal line Reset, and a first electrode of the seventh transistor T7 is connected with a second reset signal line INIT2, and a second electrode of the seventh transistor T7 is connected with a third node N3.

FIG. 35 and FIG. 36 show two exemplary structures of a second reset sub-circuit. Those skilled in the art may easily understand that an implementation mode of the second reset sub-circuit is not limited thereto, as long as a function thereof can be achieved.

Figure 37A:
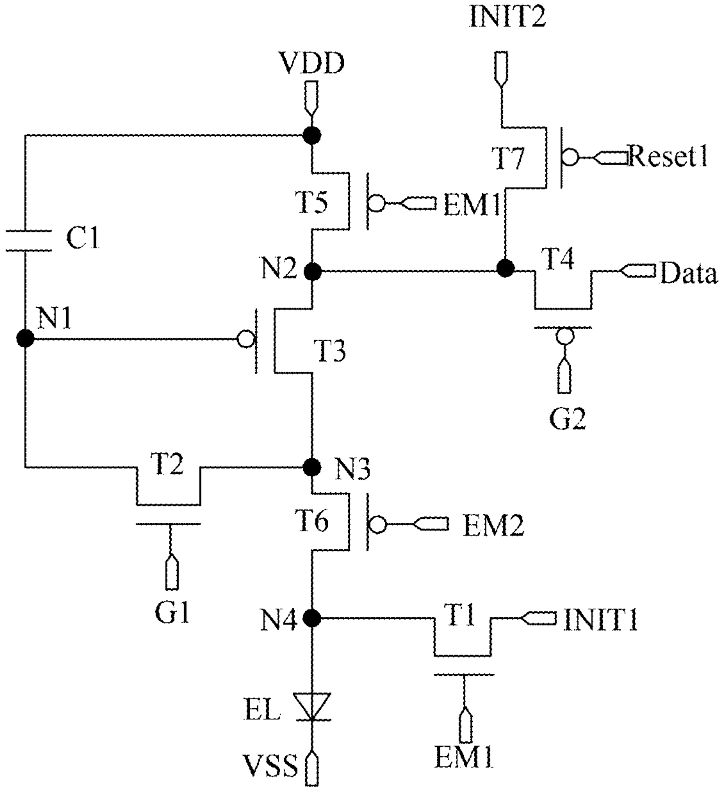
FIG. 37*a* is a first equivalent circuit diagram of a pixel circuit according to an embodiment of the present disclosure.
Figure 37B:
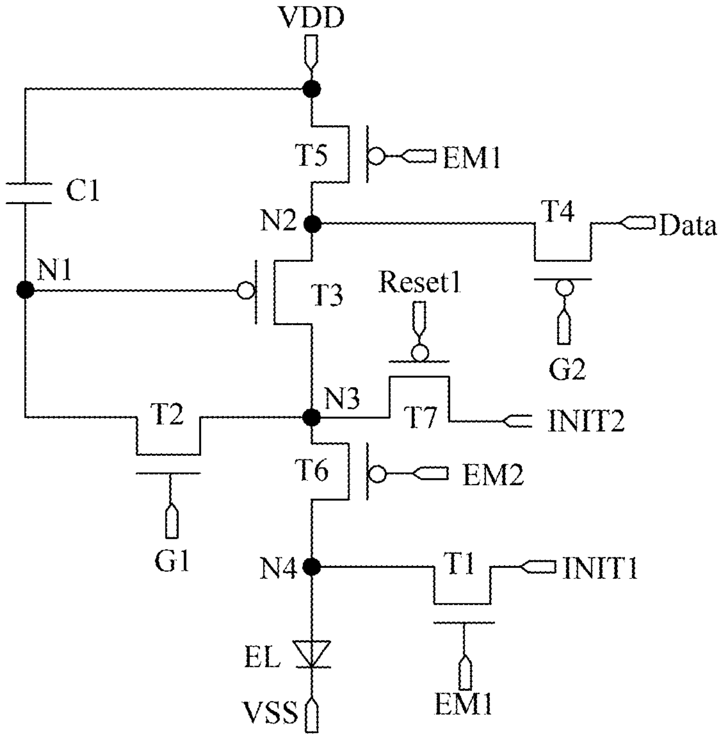
FIG. 37*b* is a second equivalent circuit diagram of a pixel circuit according to an embodiment of the present disclosure.

In some exemplary implementation modes, as shown in FIG. 37*a* or FIG. 37*b*, a first reset sub-circuit includes a first transistor T1, a compensation sub-circuit includes a second transistor T2 and a first capacitor C1, a drive sub-circuit includes a third transistor T3, a writing sub-circuit includes a fourth transistor T4, a first light emitting control sub-circuit includes a fifth transistor T5, a second light emitting control sub-circuit includes a sixth transistor T6, and a second reset sub-circuit includes a seventh transistor T7.

Among them, a control electrode of the first transistor T1 is connected with a first light emitting control signal line EM1, a first electrode of the first transistor T1 is connected with a first reset signal line INIT1, and a second electrode of the first transistor T1 is connected with a fourth node N4.

A control electrode of the second transistor T2 is connected with a first scan signal line G1, a first electrode of the second transistor T2 is connected with a third node N3, and a second electrode of the second transistor T2 is connected with a first node N1.

One terminal of the first capacitor C1 is connected with the first node N1, and the other terminal of the first capacitor C1 is connected with a first power supply line VDD.

A control electrode of the third transistor T3 is connected with the first node N1, a first electrode of the third transistor T3 is connected with a second node N2, and a second electrode of the third transistor T3 is connected with a third node N3.

A control electrode of the fourth transistor T4 is connected with a second scan signal line G2, a first electrode of the fourth transistor T4 is connected with a data signal line Data, and a second electrode of the fourth transistor T4 is connected with the second node N2.

A control electrode of the fifth transistor T5 is connected with a first light emitting control signal line EM1, a first electrode of the fifth transistor T5 is connected with the first power supply line VDD, and a second electrode of the fifth transistor T5 is connected with the second node N2.

A control electrode of the sixth transistor T6 is connected with a second light emitting control signal line EM2, a first electrode of the sixth transistor T6 is connected with the third node N3, and a second electrode of the sixth transistor T6 is connected with the fourth node N4.

A control electrode of the seventh transistor T7 is connected with a first reset control signal line Reset1, a first electrode of the seventh transistor T7 is connected with a second reset signal line INIT2, and a second electrode of the seventh transistor T7 is connected with the second node N2 or the third node N3.

FIG. 37*a* and FIG. 37*b* show two exemplary structures of the first reset sub-circuit, the compensation sub-circuit, the drive sub-circuit, the writing sub-circuit, the first light emitting control sub-circuit, the second light emitting control sub-circuit, and the second reset sub-circuit. Those skilled in the art may easily understand that an implementation mode of the above sub-circuits is not limited thereto, as long as respective functions thereof can be implemented. Since a quantity of transistors in a pixel circuit of the present disclosure is relatively small, the pixel circuit occupies less space, thereby improving a pixel resolution of a display apparatus.

In some exemplary implementation modes, the second reset signal line INIT2 may be a same voltage line as at least one of following: the first power supply line VDD, the first light emitting control signal line EM1, the second light emitting control signal line EM2, or a third power supply line. The third power supply line provides a third power supply voltage, and the third power supply voltage is greater than a first reset voltage provided by the first reset signal line INIT1.

In some exemplary implementation modes, a pulse width of a signal of a reset control signal line Reset is substantially the same as a pulse width of a signal of the second scan signal line G2.

In some exemplary implementation modes, a signal pulse of the first light emitting control signal line EM1 differs from a signal pulse of the second light emitting control signal line EM2 by one or two time units h, one time unit h is scan time of one row of sub-pixels.

Figure 38A:
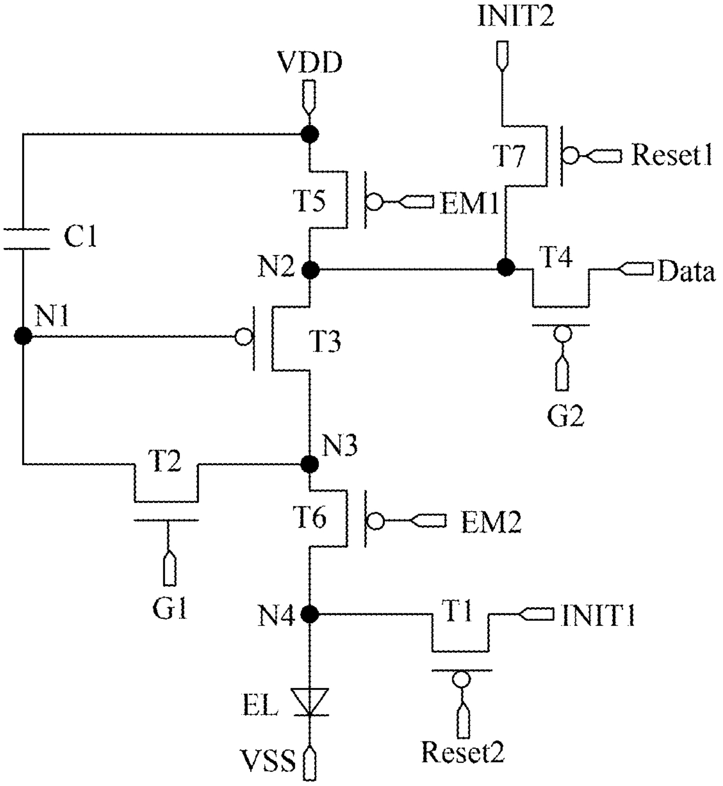
FIG. 38*a* is a third equivalent circuit diagram of a pixel circuit according to an embodiment of the present disclosure.
Figure 38B:
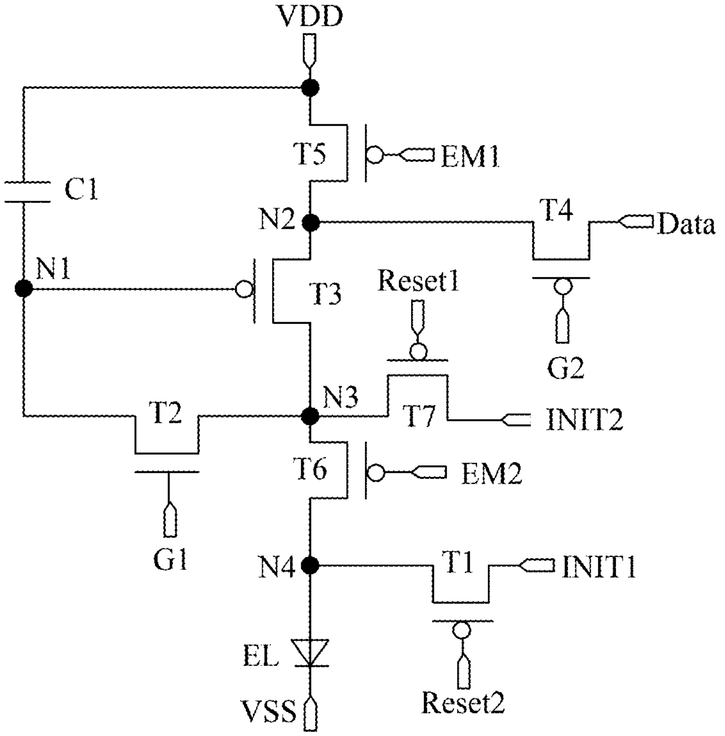
FIG. 38*b* is a fourth equivalent circuit diagram of a pixel circuit according to an embodiment of the present disclosure.

In some exemplary implementation modes, as shown in FIG. 38*a* or FIG. 38*b*, a first reset sub-circuit includes a first transistor T1, a compensation sub-circuit includes a second transistor T2 and a first capacitor C1, a drive sub-circuit includes a third transistor T3, a writing sub-circuit includes a fourth transistor T4, a first light emitting control sub-circuit includes a fifth transistor T5, a second light emitting control sub-circuit includes a sixth transistor T6, and a second reset sub-circuit includes a seventh transistor T7.

Among them, a control electrode of the first transistor T1 is connected with a second reset control signal line Reset2, a first electrode of the first transistor T1 is connected with a first reset signal line INIT1, and a second electrode of the first transistor T1 is connected with a fourth node N4.

A control electrode of the second transistor T2 is connected with a first scan signal line G1, a first electrode of the second transistor T2 is connected with a third node N3, and a second electrode of the second transistor T2 is connected with a first node N1.

One terminal of the first capacitor C1 is connected with the first node N1, and the other terminal of the first capacitor C1 is connected with a first power supply line VDD.

A control electrode of the third transistor T3 is connected with the first node N1, a first electrode of the third transistor T3 is connected with a second node N2, and a second electrode of the third transistor T3 is connected with the third node N3.

A control electrode of the fourth transistor T4 is connected with a second scan signal line G2, a first electrode of the fourth transistor T4 is connected with a data signal line Data, and a second electrode of the fourth transistor T4 is connected with the second node N2.

A control electrode of the fifth transistor T5 is connected with a first light emitting control signal line EM1, a first electrode of the fifth transistor T5 is connected with the first power supply line VDD, and a second electrode of the fifth transistor T5 is connected with the second node N2.

A control electrode of the sixth transistor T6 is connected with a second light emitting control signal line EM2, a first electrode of the sixth transistor T6 is connected with the third node N3, and a second electrode of the sixth transistor T6 is connected with the fourth node N4.

A control electrode of the seventh transistor T7 is connected with a first reset control signal line Reset1, a first electrode of the seventh transistor T7 is connected with a second reset signal line INIT2, and a second electrode of the seventh transistor T7 is connected with the second node N2 or the third node N3.

FIG. 38*a* and FIG. 38*b* show two exemplary structures of the first reset sub-circuit, the compensation sub-circuit, the drive sub-circuit, the writing sub-circuit, the first light emitting control sub-circuit, the second light emitting control sub-circuit, and the second reset sub-circuit. Those skilled in the art may easily understand that an implementation mode of the above sub-circuits is not limited thereto, as long as respective functions thereof can be implemented.

In some exemplary implementation modes, a light emitting element EL may be an Organic Light Emitting Diode (OLED), or another type of light emitting diode such as a Mini Light Emitting Diode, a Micro Light Emitting Diode, and a Quantum dot Light Emitting Diode (QLED). In a practical application, a structure of the light emitting element EL needs to be designed and determined according to a practical application environment, and is not limited herein. Description will be made below by taking a case that a light emitting element EL is an organic light emitting diode as an example.

In some exemplary implementation modes, at least one of the first transistor T1, the second transistor T2, and the seventh transistor T7 is a first type transistor, the first type transistor includes an N-type transistor or a P-type transistor, the third transistor T3 to the sixth transistor T6 are all second type transistors, a second type transistor includes a P-type transistor or an N-type transistor, and a transistor type of the second type transistor is different from that of the first type transistor, i.e., the second type transistor is a P-type transistor when the first type transistor is an N-type transistor, the second type transistor is an N-type transistor when the first type transistor is a P-type transistor.

In some exemplary implementation modes, as shown in FIG. 37*a* and FIG. 37*b*, both the first transistor T1 and the second transistor T2 are N-type thin film transistors, and the third transistor T3 to the seventh transistor T7 are all P-type thin film transistors.

In some exemplary implementation modes, the first transistor T1, the second transistor T2, and the seventh transistor T7 are all N-type thin film transistors, and the third transistor T3 to the sixth transistor T6 are all P-type thin film transistors.

In some exemplary implementation modes, as shown in FIG. 38*a* and FIG. 38*b*, the second transistor T2 is an N-type thin film transistor, and the first transistor T1 and the third transistor T3 to the seventh transistor T7 are all P-type thin film transistors.

In an exemplary embodiment, an N-type thin film transistor may be a Low Temperature Poly Silicon (LTPS) Thin Film Transistor (TFT), and a P-type thin film transistor may be an Indium Gallium Zinc Oxide (IGZO) thin film transistor. Or, the N-type thin film transistor may be an IGZO thin film transistor, and the P-type thin film transistor may be an LTPS thin film transistor.

In some exemplary implementation modes, both the first transistor T1 and the second transistor T2 are IGZO thin film transistors, and the third transistor T3 to the seventh transistor T7 are all LTPS thin film transistors.

In the embodiment, compared with a low temperature poly silicon thin film transistor, an indium gallium zinc oxide thin film transistor produces less leakage current. Therefore, the first transistor T1 and the second transistor T2 are set as indium gallium zinc oxide thin film transistors, so that a leakage current of a control electrode of a drive transistor in a light emitting phase may be significantly reduced, thereby improving problems of a low frequency, low brightness, and flicker of a display panel.

In some exemplary implementation modes, the first transistor T1, the second transistor T2, and the seventh transistor T7 are all IGZO thin film transistors, and the third transistor T3 to the sixth transistor T6 are all LTPS thin film transistors.

In some exemplary implementation modes, the second transistor T2 is an IGZO thin film transistor, and the first transistor T1 and the third transistor T3 to the seventh transistor T7 are all LTPS thin film transistors. In some exemplary implementation modes, the first capacitor C1 may be a liquid crystal capacitor composed of a pixel electrode and a common electrode, or, may be a liquid crystal capacitor composed of a pixel electrode and a common electrode, and an equivalent capacitor composed of a storage capacitor, and the present disclosure is not limited to this.

Figure 39:
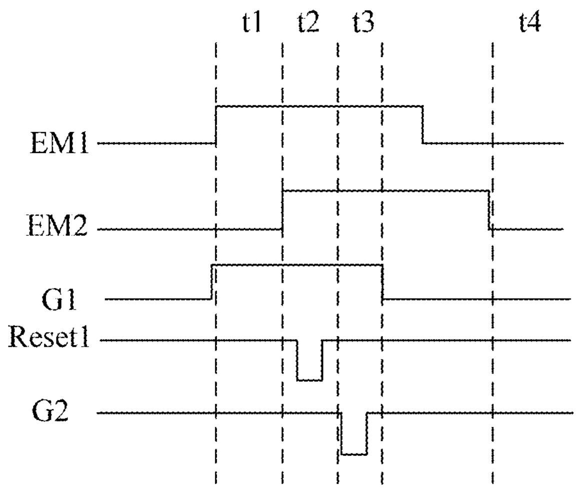
FIG. 39 is a working timing diagram of the pixel circuit shown in FIG. 37*a* or FIG. 37*b* in a scan cycle.

FIG. 39 is a working timing diagram of the pixel circuit shown in FIG. 37*a* or FIG. 37*b* in a scan cycle. A working process of a pixel circuit in a cycle of a frame will be described below in combination with the pixel circuit shown in FIG. 11*a* and the working timing diagram shown in FIG. 39 by taking a case that the first transistor T1 and the second transistor T2 are N-type transistors and the third transistor T3 to the seventh transistor T7 are all P-type transistors in the pixel circuit according to the embodiment of the present disclosure as an example. As shown in FIG. 37*a*, the pixel circuit according to the embodiment of the present disclosure includes seven transistor units (T1 to T7), one capacitor unit (C1), and three voltage lines (VDD, VSS, INIT1, since the second reset signal line INIT2 may be a same voltage line as any one of the first power supply line VDD, the first light emitting control signal line EM1, and the second light emitting control signal line EM2, the second reset signal line INIT2 is not contained in the above three voltage lines). Among them, the first power supply line VDD continuously provides a high-level signal, the second power supply line VSS continuously provides a low-level signal, and the first reset signal line INIT1 provides a first reset voltage (an initial voltage signal). As shown in FIG. 39, the working process may include following contents.

Figure 41:
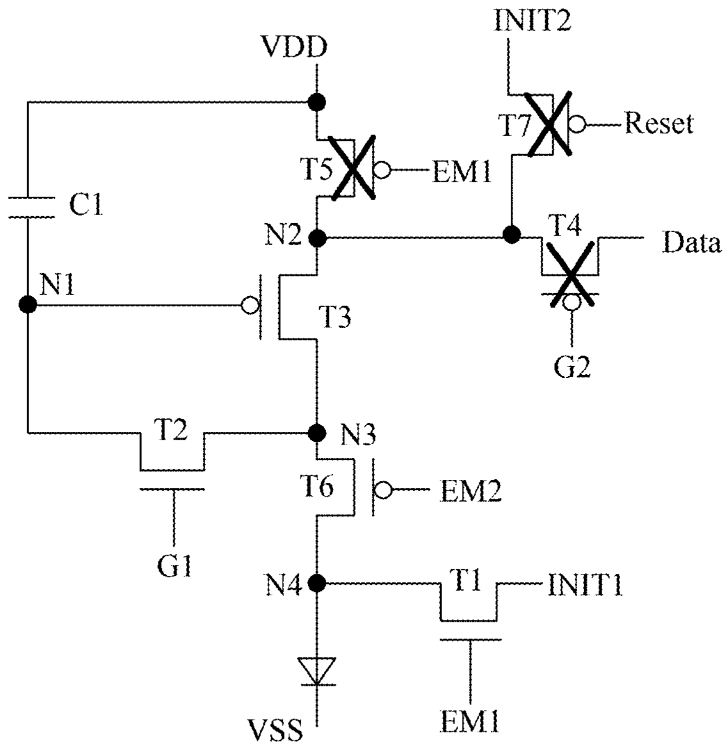
FIG. 41 is a schematic diagram of a working state of transistors of the pixel circuit shown in FIG. 37*a* in a reset phase.

In a first phase t1, i.e., a reset phase, the first scan signal line G1, the second scan signal line G2, the first reset control signal line Reset1, and the first light emitting control signal line EM1 are at a high level, and the second light emitting control signal line EM2 is at a low level. The first light emitting control signal line EM1 is at a high level, so that the first transistor T1 is turned on, and the fourth node N4 (i.e., an anode terminal of a light emitting element EL) is reset to a first reset voltage of the first reset signal line INIT1. The second light emitting control signal line EM2 is at a low level, so that the sixth transistor T6 is turned on. The first scan signal line G1 is at a high level, so that the second transistor T2 is turned on, and the first node N1 (i.e., a gate of the third transistor T3 and one terminal of the first capacitor C1) and the third node N3 are reset to the first reset voltage of the first reset signal line INIT1. In this phase, the fourth transistor T4, the fifth transistor T5, and the seventh transistor T7 remain off, as shown in FIG. 41.

Figure 42:
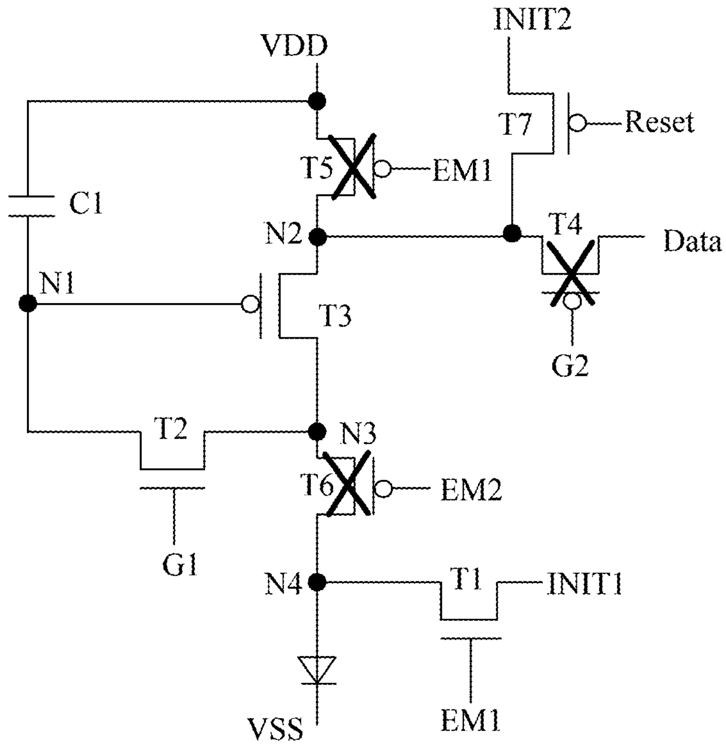
FIG. 42 is a schematic diagram of a working state of transistors of the pixel circuit shown in FIG. 37*a* in a reposition phase.

In a second phase t2, i.e., a reposition phase, the first scan signal line G1, the second scan signal line G2, the first light emitting control signal line EM1, and the second light emitting control signal line EM2 are at a high level, and the first reset control signal line Reset is at a low level. The second light emitting control signal line EM2 is at a high level, so that the sixth transistor T6 is turned off. The first reset control signal line Reset1 is at a low level, so that the seventh transistor T7 is turned on (this timing is explained by taking a case that the seventh transistor T7 is a P-type thin film transistor as an example, and when the seventh transistor T7 is an N-type thin film transistor, the first reset control signal line Reset1 provides a high-level signal in the second phase t2 and provides a low-level signal in other phases), and the second node N2 is reset to a second reset voltage, wherein the second reset voltage may be a voltage signal provided by the first power supply line VDD, the first light emitting control signal line EM1, the second light emitting control signal line EM2, or a third power supply line, the second reset voltage is greater than the first reset voltage. Since the first node N1 has the first reset voltage of the first reset signal line INIT1, the third transistor T3 is turned on, the first scan signal line G1 is at a high level, the second transistor T2 is turned on, and a voltage at the second node N2 is transmitted to the first node N1 through the third transistor T3 and the second transistor T2. In this phase, the fourth transistor T4, the fifth transistor T5, and the sixth transistor T6 remain off, as shown in FIG. 42.

Figure 43:
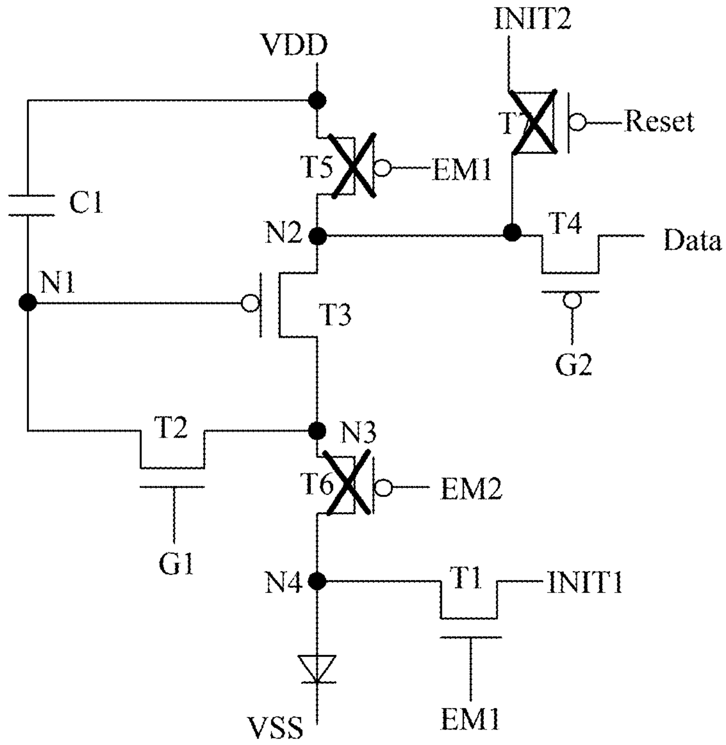
FIG. 43 is a schematic diagram of a working state of transistors of the pixel circuit shown in FIG. 37*a* in a data writing phase.

In a third phase t3, i.e., a data writing phase, the first scan signal line G1, the first reset control signal line Reset1, the first light emitting control signal line EM1, and the second light emitting control signal line EM2 are at a high level, and the second scan signal line G2 is at a low level. At this time, the second scan signal line G2 is at a low level, so that the fourth transistor T4 is turned on, a data voltage signal Vdata output by the data signal line Data is provided to the first node N1 through the fourth transistor T4, the third transistor T3, and the second transistor T2 which are turned on, and a sum of the data voltage signal Vdata output by the data signal line Data and a threshold voltage Vth of the third transistor T3 is stored in the first capacitor C1. In this phase, the fifth transistor T5, the sixth transistor T6, and the seventh transistor T7 remain off, as shown in FIG. 43.

Figure 44:
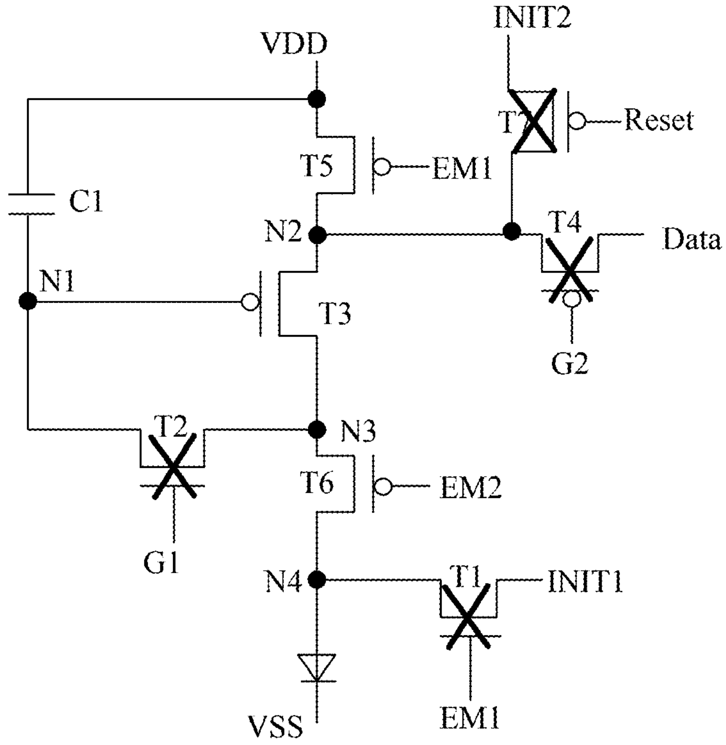
FIG. 44 is a schematic diagram of a working state of transistors of the pixel circuit shown in FIG. 37*a* in a light emitting phase.

In a fourth phase t4, i.e., a light emitting phase, the second scan signal line G2 and the first reset control signal line Reset1 are at a high level, and the first scan signal line G1, the first light emitting control signal line EM1, and the second light emitting control signal line EM2 are at a low level. The first light emitting control signal line EM1 is at a low level, so that the fifth transistor T5 is turned on and the first transistor T1 is turned off, the second light emitting control signal line EM2 is at a low level, so that the sixth transistor T6 is turned on, and a power supply voltage output from the first power supply line VDD provides a drive voltage to the fourth node N4 (i.e., the anode terminal of the light emitting element EL) through the fifth transistor T5, the third transistor T3, and the sixth transistor T6 which are turned on, to drive the light emitting element EL to emit light. In this phase, the first transistor T1, the second transistor T2, the fourth transistor T4, and the seventh transistor T7 remain off, as shown in FIG. 44.

Figure 40:
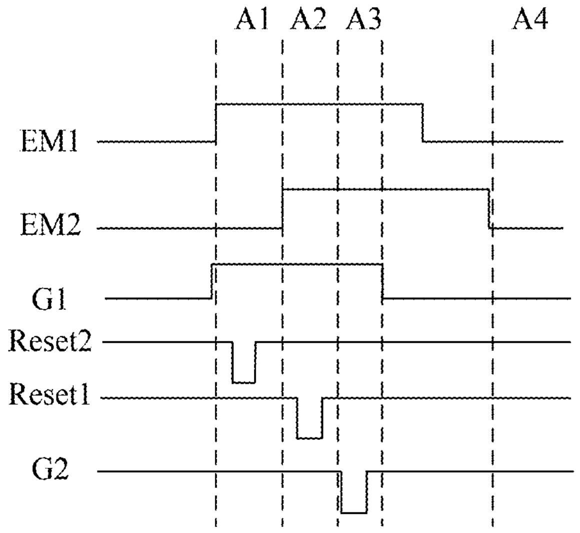
FIG. 40 is a working timing diagram of the pixel circuit shown in FIG. 38*a* or FIG. 38*b* in a scan cycle.

FIG. 40 is a working timing diagram of the pixel circuit shown in FIG. 38*a* or FIG. 38*b* in a scan cycle. A working process of a pixel circuit in a cycle of a frame will be described below in combination with the pixel circuit shown in FIG. 38*a* and the working timing diagram shown in FIG. 40 by taking a case that the second transistor T2 is an N-type transistor, and the first transistor T1 and the third transistor T3 to the seventh transistor T7 are P-type transistors in the pixel circuit according to the embodiment of the present disclosure as an example. As shown in FIG. 38*a*, the pixel circuit according to the embodiment of the present disclosure includes seven transistor units (T1 to T7), one capacitor unit (C1), and three voltage lines (VDD, VSS, INIT1, since the second reset signal line INIT2 may be a same voltage line as any one of the first power supply line VDD, the first light emitting control signal line EM1, and the second light emitting control signal line EM2, the second reset signal line INIT2 is not contained in the above three voltage lines). Among t hem, the first power supply line VDD continuously provides a high-level signal, the second power supply line VSS continuously provides a low-level signal, and the first reset signal line INIT1 provides a first reset voltage (an initial voltage signal). As shown in FIG. 40, the working process may include following contents.

In a first phase A1, i.e., a reset phase, the first scan signal line G1, the second scan signal line G2, the first reset control signal line Reset1, and the first light emitting control signal line EM1 are at a high level, and the second reset control signal line Reset2 and the second light emitting control signal line EM2 are at a low level. The first transistor T1, the sixth transistor T6, and the second transistor T2 are turned on, and the fourth node N4 (i.e., an anode terminal of the light emitting element EL), the third node N3, and the first node N1 (i.e., a gate of the third transistor T3 and one terminal of the first capacitor C1) are reset to a first reset voltage of the first reset signal line INIT1. In this phase, the fourth transistor T4, the fifth transistor T5, and the seventh transistor T7 remain off.

In a second phase A2, i.e., a reposition phase, the first scan signal line G1, the second scan signal line G2, the second reset control signal line Reset2, the first light emitting control signal line EM1, and the second light emitting control signal line EM2 are at a high level, and the first reset control signal line Reset1 is at a low level. The second light emitting control signal line EM2 is at a high level, so that the sixth transistor T6 is turned off. The first reset control signal line Reset1 is at a low level, so that the seventh transistor T7 is turned on (this timing is explained by taking a case that the seventh transistor T7 is a P-type thin film transistor as an example, and when the seventh transistor T7 is an N-type thin film transistor, the first reset control signal line Reset1 provides a high-level signal in the second phase A2 and provides a low-level signal in other phases), and the second node N2 is reset to a second reset voltage, wherein the second reset voltage may be a voltage signal provided by the first power supply line VDD, the first light emitting control signal line EM1, the second light emitting control signal line EM2, or a third power supply line, the second reset voltage is greater than the first reset voltage. Since the first node N1 has the first reset voltage of the first reset signal line INIT1, the third transistor T3 is turned on, the first scan signal line G1 is at a high level, the second transistor T2 is turned on, and a voltage at the second node N2 is transmitted to the first node N1 through the third transistor T3 and the second transistor T2. In this phase, the fourth transistor T4, the fifth transistor T5, and the sixth transistor T6 remain off.

In a third phase A3, i.e., a data writing phase, the first scan signal line G1, the second reset control signal line Reset2, the first reset control signal line Reset1, the first light emitting control signal line EM1, and the second light emitting control signal line EM2 are at a high level, and the second scan signal line G2 is at a low level. At this time, the second scan signal line G2 is at a low level, so that the fourth transistor T4 is turned on, a data voltage signal Vdata output by the data signal line Data is provided to the first node N1 through the fourth transistor T4, the third transistor T3, and the second transistor T2 which are turned on, and a sum of the data voltage signal Vdata output by the data signal line Data and a threshold voltage Vth of the third transistor T3 is stored in the first capacitor C1. In this phase, the fifth transistor T5, the sixth transistor T6, and the seventh transistor T7 remain off.

In a fourth phase A4, i.e., a light emitting phase, the second scan signal line G2, the second reset control signal line Reset2, and the first reset control signal line Reset1 are at a high level, and the first scan signal line G1, the first light emitting control signal line EM1, and the second light emitting control signal line EM2 are at a low level. The first light emitting control signal line EM1 is at a low level, so that the fifth transistor T5 is turned on, and the second reset control signal line Reset2 is at a high level, so that the first transistor is turned off. The second light emitting control signal line EM2 is at a low level, so that the sixth transistor T6 is turned on. A power supply voltage output by the first power supply line VDD provides a drive voltage to the fourth node N4 (i.e., the anode terminal of the light emitting element EL) through the fifth transistor T5, the third transistor T3, and the sixth transistor T6 which are turned on, to drive the light emitting element EL to emit light. In this phase, the first transistor T1, the second transistor T2, the fourth transistor T4, and the seventh transistor T7 remain off.

In a drive process of the pixel circuit, a drive current flowing through the third transistor T3 (i.e., a drive transistor) is determined by a voltage difference between a gate electrode and a first electrode of the third transistor T3. Since a voltage at the first node N1 is Vdata+Vth, the drive current of the third transistor T3 is as follows.

$$I=K^*(Vgs-Vth)^2=K^*[(V\text{data}+Vth-Vdd)-Vth]^2=K^*[(V\text{data}-Vdd)]^2$$

Herein, I is the drive current flowing through the third transistor T3, i.e., a drive current for driving the light emitting element EL, K is a constant, Vgs is the voltage difference between the gate electrode and the first electrode of the third transistor T3, Vth is a threshold voltage of the third transistor T3, Vdata is a data voltage output by the data signal line Data, and Vdd is a power voltage output by the first power supply line VDD.

It may be seen from the above formula that a current I flowing through the light emitting element EL is unrelated to the threshold voltage Vth of the third transistor T3, so that an influence of the threshold voltage Vth of the third transistor T3 on the current I is eliminated, and uniformity of brightness is ensured.

Due to long response time of an LTPS transistor+Oxide transistor (LTPO) pixel circuit, picture brightness flashes when switching at a low frequency. In the pixel circuit of the embodiment of the present disclosure, hysteresis is improved by adding a large bias voltage to the third transistor T3 (drive transistor) in a reposition phase of the drive transistor, so that picture brightness can be maintained when switching between high and low frequencies, and a risk of flicker can be reduced.

In a column of sub-pixels, for at least two adjacent sub-pixels, a second light emitting control signal line EM2 in a previous row of sub-pixels is electrically connected with a first light emitting control signal line EM1 in a next row of sub-pixels, and a second scan signal line G2 in the previous row of sub-pixels is electrically connected with a first reset control signal line Reset1 in the next row of sub-pixels.

Figure 45:
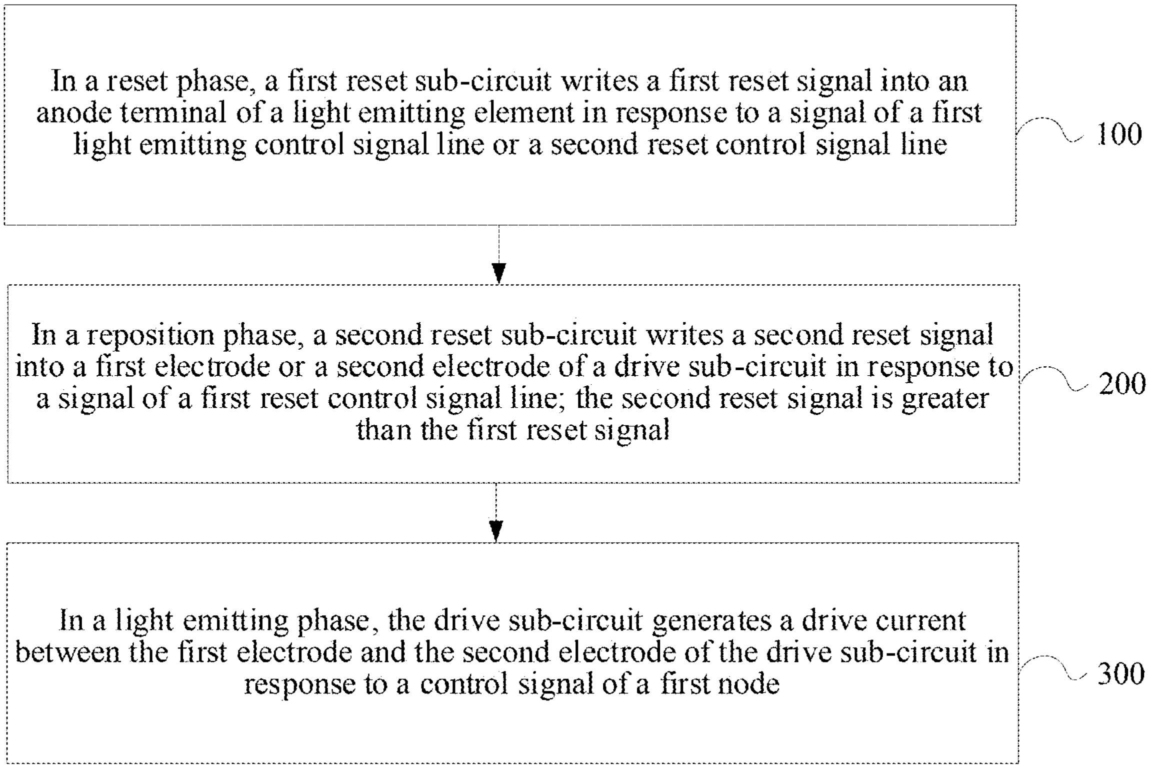
FIG. 45 is a schematic flowchart of a drive method of a pixel circuit according to an embodiment of the present disclosure.

An embodiment of the present disclosure also provides a drive method of a pixel circuit, for driving the pixel circuit as described above, the pixel circuit has multiple scan cycles, and in a scan cycle, as shown in FIG. 45, the drive method includes an act 100 to an act 400.

Among them, the act 100 includes: in a reset phase, a first reset sub-circuit writes a first reset signal into an anode terminal (i.e., a fourth node) of a light emitting element in response to a signal of a first light emitting control signal line or a second reset control signal line.

In some exemplary implementation modes, the act 100 further includes: a second light emitting control sub-circuit writes the first reset signal at the fourth node into a third node in response to a signal of a second light emitting control signal line; and a compensation sub-circuit writes the first reset signal at the third node into a first node in response to a signal of a first scan signal line.

The act 200 includes: in a reposition phase, a second reset sub-circuit writes a second reset signal into a first electrode (i.e., a second node) or a second electrode (i.e., the third node) of a drive sub-circuit in response to a signal of a first reset control signal line; the second reset signal is greater than the first reset signal.

In some exemplary implementation modes, the act 100 further includes: the compensation sub-circuit writes the second reset signal at the third node into the first node in response to the signal of the first scan signal line.

In some exemplary implementation modes, the second reset signal may be a signal derived from a voltage line of at least one of: a first power supply line, the first light emitting control signal line, the second light emitting control signal line, or a third power supply line.

The act 300 includes: in a light emitting phase, the drive sub-circuit generates a drive current between the second node and the third node in response to a control signal of the first node.

In some exemplary implementation modes, prior to the act 300, the method further includes: in a data writing phase, a writing sub-circuit writes a data signal into the second node in response to a signal of the second scan signal line; and the compensation sub-circuit compensates the first node in response to a signal of the first scan signal line.

In some exemplary implementation modes, the act 300 further includes: in the light emitting phase, a first light emitting control sub-circuit provides a signal of the first power supply line to the second node in response to a signal of the first light emitting control signal line; and a second light emitting control sub-circuit allows the drive current to flow between the third node and the fourth node in response to a signal of the second light emitting control signal line.

According to the pixel circuit and the drive method therefor, and the display apparatus of the embodiments of the present disclosure, the second reset sub-circuit writes the second reset signal into the first electrode or the second electrode of the drive sub-circuit in response to the signal of the first reset control signal line, a large bias voltage is added to the drive sub-circuit to improve hysteresis, so that picture brightness can be maintained when switching between high and low frequencies and a risk of flicker can be reduced, and a display effect of the display apparatus under high and low gray scales is improved. In addition, since a quantity of transistors in the pixel circuit of the present disclosure is relatively small, the pixel circuit occupies less space, thereby improving a pixel resolution of the display apparatus.

Following points need to be noted.

The drawings of the embodiments of the present disclosure only involve structures involved in the embodiments of the present disclosure, and other structures may refer to usual designs.

The embodiments of the present disclosure and features in the embodiments may be combined with each other to obtain new embodiments if there is no conflict.

As shown in FIG. 46 to FIG. 60, which are explanatory drawings of another group of exemplary embodiments of the pixel drive circuit of the present disclosure.

Transistors used in all embodiments of the present disclosure may be triodes, thin film transistors, field effect transistors, or other devices with same characteristics. In an embodiment of the present disclosure, in order to distinguish two electrodes of a transistor except a control electrode, one electrode of the two electrodes is called a first electrode, and the other electrode is called a second electrode.

In an actual operation, when the transistor is a thin film transistor or a field effect transistor, the first electrode may be a drain and the second electrode may be a source. Or, the first electrode may be a source and the second electrode may be a drain.

Figure 46:
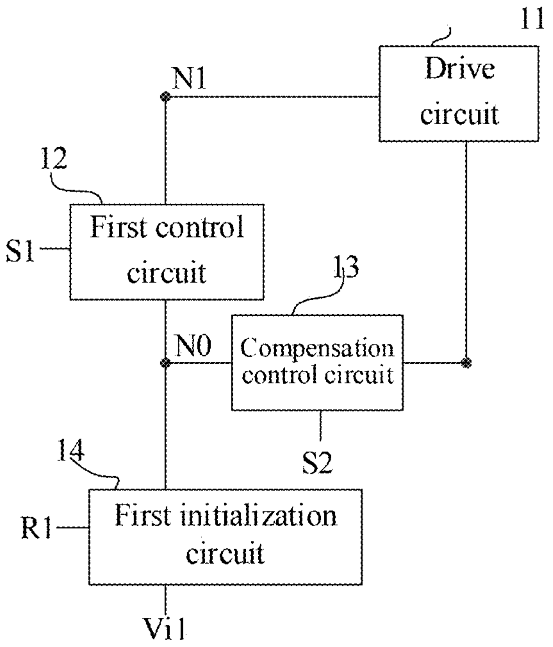
FIG. 46 is a diagram of a structure of a pixel circuit according to at least one embodiment of the present disclosure.

As shown in FIG. 46, a pixel circuit described in an embodiment of the present disclosure includes a drive circuit 11, a first control circuit 12, a compensation control circuit 13, and a first initialization circuit 14.

The first control circuit 12 is electrically connected with a first scan line S1, a control terminal of the drive circuit 11, and a connection node N0 respectively, and is configured to control communication between the control terminal of the drive circuit 11 and the connection node N0 under control of a first scan signal provided by the first scan line S1.

The compensation control circuit 13 is electrically connected with a second scan line S2, the connection node N0, and a first terminal of the drive circuit 11 respectively, and is configured to control communication between the connection node N0 and the first terminal of the drive circuit 11 under control of a second scan signal provided by the second scan line S2.

The first initialization circuit 14 is electrically connected with an initialization control line R1, a first initialization voltage line, and the connection node N0 respectively, and is configured to write a first initialization voltage Vi1 provided by the first initialization voltage line into the connection node N0 under control of an initialization control signal provided by the initialization control line R1.

The drive circuit 11 is configured to control communication between the first terminal of the drive circuit 11 and a second terminal of the drive circuit 11 under control of a potential of the control terminal of the drive circuit 11.

In at least one embodiment shown in FIG. 46, a first node N1 is a node connected with the control terminal of the drive circuit 11.

In the pixel circuit described in the embodiment of the present disclosure, the first control circuit 12 is electrically connected directly with the first node N1, and neither the first initialization circuit 14 nor the compensation control circuit 13 is directly electrically connected with the first node N1, so as to reduce a leakage path of the first node N1, and ensure stability of a voltage at the first node when working at a low frequency, which is beneficial to improve display quality, improve display uniformity, and reduce flicker.

When the pixel circuit of the embodiment of the present disclosure as shown in FIG. 46 is working, a display cycle includes an initialization phase and a data writing phase. The drive method includes following contents.

In the initialization phase, the first control circuit 12 controls communication between the control terminal of the drive circuit 11 and the connection node N0 under control of the first scan signal. The first initialization circuit 14 writes the first initialization voltage Vi1 into the connection node N0 under control of the initialization control signal, so as to write the first initialization voltage Vi1 into the control terminal of the drive circuit 11, so that the drive circuit 11 can control communication between the first terminal and the second terminal of the drive circuit at beginning of the data writing phase.

In the data writing phase, the first control circuit 12 controls the communication between the control terminal of the drive circuit 11 and the connection node N0 under control of the first scan signal. The compensation control circuit 13 controls communication between the connection node N0 and the first terminal of the drive circuit 11 under control of the second scan signal, so that the control terminal of the drive circuit 11 communicates with the first terminal of the drive circuit 11.

Optionally, the first control circuit includes a first transistor.

A control electrode of the first transistor is electrically connected with the first scan line, a first electrode of the first transistor is electrically connected with the control terminal of the drive circuit, and a second electrode of the first transistor is electrically connected with the connection node.

The first control transistor is an oxide thin film transistor.

In at least one embodiment of the present disclosure, a first transistor included in the control circuit is an oxide thin film transistor.

An oxide transistor has good hysteresis characteristics, a low leakage current, and a relatively low mobility. Therefore, according to at least one embodiment of the present disclosure, a first transistor is set as an oxide thin film transistor to achieve a low leakage current and ensure stability of a potential of a control terminal of a drive circuit.

Optionally, the compensation control circuit includes a second transistor.

A control electrode of the second transistor is electrically connected with the second scan line, a first electrode of the second transistor is electrically connected with the connection node, and a second electrode of the second transistor is electrically connected with the first terminal of the drive circuit.

In at least one embodiment of the present disclosure, the second transistor may be a low temperature poly silicon thin film transistor, but it is not limited to this. In specific implementation, the second transistor may also be another type of transistor.

Optionally, the first initialization circuit includes a third transistor.

A control electrode of the third transistor is electrically connected with the initialization control line, a first electrode of the third transistor is electrically connected with the first initialization voltage line, and a second electrode of the third transistor is electrically connected with the connection node.

In at least one embodiment of the present disclosure, the third transistor is a low temperature poly silicon thin film transistor. In specific implementation, the third transistor may also be another type of transistor.

Figure 47:
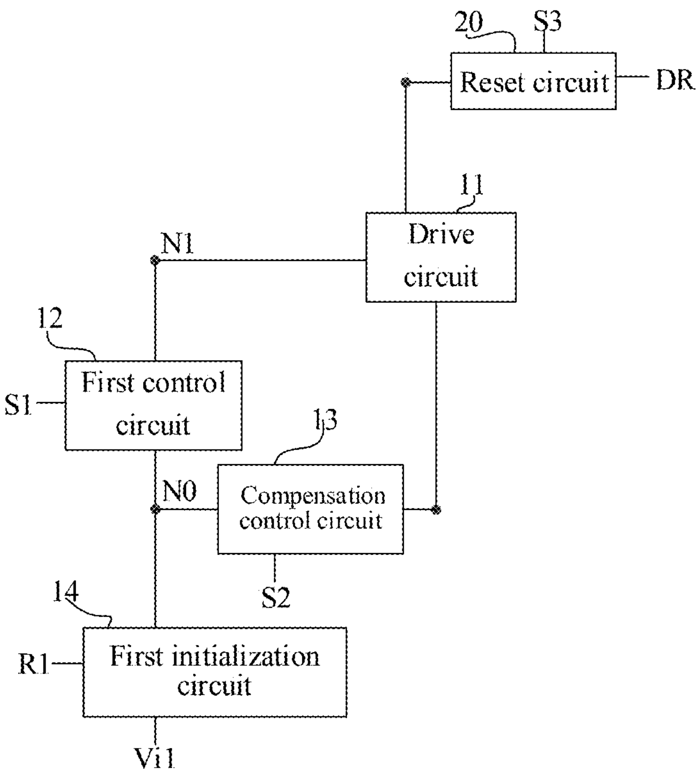
FIG. 47 is a diagram of a structure of a pixel circuit according to at least another embodiment of the present disclosure.

As shown in FIG. 47, on a basis of the pixel circuit shown in FIG. 46, the pixel circuit described in at least one embodiment of the present disclosure may further include a reset circuit 20.

The reset circuit 20 is electrically connected with a third scan line S3, a reset voltage line DR, and the second terminal of the drive circuit 11 respectively, and is configured to write a reset voltage provided by the reset voltage line DR into the second terminal of the drive circuit 11 under control of a third scan signal provided by the third scan line S3.

The pixel circuit according to at least one embodiment of the present disclosure as shown in FIG. 47 is additionally provided with the reset circuit 20. The reset circuit 20 writes the reset voltage into the second terminal of the drive circuit 11 under control of the third scan signal in a non-light emitting period before a data voltage is written into the second terminal of the drive circuit 11, to provide a bias voltage to a drive transistor in the drive circuit 11 (at this time, a potential of a gate of the drive transistor is also initialized to Vi1), so that the drive transistor remains in a reset state to improve hysteresis of the drive transistor and facilitate First Frame Response time (FFR) of a display screen.

In specific implementation, hysteresis of the drive transistor will cause a characteristic response of the drive transistor to be slow, and in at least one embodiment of the present disclosure, a gate-source voltage of the drive transistor is quickly reset before the data voltage is written, which is beneficial to speed up a recovery speed of the drive transistor, thereby improving a hysteresis phenomenon of the drive transistor and improving a hysteresis recovery speed.

When the pixel circuit according to at least one embodiment of the present disclosure as shown in FIG. 47 is working, in a non-light emitting period (the non-light emitting period may refer to a period other than a light emitting phase included in the display cycle), time for resetting the second terminal of the drive circuit 11 may be increased by increasing a duty ratio of the third scan signal, before the data voltage is written into the second terminal of the drive circuit 11, so as to make a reset effect of a potential of the second terminal of the drive circuit 11 better.

When the pixel circuit according to at least one embodiment of the present disclosure as shown in FIG. 47 is working, the reset circuit writes a reset voltage into the second terminal of the drive circuit under control of the third scan signal in the initialization phase.

In at least one embodiment of the present disclosure, the reset voltage is a Direct Current (DC) voltage signal to provide a fixed bias voltage for the drive transistor to improve a hysteresis phenomenon.

Optionally, the reset voltage may be a high voltage, but it is not limited to this.

In at least one embodiment of the present disclosure, a third scan signal may be provided to the third scan line through a separate third scan signal generation module, which is beneficial to reset a potential of the second terminal of the drive circuit.

In at least one embodiment of the present disclosure, the reset voltage line and the first voltage line may be a same voltage line, so that a quantity of signal lines used may be reduced. A voltage value of the reset voltage is greater than a voltage value of the first initialization voltage. The first voltage line is used for providing a first voltage signal (the first voltage line may be a high voltage line). A voltage value of the first voltage signal may be greater than 0 V and less than or equal to 5 V, for example, the voltage value of the first voltage signal may be 4.6 V, but it is not limited to this. The first initialization voltage may be a DC voltage, and a voltage value of the first initialization voltage may be greater than or equal to −7 V and less than or equal to 0 V, for example, the voltage value of the first initialization voltage may be −6 V, −5 V, −4 V, −3 V, or −2 V, but it is not limited to this.

In at least one embodiment of the present disclosure, the threshold voltage Vth of the drive transistor in the drive circuit may be greater than or equal to −5 V and less than or equal to −2 V, and preferably, Vth may be greater than or equal to −4 V and less than or equal to −2.5 V. For example, Vth may be −4 V, −3.5 V, −3 V, or −2.5 V, but it is not limited to this.

An absolute value of the voltage value of the reset voltage may be greater than 1.5 times of an absolute value of the threshold voltage, so as to ensure that a bias effect can be quickly achieved in a relatively short time. For example, the absolute value of the voltage value of the reset voltage may be greater than 2 times, 2.5 times, or 3 times of the absolute value of the threshold voltage, but it is not limited to this.

Optionally, the reset circuit includes a fourth transistor.

A control electrode of the fourth transistor is electrically connected with the third scan line, a first electrode of the fourth transistor is electrically connected with the reset voltage line, and a second electrode of the fourth transistor is electrically connected with the second terminal of the drive circuit.

In at least one embodiment of the present disclosure, the fourth transistor may be a low temperature poly silicon thin film transistor, but it is not limited to this.

Figure 48:
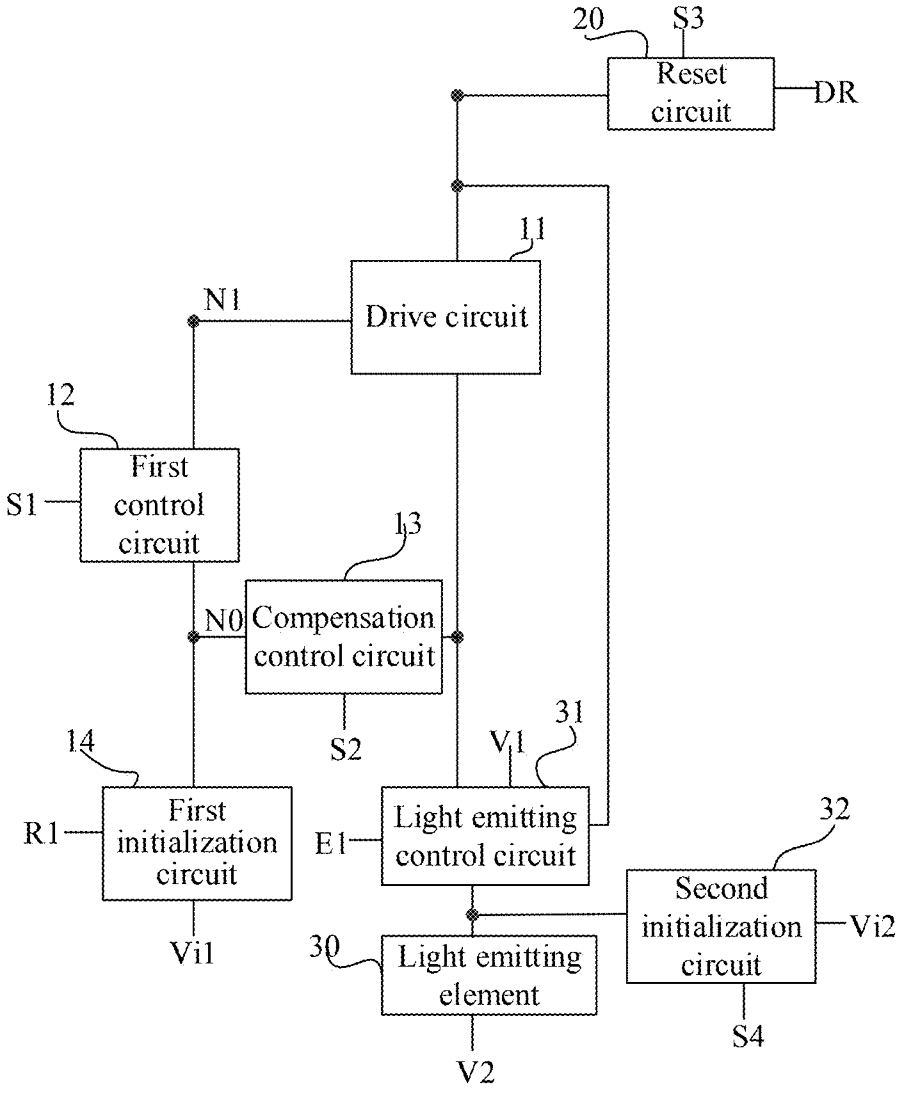
FIG. 48 is a diagram of a structure of a pixel circuit according to at least yet another embodiment of the present disclosure.

As shown in FIG. 48, the pixel circuit described in at least one embodiment of the present disclosure may further include a light emitting element 30, a light emitting control circuit 31, and a second initialization circuit 32.

The light emitting control circuit 31 is electrically connected with a light emitting control line E1, a first voltage line V1, a second terminal of a drive circuit 11, a first terminal of the drive circuit 11, and a first electrode of the light emitting element 30 respectively, and is configured to control communication between the first voltage line V1 and the second terminal of the drive circuit 11 and control communication between the first terminal of the drive circuit 11 and the first electrode of the light emitting element 30 under control of a light emitting control signal provided by the light emitting control line E1.

The second initialization circuit 32 is electrically connected with a fourth scan line S4, a second initialization voltage line, and the first electrode of the light emitting element 30 respectively, and is configured to write a second initialization voltage Vi2 provided by the second initialization voltage line into the first electrode of the light emitting element 30 under control of a fourth scan signal provided by the fourth scan line S4.

A second electrode of the light emitting element 30 is electrically connected with a second voltage line V2.

In at least one embodiment of the present disclosure, the first voltage line V1 may be a high voltage line and the second voltage line V2 may be a low voltage line, but it is not limited to this.

The light emitting element 30 may be an Organic Light Emitting Diode (OLED), the first electrode of the light emitting element 30 may be an anode of the OLED, and the second electrode of the light emitting element 30 may be a cathode of the OLED, but it is not limited to this.

In the pixel circuit according to at least one embodiment of the present disclosure as shown in FIG. 48, the fourth scan signal may be provided to the fourth scan line through a separate fourth scan signal generation module, which is beneficial to a degree of freedom of switching a switching frequency under low frequency flicker (the switching frequency is a switching frequency of a transistor included in the second initialization circuit 32). When a display panel to which the pixel circuit is applied works at a low frequency, when the light emitting control circuit 31 controls the first voltage line V1 to be disconnected from the second terminal of the drive circuit 11 and controls the first terminal of the drive circuit 11 to be disconnected from the first electrode of the light emitting element 30, it is possible to reduce flicker by increasing a frequency of the fourth scan signal.

In at least one embodiment of the present disclosure, the third scan signal and the fourth scan signal may be a same scan signal, and the third scan signal generation module and the fourth scan signal generation module may be a same module, but it is not limited to this.

When the pixel circuit according to at least one embodiment of the present disclosure shown in FIG. 48 is working, the first scan signal and the light emitting control signal may be a same signal. However, considering that when Pulse Width Modulation (PWM) controls a light emitting function, an EM may provide a high voltage signal during a light emitting process, then a first scan signal is provided to a first scan line through a separate first scan signal generation module, and a light emitting control signal is provided to a light emitting control line through a light emitting control signal generation module.

In at least one embodiment of the present disclosure, when the reset voltage line is a first voltage line, a voltage value of the reset voltage may be greater than a voltage value of the second initialization voltage.

The voltage value of the second initialization voltage may be greater than or equal to −7 V and less than or equal to 0 V. For example, the voltage value of the second initialization voltage may be −6 V, −5 V, −4 V, −3 V, or −2 V.

Optionally, the light emitting control circuit includes a fifth transistor and a sixth transistor.

A control electrode of the fifth transistor is electrically connected with the light emitting control line, a first electrode of the fifth transistor is electrically connected with the first voltage line, and a second electrode of the fifth transistor is electrically connected with the second terminal of the drive circuit.

A control terminal of the sixth transistor is electrically connected with the light emitting control line, a first electrode of the sixth transistor is electrically connected with the first terminal of the drive circuit, and a second electrode of the sixth transistor is electrically connected with the first electrode of the light emitting element.

The second initialization circuit includes a seventh transistor.

A control electrode of the seventh transistor is electrically connected with the fourth scan line, a first electrode of the seventh transistor is electrically connected with the second initialization voltage line, and a second electrode of the seventh transistor is electrically connected with the first electrode of the light emitting element.

Optionally, the seventh transistor may be an oxide thin film transistor.

In at least one embodiment of the present disclosure, the seventh transistor may be set as an oxide thin film transistor, so that leakage may be reduced to ensure stability of a potential of a first electrode of a light emitting element.

Figure 49:
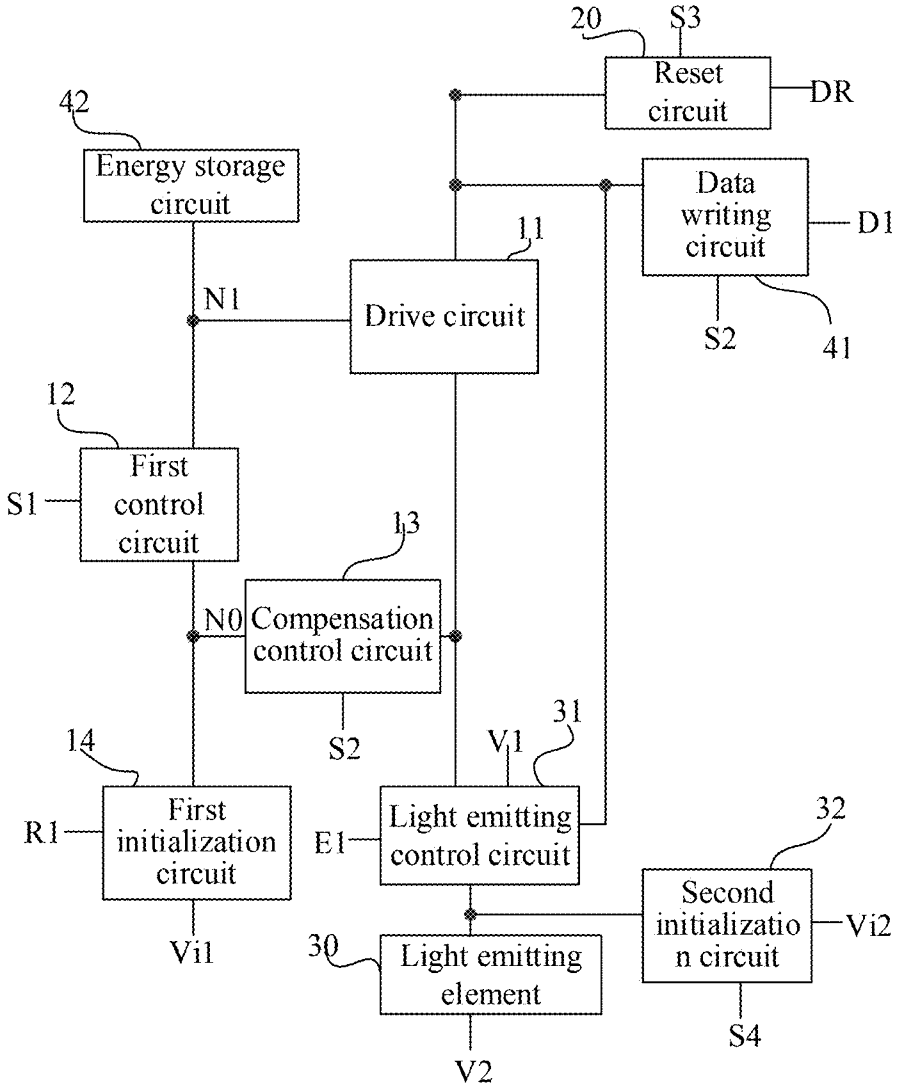
FIG. 49 is a diagram of a structure of a pixel circuit according to at least yet another embodiment of the present disclosure.

As shown in FIG. 49, on a basis of at least one embodiment of the pixel circuit shown in FIG. 48, the pixel circuit described in at least one embodiment of the present disclosure may further include a data writing circuit 41 and an energy storage circuit 42.

The data writing circuit 41 is electrically connected with a second scan line S2, a data line D1, and the second terminal of the drive circuit 11 respectively, and is configured to write a data voltage on the data line D1 into the second terminal of the drive circuit 11 under control of a second scan signal provided by the second scan line S2.

The energy storage circuit 42 is electrically connected with a control terminal of the drive circuit 11, and is configured to store electrical energy.

When the pixel circuit according to at least one embodiment of the present disclosure shown in FIG. 49 is working, the display cycle further includes a light emitting phase set after a data writing phase.

In an initialization phase, the second initialization circuit 32 writes the second initialization voltage Vi2 provided by the second initialization voltage line into the first electrode of the light emitting element 30 under control of the fourth scan signal provided by the fourth scan line S4.

In the data writing phase, the data writing circuit 41 writes a data voltage Vdata on the data line D1 into the second terminal of the drive circuit 11 under control of the second scan signal.

At beginning of the data writing phase, the drive circuit 11 controls communication between the first terminal of the drive circuit 11 and the second terminal of the drive circuit 11 to charge the energy storage circuit 42 through the data voltage Vdata, and change a potential of the control terminal of the drive circuit 11 until the potential of the control terminal of the drive circuit 11 becomes Vdata+Vth, wherein Vth is a threshold voltage of a drive transistor of the drive circuit 11.

In the light emitting phase, the light emitting control circuit 31 controls communication between the first voltage line V1 and the second terminal of the drive circuit 11 under control of a light emitting control signal, and controls communication between the first terminal of the drive circuit 11 and the first electrode of the light emitting element 30. The drive circuit 11 drives the light emitting element 30 to emit light.

Optionally, the data writing circuit includes an eighth transistor and the energy storage circuit includes a storage capacitor.

A control electrode of the eighth transistor is electrically connected with the second scan line, a first electrode of the eighth transistor is electrically connected with the data line, and a second electrode of the eighth transistor is electrically connected with the second terminal of the drive circuit.

A first terminal of the storage capacitor is electrically connected with the control terminal of the drive circuit, and a second terminal of the storage capacitor is electrically connected with the first voltage line.

In at least one embodiment of the present disclosure, the drive circuit may include a drive transistor.

The drive transistor is a single-gate transistor, a gate of the drive transistor is electrically connected with the control terminal of the drive circuit, a first electrode of the drive transistor is electrically connected with the first terminal of the drive circuit, and a second electrode of the drive transistor is electrically connected with the second terminal of the drive circuit; or, the drive transistor is a double-gate transistor, a first gate of the drive transistor is electrically connected with the control terminal of the drive circuit, a second gate of the drive transistor is electrically connected with the first voltage line, a first electrode of the drive transistor is electrically connected with the first terminal of the drive circuit, and a second electrode of the drive transistor is electrically connected with the second terminal of the drive circuit. The first gate is a top gate and the second gate is a bottom gate.

Optionally, the drive transistor may be a single-gate transistor or a double-gate transistor. When the drive transistor is a double-gate transistor, a first gate of the drive transistor is electrically connected with the control terminal of the drive circuit, a second gate of the drive transistor is electrically connected with the first voltage line, the first gate is a top gate, and the second gate is a bottom gate, so that a base substrate of the drive transistor is biased and a hysteresis phenomenon of the drive transistor is improved.

Figure 50:
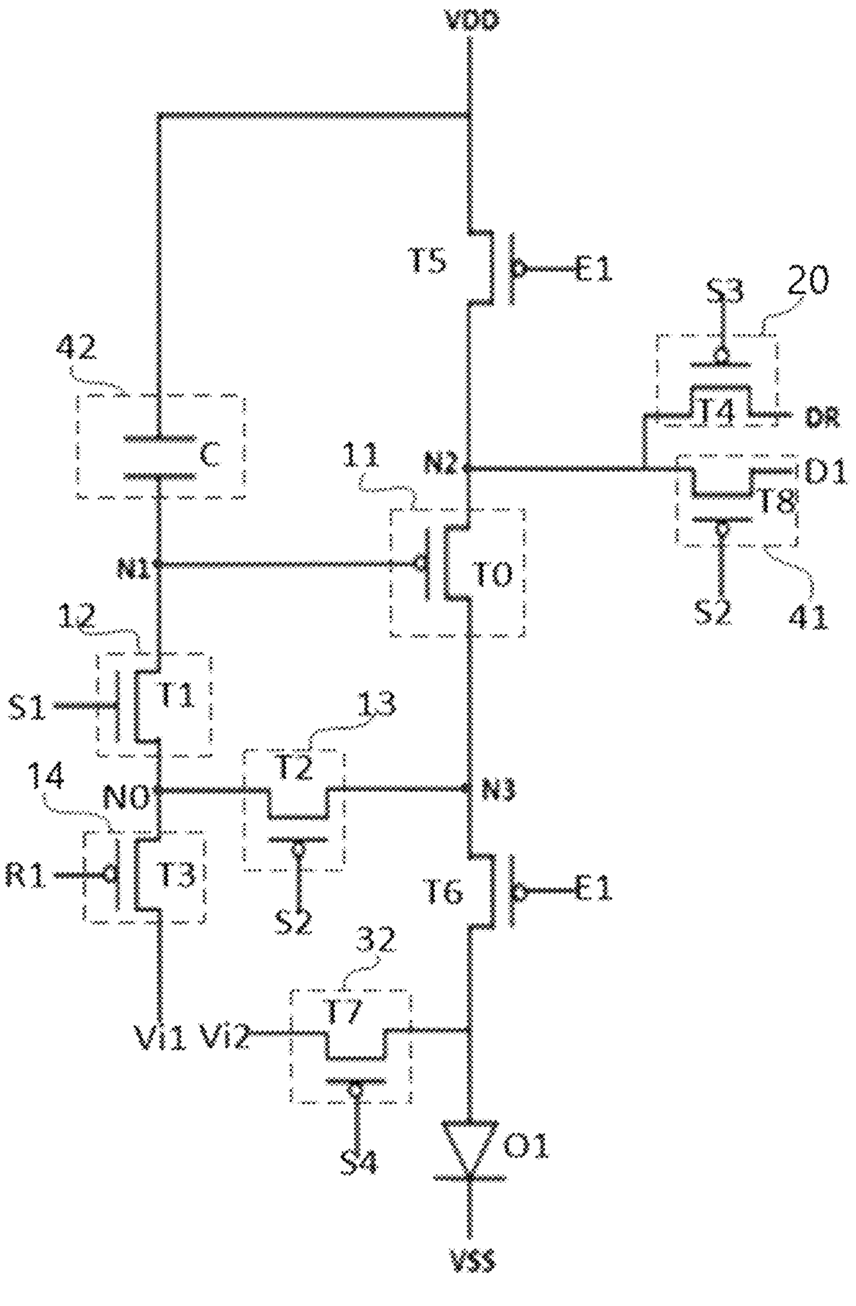
FIG. 50 is a circuit diagram of a pixel circuit according to at least one embodiment of the present disclosure.

As shown in FIG. 50, on a basis of at least one embodiment of the pixel circuit shown in FIG. 49, the first control circuit 12 includes a first transistor T1, the drive circuit 11 includes a drive transistor T0, and the light emitting element is an organic light emitting diode O1.

A gate of the first transistor T1 is electrically connected with the first scan line S1, a drain of the first transistor T1 is electrically connected with a gate of the drive transistor T0, and a source of the first transistor T1 is electrically connected with the connection node N0.

The compensation control circuit 13 includes a second transistor T2.

A gate of the second transistor T2 is electrically connected with the second scan line S2, a drain of the second transistor T2 is electrically connected with the connection node N0, and a source of the second transistor T2 is electrically connected with a drain of the drive transistor T0.

The first initialization circuit 14 includes a third transistor T3.

A gate of the third transistor T3 is electrically connected with the initialization control line R1, a drain of the third transistor T3 is electrically connected with a first initialization voltage line, and a source of the third transistor T3 is electrically connected with the connection node NO. The first initialization voltage line is used for providing a first initialization voltage Vi1.

The reset circuit 20 includes a fourth transistor T4.

A gate of the fourth transistor T4 is electrically connected with the third scan line S3, a drain of the fourth transistor T4 is electrically connected with the reset voltage line DR, and a source of the fourth transistor T4 is electrically connected with a source of the drive transistor T0.

The light emitting control circuit includes a fifth transistor T5 and a sixth transistor T6.

A gate of the fifth transistor T5 is electrically connected with the light emitting control line E1, a drain of the fifth transistor T5 is electrically connected with a high voltage line, and a source of the fifth transistor T5 is electrically connected with the source of the drive transistor T0. The high voltage line is used for providing a high voltage signal VDD.

A gate of the sixth transistor T6 is electrically connected with the light emitting control line E1, a drain of the sixth transistor T6 is electrically connected with a drain of the drive transistor T0, and a source of the sixth transistor T6 is electrically connected with an anode of the organic light emitting diode O1.

The second initialization circuit 32 includes a seventh transistor T7.

A gate of the seventh transistor T7 is electrically connected with the fourth scan line S4, a drain of the seventh transistor T7 is electrically connected with the second initialization voltage line, and a source of the seventh transistor T7 is electrically connected with the anode of the organic light emitting diode O1. The second initialization voltage line is used for providing a second initialization voltage Vi2.

The data writing circuit 41 includes an eighth transistor T8 and the energy storage circuit 42 includes a storage capacitor C.

A gate of the eighth transistor T8 is electrically connected with the second scan line S2, a drain of the eighth transistor T8 is electrically connected with the data line D1, and a source of the eighth transistor T8 is electrically connected with the source of the drive transistor T0.

A first terminal of the storage capacitor C is electrically connected with the gate of the drive transistor T0, and a second terminal of the storage capacitor C is electrically connected with the high voltage line.

A cathode of O1 is electrically connected with a low voltage line, and the low voltage line is used for providing a low voltage VSS.

In FIG. 50, a first node is labeled N1, and the first node N1 is electrically connected with the gate of T0.

A second node is labeled N2, and a third node is labeled N3. N2 is electrically connected with the source of T0, and N3 is electrically connected with the drain of T0.

In at least one embodiment shown in FIG. 50, the first voltage line is a high voltage line and the second voltage line is a low voltage line.

In at least one embodiment of the pixel circuit shown in FIG. 50, T1 may be an oxide thin film transistor, T0, T2, T3, T4, T5, T6, T7, and T8 may all be low temperature poly silicon thin film transistors, T1 is an n-type transistor, T0, T2, T3, T4, T5, T6, T7, and T8 are p-type transistors, and T0 is a single-gate transistor, but it is not limited to this.

In at least one embodiment of the pixel circuit shown in FIG. 50, N1 is only directly electrically connected with T1 and N1 is not directly electrically connected with T2 or T3, so as to reduce leakage of N1 and stabilize stability of a potential of the gate of T0.

In at least one embodiment of the pixel circuit shown in FIG. 50, T1 is an oxide thin film transistor, which may reduce leakage and ensure stability of a potential of N1.

Optionally, T2 and T3 may be single-gate transistors, thereby saving space.

In at least one embodiment of the pixel circuit shown in FIG. 50, both the initialization control signal provided by the initialization control line R1 and the second scan signal provided by the second scan line may be provided by a second scan signal generation module.

Optionally, in at least one embodiment of the pixel circuit, each transistor included in the pixel circuit may be disposed on a base substrate, an overlapping area between an orthographic projection of a conductive pattern on the base substrate and an orthographic projection of the fourth scan line S4 on the base substrate is as small as possible, and an overlapping area between the orthographic projection of the conductive pattern on the base substrate and an orthographic projection of the initialization control line R1 on the base substrate is as small as possible, so as to reduce a parasitic capacitance. In a preferred case, a capacitance between the conductive pattern and the fourth scan line S4 is less than 0.3 Cz, and a capacitance between a conductive pattern for electrically connecting the source of T0 and a source of T5 and the initialization control line R1 is less than 0.3 Cz, wherein Cz is a capacitance value of the storage capacitance C.

The conductive pattern includes the source of T0, the source of T5, and a connection conductive pattern for electrically connecting the source of T0 and the source of T5.

Figure 51:
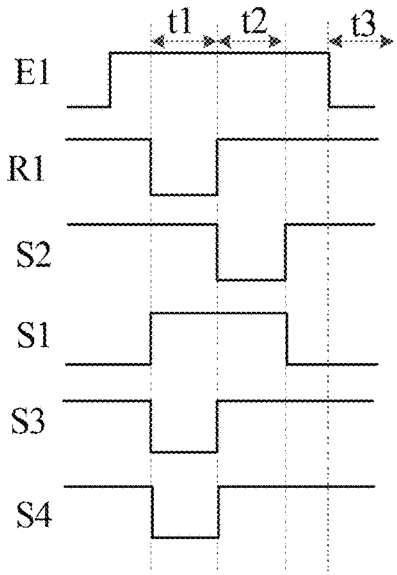
FIG. 51 is a working timing diagram of the pixel circuit shown in FIG. 50 according to at least one embodiment of the present disclosure.

As shown in FIG. 51, when the pixel circuit according to at least one embodiment of the present disclosure shown in FIG. 50 is working, a display cycle includes an initialization phase t1, a data writing phase t2, and a light emitting phase t3 which are set sequentially.

In the initialization phase t1, E1 provides a high voltage signal, S1 provides a high voltage signal, and T1 is turned on. R1 provides a low voltage signal, S2 provides a high voltage signal, T2 is turned on, T3 is turned off, and Vi1 is written into N1, so that T0 is turned on at beginning of the data writing phase t2. S3 and S4 provide low voltage signals, T7 is turned on, T4 is turned on to write a reset voltage provided by DR into N2, Vi2 is written into an anode of O1, so that O1 does not emit light, and a residual charge of the anode of O1 is cleared.

In the data writing phase t2, E1 provides a high voltage signal, S1 provides a high voltage signal, and T1 is turned on. R1 provides a high voltage signal, S2 provides a high voltage signal, T2 is turned on, T3 is turned off, T8 is turned on, S3 and S4 provide high voltage signals, T7 and T4 are turned off, and a data voltage Vdata on a data line D1 is written into N2.

At beginning of the data writing phase t2, T0 is turned on to charge C through Vdata, via T8, T0, T2, and T1 which are turned on, to raise a potential of N1 until T0 is turned off, at this time, the potential of N1 is Vdata+Vth, and Vth is a threshold voltage of T0.

In the light emitting phase t3, E1 provides a low voltage signal, R1 provides a high voltage signal, S1 provides a low voltage signal, S2, S3, and S4 provide high voltage signals, T1, T2, T3, T4, T7, and T8 are turned off, T5 and T6 are turned on, and T0 is turned on to drive O1 to emit light.

In at least one embodiment of the pixel circuit shown in FIG. 50, T4 is added to provide a high voltage for N2, and a potential of N2 is initialized in a non-light emitting period, which is beneficial to improve stability of T0. T7 is provided to initialize a potential of the anode of O1, which facilitates a degree of freedom of switching a switching frequency under low frequency flicker.

Figure 52:
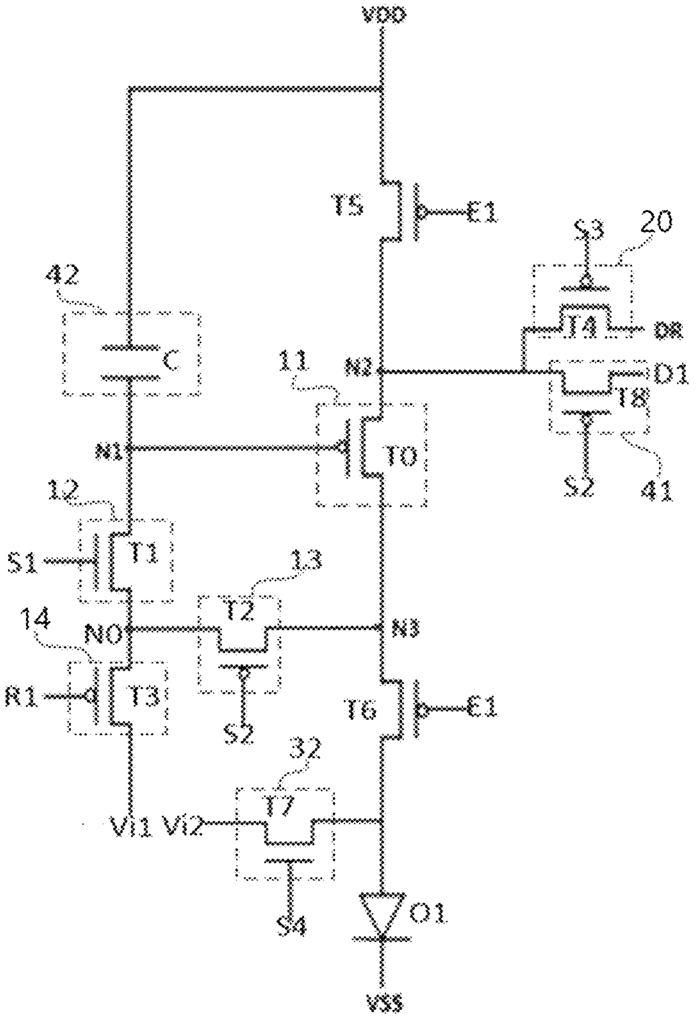
FIG. 52 is a circuit diagram of a pixel circuit according to at least another embodiment of the present disclosure.

As shown in FIG. 52, on a basis of at least one embodiment of the pixel circuit shown in FIG. 49, the first control circuit 12 includes a first transistor T1, the drive circuit 11 includes a drive transistor T0, and the light emitting element is an organic light emitting diode O1.

A gate of the first transistor T1 is electrically connected with the first scan line S1, a drain of the first transistor T1 is electrically connected with a gate of the drive transistor T0, and a source of the first transistor T1 is electrically connected with the connection node N0.

The compensation control circuit 13 includes a second transistor T2.

A gate of the second transistor T2 is electrically connected with the second scan line S2, a drain of the second transistor T2 is electrically connected with the connection node N0, and a source of the second transistor T2 is electrically connected with a drain of the drive transistor T0.

The first initialization circuit 14 includes a third transistor T3.

A gate of the third transistor T3 is electrically connected with the initialization control line R1, a drain of the third transistor T3 is electrically connected with a first initialization voltage line, and a source of the third transistor T3 is electrically connected with the connection node NO. The first initialization voltage line is used for providing a first initialization voltage Vi1.

The reset circuit 20 includes a fourth transistor T4.

A gate of the fourth transistor T4 is electrically connected with the third scan line S3, a drain of the fourth transistor T4 is electrically connected with the reset voltage line DR, and a source of the fourth transistor T4 is electrically connected with a source of the drive transistor T0.

The light emitting control circuit includes a fifth transistor T5 and a sixth transistor T6.

A gate of the fifth transistor T5 is electrically connected with the light emitting control line E1, a drain of the fifth transistor T5 is electrically connected with a high voltage line, and a source of the fifth transistor T5 is electrically connected with the source of the drive transistor T0. The high voltage line is used for providing a high voltage signal VDD.

A gate of the sixth transistor T6 is electrically connected with the light emitting control line E1, a drain of the sixth transistor T6 is electrically connected with a drain of the drive transistor T0, and a source of the sixth transistor T6 is electrically connected with an anode of the organic light emitting diode O1.

The second initialization circuit 32 includes a seventh transistor T7.

A gate of the seventh transistor T7 is electrically connected with the fourth scan line S4, a drain of the seventh transistor T7 is electrically connected with the second initialization voltage line, and a source of the seventh transistor T7 is electrically connected with the anode of the organic light emitting diode O1. The second initialization voltage line is used for providing a second initialization voltage Vi2.

The data writing circuit 41 includes an eighth transistor T8 and the energy storage circuit 42 includes a storage capacitor C.

A gate of the eighth transistor T8 is electrically connected with the second scan line S2, a drain of the eighth transistor T8 is electrically connected with the data line D1, and a source of the eighth transistor T8 is electrically connected with the source of the drive transistor T0.

A first terminal of the storage capacitor C is electrically connected with the gate of the drive transistor T0, and a second terminal of the storage capacitor C is electrically connected with the high voltage line.

A cathode of O1 is electrically connected with a low voltage line, and the low voltage line is used for providing a low voltage VSS.

In FIG. 52, a first node is labeled N1, and the first node N1 is electrically connected with the gate of T0.

A second node is labeled N2, and a third node is labeled N3. N2 is electrically connected with the source of T0, and N3 is electrically connected with the drain of T0.

In at least one embodiment shown in FIG. 52, the first voltage line is a high voltage line and the second voltage line is a low voltage line.

In at least one embodiment of the pixel circuit shown in FIG. 52, T1 and T7 may be oxide thin film transistors, T0, T2, T3, T4, T5, T6, and T8 may all be low temperature poly silicon thin film transistors, T1 and T7 are n-type transistors, T0, T2, T3, T4, T5, T6, and T8 are p-type transistors, and T0 is a single-gate transistor, but it is not limited to this.

The at least one embodiment of the pixel circuit shown in FIG. 52 of the present disclosure is different from the at least one embodiment of the pixel circuit shown in FIG. 50 of the present disclosure in that T7 is an oxide thin film transistor.

In at least one embodiment of the pixel circuit shown in FIG. 52, N1 is only directly electrically connected with T1 and N1 is not directly electrically connected with T2 or T3, so as to reduce leakage of N1 and stabilize stability of a potential of the gate of T0.

In at least one embodiment of the pixel circuit shown in FIG. 52, T1 and T7 are oxide thin film transistors to reduce leakage, to ensure stability of a potential of N1, and to ensure stability of a potential of the anode of O1.

In at least one embodiment of the pixel circuit shown in FIG. 52, a fourth scan signal may be provided to a fourth scan line through a separate fourth scan signal generation module, which facilitates a degree of freedom of switching a switching frequency (the switching frequency is a switching frequency of a transistor included in the second initialization circuit 32) under low frequency flicker. When a display panel to which the pixel circuit is applied works at a low frequency, when the light emitting control circuit 31 controls the first voltage line V1 to be disconnected from the second terminal of the drive circuit 11 and controls the first terminal of the drive circuit 11 to be disconnected from the first electrode of the light emitting element 30, it is possible to reduce flicker by increasing a frequency of the third scan signal; or, the fourth scan line may be the light emitting control line, so that in a low frequency refresh phase, only the light emitting control signal provided by the light emitting control line needs to be periodically controlled, that is, reset/brightness adjustment can be performed on the light emitting element periodically, thereby achieving brightness equalization.

Figure 53:
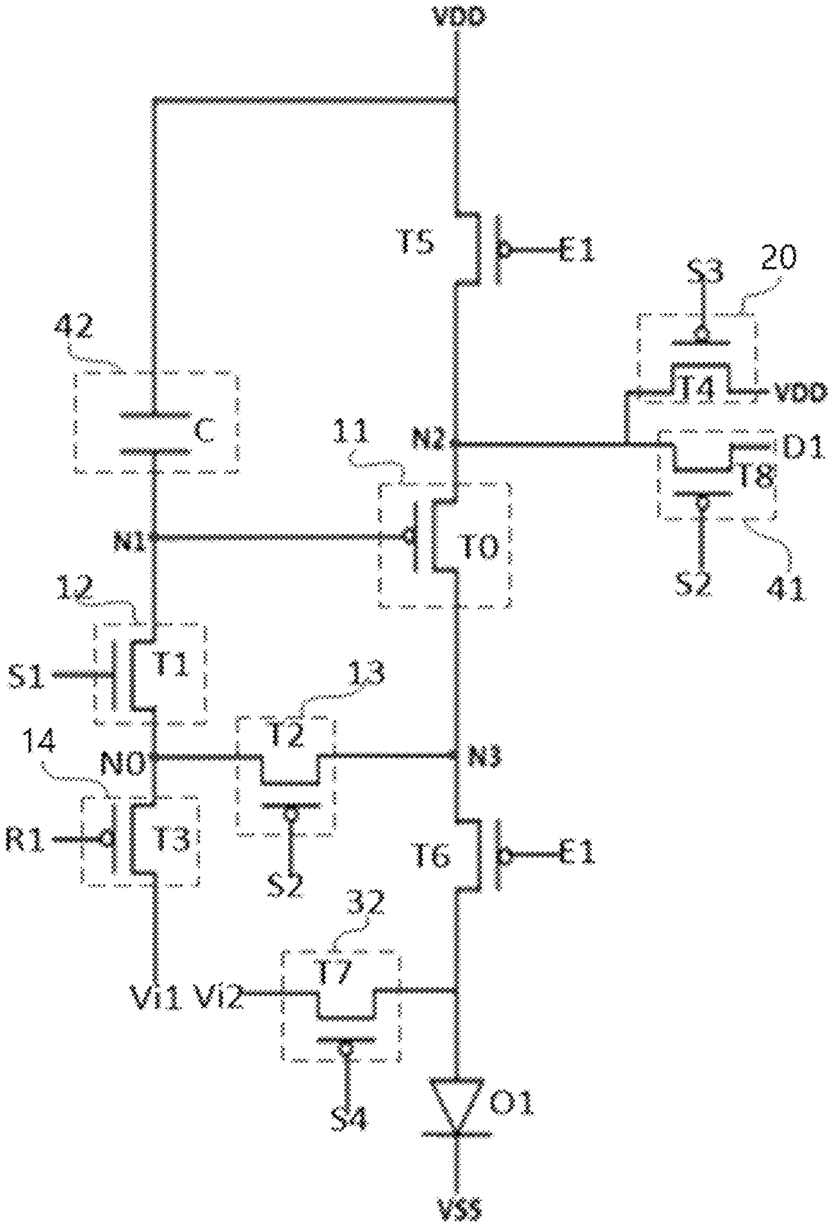
FIG. 53 is a circuit diagram of a pixel circuit according to at least yet another embodiment of the present disclosure.

As shown in FIG. 53, on a basis of at least one embodiment of the pixel circuit shown in FIG. 49, the first control circuit 12 includes a first transistor T1, the drive circuit 11 includes a drive transistor T0, and the light emitting element is an organic light emitting diode O1.

A gate of the first transistor T1 is electrically connected with the first scan line S1, a drain of the first transistor T1 is electrically connected with a gate of the drive transistor T0, and a source of the first transistor T1 is electrically connected with the connection node N0.

The compensation control circuit 13 includes a second transistor T2.

A gate of the second transistor T2 is electrically connected with the second scan line S2, a drain of the second transistor T2 is electrically connected with the connection node N0, and a source of the second transistor T2 is electrically connected with a drain of the drive transistor T0.

The first initialization circuit 14 includes a third transistor T3.

A gate of the third transistor T3 is electrically connected with the initialization control line R1, a drain of the third transistor T3 is electrically connected with a first initialization voltage line, and a source of the third transistor T3 is electrically connected with the connection node NO. The first initialization voltage line is used for providing a first initialization voltage Vi1.

The reset circuit 20 includes a fourth transistor T4.

A gate of the fourth transistor T4 is electrically connected with the third scan line S3, a drain of the fourth transistor T4 is electrically connected with a high voltage line, and a source of the fourth transistor T4 is electrically connected with a source of the drive transistor T0. The high voltage line is used for providing a high voltage signal VDD.

The light emitting control circuit includes a fifth transistor T5 and a sixth transistor T6.

A gate of the fifth transistor T5 is electrically connected with the light emitting control line E1, a drain of the fifth transistor T5 is electrically connected with a high voltage line, and a source of the fifth transistor T5 is electrically connected with the source of the drive transistor T0.

A gate of the sixth transistor T6 is electrically connected with the light emitting control line E1, a drain of the sixth transistor T6 is electrically connected with a drain of the drive transistor T0, and a source of the sixth transistor T6 is electrically connected with an anode of the organic light emitting diode O1.

The second initialization circuit 32 includes a seventh transistor T7.

A gate of the seventh transistor T7 is electrically connected with the fourth scan line S4, a drain of the seventh transistor T7 is electrically connected with the second initialization voltage line, and a source of the seventh transistor T7 is electrically connected with the anode of the organic light emitting diode O1. The second initialization voltage line is used for providing a second initialization voltage Vi2.

The data writing circuit 41 includes an eighth transistor T8 and the energy storage circuit 42 includes a storage capacitor C.

A gate of the eighth transistor T8 is electrically connected with the second scan line S2, a drain of the eighth transistor T8 is electrically connected with the data line D1, and a source of the eighth transistor T8 is electrically connected with the source of the drive transistor T0.

A first terminal of the storage capacitor C is electrically connected with the gate of the drive transistor T0, and a second terminal of the storage capacitor C is electrically connected with the high voltage line.

A cathode of O1 is electrically connected with a low voltage line, and the low voltage line is used for providing a low voltage VSS.

In FIG. 53, a first node is labeled N1, and the first node N1 is electrically connected with the gate of T0.

A second node is labeled N2, and a third node is labeled N3. N2 is electrically connected with the source of T0, and N3 is electrically connected with the drain of T0.

In at least one embodiment shown in FIG. 53, the first voltage line is a high voltage line and the second voltage line is a low voltage line.

In at least one embodiment of the pixel circuit shown in FIG. 53, T1 may be an oxide thin film transistor, T0, T2, T3, T4, T5, T6, T7, and T8 may all be low temperature poly silicon thin film transistors, T1 is an n-type transistor, T0, T2, T3, T4, T5, T6, T7, and T8 are p-type transistors, and T0 is a single-gate transistor, but it is not limited to this.

In at least one embodiment of the pixel circuit shown in FIG. 53, N1 is only directly electrically connected with T1 and N1 is not directly electrically connected with T2 or T3, so as to reduce leakage of N1 and stabilize stability of a potential of the gate of T0.

T1 is an oxide thin film transistor to reduce leakage of N1 and stabilize stability of the potential of the gate of T0.

The at least one embodiment of the pixel circuit shown in FIG. 53 of the present disclosure is different from the at least one embodiment of the pixel circuit shown in FIG. 50 of the present disclosure in that the reset voltage line DR is the high voltage line, and a quantity of signal lines used may be reduced.

In at least one embodiment of the pixel circuit shown in FIG. 53 of the present disclosure, a voltage value of VDD may be 4.6 V, the voltage value of VDD is greater than a voltage value of Vi1, and the voltage value of VDD is greater than a voltage value of Vi2.

In at least one embodiment of the pixel circuit shown in FIG. 53 of the present disclosure, T7 may also be replaced with an oxide thin film transistor, and T0 may also be replaced with a double-gate transistor, but it is not limited to this.

Figure 54:
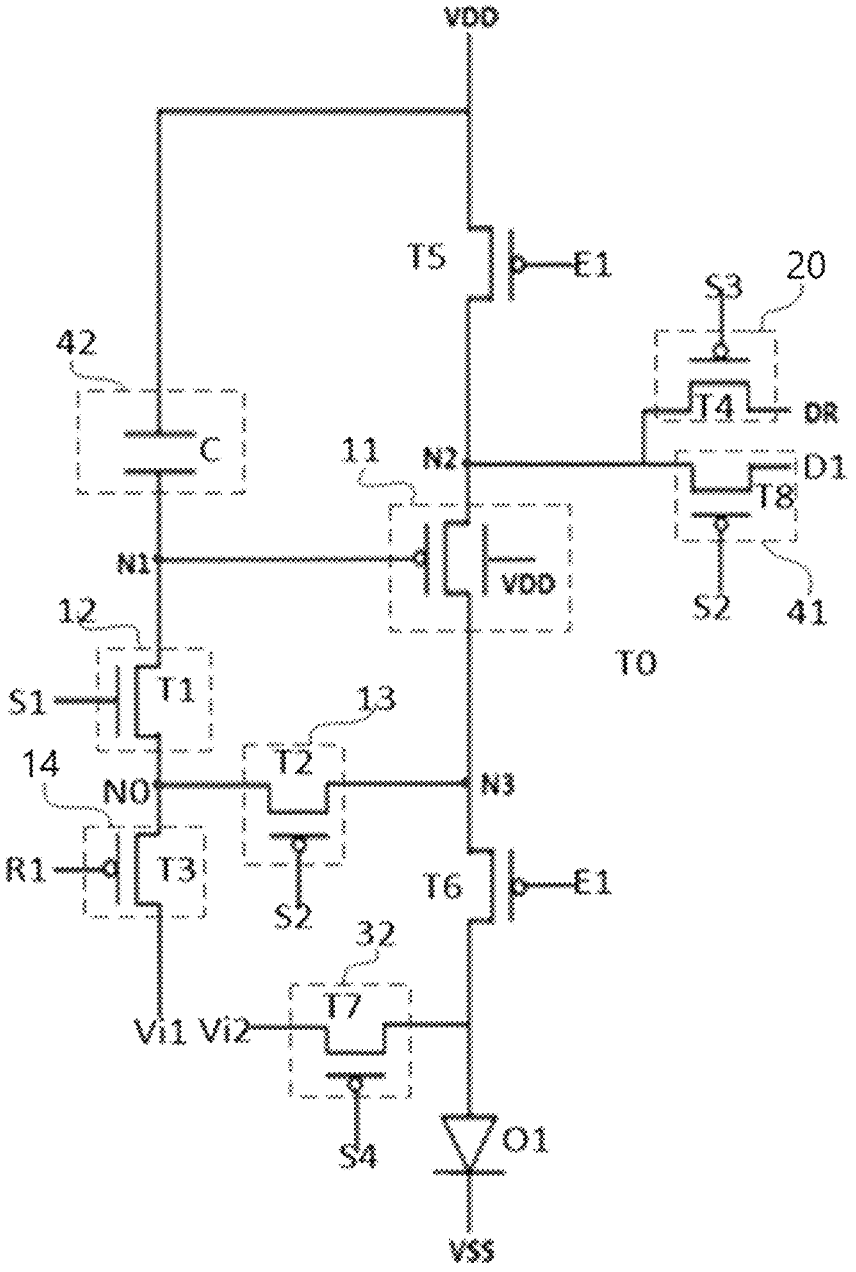
FIG. 54 is a circuit diagram of a pixel circuit according to at least yet another embodiment of the present disclosure.

As shown in FIG. 54, on a basis of at least one embodiment of the pixel circuit shown in FIG. 49, the first control circuit 12 includes a first transistor T1, the drive circuit 11 includes a drive transistor T0, and the light emitting element is an organic light emitting diode O1.

A gate of the first transistor T1 is electrically connected with the first scan line S1, a drain of the first transistor T1 is electrically connected with a first gate of the drive transistor T0, and a source of the first transistor T1 is electrically connected with the connection node N0.

The compensation control circuit 13 includes a second transistor T2.

A gate of the second transistor T2 is electrically connected with the second scan line S2, a drain of the second transistor T2 is electrically connected with the connection node N0, and a source of the second transistor T2 is electrically connected with a drain of the drive transistor T0.

The first initialization circuit 14 includes a third transistor T3.

A gate of the third transistor T3 is electrically connected with the initialization control line R1, a drain of the third transistor T3 is electrically connected with a first initialization voltage line, and a source of the third transistor T3 is electrically connected with the connection node NO. The first initialization voltage line is used for providing a first initialization voltage Vi1.

The reset circuit 20 includes a fourth transistor T4.

A gate of the fourth transistor T4 is electrically connected with the third scan line S3, a drain of the fourth transistor T4 is electrically connected with the reset voltage line DR, and a source of the fourth transistor T4 is electrically connected with a source of the drive transistor T0.

The light emitting control circuit includes a fifth transistor T5 and a sixth transistor T6.

A gate of the fifth transistor T5 is electrically connected with the light emitting control line E1, a drain of the fifth transistor T5 is electrically connected with a high voltage line, and a source of the fifth transistor T5 is electrically connected with the source of the drive transistor T0. The high voltage line is used for providing a high voltage signal VDD.

A gate of the sixth transistor T6 is electrically connected with the light emitting control line E1, a drain of the sixth transistor T6 is electrically connected with a drain of the drive transistor T0, and a source of the sixth transistor T6 is electrically connected with an anode of the organic light emitting diode O1.

The second initialization circuit 32 includes a seventh transistor T7.

A gate of the seventh transistor T7 is electrically connected with the fourth scan line S4, a drain of the seventh transistor T7 is electrically connected with the second initialization voltage line, and a source of the seventh transistor T7 is electrically connected with the anode of the organic light emitting diode O1. The second initialization voltage line is used for providing a second initialization voltage Vi2.

The data writing circuit 41 includes an eighth transistor T8 and the energy storage circuit 42 includes a storage capacitor C.

A gate of the eighth transistor T8 is electrically connected with the second scan line S2, a drain of the eighth transistor T8 is electrically connected with the data line D1, and a source of the eighth transistor T8 is electrically connected with the source of the drive transistor T0.

A first terminal of the storage capacitor C is electrically connected with the first gate of the drive transistor T0, and a second terminal of the storage capacitor C is electrically connected with the high voltage line.

A second gate of the drive transistor T0 is electrically connected with the high voltage line.

A cathode of O1 is electrically connected with a low voltage line, and the low voltage line is used for providing a low voltage VSS.

In FIG. 54, a first node is labeled N1, and the first node N1 is electrically connected with the gate of T0.

A second node is labeled N2, and a third node is labeled N3. N2 is electrically connected with the source of T0, and N3 is electrically connected with the drain of T0.

In at least one embodiment shown in FIG. 54, the first voltage line is a high voltage line and the second voltage line is a low voltage line.

In at least one embodiment of the pixel circuit shown in FIG. 54, T1 may be an oxide thin film transistor, T0, T2, T3, T4, T5, T6, T7, and T8 may all be low temperature poly silicon thin film transistors, T1 is an n-type transistor, T0, T2, T3, T4, T5, T6, T7, and T8 are p-type transistors, and T0 is a double-gate transistor, but it is not limited to this.

In at least one embodiment of the pixel circuit shown in FIG. 54, N1 is only directly electrically connected with T1 and N1 is not directly electrically connected with T2 or T3, so as to reduce leakage of N1 and stabilize stability of a potential of the gate of T0.

In at least one embodiment of the pixel circuit shown in FIG. 54, T1 is an oxide thin film transistor, which may reduce leakage and ensure stability of a potential of N1.

In at least one embodiment of the pixel circuit shown in FIG. 54, T0 is a double-gate transistor, the first gate of T0 is a top gate, the second gate of T0 is a bottom gate, and the second gate of T0 is electrically connected with the high voltage line to bias a substrate of T0, which is beneficial to improve a hysteresis phenomenon of T0.

The at least one embodiment of the pixel circuit shown in FIG. 54 of the present disclosure is different from the at least one embodiment of the pixel circuit shown in FIG. 50 of the present disclosure in that T0 is a double-gate transistor.

In at least one embodiment of the pixel circuit shown in FIG. 54 of the present disclosure, T7 may be replaced with an oxide thin film transistor and DR may be a first voltage line, but it is not limited to this.

In at least one embodiment of pixel circuits shown in FIG. 50, FIG. 52, FIG. 53, and FIG. 54 of the present disclosure, in a non-light emitting period (which may refer to a period included in the display cycle except a light emitting phase), before a data voltage Vdata is written into N2, turn-on time of T4 may be increased by increasing a duty ratio of a third scan signal, so that a reset effect of a potential of N2 is better.

Figure 55:
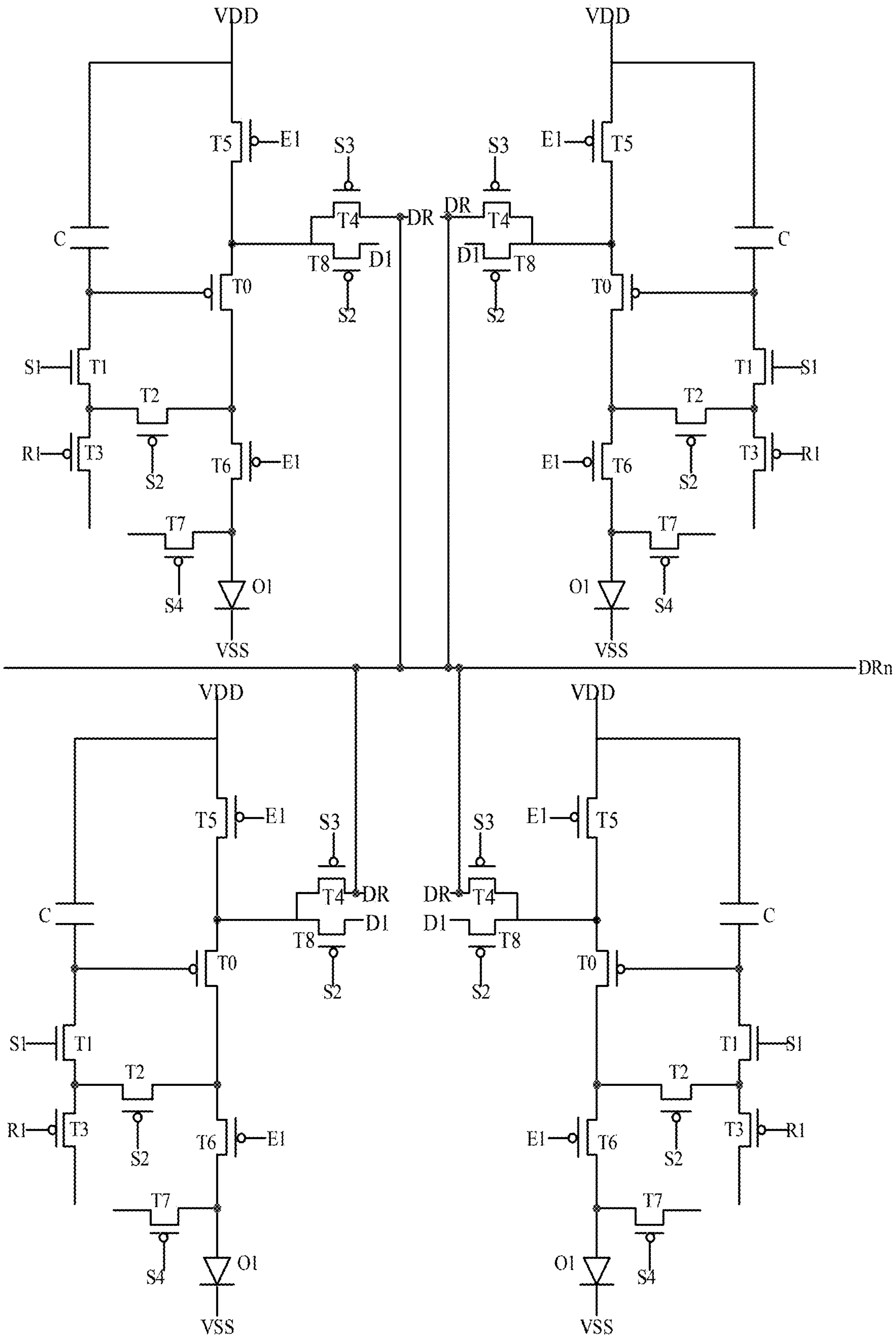
FIG. 55 is a schematic diagram of electrical connections between two adjacent rows of pixel circuits and a reset voltage line of a same row.

As shown in FIG. 55, two adjacent rows of pixel circuits may be electrically connected with a reset voltage line of a same row. In FIG. 55, a reset voltage line of an n-th row is labeled DRn (n is a positive integer). And two pixel circuits located in adjacent columns are mirrored to facilitate wiring.

Figure 56:
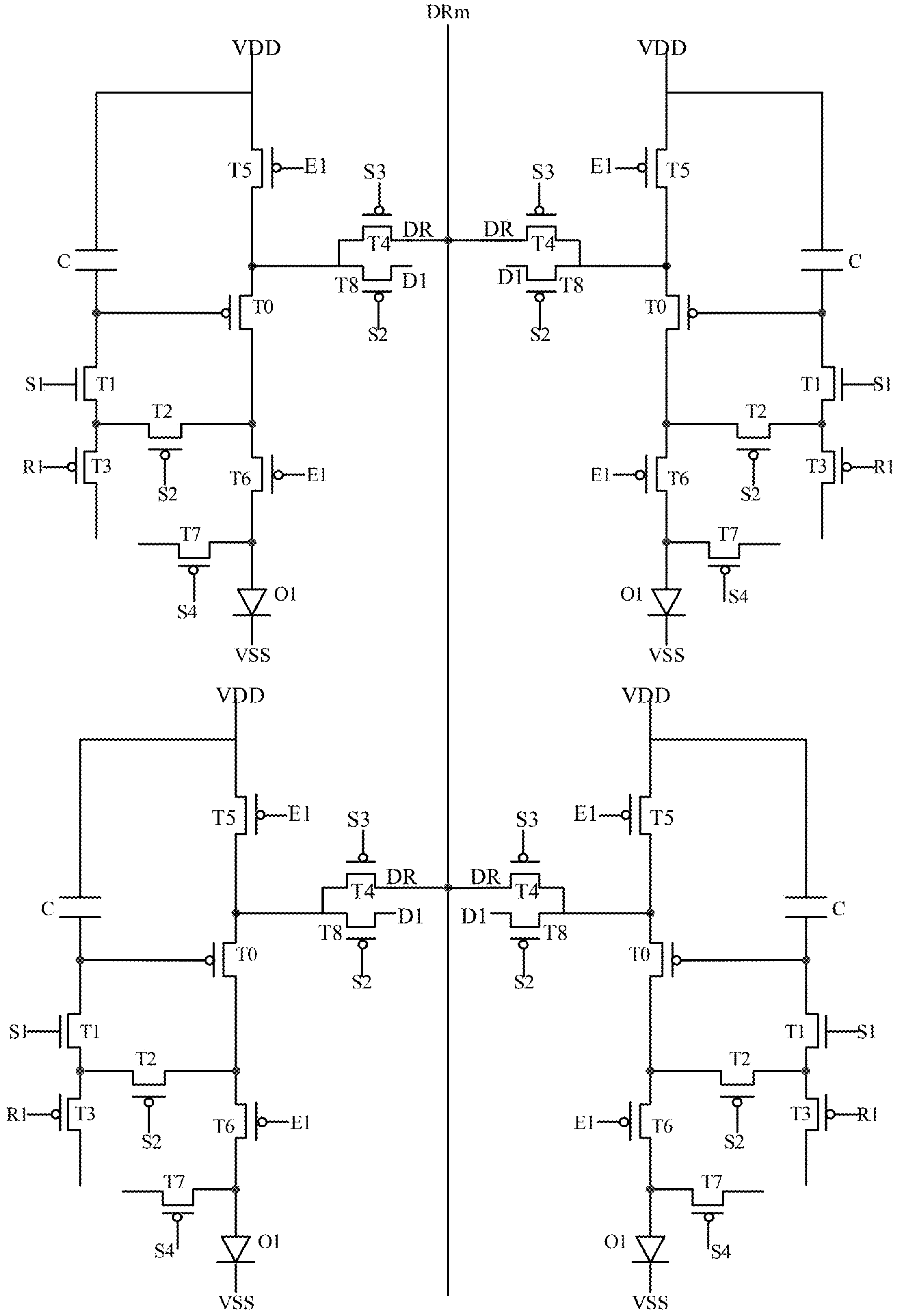
FIG. 56 is a schematic diagram of electrical connections between two adjacent columns of pixel circuits and a reset voltage line of a same column.

As shown in FIG. 56, two adjacent columns of pixel circuits may be electrically connected with a reset voltage line of a same column. In FIG. 56, a reset voltage line of an m-th column is labeled DRm (m is a positive integer). And two pixel circuits located in adjacent columns are mirrored to facilitate wiring.

Figure 57:
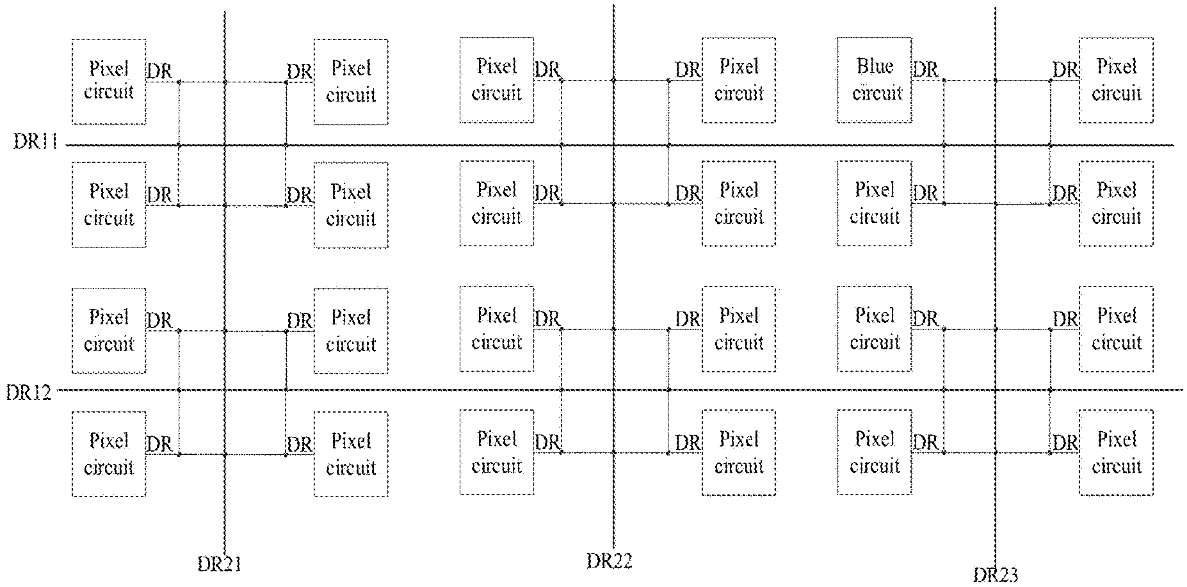
FIG. 57 is a schematic diagram of sharing reset voltage lines by adjacent rows of pixel circuits and adjacent columns of pixel circuits.

As shown in FIG. 57, two adjacent rows of pixel circuits may be electrically connected with a reset voltage line of a same row, and two adjacent columns of pixel circuits may be electrically connected with a reset voltage line of a same column, and two pixel circuits located in adjacent columns are mirrored, and multiple reset voltage lines are disposed in a grid to facilitate wiring.

In FIG. 57, a reset voltage line of a first row is labeled DR11, a reset voltage line of a second row is labeled DR12, a reset voltage line of a first column is labeled DR21, a reset voltage line of a second column is labeled DR22, and a reset voltage line of a third column is labeled DR23.

Figure 58:
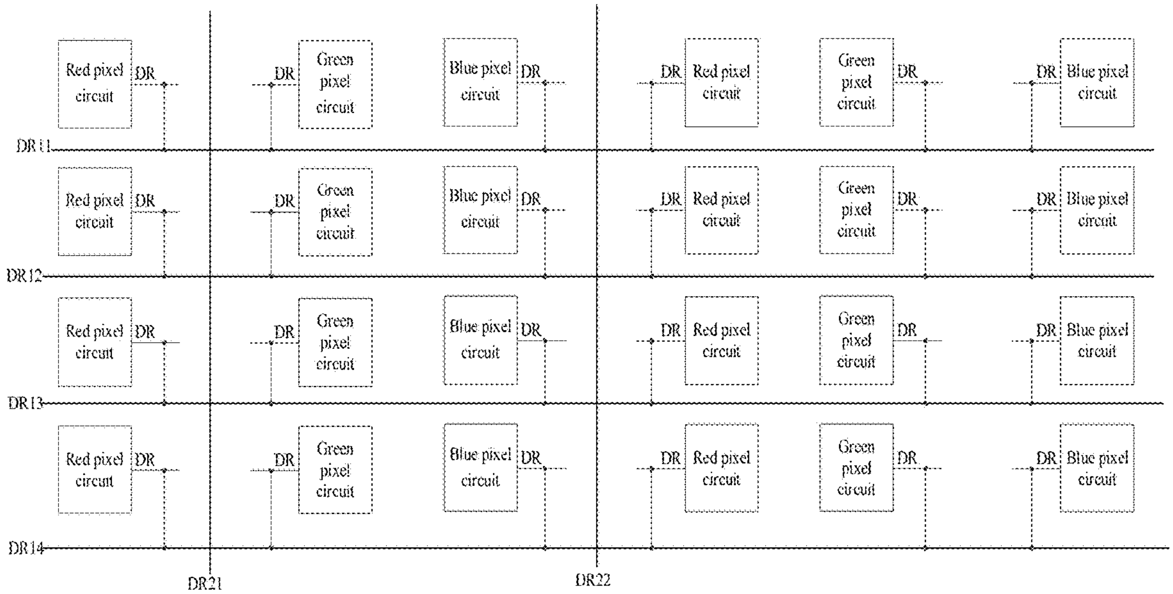
FIG. 58 is a schematic diagram of a connection relationship and a positional relationship between reset voltage lines arranged in a grid and multiple pixel circuits.

In FIG. 58, a reset voltage line of a first row is labeled DR11, a reset voltage line of a second row is labeled DR12, a reset voltage line of a third row is labeled DR13, a reset voltage line of a fourth row is labeled DR14, a reset voltage line of a first column is labeled DR21, and a reset voltage line of a second column is labeled DR22.

As shown in FIG. 58, pixel circuits located in the first row are all electrically connected with the reset voltage line of the first row DR11, pixel circuits located in the second row are electrically connected with the reset voltage line of the second row DR12, pixel circuits located in the third row are all electrically connected with the reset voltage line of the third row DR13, and pixel circuits located in the fourth row are electrically connected with the reset voltage line of the fourth row DR14.

Reset voltage lines vertically extending are disposed, so that multiple reset voltage lines are disposed in a grid. And a column of reset voltage lines may be disposed every few columns of pixel circuits to save wiring space.

In specific implementation, reset voltage lines vertically extending may be disposed on a side of a column of red pixel circuits.

The drive method described in the embodiment of the present disclosure is applied to the above pixel circuit, and a display cycle includes an initialization phase and a data writing phase. The drive method includes following contents.

In the initialization phase, a first control circuit controls communication between a control terminal of a drive circuit and a connection node under control of a first scan signal, and a first initialization circuit writes a first initialization voltage into the connection node under control of an initialization control signal, thereby the first initialization voltage is written into the control terminal of the drive circuit, so that the drive circuit may control communication between a first terminal of the drive circuit and a second terminal of the drive circuit at beginning of the data writing phase.

In the data writing phase, the first control circuit controls communication between the control terminal of the drive circuit and the connection node under control of the first scan signal, and a compensation control circuit controls communication between the connection node and the first terminal of the drive circuit under control of a second scan signal, so that the control terminal of the drive circuit communicates with the first terminal of the drive circuit.

In the drive method described in the embodiment of the present disclosure, the first control circuit controls communication between the control terminal of the drive circuit and the connection node, the first initialization circuit writes the first initialization voltage into the connection node under control of the initialization control signal, the compensation control circuit controls communication between the connection node and the first terminal of the drive circuit under control of the second scan signal. The first control circuit is directly electrically connected with the control terminal of the drive circuit, the first initialization circuit and the compensation control circuit are not directly electrically connected with the control terminal of the drive circuit, so as to reduce a leakage path of a first node (a node electrically connected with the control terminal of the drive circuit), to ensure stability of a voltage of the first node when working at a low frequency, which is beneficial to improve display quality, improve display uniformity, and reduce flicker.

In specific implementation, the pixel circuit may further include a reset circuit. The drive method further includes: in the initialization phase, the reset circuit writes a reset voltage into the second terminal of the drive circuit under control of a third scan signal.

Optionally, the pixel circuit may further include a light emitting element and a second initialization circuit. The drive method further includes: the second initialization circuit writes a second initialization voltage into a first electrode of the light emitting element under control of a fourth scan signal to control the light emitting element not to emit light.

In specific implementation, the pixel circuit further includes a light emitting control circuit, a data writing circuit, and an energy storage circuit, a display cycle includes a light emitting phase set after a data writing phase, and the drive method further includes following contents.

In the data writing phase, the data writing circuit writes a data voltage Vdata on a data line into a second terminal of a drive circuit under control of a second scan signal.

At beginning of the data writing phase, the drive circuit controls communication between a first terminal of the drive circuit and a second terminal of the drive circuit to charge the energy storage circuit through the data voltage Vdata, and changes a potential of a control terminal of the drive circuit until the potential of the control terminal of the drive circuit becomes Vdata+Vth, wherein Vth is a threshold voltage of a drive transistor included in the drive circuit.

In the light emitting phase, a light emitting control circuit controls communication between a first voltage line and the second terminal of the drive circuit under control of a light emitting control signal, and controls communication between the first terminal of the drive circuit and a first electrode of a light emitting element, and the drive circuit drives the light emitting element to emit light.

The display apparatus described in the embodiment of the present disclosure includes the above pixel circuit.

Optionally, the pixel circuit includes a reset circuit electrically connected with a third scan line, and a second initialization circuit electrically connected with the fourth scan line. The display apparatus further includes a third scan signal generation module and a fourth scan signal generation module.

The third scan signal generation module is electrically connected with the third scan line, and is configured to provide a third scan signal to the third scan line.

The fourth scan signal generation module is electrically connected with the fourth scan line, and is configured to provide a fourth scan signal to the fourth scan line.

In at least one embodiment of the present disclosure, the third scan signal and the fourth scan signal may be a same scan signal, and the third scan signal generation module and the fourth scan signal generation module may be a same module.

Figure 59:
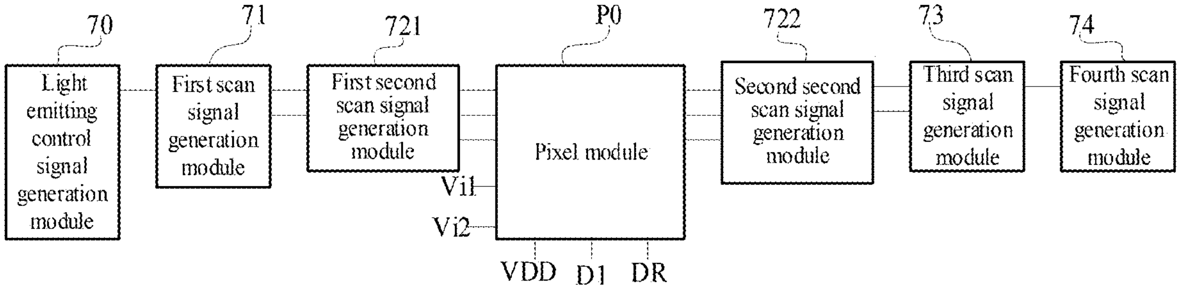
FIG. 59 is a diagram of a structure of a display apparatus according to at least one embodiment of the present disclosure.

As shown in FIG. 59, the display apparatus described in at least one embodiment of the present disclosure includes a display panel, the display panel includes a pixel module P0, and the pixel module P0 includes multiple rows and multiple columns of the above pixel circuits.

The pixel module P0 is disposed in a valid display region of the display panel.

The display panel further includes a light emitting control signal generation module 70, a first scan signal generation module 71, a first second scan signal generation module 721, a second second scan signal generation module 722, a third scan signal generation module 73, and a fourth scan signal generation module 74.

The light emitting control signal generation module 70 is configured to provide a light emitting control signal, the first scan signal generation module 71 is configured to provide a first scan signal, the first second scan signal generation module 721 and the second second scan signal generation module 722 are configured to provide a second scan signal, the third scan signal generation module 73 is configured to provide a third scan signal, and the fourth scan signal generation module 74 is configured to provide a fourth scan signal.

The light emitting control signal generation module 70, the first scan signal generation module 71, and the first second scan signal generation module 721 are disposed on a left side of the display panel.

The second second scan signal generation module 722, the third scan signal generation module 73, and the fourth scan signal generation module 74 are disposed on a right side of the display panel.

Figure 60:
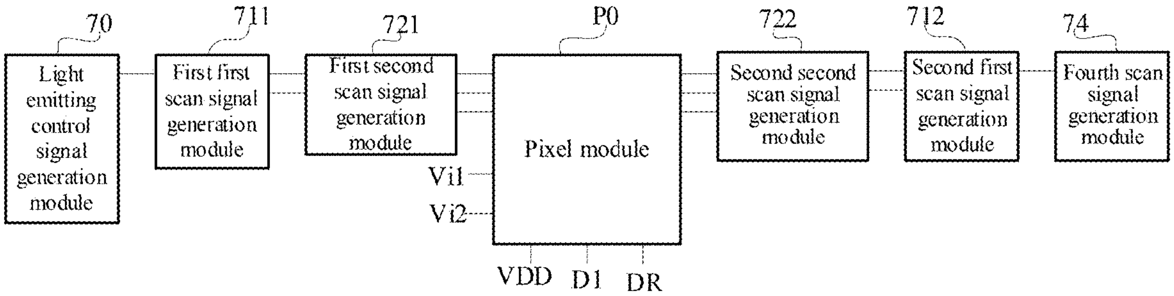
FIG. 60 is a diagram of a structure of a display apparatus according to at least another embodiment of the present disclosure.

As shown in FIG. 60, the display apparatus described in at least one embodiment of the present disclosure includes a display panel, the display panel includes a pixel module P0, and the pixel module P0 includes multiple rows and multiple columns of the above pixel circuits. The pixel module P0 is disposed in a valid display region of the display panel.

The display panel further includes a light emitting control signal generation module 70, a first first scan signal generation module 711, a second first scan signal generation module 712, a first second scan signal generation module 721, a second second scan signal generation module 722, and a fourth scan signal generation module 74.

The light emitting control signal generation module 70 is configured to provide a light emitting control signal, the first scan signal generation module 711, and the second first scan signal generation module 712 are configured to provide a first scan signal, and the first second scan signal generation module 721 and the second second scan signal generation module 722 are configured to provide a second scan signal.

The third scan signal and the fourth scan signal are a same scan signal.

The fourth scan signal generation module 74 is configured to provide a third scan signal and a fourth scan signal.

The light emitting control signal generation module 70, the first first scan signal generation module 711, and the first second scan signal generation module 721 are disposed on a left side of the display panel.

The second first scan signal generation module 712, the second second scan signal generation module 722, and the fourth scan signal generation module 74 are disposed on a right side of the display panel.

In FIG. 55 and FIG. 56, a first initialization voltage is labeled Vi1, a second initialization voltage is labeled Vi2, a high voltage signal is labeled VDD, a data line is labeled D1, and a reset voltage line is labeled DR.

The display apparatus according to the embodiment of the present disclosure may be a mobile phone, a tablet computer, a television, a display, a notebook computer, a digital photo frame, a navigator, or any product or component with a display function.

As shown in FIG. 61 to FIG. 78, which are explanatory drawings of another group of exemplary embodiments of the pixel drive circuit of the present disclosure.

Transistors used in all embodiments of the present disclosure may be triodes, thin film transistors, field effect transistors, or other devices with same characteristics. In an embodiment of the present disclosure, in order to distinguish two electrodes of a transistor except a control electrode, one electrode of the two electrodes is called a first electrode, and the other electrode is called a second electrode.

In an actual operation, when the transistor is a thin film transistor or a field effect transistor, the first electrode may be a drain and the second electrode may be a source. Or, the first electrode may be a source and the second electrode may be a drain.

The pixel circuit described in the embodiment of the present disclosure includes a drive circuit, a first initialization circuit, and a reset circuit.

The first initialization circuit is electrically connected with an initialization control line, a first terminal of the drive circuit, and a first initialization voltage terminal respectively, and is configured to write a first initialization voltage provided by the first initialization voltage terminal into the first terminal of the drive circuit under control of an initialization control signal provided by the initialization control line.

The reset circuit is electrically connected with a second scan line and a reset voltage terminal respectively, the reset circuit is also electrically connected with a second terminal of the drive circuit or the first terminal of the drive circuit, and is configured to control to write a reset voltage provided by the reset voltage terminal into the second terminal of the drive circuit or the first terminal of the drive circuit under control of a second scan signal provided by the second scan line.

The drive circuit is configured to control communication between the first terminal of the drive circuit and the second terminal of the drive circuit under control of a potential of a control terminal of the drive circuit.

The pixel circuit according to at least one embodiment of the present disclosure includes the first initialization circuit and the reset circuit, the first initialization circuit writes the first initialization voltage into the first terminal of the drive circuit before a data voltage is written into the second terminal of the drive circuit so as to write the first initialization voltage into the control terminal of the drive circuit in cooperation with a compensation control circuit included in the pixel circuit. The reset circuit writes the reset voltage into the second terminal of the drive circuit or the first terminal of the drive circuit under control of the second scan signal, in a non-light emitting period before the data voltage is written into the second terminal of the drive circuit, to provide a bias voltage to a drive transistor in the drive circuit (at this time a potential of a gate of the drive transistor is also initialized to Vi1), so that the drive transistor remains in a reset state, so as to improve hysteresis of the drive transistor and facilitate First Frame Response time (FFR) of a display screen.

In specific implementation, hysteresis of the drive transistor will cause a characteristic response of the drive transistor to be slow, and in at least one embodiment of the present disclosure, a gate-source voltage of the drive transistor is quickly reset before the data voltage is written, which is beneficial to speed up a recovery speed of the drive transistor, thereby improving a hysteresis phenomenon of the drive transistor and improving a hysteresis recovery speed.

In at least one embodiment of the present disclosure, the second scan signal may be provided to the second scan line through a separate second scan signal generation module to facilitate reset of a potential of the second terminal of the drive circuit.

In at least one embodiment of the present disclosure, the reset voltage is a constant voltage to provide a fixed bias voltage for the drive transistor to improve a hysteresis phenomenon.

Optionally, the first initialization voltage is a low potential constant voltage, and a voltage value of the first initialization voltage is greater than or equal to −6 V and less than or equal to −2 V. For example, the voltage value of the first initialization voltage may be −6 V, −5 V, −4 V, −3 V, or −2 V, but it is not limited to this.

In specific implementation, the reset voltage may be a high potential constant voltage to ensure that the drive transistor in the drive circuit can be quickly turned on at beginning of the data writing phase; a voltage value of the reset voltage is greater than or equal to 4 V and less than or equal to 10 V; or, the reset voltage may be a low potential constant voltage, a voltage value of the reset voltage is greater than or equal to −6 V and less than or equal to −2 V.

Optionally, when the reset voltage is a high potential constant voltage, a voltage value of the reset voltage may be, for example, 4 V, 5 V, 6 V, 7 V, 8 V, 9 V, or 10 V, but it is not limited to this.

When the reset voltage is a low potential constant voltage, a voltage value of the reset voltage may be, for example, −6 V, −5 V, −4 V, −3 V, or −2 V, but it is not limited to this.

In at least one embodiment of the present disclosure, when the reset voltage is a low potential constant voltage, a voltage value of the reset voltage is substantially the same as a voltage value of the first initialization voltage, so that when the first initialization voltage is written into the first terminal of the drive circuit through the first initialization circuit meanwhile the reset voltage is written into the second terminal of the drive circuit through the reset circuit, the drive transistor in the drive circuit does not fail.

The voltage value of the reset voltage is substantially the same as the voltage value of the first initialization voltage, which may mean that an absolute value of a difference value between the voltage value of the reset voltage and the voltage value of the first initialization voltage is less than a predetermined voltage difference value. For example, the predetermined voltage difference value may be 0.1 V or 0.05 V, but it is not limited to this.

In at least one embodiment of the present disclosure, the threshold voltage Vth of the drive transistor in the drive circuit may be greater than or equal to −5 V and less than or equal to −2 V, and preferably, Vth may be greater than or equal to −4 V and less than or equal to −2.5 V. For example, Vth may be −4 V, −3.5 V, −3 V, or −2.5 V, but it is not limited to this.

Optionally, the drive circuit includes a drive transistor, and an absolute value of the voltage value of the reset voltage is greater than 1.5 times of an absolute value of a threshold voltage, so as to ensure that a bias effect can be quickly achieved in a short time. The threshold voltage is a threshold voltage of the drive transistor. For example, the absolute value of the voltage value of the reset voltage may be greater than 2 times, 2.5 times, or 3 times of the absolute value of the threshold voltage, but it is not limited to this.

Figure 61:
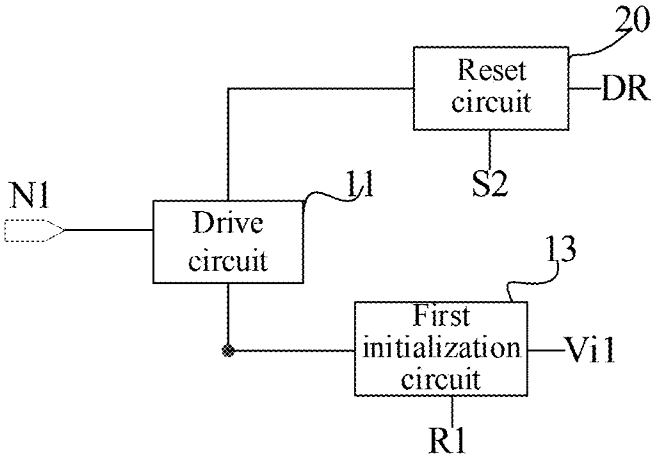
FIG. 61 is a diagram of a structure of a pixel circuit according to at least yet another embodiment of the present disclosure.

As shown in FIG. 61, a pixel circuit described in an embodiment of the present disclosure includes a drive circuit 11, a first initialization circuit 13, and a reset circuit 20.

The first initialization circuit 13 is electrically connected with an initialization control line R1, a first terminal of the drive circuit 11, and a first initialization voltage terminal respectively, and is configured to write a first initialization voltage Vi1 provided by the first initialization voltage terminal into the first terminal of the drive circuit 11 under control of an initialization control signal provided by the initialization control line R1.

The reset circuit 20 is electrically connected with a second scan line S2 and a reset voltage terminal DR respectively, and is also electrically connected with a second terminal of the drive circuit 11, and is configured to control a reset voltage provided by the reset voltage terminal DR to be written into the second terminal of the drive circuit 12 under control of a second scan signal provided by the second scan line S2.

The drive circuit 11 is configured to control communication between the first terminal of the drive circuit 11 and the second terminal of the drive circuit 12 under control of a potential of a control terminal of the drive circuit 11.

In FIG. 61, a first node is labeled N1, and the first node is electrically connected with the control terminal of the drive circuit 11.

When the pixel circuit according to at least one embodiment of the present disclosure as shown in FIG. 61 is working, a display cycle may include an initialization phase and a reset phase.

In the initialization phase, the first initialization circuit 13 writes the first initialization voltage Vi1 into the first terminal of the drive circuit 11 under control of the initialization control signal.

In the reset phase, the reset circuit 20 writes the reset voltage into the second terminal of the drive circuit 11 under control of the second scan signal.

Figure 62:
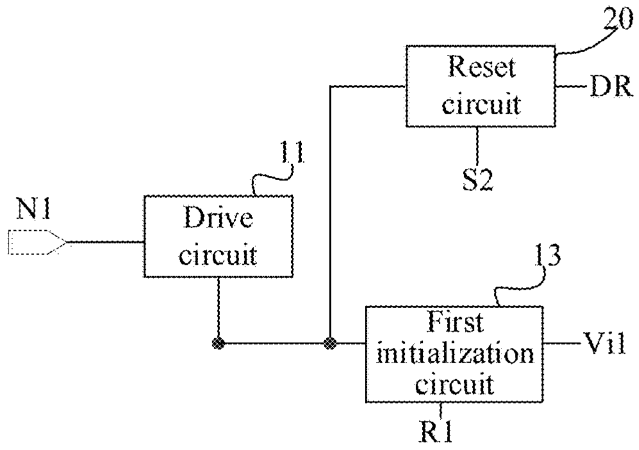
FIG. 62 is a diagram of a structure of a pixel circuit according to at least yet another embodiment of the present disclosure.

As shown in FIG. 62, a pixel circuit described in at least one embodiment of the present disclosure may include a drive circuit 11, a first initialization circuit 13, and a reset circuit 20.

The first initialization circuit 13 is electrically connected with an initialization control line R1, a first terminal of the drive circuit 11, and a first initialization voltage terminal respectively, and is configured to write a first initialization voltage Vi1 provided by the first initialization voltage terminal into the first terminal of the drive circuit 11 under control of an initialization control signal provided by the initialization control line R1.

The reset circuit 20 is electrically connected with a second scan line S2 and a reset voltage terminal DR respectively, the reset circuit 20 is also electrically connected with the first terminal of the drive circuit 11, and is configured to control to write a reset voltage provided by the reset voltage terminal DR into the first terminal of the drive circuit 11 under control of a second scan signal provided by the second scan line S2.

When the pixel circuit according to at least one embodiment of the present disclosure as shown in FIG. 62 is working, a display cycle may include an initialization phase and a reset phase.

In the initialization phase, the first initialization circuit 13 writes the first initialization voltage Vi1 into the first terminal of the drive circuit 11 under control of the initialization control signal.

In the reset phase, the reset circuit 20 writes the reset voltage into the first terminal of the drive circuit 11 under control of the second scan signal.

Optionally, the first initialization circuit includes a second transistor.

A control electrode of the second transistor is electrically connected with the initialization control line, a first electrode of the second transistor is electrically connected with the first initialization voltage terminal, and a second electrode of the second transistor is electrically connected with the first terminal of the drive circuit.

In at least one embodiment of the present disclosure, the second transistor may be a low temperature poly silicon thin film transistor, but it is not limited to this.

Optionally, the reset circuit includes a third transistor.

A control electrode of the third transistor is electrically connected with the second scan line, a first electrode of the third transistor is electrically connected with the reset voltage terminal, and a second electrode of the third transistor is electrically connected with a second terminal of the drive circuit or the first terminal of the drive circuit.

In at least one embodiment of the present disclosure, the pixel circuit may include a compensation control circuit.

The compensation control circuit is electrically connected with a first scan line, a control terminal of the drive circuit, and a first terminal of the drive circuit respectively, and is configured to control communication between the control terminal of the drive circuit and the first terminal of the drive circuit under control of a first scan signal provided by the first scan line.

When the pixel circuit described in at least one embodiment of the present disclosure is working, the display cycle may include the initialization phase. In the initialization phase, the first initialization circuit writes the first initialization voltage into the first terminal of the drive circuit under control of the initialization control signal, and the compensation control circuit controls communication between the control terminal of the drive circuit and the first terminal of the drive circuit under control of the first scan signal, to write the first initialization voltage into the control terminal of the drive circuit, so that at beginning of the data writing phase, the drive circuit can control communication between the first terminal of the drive circuit and the second terminal of the drive transistor under control of a potential of the control terminal of the drive circuit.

In the pixel circuit described in at least one embodiment of the present disclosure, the control terminal of the drive circuit is only directly electrically connected with the compensation control circuit, the first initialization circuit is directly electrically connected with the first terminal of the drive circuit, so as to initialize the potential of the control terminal of the drive circuit through the compensation control circuit and the first initialization circuit and to reduce a leakage path of the control terminal of the drive circuit. Under a condition that design complexity of the pixel circuit is not obviously increased, stability of a voltage of a first node may be ensured, which is beneficial to improve display quality, improve display uniformity, and reduce flicker.

Optionally, the compensation control circuit includes a first transistor.

A control electrode of the first transistor is electrically connected with the first scan line, a first electrode of the first transistor is electrically connected with the control terminal of the drive circuit, and a second electrode of the first transistor is electrically connected with the first terminal of the drive circuit.

The first transistor is an oxide thin film transistor.

In the embodiment of the present disclosure, the compensation control circuit may include a first transistor which is an oxide thin film transistor. An oxide transistor has good hysteresis characteristics, a low leakage current, and a relatively low mobility. Therefore, according to at least one embodiment of the present disclosure, the first transistor is set as the oxide thin film transistor to achieve a low leakage current and ensure stability of the potential of the control terminal of the drive circuit.

Figure 63:
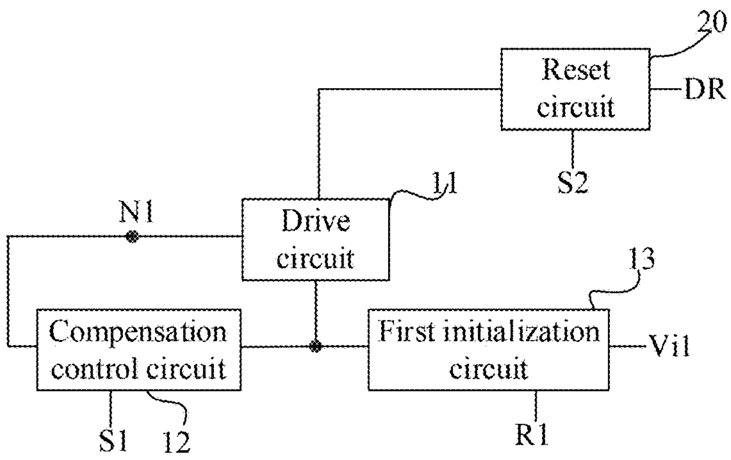
FIG. 63 is a diagram of a structure of a pixel circuit according to at least yet another embodiment of the present disclosure.

As shown in FIG. 63, based on at least one embodiment of the pixel circuit shown in FIG. 61, the pixel circuit described in at least one embodiment of the present disclosure may further include a compensation control circuit 12.

The compensation control circuit 12 is electrically connected with a first scan line S1, a control terminal of the drive circuit 11, and a first terminal of the drive circuit 11 respectively, and is configured to control communication between the control terminal of the drive circuit 11 and the first terminal of the drive circuit 11 under control of a first scan signal provided by the first scan line S1.

When the pixel circuit according to at least one embodiment of the present disclosure as shown in FIG. 63 is working, a display cycle may include an initialization phase in which the compensation control circuit 12 controls communication between the control terminal of the drive circuit 11 and the first terminal of the drive circuit 11 under control of the first scan signal.

Figure 64:
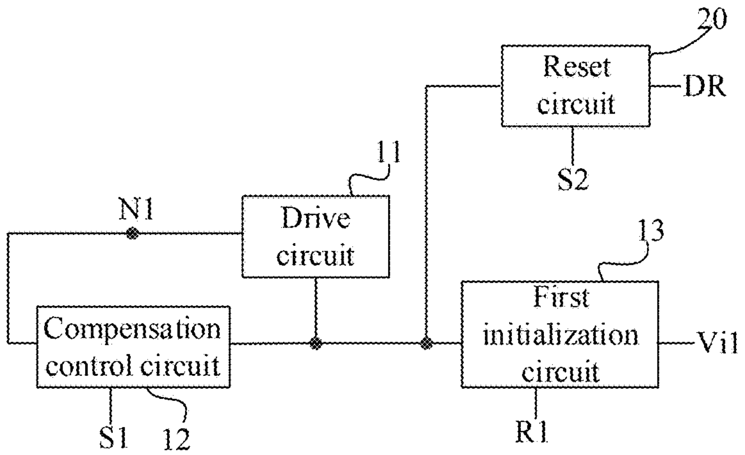
FIG. 64 is a diagram of a structure of a pixel circuit according to at least yet another embodiment of the present disclosure.

As shown in FIG. 64, based on at least one embodiment of the pixel circuit shown in FIG. 62, the pixel circuit described in at least one embodiment of the present disclosure may further include a compensation control circuit 12.

The compensation control circuit 12 is electrically connected with a first scan line S1, a control terminal of the drive circuit 11 and a first terminal of the drive circuit 11 respectively, and is configured to control communication between the control terminal of the drive circuit 11 and the first terminal of the drive circuit 11 under control of a first scan signal provided by the first scan line S1.

When the pixel circuit according to at least one embodiment of the present disclosure as shown in FIG. 64 is working, a display cycle may include an initialization phase, in initialization phase, the compensation control circuit 12 controls communication between the control terminal of the drive circuit 11 and the first terminal of the drive circuit 11 under control of the first scan signal.

In at least one embodiment of the present disclosure, the pixel circuit may further include a light emitting element, an energy storage circuit, a second initialization circuit, a data writing circuit, and a light emitting control circuit.

The energy storage circuit is electrically connected with the control terminal of the drive circuit, and is configured to store electrical energy.

The second initialization circuit is electrically connected with a third scan line, a second initialization voltage terminal, and a first electrode of the light emitting element respectively, and is configured to write a second initialization voltage provided by the second initialization voltage terminal into the first electrode of the light emitting element under control of a third scan signal provided by the third scan line.

The data writing circuit is electrically connected with a fourth scan line, a data line, and the second terminal of the drive circuit respectively, and is configured to write a data voltage provided by the data line into the second terminal of the drive circuit under control of a fourth scan signal provided by the fourth scan line.

The light emitting control circuit is electrically connected with a light emitting control line, a first voltage terminal, the second terminal of the drive circuit, the first terminal of the drive circuit, and the first electrode of the light emitting element respectively, and is configured to control communication between the first voltage terminal and the second terminal of the drive circuit and control communication between the first terminal of the drive circuit and the first electrode of the light emitting element under control of a light emitting control signal provided by the light emitting control line.

A second electrode of the light emitting element is electrically connected with a second voltage terminal.

In at least one embodiment of the present disclosure, the pixel circuit may further include a light emitting element, an energy storage circuit, a second initialization circuit, a data writing circuit, and a light emitting control circuit. The second initialization circuit initializes a first electrode of the light emitting element, the data writing circuit writes a data voltage into a second terminal of a drive circuit, and the light emitting control circuit controls communication between a first voltage terminal and the second terminal of the drive circuit and controls communication between a first terminal of the drive circuit and the first electrode of the light emitting element under control of a light emitting control signal.

Optionally, the light emitting element may be an organic light emitting diode, the first electrode of the light emitting element may be an anode of the organic light emitting diode, and a second electrode of the light emitting element may be a cathode of the organic light emitting diode.

The first voltage terminal may be a high voltage terminal and the second voltage terminal may be a low voltage terminal; but it is not limited to this.

Figure 65:
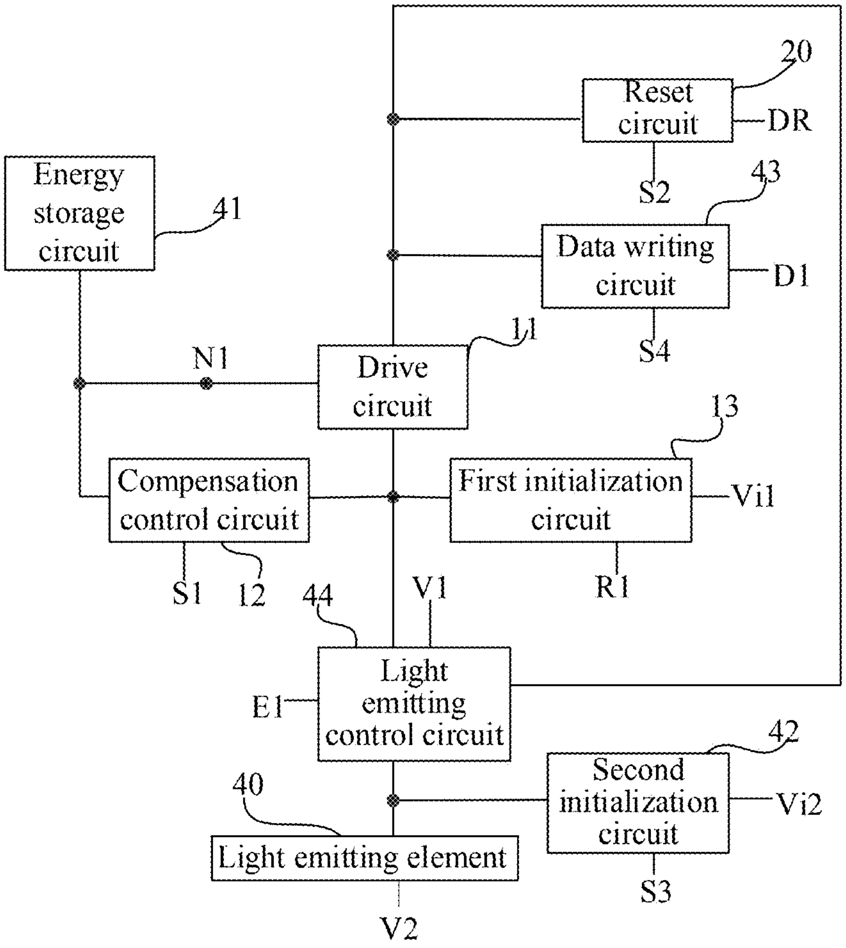
FIG. 65 is a diagram of a structure of a pixel circuit according to at least yet another embodiment of the present disclosure.

As shown in FIG. 65, on a basis of at least one embodiment of the pixel circuit shown in FIG. 63, the pixel circuit described in at least one embodiment of the present disclosure may further include a light emitting element 40, an energy storage circuit 41, a second initialization circuit 42, a data writing circuit 43, and a light emitting control circuit 44.

The energy storage circuit 41 is electrically connected with the control terminal of the drive circuit 11, and is configured to store electrical energy.

The second initialization circuit 42 is electrically connected with a third scan line S3, a second initialization voltage terminal, and a first electrode of the light emitting element 40 respectively, and is configured to write a second initialization voltage Vi2 provided by the second initialization voltage terminal into the first electrode of the light emitting element 40 under control of a third scan signal provided by the third scan line S3.

The data writing circuit 43 is electrically connected with a fourth scan line S4, a data line D1, and the second terminal of the drive circuit 11 respectively, and is configured to write a data voltage provided by the data line D1 into the second terminal of the drive circuit 11 under control of a fourth scan signal provided by the fourth scan line S4.

The light emitting control circuit 44 is electrically connected with a light emitting control line E1, a first voltage terminal V1, the second terminal of the drive circuit 11, the first terminal of the drive circuit 11, and the first electrode of the light emitting element 40 respectively, and is configured to control communication between the first voltage terminal V1 and the second terminal of the drive circuit 11 and control communication between the first terminal of the drive circuit 11 and the first electrode of the light emitting element 40 under control of a light emitting control signal provided by the light emitting control line E1.

A second electrode of the light emitting element is electrically connected with a second voltage terminal V2.

When the pixel circuit according to at least one embodiment of the present disclosure shown in FIG. 65 is working, the display cycle further includes a data writing phase and a light emitting phase set after the initialization phase.

In the data writing phase, the data writing circuit 43 writes a data voltage Vdata provided by the data line D1 into the second terminal of the drive circuit 11 under control of a fourth scan signal. The compensation control circuit 12 controls communication between the control terminal of the drive circuit 11 and the first terminal of the drive circuit 11 under control of a first scan signal.

At beginning of the data writing phase, the drive circuit 11 turns on a connection between the first terminal of the drive circuit 11 and the second terminal of the drive circuit 11 under control of the control terminal of the drive circuit 11, to charge the energy storage circuit 41 through the data voltage Vdata, thereby changing a potential of the control terminal of the drive circuit 11 until the potential of the control terminal of the drive circuit 11 becomes Vdata+Vth, wherein Vth is a threshold voltage of a drive transistor included in the drive circuit 11.

In the light emitting phase, the light emitting control circuit 44 controls communication between the first voltage terminal V1 and the second terminal of the drive circuit 11 and controls communication between the first terminal of the drive circuit 11 and the first electrode of the light emitting element 40 under control of a light emitting control signal, and the drive circuit 11 drives the light emitting element 40 to emit light.

In specific implementation, the reset phase may be set between the initialization phase and the data writing phase, but it is not limited to this.

Figure 66:
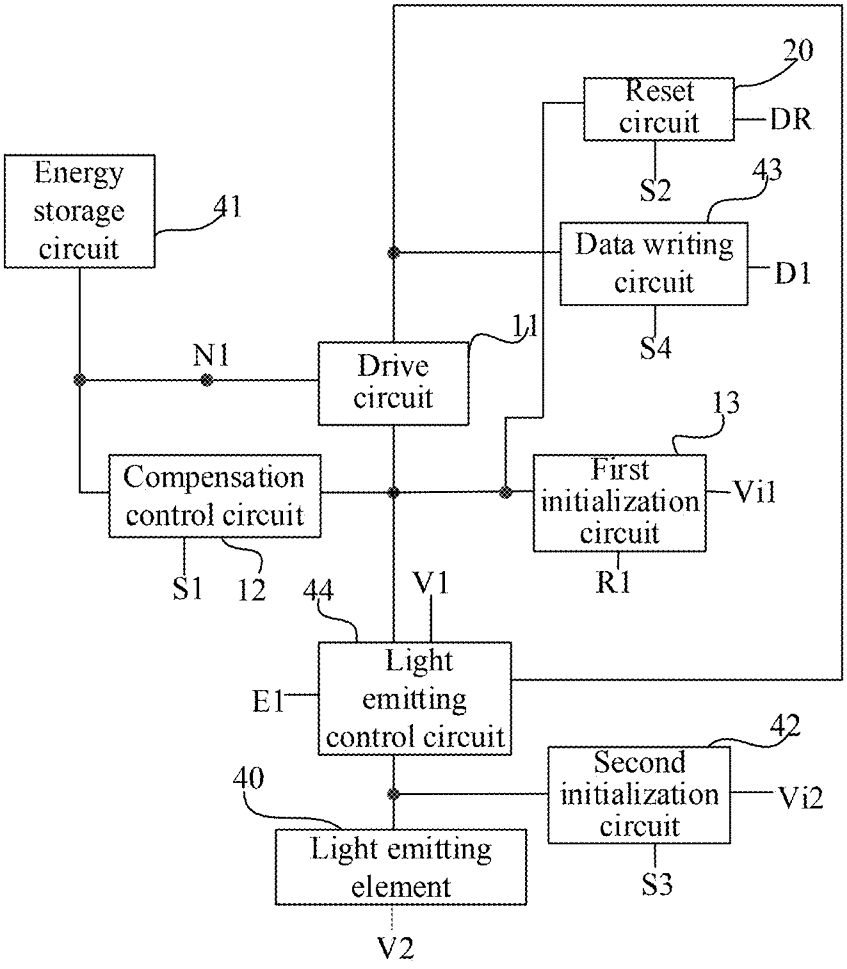
FIG. 66 is a diagram of a structure of a pixel circuit according to at least yet another embodiment of the present disclosure.

As shown in FIG. 66, on a basis of at least one embodiment of the pixel circuit shown in FIG. 64, the pixel circuit described in at least one embodiment of the present disclosure may further include a light emitting element 40, an energy storage circuit 41, a second initialization circuit 42, a data writing circuit 43, and a light emitting control circuit 44.

The energy storage circuit 41 is electrically connected with the control terminal of the drive circuit 11, and is configured to store electrical energy.

The second initialization circuit 42 is electrically connected with a third scan line S3, a second initialization voltage terminal, and the first electrode of the light emitting element 40 respectively, and is configured to write a second initialization voltage Vi2 provided by the second initialization voltage terminal into the first electrode of the light emitting element 40 under control of a third scan signal provided by the third scan line S3.

The data writing circuit 43 is electrically connected with a fourth scan line S4, a data line D1, and the second terminal of the drive circuit 11 respectively, and is configured to write a data voltage provided by the data line D1 into the second terminal of the drive circuit 11 under control of a fourth scan signal provided by the fourth scan line S4.

The light emitting control circuit 44 is electrically connected with a light emitting control line E1, a first voltage terminal V1, the second terminal of the drive circuit 11, the first terminal of the drive circuit 11, and the first electrode of the light emitting element 40 respectively, and is configured to control communication between the first voltage terminal V1 and the second terminal of the drive circuit 11 and control communication between the first terminal of the drive circuit 11 and the first electrode of the light emitting element 40 under control of a light emitting control signal provided by the light emitting control line E1.

The second electrode of the light emitting element is electrically connected with a second voltage terminal V2.

When the pixel circuit according to at least one embodiment of the present disclosure shown in FIG. 66 is working, the display cycle further includes a data writing phase and a light emitting phase set after the initialization phase.

In the data writing phase, the data writing circuit 43 writes a data voltage Vdata provided by the data line D1 into the second terminal of the drive circuit 11 under control of a fourth scan signal. The compensation control circuit 12 controls communication between the control terminal of the drive circuit 11 and the first terminal of the drive circuit 11 under control of a first scan signal.

At beginning of the data writing phase, the drive circuit 11 turns on a connection between the first terminal of the drive circuit 11 and the second terminal of the drive circuit 11 under control of the control terminal of the drive circuit 11, to charge the energy storage circuit 41 through the data voltage Vdata, thereby changing a potential of the control terminal of the drive circuit 11 until the potential of the control terminal of the drive circuit 11 becomes Vdata+Vth, wherein Vth is a threshold voltage of a drive transistor included in the drive circuit 11.

In the light emitting phase, the light emitting control circuit 44 controls communication between the first voltage terminal V1 and the second terminal of the drive circuit 11 and controls communication between the first terminal of the drive circuit 11 and the first electrode of the light emitting element 40 under control of a light emitting control signal, and the drive circuit 11 drives the light emitting element 40 to emit light.

Figure 67:
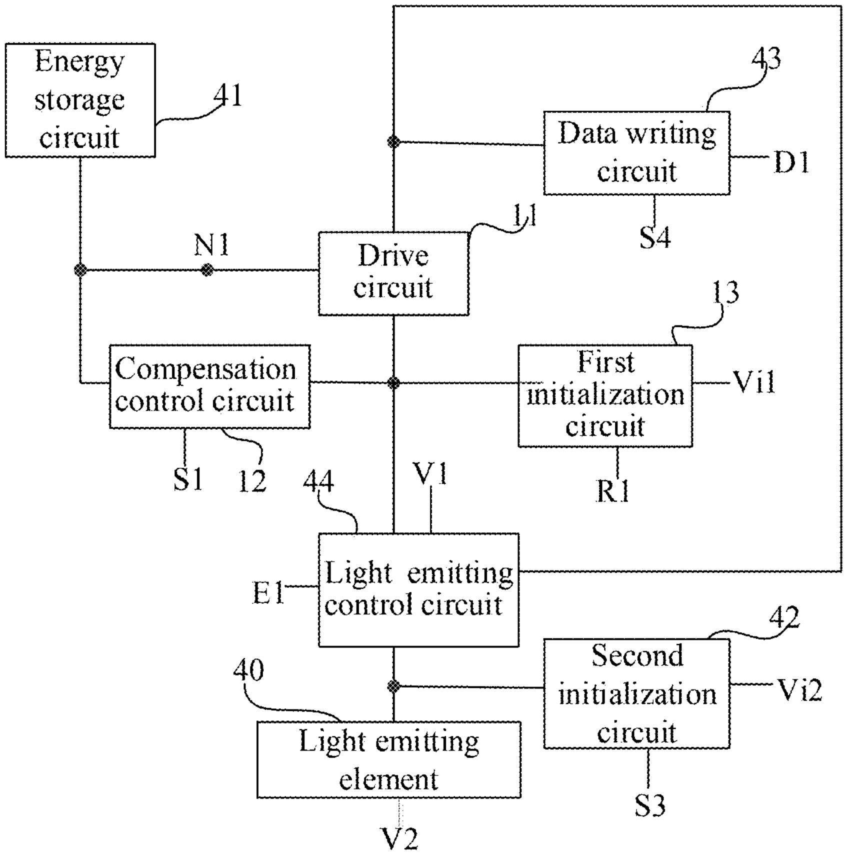
FIG. 67 is a diagram of a structure of a pixel circuit according to at least yet another embodiment of the present disclosure.

As shown in FIG. 67, the pixel circuit described in at least one embodiment of the present disclosure may include a drive circuit 11, a compensation control circuit 12, a first initialization circuit 13, a light emitting element 40, an energy storage circuit 41, a second initialization circuit 42, a data writing circuit 43, and a light emitting control circuit 44.

The compensation control circuit 12 is electrically connected with a first scan line S1, a control terminal of the drive circuit 11, and a first terminal of the drive circuit 11 respectively, and is configured to control communication between the control terminal of the drive circuit 11 and the first terminal of the drive circuit 11 under control of a first scan signal provided by the first scan line S1.

The first initialization circuit 13 is electrically connected with an initialization control line R1, the first terminal of the drive circuit 11, and a first initialization voltage terminal respectively, and is configured to write a first initialization voltage Vi1 provided by the first initialization voltage terminal into the first terminal of the drive circuit 11 under control of an initialization control signal provided by the initialization control line R1.

The drive circuit 11 is configured to control communication between the first terminal of the drive circuit 11 and a second terminal of the drive circuit 12 under control of a potential of the control terminal of the drive circuit 12.

The energy storage circuit 41 is electrically connected with the control terminal of the drive circuit 11, and is configured to store electrical energy.

The second initialization circuit 42 is electrically connected with a third scan line S3, a second initialization voltage terminal, and a first electrode of the light emitting element 40 respectively, and is configured to write a second initialization voltage Vi2 provided by the second initialization voltage terminal into the first electrode of the light emitting element 40 under control of a third scan signal provided by the third scan line S3.

The data writing circuit 43 is electrically connected with a fourth scan line S4, a data line D1, and the second terminal of the drive circuit 11 respectively, and is configured to write a data voltage provided by the data line D1 into the second terminal of the drive circuit 11 under control of a fourth scan signal provided by the fourth scan line S4.

The light emitting control circuit 44 is electrically connected with a light emitting control line E1, a first voltage terminal V1, the second terminal of the drive circuit 11, the first terminal of the drive circuit 11, and the first electrode of the light emitting element 40 respectively, and is configured to control communication between the first voltage terminal V1 and the second terminal of the drive circuit 11 and control communication between the first terminal of the drive circuit 11 and the first electrode of the light emitting element 40 under control of a light emitting control signal provided by the light emitting control line E1.

A second electrode of the light emitting element is electrically connected with a second voltage terminal V2.

When the pixel circuit according to at least one embodiment of the present disclosure shown in FIG. 67 is working, a display cycle includes an initialization phase, a data writing phase, and a light emitting phase which are set sequentially.

In the initialization phase, the first initialization circuit 13 writes a first initialization voltage Vi1 into the first terminal of the drive circuit 11 under control of an initialization control signal. The compensation control circuit 12 controls communication between the control terminal of the drive circuit 11 and the first terminal of the drive circuit 11 under control of a first scan signal, to write the first initialization voltage Vi1 into the control terminal of the drive circuit 11, so that the drive circuit 11 can control communication between the first terminal of the drive circuit 11 and the second terminal of the drive transistor 11 under control of a potential of the control terminal of the drive circuit 11 at beginning of the data writing phase.

In the data writing phase, the data writing circuit 43 writes a data voltage Vdata provided by the data line D1 into the second terminal of the drive circuit 11 under control of a fourth scan signal. The compensation control circuit 12 controls communication between the control terminal of the drive circuit 11 and the first terminal of the drive circuit 11 under control of a first scan signal.

At beginning of the data writing phase, the drive circuit 11 turns on a connection between the first terminal of the drive circuit 11 and the second terminal of the drive circuit 11 under control of the control terminal of the drive circuit 11, to charge the energy storage circuit 41 through the data voltage Vdata, thereby changing a potential of the control terminal of the drive circuit 11 until the potential of the control terminal of the drive circuit 11 becomes Vdata+Vth, wherein Vth is a threshold voltage of a drive transistor included in the drive circuit 11.

In the light emitting phase, the light emitting control circuit 44 controls communication between the first voltage terminal V1 and the second terminal of the drive circuit 11 and controls communication between the first terminal of the drive circuit 11 and the first electrode of the light emitting element 40 under control of a light emitting control signal, and the drive circuit 11 drives the light emitting element 40 to emit light.

In at least one embodiment of pixel circuits shown in FIG. 65, FIG. 66, and FIG. 67, the third scan signal may be provided to the third scan line S3 through a separate third scan signal generation module, which facilitates a degree of freedom of switching a switching frequency (the switching frequency is a switching frequency of a transistor included in the second initialization circuit) under low frequency flicker, but it is not limited to this. In specific implementation, the third scan signal and the fourth scan signal may be a same scan signal.

When a display panel to which the pixel circuit is applied works at a low frequency, when the light emitting control circuit 44 controls the first voltage terminal V1 to be disconnected from the second terminal of the drive circuit 11, and controls the first terminal of the drive circuit 11 to be disconnected from the first electrode of the light emitting element 40, flicker can be reduced by increasing a frequency of the third scan signal.

In at least one embodiment of the present disclosure, the second scan signal and the third scan signal may be a same scan signal, and the second scan signal generation module and the third scan signal generation module may be a same module, but it is not limited to this. In specific implementation, the second scan signal may be a different scan signal from the third scan signal.

When the pixel circuit according to at least one embodiment of the present disclosure shown in FIG. 65, FIG. 66, and FIG. 67 is working, in a non-light emitting period, before the data voltage is written into the second terminal of the drive circuit 11, the second initialization circuit 42 writes the second initialization voltage Vi2 provided by the second initialization voltage terminal into the first electrode of the light emitting element 40 under control of the third scan signal provided by the third scan line S3, so as to control the light emitting element 40 not to emit light and clear a residual charge of the first electrode of the light emitting element 40.

In at least one embodiment of the present disclosure, a time interval between the initialization phase and the data writing phase is greater than a predetermined time interval to improve a hysteresis phenomenon of the drive transistor and reduce high and low frequency flicker of the pixel circuit by initializing a potential of a gate of the drive transistor in advance.

In specific implementation, the predetermined time interval may be selected according to an actual situation.

In at least one embodiment of the pixel circuits shown in FIG. 65, FIG. 66, and FIG. 67 of the present disclosure, the initialization control signal provided by the initialization control line R1 and the fourth scan signal may be generated by a same fourth scan signal generation module, the fourth scan signal may be a fourth scan signal of an N-th stage generated by the fourth scan signal generation module, and the initialization control signal may be a fourth scan signal of an (N−M)-th stage generated by the fourth scan signal generation module to initialize the potential of the gate of the drive transistor in advance, N is a positive integer, M may be a positive integer greater than 6, for example, M may be 14, but it is not limited to this.

Optionally, the data writing circuit includes a fourth transistor.

A control electrode of the fourth transistor is electrically connected with the fourth scan signal line, a first electrode of the fourth transistor is electrically connected with the data line, and a second electrode of the fourth transistor is electrically connected with the second terminal of the drive circuit.

The light emitting control circuit includes a fifth transistor and a sixth transistor.

A control electrode of the fifth transistor is electrically connected with the light emitting control line, a first electrode of the fifth transistor is electrically connected with the first voltage terminal, and a second electrode of the fifth transistor is electrically connected with the second terminal of the drive circuit.

A control terminal of the sixth transistor is electrically connected with the light emitting control line, a first electrode of the sixth transistor is electrically connected with the first terminal of the drive circuit, and a second electrode of the sixth transistor is electrically connected with the first electrode of the light emitting element.

The second initialization circuit includes a seventh transistor.

A control electrode of the seventh transistor is electrically connected with the third scan line, a first electrode of the seventh transistor is electrically connected with the second initialization voltage terminal, and a second electrode of the seventh transistor is electrically connected with the first electrode of the light emitting element.

The drive circuit includes a drive transistor. A control electrode of the drive transistor is electrically connected with the control terminal of the drive circuit, a first electrode of the drive transistor is electrically connected with the first terminal of the drive circuit, and a second electrode of the drive transistor is electrically connected with the second terminal of the drive circuit.

The energy storage circuit includes a storage capacitor. A first terminal of the storage capacitor is electrically connected with the control terminal of the drive circuit, and a second terminal of the storage capacitor is connected with the first voltage terminal.

Figure 68:
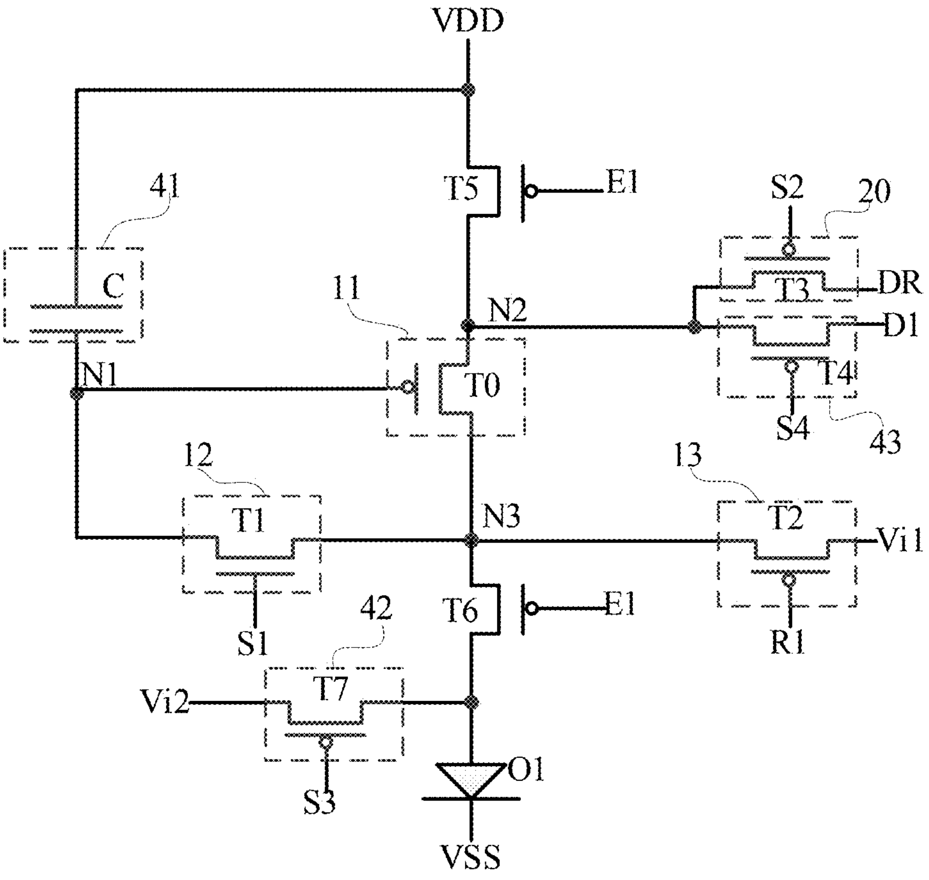
FIG. 68 is a circuit diagram of a pixel circuit according to at least yet another embodiment of the present disclosure.

As shown in FIG. 68, on a basis of at least one embodiment of the pixel circuit shown in FIG. 65, the light emitting element is an organic light emitting diode O1. The compensation control circuit 12 includes a first transistor T1. The drive circuit 11 includes a drive transistor T0.

A gate of the first transistor T1 is electrically connected with the first scan line S1, a drain of the first transistor T1 is electrically connected with a gate of the drive transistor T0, and a source of the first transistor T1 is electrically connected with a drain of the drive transistor T1.

The first initialization circuit 13 includes a second transistor T2.

A gate of the second transistor T2 is electrically connected with the initialization control line R1, a drain of the second transistor T2 is electrically connected with the first initialization voltage terminal, and a source of the second transistor T2 is electrically connected with the drain of the drive transistor T0. The first initialization voltage terminal is used for providing the first initialization voltage Vi1.

The reset circuit 20 includes a third transistor T3.

A gate of the third transistor T3 is electrically connected with the second scan line S2, a drain of the third transistor T3 is electrically connected with the reset voltage terminal DR, and a source of the third transistor T3 is electrically connected with the source of the drive transistor T0.

The data writing circuit 43 includes a fourth transistor T4.

A gate of the fourth transistor T4 is electrically connected with the fourth scan line S4, a drain of the fourth transistor T4 is electrically connected with the data line D1, and a source of the fourth transistor T4 is electrically connected with a source of the drive transistor T0.

The light emitting control circuit includes a fifth transistor T5 and a sixth transistor T6.

A gate of the fifth transistor T5 is electrically connected with the light emitting control line E1, a drain of the fifth transistor T5 is electrically connected with a high voltage terminal, and a source of the fifth transistor T5 is electrically connected with the source of the drive transistor T0. The high voltage terminal is used for providing a high voltage signal VDD.

A gate of the sixth transistor T6 is electrically connected with the light emitting control line E1, a drain of the sixth transistor T6 is electrically connected with the drain of the drive transistor T0, and a source of the sixth transistor T6 is electrically connected with an anode of an organic light emitting diode O1. A cathode of O1 is electrically connected with a low voltage terminal, and the low voltage terminal is used for providing a low voltage signal VSS.

The second initialization circuit 42 includes a seventh transistor T7.

A gate of the seventh transistor T7 is electrically connected with the third scan line S3, a drain of the seventh transistor T7 is electrically connected with the second initialization voltage terminal, and a source of the seventh transistor T7 is electrically connected with the anode of the organic light emitting diode O1. The second initialization voltage terminal is used for providing the second initialization voltage Vi2.

The energy storage circuit 41 includes a storage capacitor C. A first terminal of the storage capacitor C is electrically connected with the gate of the drive transistor T0, and a second terminal of the storage capacitor C is connected with the high voltage terminal.

In at least one embodiment of the pixel circuit shown in FIG. 68, T1 is an oxide thin film transistor, T2, T3, T4, T5, T6, and T7 are low temperature poly silicon thin film transistors, T1 is an n-type transistor, and T2, T3, T4, T5, T6, and T7 are p-type transistors.

In at least one embodiment of the pixel circuit shown in FIG. 68, N1 is a first node electrically connected with the gate of T0, N2 is a second node electrically connected with the source of T0, and N3 is a third node electrically connected with the drain of T0.

In at least one embodiment of the pixel circuit shown in FIG. 68, the initialization control signal and the fourth scan signal may be provided by a same fourth scan signal generation module.

In specific implementation, when a reset voltage provided by DR is a high voltage, a reset phase and an initialization phase are different phases to avoid gate-source short circuit of T0. When the reset voltage provided by DR is a low voltage, the reset phase and the initialization phase may be a same phase.

Figure 69:
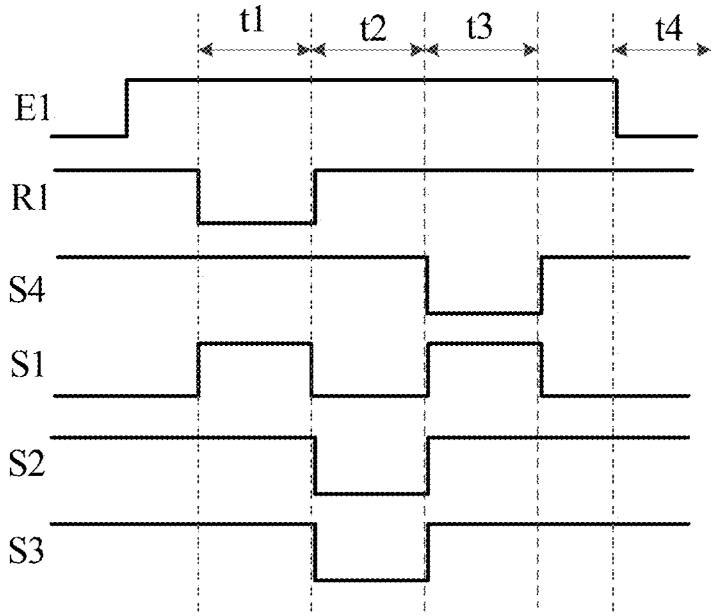
FIG. 69 is a working timing diagram of the pixel circuit shown in FIG. 68 according to at least one embodiment.

As shown in FIG. 69, when the pixel circuit according to at least one embodiment of the present disclosure shown in FIG. 68 is working, when a reset voltage provided by DR is a high voltage, a display cycle may include an initialization phase t1, a reset phase t2, a data writing phase t3, and a light emitting phase t4 set sequentially.

In the initialization phase t1, E1 provides a high voltage signal, R1 provides a low voltage signal, S4 provides a high voltage signal, S1 provides a high voltage signal, both S2 and S3 provide high voltage signals, T1 and T2 are turned on to write Vi1 into N1, and a potential of the gate of T0 is initialized, so that T0 can be turned on at beginning of the data writing phase t3.

In the reset phase t2, E1 provides a high voltage signal, R1 provides a high voltage signal, S4 provides a high voltage signal, S1 provides a low voltage signal, both S2 and S3 provide low voltage signals, T3 and T7 are turned on to initialize a potential of N2 through a high voltage provided by DR, so as to reset a gate-source voltage of T0, which is beneficial to accelerate a recovery speed of T0, thus improving a hysteresis phenomenon of T0 and improving a recovery speed of hysteresis. Vi2 is written into the anode of O1 so that O1 does not emit light and a residual charge of the anode of O1 is removed.

In the data writing phase t3, E1 provides a high voltage signal, R1 provides a high voltage signal, S4 provides a low voltage signal, S1 provides a high voltage signal, both S2 and S3 provide high voltage signals, T1 is turned on, and T4 is turned on.

At beginning of the data writing phase t3, T0 is turned on, and C is charged through a data voltage Vdata provided by D1 to raise a potential of N1 until T0 is turned off and the potential of N1 is Vdata+Vth, wherein Vth is a threshold voltage of T0.

In the light emitting phase, E1 provides a low voltage signal, R1 provides a high voltage signal, S4 provides a high voltage signal, S1 provides a low voltage signal, both S2 and S3 provide high voltage signals, T5, T0, and T6 are turned on, and T0 drives O1 to emit light.

Figure 70:
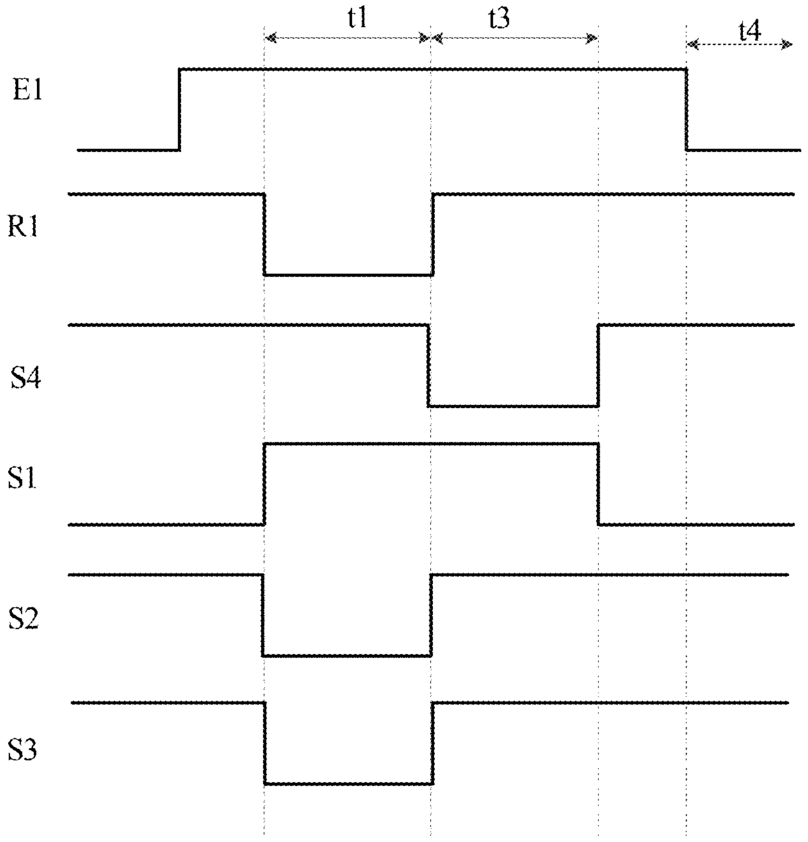
FIG. 70 is a working timing diagram of the pixel circuit shown in FIG. 68 according to at least another embodiment.

As shown in FIG. 70, when the pixel circuit according to at least one embodiment of the present disclosure as shown in FIG. 68 is working, when a reset voltage provided by DR is a low voltage, a display cycle may include an initialization phase t1, a data writing phase t3, and a light emitting phase t4 set sequentially.

In the initialization phase t1, E1 provides a high voltage signal, R1 provides a low voltage signal, S4 provides a high voltage signal, S1 provides a high voltage signal, both S2 and S3 provide low voltage signals, T1 and T2 are turned on to write Vi1 into N1, so that T0 can be turned on at the start of the data writing phase t3; T3 and T7 are turned on, a reset voltage provided by DR is written into N2, and Vi2 is written into the anode of O1, so as to reset a gate-source voltage of T0, which is beneficial to accelerate a recovery speed of T0, thus improving a hysteresis phenomenon of T0 and improving a recovery speed of hysteresis. Vi2 is written into the anode of O1 so that O1 does not emit light and a residual charge of the anode of O1 is removed.

In the data writing phase t3, E1 provides a high voltage signal, R1 provides a high voltage signal, S4 provides a low voltage signal, S1 provides a high voltage signal, both S2 and S3 provide high voltage signals, T1 is turned on, and T4 is turned on.

At beginning of the data writing phase t3, T0 is turned on, and C is charged through a data voltage Vdata provided by D1 to raise a potential of N1 until T0 is turned off and the potential of N1 is Vdata+Vth, wherein Vth is a threshold voltage of T0.

In the light emitting phase, E1 provides a low voltage signal, R1 provides a high voltage signal, S4 provides a high voltage signal, S1 provides a low voltage signal, both S2 and S3 provide high voltage signals, T5, T0, and T6 are turned on, and T0 drives O1 to emit light.

Figure 71:
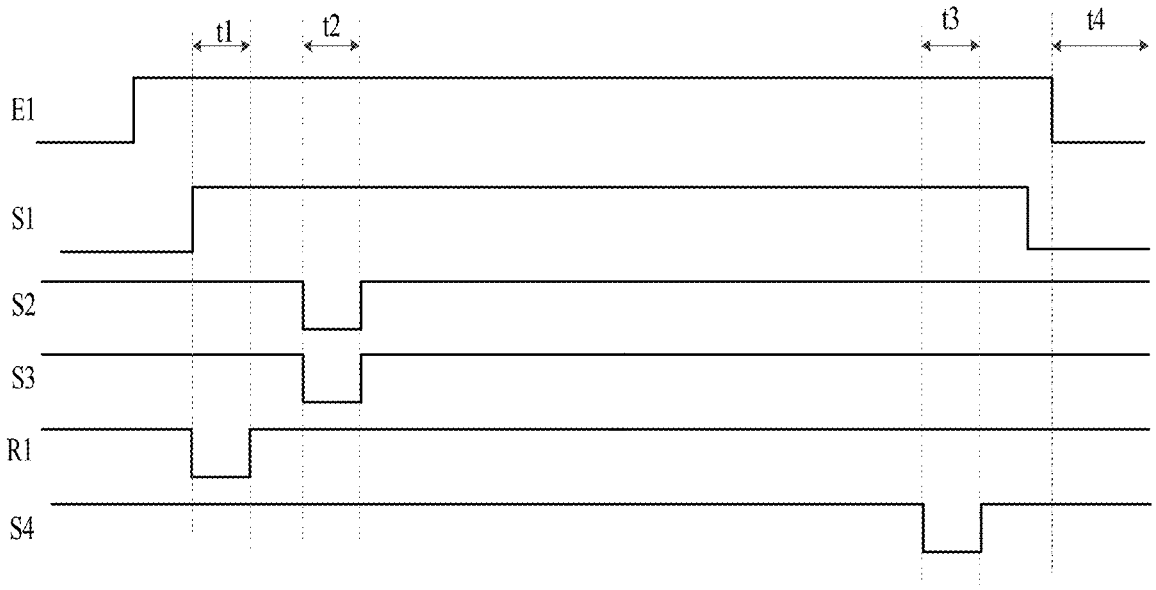
FIG. 71 is a working timing diagram of the pixel circuit shown in FIG. 68 according to at least yet another embodiment.

As shown in FIG. 71, when the pixel circuit according to at least one embodiment shown in FIG. 68 is working, when an initialization control signal provided by R1 is a fourth scan signal of an (N-14)-th stage and a fourth scan signal provided by S4 is a fourth scan signal of an N-th stage, a display cycle may include an initialization phase t1, a reset phase t2, a data writing phase t3, and a light emitting phase t4 set sequentially. In the initialization phase t1, E1 provides a high voltage signal, S1 provides a high voltage signal, R1 provides a low voltage signal, both S2 and S3 provide high voltage signals, S4 provides a high voltage signal, T1 and T2 are turned on to write Vi1 into N1, so that T0 can be turned on at beginning of the data writing phase t3.

In the reset phase t2, E1 provides a high voltage signal, S1 provides a high voltage signal, R1 provides a high voltage signal, both S2 and S3 provide low voltage signals, S4 provides a high voltage signal, T3 and T7 are turned on to initialize a potential of N2 through a high voltage provided by DR, so as to reset a gate-source voltage of T0, which is beneficial to accelerate a recovery speed of T0, thus improving a hysteresis phenomenon of T0 and improving a recovery speed of hysteresis. Vi2 is written into the anode of O1, so that O1 does not emit light and a residual charge of the anode of O1 is removed. T1 is turned on, T2 is turned off, and T5 and T6 are turned off.

In the data writing phase t3, E1 provides a high voltage signal, S1 provides a high voltage signal, R1 provides a high voltage signal, both S2 and S3 provide high voltage signals, S4 provides a low voltage signal, T1 and T4 are turned on to write Vdata into N2. N1 and N3 are communicated, so that C is charged through a data voltage Vdata on D1, a potential of N1 is raised until T0 is turned off, at this time, a potential of the gate of T0 is Vdata+Vth.

In the light emitting phase t4, E1 provides a low voltage signal, S1 provides a low voltage signal, R1 provides a high voltage signal, both S2 and S3 provide high voltage signals, S4 provides a high voltage signal, T5, T6, and T0 are turned on, and T0 drives O1 to emit light.

In at least one embodiment of the pixel circuit shown in FIG. 68, the reset voltage provided by DR may be VDD, or DR may be a same signal terminal as E1; or, the reset voltage provided by D4 may be a third initialization voltage, but it is not limited to this.

Figure 72:
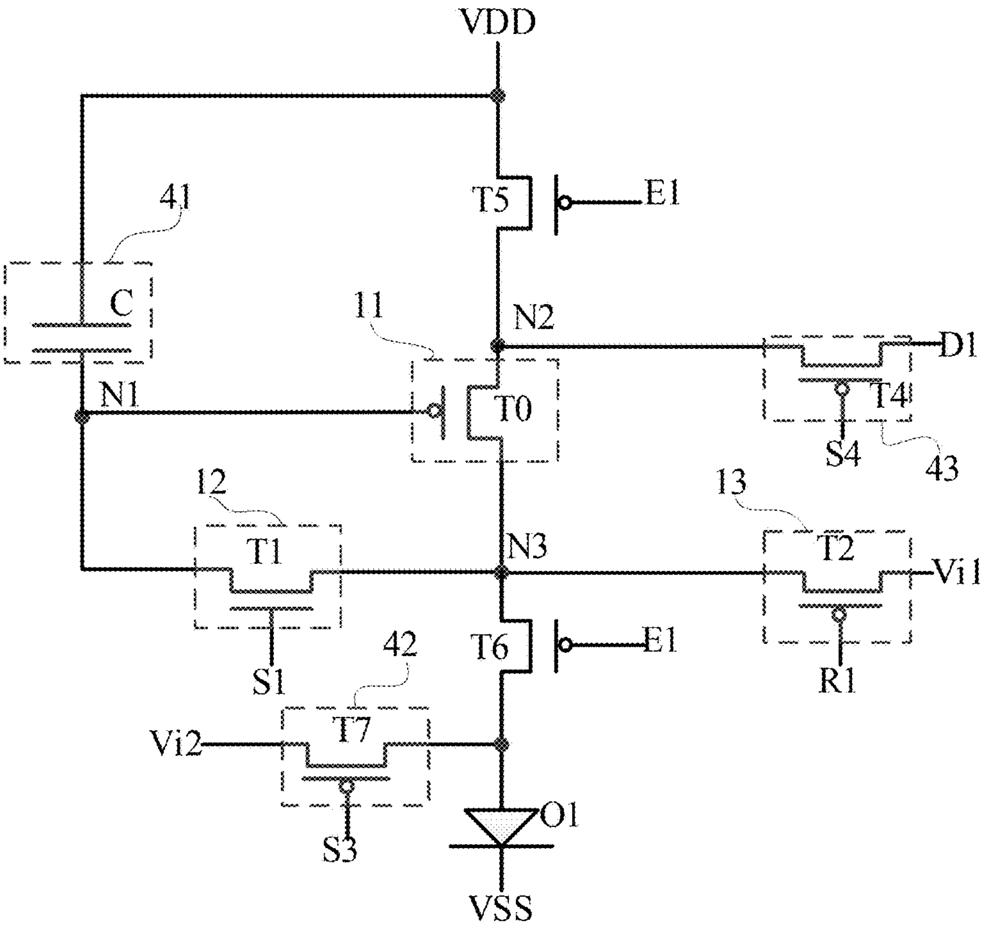
FIG. 72 is a diagram of a structure of a pixel circuit according to at least one embodiment of the present disclosure.

As shown in FIG. 72, on a basis of at least one embodiment of the pixel circuit shown in FIG. 67, the light emitting element is an organic light emitting diode O1. The compensation control circuit 12 includes a first transistor T1. The drive circuit 11 includes a drive transistor T0.

A gate of the first transistor T1 is electrically connected with the first scan line S1, a drain of the first transistor T1 is electrically connected with a gate of the drive transistor T0, and a source of the first transistor T1 is electrically connected with a drain of the drive transistor T1.

The first initialization circuit 13 includes a second transistor T2.

A gate of the second transistor T2 is electrically connected with the initialization control line R1, a drain of the second transistor T2 is electrically connected with the first initialization voltage terminal, and a source of the second transistor T2 is electrically connected with the drain of the drive transistor T0. The first initialization voltage terminal is used for providing a first initialization voltage Vi1.

The data writing circuit 43 includes a fourth transistor T4.

A gate of the fourth transistor T4 is electrically connected with the fourth scan line S4, a drain of the fourth transistor T4 is electrically connected with the data line D1, and a source of the fourth transistor T4 is electrically connected with a source of the drive transistor T0.

The light emitting control circuit includes a fifth transistor T5 and a sixth transistor T6.

A gate of the fifth transistor T5 is electrically connected with the light emitting control line E1, a drain of the fifth transistor T5 is electrically connected with a high voltage terminal, and a source of the fifth transistor T5 is electrically connected with the source of the drive transistor T0. The high voltage terminal is used for providing a high voltage signal VDD.

A gate of the sixth transistor T6 is electrically connected with the light emitting control line E1, a drain of the sixth transistor T6 is electrically connected with the drain of the drive transistor T0, and a source of the sixth transistor T6 is electrically connected with an anode of the organic light emitting diode O1. A cathode of O1 is electrically connected with a low voltage terminal, and the low voltage terminal is used for providing a low voltage signal VSS.

The second initialization circuit 42 includes a seventh transistor T7.

A gate of the seventh transistor T7 is electrically connected with the third scan line S3, a drain of the seventh transistor T7 is electrically connected with the second initialization voltage terminal, and a source of the seventh transistor T7 is electrically connected with the anode of the organic light emitting diode O1. The second initialization voltage terminal is used for providing a second initialization voltage Vi2.

The energy storage circuit 41 includes a storage capacitor C. A first terminal of the storage capacitor C is electrically connected with the gate of the drive transistor T0, and a second terminal of the storage capacitor C is connected with the high voltage terminal.

In at least one embodiment of the pixel circuit shown in FIG. 72, T1 is an oxide thin film transistor, T2, T4, T5, T6, and T7 are low temperature poly silicon thin film transistors, T1 is an n-type transistor, and T2, T4, T5, T6, and T7 are p-type transistors.

In at least one embodiment of the pixel circuit shown in FIG. 72, N1 is a first node electrically connected with the gate of T0, N2 is a second node electrically connected with the source of T0, and N3 is a third node electrically connected with the drain of T0.

In at least one embodiment of the pixel circuit shown in FIG. 72, a third scan signal and a fourth scan signal are a same scan signal, but it is not limited to this.

Figure 73:
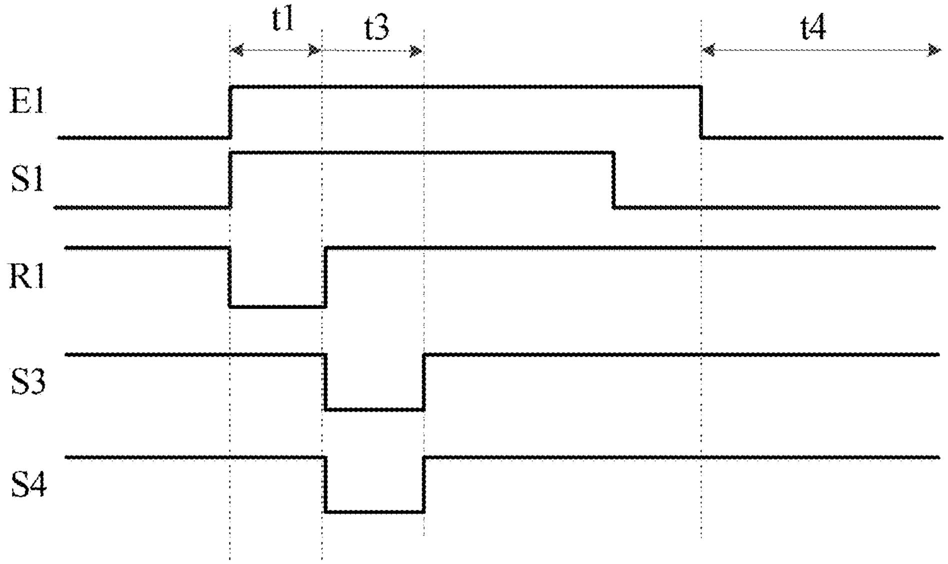
FIG. 73 is a working timing diagram of the pixel circuit shown in FIG. 72 according to at least one embodiment.

As shown in FIG. 73, when the pixel circuit according to at least one embodiment of the present disclosure shown in FIG. 72 is working, a display cycle may include an initialization phase t1, a data writing phase t3, and a light emitting phase t4 set sequentially.

In the initialization phase t1, E1 provides a high voltage signal, R1 provides a low voltage signal, both S3 and S4 provide high voltage signals, S1 provides a high voltage signal, and T1 and T2 are turned on to write Vi1 into N1, so that T0 can be turned on at beginning of the data writing phase t3.

In the data writing phase t3, E1 provides a high voltage signal, R1 provides a high voltage signal, both S3 and S4 provide low voltage signals, S1 provides a high voltage signal, T7 is turned on to write Vi2 into the anode of O1, T1 and T4 are turned on to write a data voltage Vdata on D1 into N2, and N1 and N3 are communicated.

At beginning of the data writing phase t3, T0 is turned on, and C is charged through Vdata to raise a potential of the gate of T0 until the potential of the gate of T0 becomes Vdata+Vth, wherein Vth is a threshold voltage of T0, and T0 is turned off.

In the light emitting phase t4, E1 provides a low voltage signal, R1 provides a high voltage signal, both S3 and S4 provide high voltage signals, S1 provides a low voltage signal, T5, T6, and T0 are turned on, and T0 drives O1 to emit light.

Figure 74:
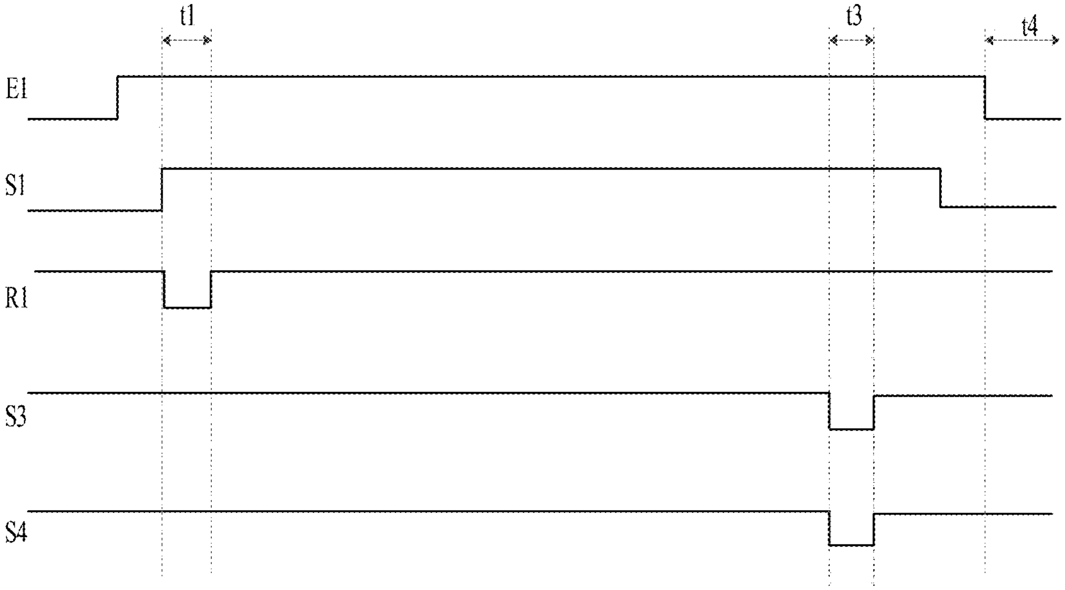
FIG. 74 is a working timing diagram of the pixel circuit shown in FIG. 72 according to at least another embodiment.

As shown in FIG. 74, when the pixel circuit according to at least one embodiment shown in FIG. 72 is working, when an initialization control signal provided by R1 is a fourth scan signal of an (N−14)-th stage and a fourth scan signal provided by S4 is a fourth scan signal of an N-th stage, a display cycle may include an initialization phase t1, a data writing phase t3, and a light emitting phase t4 set sequentially.

In the initialization phase t1, E1 provides a high voltage signal, R1 provides a low voltage signal, both S3 and S4 provide high voltage signals, S1 provides a high voltage signal, and T1 and T2 are turned on to write Vi1 into N1, so that T0 can be turned on at beginning of the data writing phase t3.

In the data writing phase t3, E1 provides a high voltage signal, R1 provides a high voltage signal, both S3 and S4 provide low voltage signals, S1 provides a high voltage signal, T7 is turned on to write Vi2 into the anode of O1, T1 and T4 are turned on to write a data voltage Vdata on D1 into N2, and N1 and N3 are communicated.

At beginning of the data writing phase t3, T0 is turned on, and C is charged through Vdata to raise a potential of the gate of T0 until the potential of the gate of T0 becomes Vdata+Vth, wherein Vth is a threshold voltage of T0, and T0 is turned off.

In the light emitting phase t4, E1 provides a low voltage signal, R1 provides a high voltage signal, both S3 and S4 provide high voltage signals, S1 provides a low voltage signal, T5, T6, and T0 are turned on, and T0 drives O1 to emit light.

As shown in FIG. 74, a time interval between the initialization phase t1 and the data writing phase t3 is relatively large, so that the potential of N1 can be reset in advance, which is beneficial to improve a hysteresis phenomenon of T0.

Figure 75:
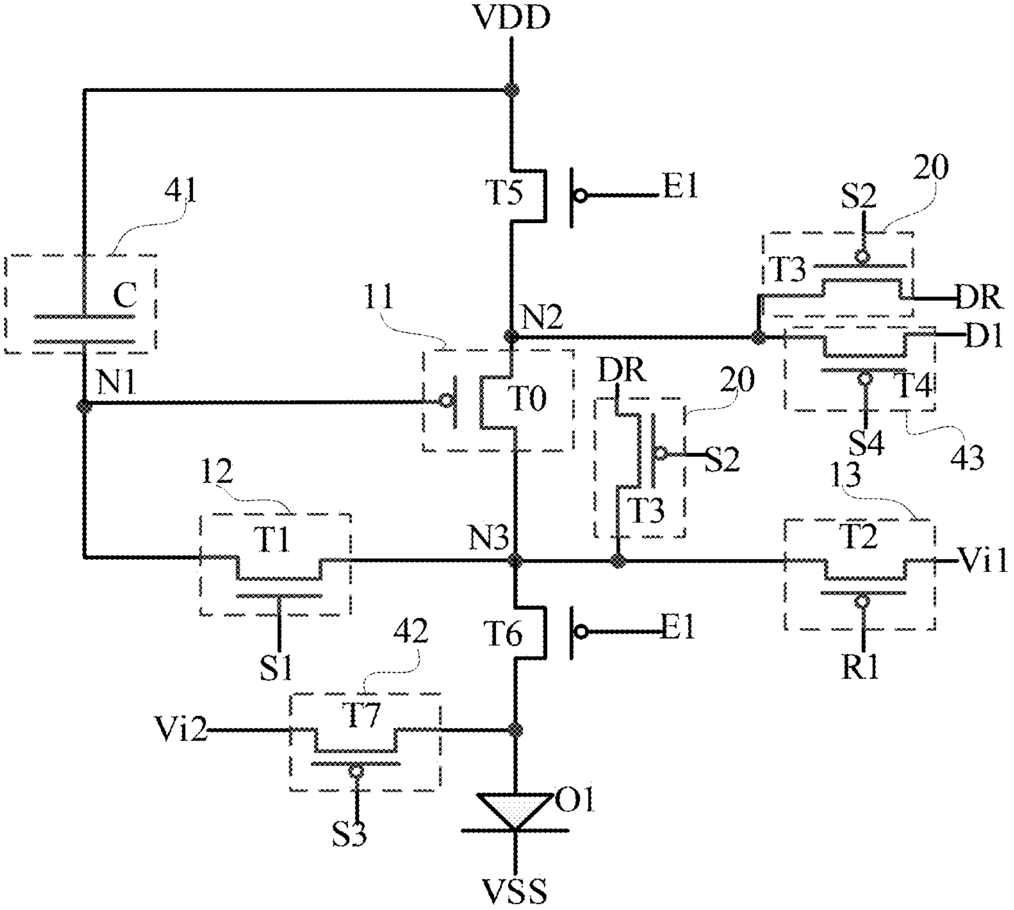
FIG. 75 is a diagram of a structure of a pixel circuit according to at least yet another embodiment of the present disclosure.

As shown in FIG. 75, on a basis of at least one embodiment of the pixel circuit shown in FIG. 66, the light emitting element is an organic light emitting diode O1. The compensation control circuit 12 includes a first transistor T1. The drive circuit 11 includes a drive transistor T0.

A gate of the first transistor T1 is electrically connected with the first scan line S1, a drain of the first transistor T1 is electrically connected with a gate of the drive transistor T0, and a source of the first transistor T1 is electrically connected with a drain of the drive transistor T1.

The first initialization circuit 13 includes a second transistor T2.

A gate of the second transistor T2 is electrically connected with the initialization control line R1, a drain of the second transistor T2 is electrically connected with the first initialization voltage terminal, and a source of the second transistor T2 is electrically connected with a first electrode of the drive transistor T0. The first initialization voltage terminal is used for providing the first initialization voltage Vi1.

The reset circuit 20 includes a third transistor T3.

A gate of the third transistor T3 is electrically connected with the second scan line S2, a drain of the third transistor T3 is electrically connected with the reset voltage terminal DR, and a source of the third transistor T3 is electrically connected with a second electrode of the drive transistor T0.

The data writing circuit 43 includes a fourth transistor T4.

A gate of the fourth transistor T4 is electrically connected with the fourth scan line S4, a drain of the fourth transistor T4 is electrically connected with the data line D1, and a source of the fourth transistor T4 is electrically connected with the second electrode of the drive transistor T0.

The light emitting control circuit 44 includes a fifth transistor T5 and a sixth transistor T6.

A gate of the fifth transistor T5 is electrically connected with the light emitting control line E1, a drain of the fifth transistor T5 is electrically connected with a high voltage terminal, and a source of the fifth transistor T5 is electrically connected with the second electrode of the drive transistor T0. The high voltage terminal is used for providing a high voltage signal VDD.

A gate of the sixth transistor T6 is electrically connected with the light emitting control line E1, a drain of the sixth transistor T6 is electrically connected with the first electrode of the drive transistor T0, and a source of the sixth transistor T6 is electrically connected with an anode of the organic light emitting diode O1. A cathode of O1 is electrically connected with a low voltage terminal, and the low voltage terminal is used for providing a low voltage signal VSS.

The second initialization circuit 42 includes a seventh transistor T7.

A gate of the seventh transistor T7 is electrically connected with the third scan line S3, a drain of the seventh transistor T7 is electrically connected with the second initialization voltage terminal, and a source of the seventh transistor T7 is electrically connected with the anode of the organic light emitting diode O1. The second initialization voltage terminal is used for providing the second initialization voltage Vi2.

The energy storage circuit 41 includes a storage capacitor C. A first terminal of the storage capacitor C is electrically connected with the gate of the drive transistor T0, and a second terminal of the storage capacitor C is connected with the high voltage terminal.

In at least one embodiment of the pixel circuit shown in FIG. 75, T1 is an oxide thin film transistor, T2, T3, T4, T5, T6, and T7 are low temperature poly silicon thin film transistors, T1 is an n-type transistor, and T2, T3, T4, T5, T6, and T7 are p-type transistors.

In at least one embodiment of the pixel circuit shown in FIG. 75, N1 is a first node electrically connected with the gate of T0, N2 is a second node electrically connected with the second electrode of T0, and N3 is a third node electrically connected with the first electrode of T0.

In at least one embodiment of the pixel circuit shown in FIG. 75, the first electrode of T0 may be a drain and the second electrode of T0 may be a source. Or, the first electrode of T0 may be a source and the second electrode of T0 may be a drain.

In at least one embodiment of the pixel circuit shown in FIG. 75 of the present disclosure, the initialization control signal provided by R1 may be a fourth scan signal of an (N-14)-th stage, and the fourth scan signal provided by S4 may be a fourth scan signal of an N-th stage, but it is not limited to this.

Figure 76:
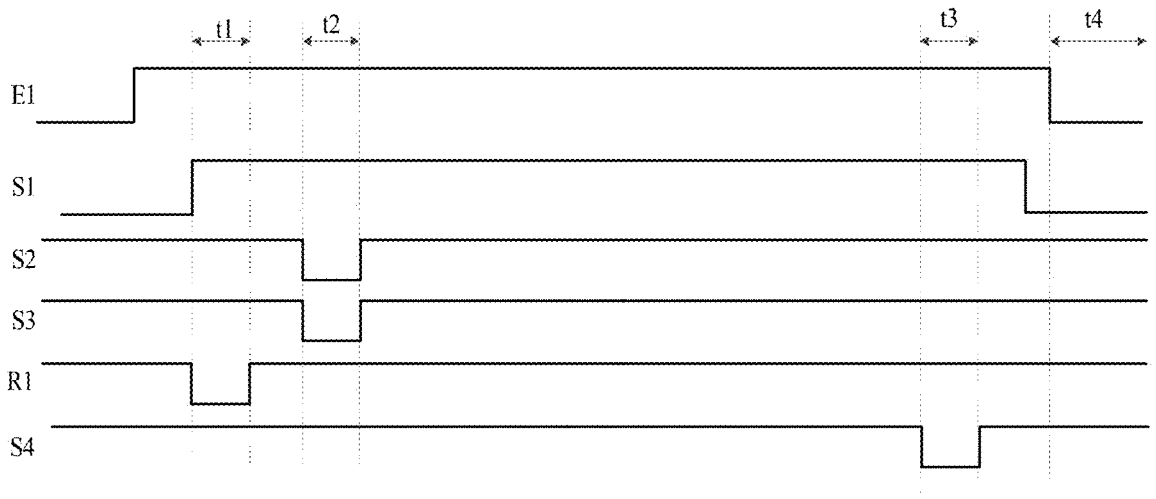
FIG. 76 is a working timing diagram of the pixel circuit shown in FIG. 75 according to at least one embodiment.

As shown in FIG. 76, when the pixel circuit according to at least one embodiment of the present disclosure shown in FIG. 75 is working, a display cycle may include an initialization phase t1, a reset phase t2, a data writing phase t3, and a light emitting phase t4 set sequentially.

In the initialization phase t1, E1 provides a high voltage signal, S1 provides a high voltage signal, R1 provides a low voltage signal, both S2 and S3 provide high voltage signals, S4 provides a high voltage signal, T1 and T2 are turned on to write Vi1 into N1, so that T0 can be turned on at beginning of the data writing phase t3.

In the reset phase t2, E1 provides a high voltage signal, S1 provides a high voltage signal, R1 provides a high voltage signal, both S2 and S3 provide low voltage signals, S4 provides a high voltage signal, T3 and T7 are turned on to initialize a potential of N2 through a high voltage provided by DR, so as to reset a gate-source voltage of T0, which is beneficial to accelerate a recovery speed of T0, thus improving a hysteresis phenomenon of T0 and improving a recovery speed of hysteresis. Vi2 is written into the anode of O1, so that O1 does not emit light and a residual charge of the anode of O1 is removed. T1 is turned on, T2 is turned off, and T5 and T6 are turned off.

In the data writing phase t3, E1 provides a high voltage signal, S1 provides a high voltage signal, R1 provides a high voltage signal, both S2 and S3 provide high voltage signals, S4 provides a low voltage signal, T1 and T4 are turned on to write Vdata into N2. N1 and N3 are communicated, so that C is charged through a data voltage Vdata on D1, a potential of N1 is raised until T0 is turned off, at this time, a potential of the gate of T0 is Vdata+Vth.

In the light emitting phase t4, E1 provides a low voltage signal, S1 provides a low voltage signal, R1 provides a high voltage signal, both S2 and S3 provide high voltage signals, S4 provides a high voltage signal, T5, T6, and T0 are turned on, and T0 drives O1 to emit light.

A drive method described in at least one embodiment of the present disclosure is applied to the above pixel circuit, and a display cycle includes an initialization phase and a reset phase. The drive method includes following contents.

In the initialization phase, a first initialization circuit writes a first initialization voltage into a first terminal of a drive circuit under control of an initialization control signal.

In the reset phase, a reset circuit writes a reset voltage into a second terminal of the drive circuit or the first terminal of the drive circuit under control of a second scan signal.

In at least one embodiment of the drive method described in the present disclosure, a reset circuit writes a reset voltage into a second terminal of a drive circuit or a first terminal of the drive circuit under control of a second scan signal in a non-light emitting period, before a data voltage is written into the second terminal of the drive circuit, to provide a bias voltage to a drive transistor in the drive circuit (at this time, a potential of a gate of the drive transistor is also initialized to Vi1), so that the drive transistor remains in a reset state to improve hysteresis of the drive transistor and facilitate First Frame Response time (FFR) of a display screen.

In at least one embodiment of the present disclosure, in the reset phase, when the reset circuit writes a reset voltage into the second terminal of the drive circuit under control of the second scan signal, the reset voltage is a high potential constant voltage, the first initial voltage is a low potential constant voltage, and the initialization phase and the reset phase are different time periods; or, the reset voltage and the first initialization voltage are low potential constant voltages, and the initialization phase and the reset phase are a same time period or different time periods.

Optionally, when the reset circuit writes the reset voltage into the first terminal of the drive circuit under control of the second scan signal in the reset phase, the reset phase and the initialization phase are different time periods, so that the first initialization voltage is written into the first terminal of the drive circuit in the initialization phase, and the reset voltage is written into the first terminal of the drive circuit in the reset phase.

In specific implementation, the pixel circuit may further include a compensation control circuit, and the drive method may further include following contents.

In the initialization phase, the compensation control circuit controls communication between the control terminal of the drive circuit and the first terminal of the drive circuit under control of the first scan signal to write the first initialization voltage into the control terminal of the drive circuit.

In the drive method described in the embodiment of the present disclosure, the compensation control circuit controls communication between the control terminal of the drive circuit and the first terminal of the drive circuit under control of the first scan signal, the control terminal of the drive circuit is only directly electrically connected with the compensation control circuit, the first initialization circuit writes the first initial voltage into the first terminal of the drive circuit under control of the initialization control signal, and the first initialization circuit is directly electrically connected with the first terminal of the drive circuit, so as to initialize the potential of the control terminal of the drive circuit through the compensation control circuit and the first initialization circuit and to reduce a leakage path of the control terminal of the drive circuit. Under a condition that design complexity of the pixel circuit is not obviously increased, stability of a voltage of a first node may be ensured, which is beneficial to improve display quality, improve display uniformity, and reduce flicker.

In specific implementation, the pixel circuit further includes a data writing circuit and an energy storage circuit. The display cycle further includes a data writing phase set after the initialization phase. The drive method further includes following contents.

In the data writing phase, the data writing circuit writes the data voltage Vdata provided by the data line into the second terminal of the drive circuit under control of the fourth scan signal. The compensation control circuit controls communication between the control terminal of the drive circuit and the first terminal of the drive circuit under control of the first scan signal.

At beginning of the data writing phase, the drive circuit turns on a connection between the first terminal of the drive circuit and the second terminal of the drive circuit under control of the control terminal of the drive circuit to charge the energy storage circuit through the data voltage Vdata, thereby changing a potential of the control terminal of the drive circuit until the potential of the control terminal of the drive circuit becomes Vdata+Vth, wherein Vth is a threshold voltage of a drive transistor included in the drive circuit.

In specific implementation, the data writing phase may be set after the reset phase.

Optionally, a time interval between the initialization phase and the data writing phase is greater than a predetermined time interval to improve a hysteresis phenomenon of the drive transistor and reduce high and low frequency flicker of the pixel circuit by initializing a potential of a gate of the drive transistor in advance.

In at least one embodiment of the present disclosure, the pixel circuit further includes a light emitting control circuit, and the display cycle further includes a light emitting phase set after the data writing phase. The drive method includes following contents.

In the light emitting phase, the light emitting control circuit controls communication between a first voltage terminal and the second terminal of the drive circuit under control of a light emitting control signal, controls communication between the first terminal of the drive circuit and a first electrode of a light emitting element, and the drive circuit drives the light emitting element to emit light.

The display apparatus according to at least one embodiment of the present disclosure includes the above pixel circuit.

Optionally, the pixel circuit includes a reset circuit and a second initialization circuit. The display apparatus further includes a second scan signal generation module and a third scan signal generation module.

The reset circuit is electrically connected with a second scan line, and the second initialization circuit is electrically connected with a third scan line.

The second scan signal generation module is electrically connected with the second scan line, and is configured to provide a second scan signal to the second scan line.

The third scan signal generation module is electrically connected with the third scan line, and is configured to provide a third scan signal to the third scan line.

Optionally, the second scan signal and the third scan signal are a same control signal.

The second scan signal generation module and the third scan signal generation module are a same module.

Figure 77:
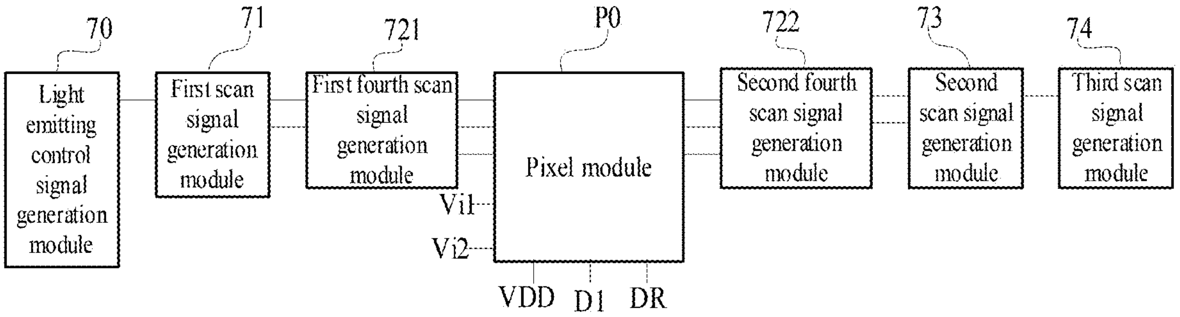
FIG. 77 is a diagram of a structure of a display apparatus according to at least yet another embodiment of the present disclosure.

As shown in FIG. 77, the display apparatus described in at least one embodiment of the present disclosure includes a display panel, the display panel includes a pixel module P0, and the pixel module P0 includes multiple rows and multiple columns of the above pixel circuits.

The pixel module P0 is disposed in a valid display region of the display panel.

The display panel further includes a light emitting control signal generation module 70, a first scan signal generation module 71, a first fourth scan signal generation module 721, a second fourth scan signal generation module 722, a second scan signal generation module 73, and a third scan signal generation module 74.

The light emitting control signal generation module 70 is configured to provide a light emitting control signal, the first scan signal generation module 71 is configured to provide a first scan signal, the first fourth scan signal generation module 721 and the second fourth scan signal generation module 722 are configured to provide a fourth scan signal, the second scan signal generation module 73 is configured to provide a second scan signal, and the third scan signal generation module 74 is configured to provide a third scan signal.

The light emitting control signal generation module 70, the first scan signal generation module 71, and the first fourth scan signal generation module 721 are disposed on a left side of the display panel.

The second fourth scan signal generation module 722, the second scan signal generation module 73, and the third scan signal generation module 74 are disposed on a right side of the display panel.

Figure 78:
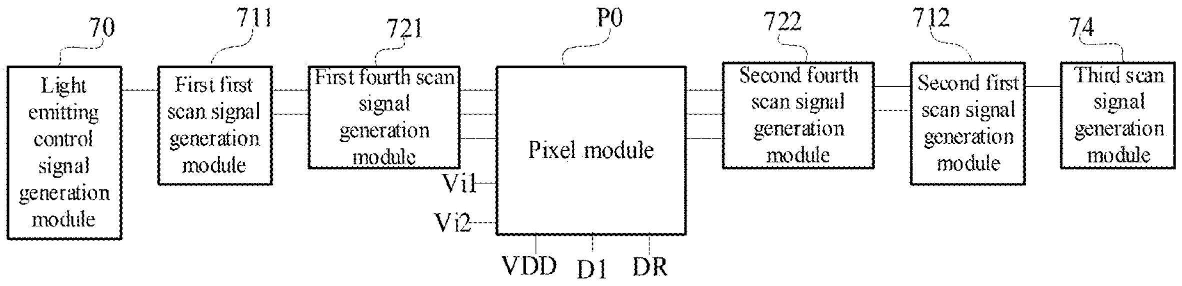
FIG. 78 is a diagram of a structure of a display apparatus according to at least yet another embodiment of the present disclosure.

As shown in FIG. 78, the display apparatus described in at least one embodiment of the present disclosure includes a display panel, the display panel includes a pixel module P0, and the pixel module P0 includes multiple rows and multiple columns of the above pixel circuits.

The pixel module P0 is disposed in a valid display region of the display panel.

The display panel further includes a light emitting control signal generation module 70, a first first scan signal generation module 711, a second first scan signal generation module 712, a first fourth scan signal generation module 721, a second fourth scan signal generation module 722, and a third scan signal generation module 74.

The light emitting control signal generation module 70 is configured to provide a light emitting control signal, the first scan signal generation module 71 is configured to provide a first scan signal, the first fourth scan signal generation module 721 and the second fourth scan signal generation module 722 are configured to provide a fourth scan signal, and the third scan signal generation module 74 is configured to provide a second scan signal and a third scan signal.

The light emitting control signal generation module 70, the first first scan signal generation module 711, and the first fourth scan signal generation module 721 are disposed on a left side of the display panel.

The second fourth scan signal generation module 722, the second first scan signal generation module 712, and the third scan signal generation module 74 are disposed on a right side of the display panel.

In FIG. 77 and FIG. 78, a first initialization voltage is labeled Vi1, a second initialization voltage is labeled Vi2, a high voltage signal is labeled VDD, a data line is labeled D1, and a reset voltage terminal is labeled DR.

In an embodiment of the present disclosure, referring to FIG. 6, FIG. 7, FIG. 12, and FIG. 14, etc., a width-to-length ratio W/L of the eighth transistor T8 may be approximately equal to a width-to-length ratio W/L of the seventh transistor T7. For another example, the width-to-length ratio W/L of the eighth transistor T8 may be greater than the width-to-length ratio of the seventh transistor T7, that is, the width-to-length ratio W/L of T8 may be slightly larger, so that the N2 node may be quickly reset.

In an embodiment of the present disclosure, referring to FIG. 6, FIG. 7, FIG. 12, and FIG. 14, etc., a channel width W of the eighth transistor T8 is 1.5 to 3.5, for example, may be 1.6, 1.8, 1.9, 2.0, 2.2, 2.5, and 3.0, etc., and a channel length L is 2.0 to 4.5, for example, may be 2.5, 2.7, 3.0, 3.2, 3.5, and 4.0, etc. A channel width W of the seventh transistor T7 is 1.5 to 3.5, for example, may be 1.6, 1.8, 1.9, 2.0, 2.2, 2.5, and 3.0, etc., and a channel length L is 2.0 to 4.5, for example, may be 2.5, 2.7, 3.0, 3.2, 3.5, and 4.0, etc.

It should be noted that, referring to FIG. 38*a*, and FIG. 50, etc., designs of the above transistors are also applicable to the seventh transistor T7 and the first transistor T1 in embodiments of FIG. 38*a*, etc., and the fourth transistor T4 and the seventh transistor T7 in embodiments of FIG. 50, etc.

In an embodiment of the present disclosure, referring to FIG. 6, FIG. 7, FIG. 12, and FIG. 14, etc., a width-to-length ratio W/L of the eighth transistor T8 may be approximately equal to a width-to-length ratio W/L of the first transistor T1. For another example, the width-to-length ratio W/L of the eighth transistor T8 may be less than the width-to-length ratio W/L of the first transistor T1, so that reset capabilities of an N1 node and an N2 node may be balanced.

In an embodiment of the present disclosure, referring to FIG. 6, FIG. 7, FIG. 12, and FIG. 14, etc., a width-to-length ratio W/L of the eighth transistor T8 may be greater than a width-to-length ratio W/L of the first transistor T1, so that a reset capability of an N2 node may be improved.

In an embodiment of the present disclosure, referring to FIG. 6, FIG. 7, FIG. 12, and FIG. 14, etc., a channel width W of the eighth transistor T8 is 1.5 to 3.5, for example, may be 1.6, 1.8, 1.9, 2.0, 2.2, 2.5, and 3.0, etc., and a channel length L is 2.0 to 4.5, for example, may be 2.5, 2.7, 3.0, 3.2, 3.5, and 4.0, etc. A channel width W of the first transistor T1 is 1.5 to 3.5, for example, may be 1.6, 1.8, 1.9, 2.0, 2.2, 2.5, and 3.0, etc., and a channel length L is 2.0 to 4.5, for example, may be 2.5, 2.7, 3.0, 3.2, 3.5, and 4.0, etc.

It should be noted that, referring to FIG. 50, etc., designs of the above transistors are also applicable to the fourth transistor T4 and the third transistor T3 in embodiments of FIG. 50, etc.

The display apparatus according to the embodiment of the present disclosure may be a mobile phone, a tablet computer, a television, a display, a notebook computer, a digital photo frame, a navigator, or any product or component with a display function.

It should be noted that in all the embodiments shown in FIG. 1 to FIG. 78, names and label numbers of functional modules/electrical devices do not limit specific functions of the functional modules/electrical devices. For example, the drive circuit 1 in FIG. 3 to FIG. 26, the drive sub-circuit in FIG. 27 to FIG. 45, the drive circuit 11 in FIG. 46 to FIG. 60, and the drive circuit 11 in FIG. 61 to FIG. 78 all have a same function; for another example, the second reset circuit 3 in FIG. 3 to FIG. 26, the second reset sub-circuit in FIG. 27 to FIG. 45, the reset circuit 20 in FIG. 46 to FIG. 60, and the reset circuit 20 in FIG. 61 to FIG. 78 all have a same function; for another example, the third reset circuit 4 in FIG. 3 to FIG. 26, the first reset sub-circuit in FIG. 27 to FIG. 45, the second initialization circuit 32 in FIG. 46 to FIG. 60, and the second initialization circuit 42 in FIG. 61 to FIG. 78 all have a same function; for another example, the threshold compensation circuit 8 in FIG. 3 to FIG. 26, the second transistor T2 in FIG. 27 to FIG. 45, the compensation control circuit 13 and the compensation control circuit 12 in FIG. 46 to FIG. 60 all have a same function; for another example, the data writing circuit 7 in FIG. 3 to FIG. 26, the writing sub-circuit in FIG. 27 to FIG. 45, the data writing circuit 41 in FIG. 46 to FIG. 60, and the data writing circuit 43 in FIG. 61 to FIG. 78 all have a same function; for another example, the control circuit 5 in FIG. 3 to FIG. 26, the first light emitting control sub-circuit and the second light emitting control sub-circuit in FIG. 27 to FIG. 45, the light emitting control circuit 31 in FIG. 46 to FIG. 60, and the light emitting control circuit 44 in FIG. 61 to FIG. 78 all have a same function; for another example, the coupling circuit 6 in FIG. 3 to FIG. 26, the first capacitor C1 in FIG. 27 to FIG. 45, the energy storage circuit 42 in FIG. 46 to FIG. 60, and the energy storage circuit 41 in FIG. 61 to FIG. 78 all have a same function; for another example, the drive transistor T3 in FIG. 3 to FIG. 26, the drive transistor T3 in FIG. 27 to FIG. 45, the drive transistor T0 in FIG. 46 to FIG. 60, and the drive transistor T0 in FIG. 61 to FIG. 78 all have a same function. The above functional modules/electrical devices having a same function may be replaced with each other to form a new embodiment, replacement of the functional modules/electrical devices may include replacement of structures of the functional modules/electrical devices themselves, and replacement of voltage states of signal terminals with which the functional modules/electrical devices are connected.

Figure 79:
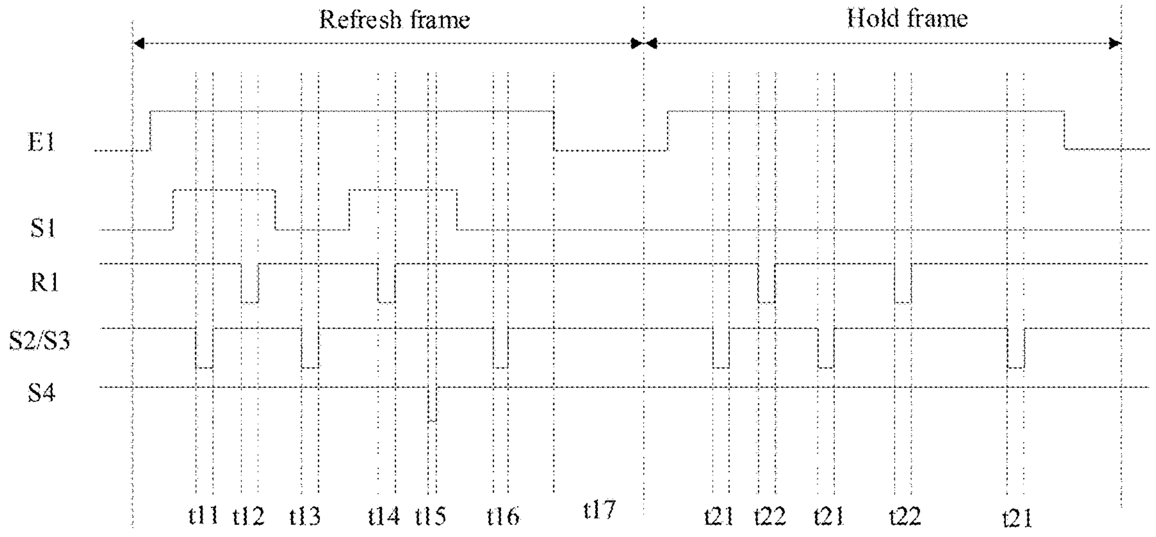
FIG. 79 is a working timing diagram of a pixel circuit.

FIG. 79 is a working timing diagram of a pixel circuit. In some exemplary embodiments, a working timing provided in FIG. 79 is applicable to the pixel circuit provided in FIG. 6, the pixel circuit provided in FIG. 7, the pixel circuit provided in FIG. 12, the pixel circuit provided in FIG. 14, the pixel circuit provided in FIG. 38*a*, the pixel circuit provided in FIG. 50, the pixel circuit provided in FIG. 52, the pixel circuit provided in FIG. 53, the pixel circuit provided in FIG. 54, the pixel circuit provided in FIG. 68, the pixel circuit provided in FIG. 72, and the pixel circuit provided in FIG. 75. FIG. 79 is illustrated by taking a working timing of the pixel circuit provided in FIG. 68, FIG. 72, and FIG. 75 as an example.

Taking FIG. 68 as an example, in conjunction with FIG. 68 and FIG. 79, the pixel circuit according to the embodiment of the present disclosure is disposed in a display substrate, the display substrate includes a first drive mode and a second drive mode, a refresh rate of the first drive mode is less than a refresh rate of the second drive mode, content displayed by the display substrate includes a plurality of display frames, and in the first drive mode and the second drive mode, a display frame includes a refresh frame. In the pixel circuit, a compensation control circuit includes a first transistor T1, a gate of the first transistor T1 is electrically connected with a first scan line S1, a first initialization circuit includes a second transistor T2, a gate of the second transistor T2 is electrically connected with an initialization control line R1, a drain of the second transistor T2 is electrically connected with a first initial voltage terminal, and a reset circuit includes a third transistor T3, a gate of the third transistor T3 is electrically connected with a second scan line S2, and a drain of the third transistor T3 is electrically connected with a reset voltage terminal DR; a data writing circuit includes a fourth transistor T4; a gate of the fourth transistor T4 is electrically connected with a fourth scan line S4, a drain of the fourth transistor T4 is electrically connected with a data line D1, and a second initialization circuit includes a seventh transistor T7; a gate of the seventh transistor T7 is electrically connected with a third scan line S3, and a drain of the seventh transistor T7 is electrically connected with a second initial voltage terminal. A light emitting control circuit includes a fifth transistor T5 and a sixth transistor T6, gates of which are electrically connected with a light emitting control line E1.

As shown in FIG. 79, a signal of the second scan line S2 is identical to a signal of the third scan line S3, and time when the signal of the second scan line S2 is an active level signal includes: a first refresh time period, a second refresh time period, and a third refresh time period which sequentially occur at intervals. During the second refresh time period, a signal of the first scan line S1 is an inactive level signal.

In an exemplary embodiment, the first drive mode may be referred to as a low frequency drive mode and the second drive mode may be referred to as a high frequency drive mode.

In an exemplary embodiment, a refresh rate refers to a quantity of times that the display substrate refreshes data in one second. A refresh rate of a first drive mode set by a same display substrate is fixed, and a refresh rate of a first drive mode set by different display substrates may be different. Among them, the refresh rate of the display substrate in the first drive mode may range from 1 Hz to 60 Hz, and, for example, the refresh rate in the first drive mode may be about 10 Hz.

In an exemplary embodiment, in the display substrate, the first drive mode and the second drive mode will be adopted for alternately displaying function in order to reduce power consumption of a product. In the first drive mode, in the display substrate, display data is refreshed in a refresh frame and the display data refreshed in the refresh frame is held in a hold frame. In the second drive mode, a display frame may include a refresh frame but not a hold frame. In the second drive mode, in the display substrate, display data is refreshed in a refresh frame. A refresh rate of the display substrate in the second drive mode may range from 60 Hz to 480 Hz and, for example, the refresh rate in the first drive mode may be about 120 Hz.

In an exemplary embodiment, as shown in FIG. 68, a voltage of a signal of the reset voltage terminal DR may be a positive voltage, a voltage of a signal of the first initial voltage terminal may be a negative voltage, and a difference between the voltage of the signal of the reset voltage terminal and the voltage of the signal of the first initial voltage terminal is greater than a threshold difference.

In an exemplary embodiment, the threshold difference may be about 12 volts to 14 volts, and the threshold difference may be 13.4 volts.

In an exemplary embodiment, the signal of the reset voltage terminal DR may have a voltage value of about 7 volts to 8 volts, and, exemplarily, the signal of the reset voltage terminal DR may have a voltage value of about 7.4 volts.

In an exemplary embodiment, the signal of the first initial voltage terminal (i.e., the first initial signal Vi1) may have a voltage value of about −5 volts to −7 volts, and, exemplarily, the signal of the first initial voltage terminal may have a voltage value of about −6 volts.

In the present disclosure, a signal of a first scan line S1 an inactive level signal during a second refresh time period, so that a first transistor T1 is in an off state during the second refresh time period, at this time, a signal of a first node in a pixel circuit is a signal of a first initial voltage terminal, and a signal of a second node is a signal of a reset voltage terminal, that is, a drive transistor has a large negative bias voltage, a large bias voltage is added to the drive transistor to improve hysteresis of the drive transistor, and enhance indexes of afterimage and trailing in a display substrate, so that phenomena of afterimage and trailing are greatly improved and display performance of the display substrate is improved.

In some exemplary implementation modes, as shown in FIG. 79, during a first refresh time period, a signal of the first scan line S1 is an active level signal, and signals of the initialization control line R1, the fourth scan line S4, and the light emitting control line E1 are inactive level signals.

In some exemplary implementation modes, as shown in FIG. 79, during a second refresh time period, signals of the initialization control line R1, the fourth scan line S4, and the light emitting control line E1 are inactive level signals.

In some exemplary implementation modes, as shown in FIG. 79, during a third refresh time period, signals of the first scan line S1, the initialization control line R1, the fourth scan line S4, and the light emitting control line E1 are inactive level signals.

In some exemplary implementation modes, as shown in FIG. 79, time when a signal of the initialization control line R1 is an active level signal may include: a fourth refresh time period occurring between the first refresh time period and the second refresh time period, and a fifth refresh time period occurring between the second refresh time period and the third refresh time period. Among them, during the fourth refresh time period and the fifth refresh time period, a signal of the first scan line S1 is an active level signal, and signals of the second scan line S2, the fourth scan line S4, and the light emitting control line E1 are inactive level signals.

In some exemplary implementation modes, as shown in FIG. 79, time when a signal of the fourth scan line S4 is an active level signal occurs between the fifth refresh time period and the third refresh time period, and when the signal of the fourth scan line S4 is an active level signal, a signal of the first scan line S1 is an active level signal, and signals of the second scan line S2, the initialization control line R1, and the light emitting control line E1 are inactive level signals.

In some exemplary implementation modes, as shown in FIG. 79, a duration for which the signal of the fourth scan line S4 is an active level signal is less than a duration of any one of the first refresh time period to the third refresh time period.

In some exemplary implementation modes, as shown in FIG. 79, time when the signal of the first scan line S1 is an active level signal includes: a sixth refresh time period and a seventh refresh time period which sequentially occur at intervals; the first refresh time period and the fourth refresh time period are located within the sixth refresh time period, the second refresh time period is located between the sixth refresh time period and the seventh refresh time period, and time when the signal of the fourth scan line S4 is an active level signal and the fifth refresh time period are located within the seventh refresh time period, wherein during the sixth refresh time period and the seventh refresh time period, the signal of the light emitting control line E1 is an inactive level signal.

In some exemplary implementation modes, as shown in FIG. 79, when the signal of the light emitting control line E1 is an active level signal, signals of the first scan line S1, the second scan line S2, the fourth scan line S4, and the initialization control line R1 are inactive level signals.

In some exemplary implementation modes, as shown in FIG. 79, in the first drive mode, the display frame may further include at least one hold frame during which signals of the first scan line S1 and the fourth scan line S4 are inactive level signals.

In some exemplary implementation modes, as shown in FIG. 79, time when the signal of the second scan line S2 is an active level signal includes a plurality of first hold time periods which sequentially occur at intervals, and time when the signal of the initialization control line R1 is an active level signal includes a plurality of second hold time periods which sequentially occur at intervals; the plurality of first hold time periods and the plurality of second hold time periods are alternately disposed, and a first first hold time period occurs before a first o second hold time period.

In an exemplary embodiment, a working process of a pixel circuit according to an exemplary embodiment is described in conjunction with FIG. 68 and FIG. 79, FIG. 68 is illustrated by taking a case in which the first transistor T1 is an N-type transistor and remaining transistors are P-type transistors as an example. As shown in FIG. 79, the working process of the pixel circuit in a refresh frame may include a first refresh phase to a sixth refresh phase and a light emitting phase.

In the first refresh phase t11, i.e., a first refresh time period, signals of the first scan line S1, the light emitting control line E1, the initialization control line R1, and the fourth scan line S4 are high-level signals, and signals of the second scan line S2 and the third scan line S3 are low-level signals. A signal of the first scan line S1 is a high-level signal, the first transistor T1 is turned on, a signal of the third node N3 is written into the first node N1 through the turned-on first transistor T1, the signals of the second scan line S2 and the third scan line S3 are low-level signals, the third transistor T3 and the seventh transistor T7 are turned on, a signal of the reset voltage terminal DR is written into the second node N2 through the turned-on third transistor T3, the second node N2 is initialized, and an original data voltage in the second node N2 is cleared. The second initial signal Vi2 is written into the anode of the organic light emitting diode through the turned-on seventh transistor T7, the anode of the organic light emitting diode O1 is initialized, and an original data voltage in the anode of the organic light emitting diode is cleared. Signals of the light emitting control line E1, the initialization control line R1, and the fourth scan line S4 are high-level signals, and the second transistor T2, the fourth transistor T4, the fifth transistor T5, and the sixth transistor T6 are turned off. In this phase, the organic light emitting diode O1 does not emit light.

In the second refresh phase t12, i.e., a fourth refresh time period, signals of the first scan line S1, the light emitting control line E1, the second scan line S2, the third scan line S3, and the fourth scan line S4 are high-level signals, and a signal of the initialization control line R1 is a low-level signal. A signal of the first scan line S1 is a high-level signal, the first transistor T1 is continuously turned on, a signal of the third node N3 is written into the first node N1 through the turned-on first transistor T1, the signal of the initialization control line R1 is a low-level signal, the second transistor T2 is turned on, the first initial signal Vi1 is written into the first node N1 through the turned-on second transistor T2, the third node N3, and the turned-on first transistor T1 to initialize the first node N1 and clear an original data voltage in the first node N1.

Since the first node N1 and the second node N2 meet a turning-on condition of the drive transistor T0, the drive transistor T0 is turned on. Signals of the light emitting control line E1, the second scan line S2, the third scan line S3, and the fourth scan line S4 are high-level signals, and the third transistor T3, the fourth transistor T4, the fifth transistor T5, the sixth transistor T6, and the seventh transistor T7 are turned off. In this phase, the organic light emitting diode O1 does not emit light.

In the third refresh phase t13, i.e., a second refresh time period, signals of the light emitting control line E1, the initialization control line R1, and the fourth scan line S4 are high-level signals, and signals of the first scan line S1, the second scan line S2, and the third scan line S3 are low-level signals. A signal of the first scan line S1 is a low-level signal, the first transistor T1 is turned off, signals of the second scan line S2 and the third scan line S3 are low-level signals, the third transistor T3 and the seventh transistor T7 are turned on, a signal of the reset voltage terminal DR is written into the second node N2 through the turned-on third transistor T3 to initialize the second node N2 and clear an original data voltage in the second node N2, and the second initial signal Vi2 is written into the anode of the organic light emitting diode through the turned-on seventh transistor T7 to initialize the anode of the organic light emitting diode O1 and clear an original data voltage in the anode of the organic light emitting diode. The signals of the light emitting control line E1, the initialization control line R1, and the fourth scan line S4 are high-level signals, and the second transistor T2, the fourth transistor T4, the fifth transistor T5, and the sixth transistor T6 are turned off. In this phase, a signal of the first node N1 maintains the first initial signal of a previous phase, and the organic light emitting diode O1 does not emit light.

In the fourth refresh phase t14, i.e., a fifth refresh time period, signals of the first scan line S1, the light emitting control line E1, the second scan line S2, the third scan line S3, and the fourth scan line S4 are high-level signals, and a signal of the initialization control line R1 is a low-level signal. A signal of the first scan line S1 is a high-level signal, the first transistor T1 is continuously turned on, a signal of the third node N3 is written into the first node N1 through the turned-on first transistor T1, the signal of the initialization control line R1 is a low-level signal, the second transistor T2 is turned on, the first initial signal Vi1 is written into the first node N1 through the turned-on second transistor T2, the third node N3, and the turned-on first transistor T1 to initialize the first node N1 and clear an original data voltage in the first node N1. Since the first node N1 and the second node N2 meet a turning-on condition of the drive transistor T0, the drive transistor T0 is turned on. Signals of the light emitting control line E1, the second scan line S2, the third scan line S3, and the fourth scan line S4 are high-level signals, and the third transistor T3, the fourth transistor T4, the fifth transistor T5, the sixth transistor T6, and the seventh transistor T7 are turned off. In this phase, the organic light emitting diode O1 does not emit light.

In the fifth refresh phase t15, signals of the first scan line S1, the light emitting control line E1, the second scan line S2, the third scan line S3, and the initialization control line R1 are high-level signals, a signal of the fourth scan line S4 is a low-level signal, and the data line is written with a data signal. A signal of the first scan line S1 is a high-level signal, the first transistor T1 is continuously turned on, a signal of the third node N3 is written into the first node N1 through the turned-on first transistor T1, a signal of the fourth scan line S4 is a low-level signal, the fourth transistor T4 is turned on, the data signal of the data line D1 is written into the first node N1 through the turned-on fourth transistor T4, the second node N2, the turned-on drive transistors T0, the third node N3, and the turned-on first transistor T1, and a sum of a voltage value Vdata of the data signal of the data line D1 and a threshold voltage Vth of the drive transistor T0 is provided to the first node N1, signals of the light emitting control line E1, the initialization control line R1, the second scan line S2, and the third scan line S3 are high-level signals, and the second transistor T2, the third transistor T3, the fifth transistor T5, the sixth transistor T6, and the seventh transistor T7 are turned off. In this phase, the organic light emitting diode O1 does not emit light.

In the sixth refresh phase t16, i.e., a third refresh time period, signals of the light emitting control line E1, the initialization control line R1, and the fourth scan line S4 are high-level signals, and signals of the first scan line S1, the second scan line S2, and the third scan line S3 are low-level signals. A signal of the first scan line S1 is a low-level signal, the first transistor T1 is turned off, signals of the second scan line S2 and the third scan line S3 are low-level signals, the third transistor T3 and the seventh transistor T7 are turned on, a signal of the reset voltage terminal DR is written into the second node N2 through the turned-on third transistor T3 to initialize the second node N2 and clear an original data voltage in the second node N2, and the second initial signal Vi2 is written into the anode of the organic light emitting diode through the turned-on seventh transistor T7 to initialize the anode of the organic light emitting diode O1 and clear an original data voltage in the anode of the organic light emitting diode. The signals of the light emitting control line E1, the initialization control line R1, and the fourth scan line S4 are high-level signals, and the second transistor T2, the fourth transistor T4, the fifth transistor T5, and the sixth transistor T6 are turned off. In this phase, a signal of the first node N1 maintains a stored signal of a previous phase, and the organic light emitting diode O1 does not emit light.

In the light emitting phase t17, signals of the initialization control line R1, the second scan line S2, the third scan line S3, and the fourth scan line S4 are high-level signals, and signals of the light emitting control line E1 and the first scan line S1 are low-level signals. A signal of the first scan line S1 is a low-level signal, the first transistor T1 is turned off, a signal of the light emitting control line E1 is a low-level signal, the fifth transistor and the sixth transistor T6 are turned on, and a power supply voltage outputted by the high voltage signal VDD provides a drive signal to the anode of the organic light emitting diode O1 through the turned-on fifth transistor T5, the second node N2, the drive transistor T0, the third node N3, and the turned-on sixth transistor T6 to drive the organic light emitting diode O1 to emit light. In this phase, the signals of the initialization control line R1, the second scan line S2, the third scan line S3, and the fourth scan line S4 are high-level signals, and the first transistor T1, the second transistor T2, the third transistor T3, the fourth transistor T4, and the seventh transistor T7 are turned off.

In a drive process of the pixel circuit, a drive current flowing through the drive transistor T0 is determined by a voltage difference between the gate and the source of the drive transistor T3. Since a voltage of the first node N1 is Vdata+Vth, the drive current of the drive transistor T0 is as follows.

$$I=K^*(Vgs-Vth)^2=K^*[(V\text{data}+Vth-Vdd)-Vth]^2=K^*[(V\text{data}-Vdd)]^2$$

Among them, I is the drive current flowing through the drive transistor T0, i.e., the drive current for driving the organic light emitting diode O1, K is a constant, Vgs is the voltage difference between the gate and the source of the drive transistor T0, Vth is the threshold voltage of the drive transistor T0, Vdata is a voltage value of a data signal of the data line D1, and Vdd is a voltage value of a high voltage signal.

It may be seen from the above formula that the drive current I flowing through the organic light emitting diode O1 has nothing to do with the threshold voltage Vth of the drive transistor T0, which eliminates an influence of the threshold voltage Vth of the drive transistor T0 on the drive current I and ensures uniformity of brightness.

According to the pixel circuit of the embodiment of the present disclosure, by making the driver transistor in a strong bias voltage state in the third refresh phase of the refresh frame and adding a large strong bias voltage to the driver transistor, hysteresis may be improved, phenomena of afterimage and trailing of the display substrate may be improved, and display performance of the display substrate is improved.

As shown in FIG. 79, the working process of the pixel circuit in the hold frame may include a plurality of first hold phases and a plurality of second hold phases, and the first hold phases and the second hold phases are alternately disposed.

In a first hold phase t21, i.e., a first hold time period, signals of the light emitting control line E1, the initialization control line R1, and the fourth scan line S4 are high-level signals, and signals of the first scan line S1, the second scan line S2, and the third scan line S3 are low-level signals. A signal of the first scan line S1 is a low-level signal, the first transistor T1 is turned off, signals of the second scan line S2 and the third scan line S3 are low-level signals, the third transistor T3 and the seventh transistor T7 are turned on, a signal of the reset voltage terminal DR is written into the second node N2 through the turned-on third transistor T3 to initialize the second node N2 and clear an original data voltage in the second node N2, and the second initial signal Vi2 is written into the anode of the organic light emitting diode O1 through the turned-on seventh transistor T7 to initialize the anode of the organic light emitting diode O1 and clear an original data voltage in the anode of the organic light emitting diode O1. The signals of the light emitting control line E1, the initialization control line R1, and the fourth scan line S4 are high-level signals, and the second transistor T2, the fourth transistor T4, the fifth transistor T5, and the sixth transistor T6 are turned off.

In a second hold phase, i.e., a second hold time period, signals of the light emitting control line E1, the second scan line S2, the third scan line S3, and the fourth scan line S4 are high-level signals, and signals of the first scan line S1 and the initialization control line R1 are low-level signals. A signal of the first scan line S1 is a low-level signal, the first transistor T1 is turned off, a signal of the initialization control line R1 is a low-level signal, the second transistor T2 is turned on, and the first initial signal Vi1 is written into the third node N3 through the turned-on second transistor T2 to initialize the third node N3 and clear an original data voltage in the third node N3. The signals of the light emitting control line E1, the second scan line S2, the third scan line S3, and the fourth scan line S4 are high-level signals, and the first transistor T1, the third transistor T3, the fourth transistor T4, the fifth transistor T5, the sixth transistor T6 and the seventh transistor T7 are turned off.

| Afterimage | Minimum value | Average value | Maximum value |
|---|---|---|---|
| 0 s JNCD (Timing 1) | 1.77 | 2.37 | 3.09 |
| 0 s JNCD (Timing 2) | 0.33 | 0.69 | 0.84 |
| 10 s JNCD (Timing 1) | 0.73 | 0.97 | 1.15 |
| 10 s JNCD (Timing 2) | 0.09 | 0.18 | 0.22 |
| 15 s JNCD (Timing 1) | 0.63 | 0.84 | 0.98 |
| 15 s JNCD (Timing 2) | 0.08 | 0.17 | 0.22 |

As shown in the above table, timing 1 refers to the working process of the pixel circuit without including a third refresh phase, and timing 2 refers to the working process of the pixel circuit provided in FIG. 79. JNCD is a standard for measuring color accuracy, the smaller the value is, the more accurate the color display is. 0s JNCD is color accuracy of the display substrate when display time is 0s, 10s JNCD is color accuracy of the display substrate when the display time is 10s, and 15s JNCD is color accuracy of the display substrate when the display time is 15s. As shown in the above table, a minimum value, an average value, and a maximum value of the display substrate at 0s JNCD when timing 2 is adopted are smaller than a minimum value, an average value, and a maximum value of the display substrate at 0s JNCD when timing 1 is adopted, a minimum value, an average value, and a maximum value of the display substrate at 10s JNCD when timing 2 is adopted are smaller than a minimum value, an average value, and a maximum value of the display substrate at 10s JNCD when timing 1 is adopted, and a minimum value, an average value, and a maximum value of the display substrate at 15s JNCD when timing 2 is adopted are smaller than a minimum value, an average value, and a maximum value of the display substrate at 15s JNCD when timing 1 is adopted, that is, the color accuracy of the display substrate when timing 2 is adopted is higher than that when timing 1 is adopted. The minimum value, the average value, and the maximum value of the display substrate at 0s JNCD when timing 2 is adopted are greater than the minimum value, the average value, and the maximum value of the display substrate at 10s JNCD when timing 2 is adopted, the minimum value, the average value, and the maximum value of the display substrate at 10s JNCD when timing 2 is adopted are greater than or equal to the minimum value, the average value, and the maximum value of the display substrate at 15s JNCD when timing 2 is adopted, that is, when timing 2 is adopted, the color accuracy of the display substrate becomes higher and higher with increase of display time. Therefore, the working process of the pixel circuit according to the embodiment of the present disclosure improves afterimage of the display substrate and enhances a display effect of the display substrate.

| Trailing | 500 nits | 2 nits |
|---|---|---|
| FFR2 | 98% | 89% |
| FFR1 | 84% | 54% |

As shown in the above table, FFR1 is a trailing parameter of the display substrate when timing 1 is adopted, and FFR2 is a trailing parameter of the display substrate when timing 2 is adopted, the above table shows trailing parameters under different brightness (such as 500 nits and 2 nits). The larger a value of a trailing parameter is, the better the display effect of the display substrate is. As shown in the above table, under same brightness, a value of FFR2 is greater than that of FFR1, and when same timing is adopted, the greater the brightness of the display substrate is, the greater the value of FFR2 is, that is, the higher the brightness is, the better the display effect of the display substrate is. Therefore, the working process of the pixel circuit according to the embodiment of the present disclosure improves trailing of the display substrate and enhances the display effect of the display substrate.

In some exemplary embodiments, when the working timing provided in FIG. 79 is applicable to pixel circuits provided in FIG. 6, FIG. 7, FIG. 12, and FIG. 14, a signal of the third reset signal terminal Re3 is an active level signal when a signal of the first reset signal terminal Re1 in FIG. 6, FIG. 7, FIG. 12, and FIG. 14 is an active level signal, and the signal of the third reset signal terminal Re3 is an inactive level signal when the signal of the third reset signal terminal Re1 is an inactive level signal. A working timing of the first reset signal terminal Re1 in FIG. 6, FIG. 7, FIG. 12, and FIG. 14 is the same as that of the third scan line S3 in FIG. 79, a working timing of the first gate drive signal terminal G1 in FIG. 6, FIG. 7, FIG. 12, and FIG. 14 is the same as that of the fourth scan line S4 in FIG. 79, a working timing of the second gate drive signal terminal G2 in FIG. 6, FIG. 7, FIG. 12, and FIG. 14 is the same as that of the first scan line S1 in FIG. 79, and a working timing of the enabling signal terminal EM in FIG. 6, FIG. 7, FIG. 12, and FIG. 14 is the same as that of the light emitting control line E1 in FIG. 79.

In some exemplary embodiments, when the working timing provided in FIG. 79 is applicable to the pixel circuit provided in FIG. 38*a*, a signal of the second light emitting control signal line EM2 is an active level signal when a signal of the first light emitting control signal line EM1 in FIG. 38*a* is an active level signal, the signal of the second light emitting control signal line EM2 is an inactive level signal when the signal of the first light emitting control signal line EM1 is an inactive level signal, a signal of the second reset control signal line Reset2 is an active level signal when a signal of the first reset control signal line Reset1 is an active level signal, the signal of the second reset control signal line Reset2 is an inactive level signal when the signal of the first reset control signal line Reset1 is an inactive level signal, a working timing of the first reset control signal line Reset1 in FIG. 38*a* is the same as that of the second scan line S2 in FIG. 79, a working timing of the first scan signal line G1 in FIG. 38*a* is the same as that of the first scan line S1 in FIG. 79, a working timing of the second scan signal line G2 in FIG. 38*a* is the same as that of the fourth scan line S4 in FIG. 79, and a working timing of the first light emitting control signal line EM1 in FIG. 38*a* is the same as that of the light emitting control line E1 in FIG. 79.

In some exemplary embodiments, when the working timing provided in FIG. 79 is applicable to pixel circuits provided in FIG. 50 and FIG. 52 to FIG. 54, a signal of the third scan line S3 in FIG. 50 and FIG. 52 to FIG. 54 is an active level signal, a signal of the fourth scan line S4 is an active level signal, the signal of the third scan line S3 is an inactive level signal, the signal of the fourth scan line S4 is an inactive level signal, a working timing of the third scan line S3 in FIG. 50 and FIG. 52 to FIG. 54 is the same as that of the second scan line S2 in FIG. 79, a working timing of the second scan line S2 in FIG. 50 and FIG. 52 to FIG. 54 is the same as that of the fourth scan line S4 in FIG. 79, and the working timing of the second scan line S2 in FIG. 50 and FIG. 52 to FIG. 54 is the same as that of the first scan line S1 in FIG. 79, and a working timing of the light emitting control line E1 in FIG. 50 and FIG. 52 to FIG. 54 is the same as that of the light emitting control line E1 in FIG. 79.

In some exemplary embodiments, a working timing of a signal line A and a working timing of a signal line B mean that a signal of the signal line A and a signal of the signal line B are both active level signals at the same time, and are both inactive level signals at the same time, and do not mean that the signal of the signal line A and the signal of the signal line B are exactly the same, which is different from types of transistors connected with the signal line A and the signal line B.

An embodiment of the present disclosure also provides a drive method of a pixel circuit, which is configured to drive the pixel circuit. A working process of the pixel circuit in a refresh frame may include: a first refresh phase, a third refresh phase, and a sixth refresh phase which sequentially occur, wherein a first refresh time period is the first refresh phase, a second refresh time period is the third refresh phase, and a third refresh time period is the sixth refresh phase.

In the first refresh phase, a first transistor writes a signal of a third node into a first node in response to a signal of a first scan line, a third transistor writes a signal of a reset voltage terminal into a second node in response to a signal of a second scan line, and a seventh transistor writes a second initial signal into an anode of an organic light emitting diode in response to a signal of a third scan line.

In the third refresh phase and the sixth refresh phase, the third transistor writes the signal of the reset voltage terminal into the second node in response to the signal of the second scan line, and the seventh transistor writes the second initial signal into the anode of the organic light emitting diode in response to the signal of the third scan line.

The pixel circuit is the pixel circuit according to any one of the foregoing embodiments, and an implementation principle and implementation effects are similar, so details will not be repeated here.

In some exemplary implementation modes, the working process of the pixel circuit in the refresh frame may further include: a second refresh phase, a fourth refresh phase, a fifth refresh phase, and a light emitting phase which sequentially occur, wherein a fourth refresh time period is the second refresh phase, a fifth refresh time period is the fourth refresh phase, time when a signal of a fourth scan line is an active level signal is the fifth refresh phase, time when a signal of a light emitting control line is an active level signal is the light emitting phase, and the light emitting phase occurs after the sixth refresh phase.

In the second refresh phase and the fourth refresh phase, the first transistor writes a signal of the third node into the first node in response to a signal of the first scan line, and the second transistor writes a first initial voltage into the third node in response to a signal of an initialization control line.

In the fifth refresh phase, the first transistor writes the signal of the third node into the first node in response to the signal of the first scan line, and the fourth transistor writes a signal of a data line into the second node in response to a signal of the fourth scan line.

In the light emitting phase, the third transistor generates a drive current between the second node and the third node in response to a control signal of the first node, and the fifth transistor and the sixth transistor write a high voltage signal to the second node and write a signal of the third node into the anode of the organic light emitting diode in response to a signal of the light emitting control line.

In some exemplary implementation modes, in the first drive mode, the display frame may further include at least one hold frame, and the working process of the pixel circuit in the hold frame includes: a plurality of first hold phases and a plurality of second hold phases, a first hold time period is a first hold phase and a second hold time period is a second hold phase.

In the first hold phase, the third transistor writes a signal of the reset voltage terminal into the second node in response to a signal of the second scan line, and the seventh transistor writes a second initial voltage into the anode of the organic light emitting diode in response to a signal of the third scan line.

In the second hold phase, the second transistor writes a first initial signal into the third node in response to a signal of the initialization control line.

Figure 80:
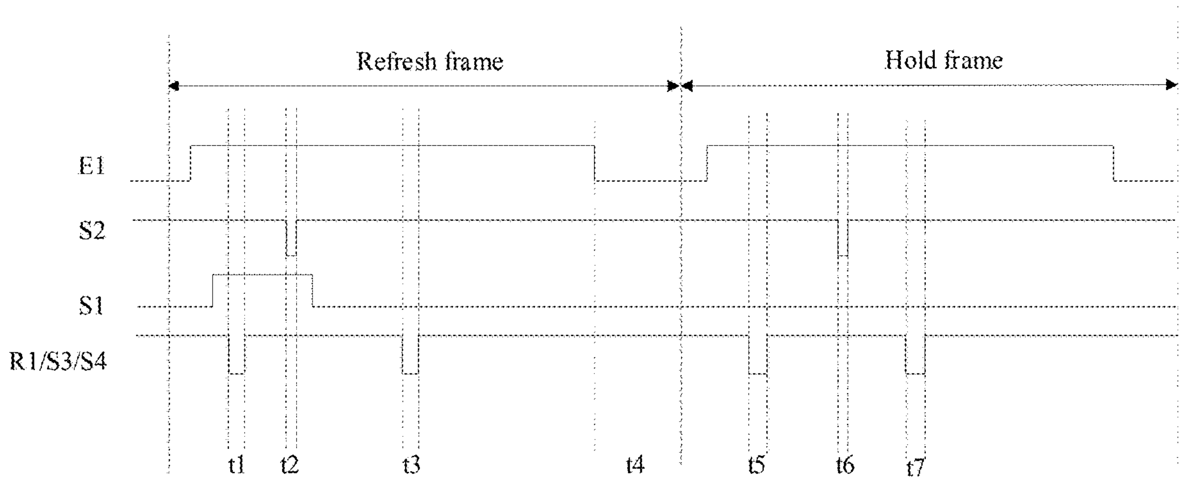
FIG. 80 is a working timing diagram of another pixel circuit.

FIG. 80 is a working timing diagram of another pixel circuit. In some exemplary embodiments, the working timing provided in FIG. 80 is suitable for the pixel circuit provided in FIG. 6, the pixel circuit provided in FIG. 7, the pixel circuit provided in FIG. 11, the pixel circuit provided in FIG. 12, the pixel circuit provided in FIG. 14, the pixel circuit provided in FIG. 38*a*, the pixel circuit provided in FIG. 38*b*, the pixel circuit provided in FIG. 50, the pixel circuit provided in FIG. 52, the pixel circuit provided in FIG. 53, the pixel circuit provided in FIG. 54, the pixel circuit provided in FIG. 68, the pixel circuit provided in FIG. 72, and the pixel circuit provided in FIG. 75. FIG. 80 is illustrated by taking the working timing of the pixel circuit provided in FIG. 50 and FIG. 52 to FIG. 54 as an example.

Taking FIG. 50 as an example, as shown in FIG. 50 and FIG. 80, the pixel circuit according to the embodiment of the present disclosure is disposed in a display substrate, the display substrate includes a first drive mode and a second drive mode, a refresh rate of the first drive mode is less than a refresh rate of the second drive mode, content displayed by the display substrate includes a plurality of display frames, in the first drive mode, a display frame includes a refresh frame and at least one hold frame, in the second drive mode, the display frame includes a refresh frame, in the pixel circuit, a first control circuit includes a first transistor T1; a gate of the first transistor T1 is electrically connected with a first scan line S1; a compensation control circuit includes a second transistor T2; a gate of the second transistor T2 is electrically connected with a second scan line S2; a first initialization circuit includes a third transistor T3; a gate of the third transistor T3 is electrically connected with an initialization control line R1; a reset circuit includes a fourth transistor T4; a gate of the fourth transistor T4 is electrically connected with a third scan line S3; a light emitting control circuit includes a fifth transistor T5 and a sixth transistor T6; gates of the fifth transistor T5 and the sixth transistor T6 are electrically connected with a light emitting control line E1; a second initialization circuit includes a seventh transistor T7; a gate of the seventh transistor T7 is electrically connected with a fourth scan line S4; a data writing circuit includes an eighth transistor T8; a gate of the eighth transistor T8 is electrically connected with the second scan line S2, and a drain of the eighth transistor T8 is electrically connected with a data line D1.

In an exemplary embodiment, the display substrate may further include a first drive chip and a second drive chip, wherein the first drive chip is configured to generate a data signal, the second drive chip is configured to generate an adjustment signal, and the first drive chip and the second drive chip are different chips. The first driver chip may be a source drive chip.

As shown in FIG. 80, a signal of the second scan line S2 is an active level signal during a portion of the refresh frame and a portion of the hold frame, a signal of the data line D1 is a data signal during a portion of the refresh frame, and the signal of the data line D1 is an adjustment signal during a portion of the hold frame.

In an exemplary embodiment, a voltage value of the adjustment signal may be adjusted according to actual requirements, which is not limited in present disclosure.

In an exemplary embodiment, the first drive mode may be referred to as a low frequency drive mode and the second drive mode may be referred to as a high frequency drive mode.

In an exemplary embodiment, the refresh rate refers to a quantity of times that the display substrate refreshes data in one second. A refresh rate of a first drive mode set by a same display substrate is fixed, and a refresh rate of a first drive mode set by different display substrates may be different. Among them, the refresh rate of the display substrate in the first drive mode may range from 1 Hz to 60 Hz, and, for example, the refresh rate in the first drive mode may be about 10 Hz.

In an exemplary embodiment, in the display substrate, the first drive mode and the second drive mode will be adopted for alternately displaying function in order to reduce power consumption of a product. In the first drive mode, the display substrate refreshes display data in a refresh frame and maintains the display data refreshed in the refresh frame in a hold frame. In the second drive mode, a display frame may include a refresh frame but not a hold frame. In the second drive mode, the display substrate refreshes display data in a refresh frame. A refresh rate of the display substrate in the second drive mode may range from 60 Hz to 480 Hz and, for example, the refresh rate in the first drive mode may be about 120 Hz.

In the present disclosure, a signal of the second scan line S2 is an active level signal during a portion of a hold frame and a signal of the data line D1 is an adjustment signal during a portion of the hold frame, so that a difference between signals of a refresh frame and the hold frame at the second node in the first drive mode is reduced, and a voltage difference of a drive transistor in the refresh frame and the hold frame is reduced, which may improve a risk of flicker of the display substrate in the first drive mode and a flicker problem occurring when a high frequency drive mode and a low frequency drive mode are switched, and improve display performance of the display substrate.

In some exemplary implementation modes, as shown in FIG. 80, signals of the third scan line S3, the fourth scan line S4, and the initialization control line R1 are the same.

In some exemplary implementation modes, as shown in FIG. 80, in a refresh frame, when a signal of the second scan line S2 is an active level signal, a signal of the first scan line S1 is an active level signal, and signals of the third scan line S3 and the light emitting control line E1 are inactive level signals.

In some exemplary implementation modes, as shown in FIG. 80, a duration for which a signal of the second scan line S2 is an active level signal is less than a duration for which a signal of the first scan line S1 is an active level signal, and is less than a duration for which a signal of the third scan line S3 is an active level signal.

In some exemplary implementation modes, as shown in FIG. 80, in a refresh frame, time when a signal of the third scan line S3 is an active level signal includes a first time period and a second time period which sequentially occur at intervals. During the first time period, a signal of the first scan line S1 is an active level signal, and signals of the second scan line S2 and the light emitting control line E1 are inactive level signals; during the second time period, signals of the first scan line S1, the second scan line S2, and the light emitting control line E1 are inactive level signals.

In some exemplary implementation modes, as shown in FIG. 80, a sum of a duration of the first time period and a duration of the second time period is less than a duration for which a signal of the first scan line S1 is an active level signal.

In some exemplary implementation modes, as shown in FIG. 80, in a refresh frame and a hold frame, signals of the first scan line S1, the second scan line S2, and the third scan line S3 are inactive level signals when a signal of the light emitting control line E1 is an active level signal.

In some exemplary implementation modes, as shown in FIG. 80, in a hold frame, a signal of the first scan line S1 is an inactive level signal.

In some exemplary implementation modes, as shown in FIG. 80, in a hold frame, time when a signal of the third scan line S3 is an active level signal includes a third time period and a fourth time period which sequentially occur at intervals.

In the third time period and the fourth time period, signals of the third scan line S3 and the light emitting control line E1 are inactive level signals, and time when a signal of the second scan line S2 is an active level signal is between the third time period and the fourth time period.

In an exemplary embodiment, a working process of a pixel circuit according to an exemplary embodiment is described in conjunction with FIG. 50 and FIG. 80, FIG. 50 is illustrated by taking a case where the first transistor T1 is an N-type transistor and remaining transistors are P-type transistors as an example. As shown in FIG. 80, the working process of the pixel circuit in a refresh frame may include a first refresh-reset phase, a first data writing phase, a second refresh-reset phase, and a light emitting phase.

In the first refresh-reset phase t1, i.e., a first time period, signals of the first scan line S1, the second scan line S2, and the light emitting control line E1 are high-level signals, and signals of the initialization control line R1, the third scan line S3, and the fourth scan line S4 are low-level signals. A signal of the first scan line S1 is a high-level signal, the first transistor T1 is turned on, a signal of the connection node N0 is written into the first node N1 through the turned-on first transistor T1, signals of the initialization control line R1, the third scan line S3, and the fourth scan line S4 are low-level signals, the third transistor T3, the fourth transistor T4, and the seventh transistor T7 are turned on, the first initialization signal Vi1 is written into the first node N1 through the turned-on third transistor T3, the connection node N0, and the turned-on first transistor T1 to initialize the first node N1 and clear an original data voltage in the first node N1, a signal of the reset voltage terminal DR is written into the second node N2 through the turned-on fourth transistor T4 to initialize the second node N2 and clear an original data voltage in the second node N2. The second initial signal Vi2 is written into the anode of the organic light emitting diode O1 through the turned-on seventh transistor T7 to initialize the anode of the organic light emitting diode O1 and clear an original data voltage in the anode of the organic light emitting diode O1. Since the first node N1 and the second node N2 meet a turning-on condition of the drive transistor T0, the drive transistor T0 is turned on, signals of the second scan line S2 and the light emitting control line E1 are high-level signals, the second transistor T2, the fifth transistor T5, the sixth transistor T6, and the eighth transistor T8 are turned off, and in this phase, the organic light emitting diode O1 does not emit light.

In the first data writing phase t2, signals of the first scan line S1, the initialization control line R1, the third scan line S3, the fourth scan line S4, and the light emitting control line E1 are high-level signals, a signal of the second scan line S2 is a low-level signal, and the data line D1 is written with a data signal. A signal of the first scan line S1 is a high-level signal, the first transistor T1 is continuously turned on, a signal of the connection node N0 is written into the first node N1 through the turned-on first transistor T1, a signal of the second scan line S2 is a low-level signal, the second transistor T2 and the eighth transistor T8 are turned on, the data signal of the data line D1 is written into the first node N1 through the turned-on eighth transistor T8, the second node N2, the turned-on drive transistor T0, the third node N3, the turned-on second transistor T2, the connection node N0, and the turned-on first transistor T1, and a sum of a voltage value Vdata of the data signal of the data line D1 and a threshold voltage Vth of the drive transistor T0 is provided to the first node N1, signals of the initialization control line R1, the third scan line S3, the fourth scan line S4, and the light emitting control line E1 are high-level signals, the third transistor T3, the fourth transistor T4, the fifth transistor T5, the sixth transistor T6, and the seventh transistor T7 are turned off, and the organic light emitting diode O1 does not emit light in this phase.

In the second refresh-reset phase t3, i.e., a second time period, signals of the second scan line S2 and the light emitting control line E1 are high-level signals, and signals of the first scan line S1, the initialization control line R1, the third scan line S3, and the fourth scan line S4 are low-level signals. A signal of the first scan line S1 is a low-level signal, the first transistor T1 is turned off, signals of the initialization control line R1, the third scan line S3, and the fourth scan line S4 are low-level signals, the third transistor T3, the fourth transistor T4, and the seventh transistor T7 are turned on, the first initialization signal Vi1 is written into the connection node NO through the turned-on third transistor T3 to initialize the connection node N0 and clear an original data voltage in the connection node N0, a signal of the reset voltage terminal DR is written into the second node N2 through the turned-on fourth transistor T4 to initialize the second node N2 and clear an original data voltage in the second node N2. The second initial signal Vi2 is written into the anode of the organic light emitting diode O1 through the turned-on seventh transistor T7 to initialize the anode of the organic light emitting diode O1 and clear an original data voltage in the anode of the organic light emitting diode O1. Signals of the second scan line S2 and the light emitting control line E1 are high-level signals, and the second transistor T2, the fifth transistor T5, the sixth transistor T6, and the eighth transistor T8 are turned off. In this phase, the organic light emitting diode O1 does not emit light.

In the light emitting phase t4, signals of the second scan line S2, the initialization control line R1, the third scan line S3, and the fourth scan line S4 are high-level signals, and signals of the first scan line S1 and the light emitting control line E1 are low-level signals. A signal of the first scan line S1 is a low-level signal, the first transistor T1 is turned off, a signal of the light emitting control line E1 is a low-level signal, the fifth transistor T5 and the sixth transistor T6 are turned on, and a power supply voltage outputted by the high voltage signal VDD provides a drive signal to the anode of the organic light emitting diode O1 through the turned-on fifth transistor T5, the second node N2, the turned-on drive transistor T0, the third node N3, and the turned-on sixth transistor T6 to drive the organic light emitting diode O1 to emit light. In this phase, signals of the second scan line S2, the initialization control line R1, the third scan line S3, and the fourth scan line S4 are high-level signals, and the first transistor T1, the second transistor T2, the third transistor T3, the fourth transistor T4, the seventh transistor T7, and the eighth transistor T8 are turned off.

In a drive process of the pixel circuit, a drive current flowing through the drive transistor T0 is determined by a voltage difference between the gate and the source of the drive transistor T0. Since a voltage of the first node N1 is Vdata+Vth, the drive current of the drive transistor T0 is as follows.

$$I=K*(Vgs-Vth)^2=K*[(V\text{data}+Vth-Vdd)-Vth]^2=K*[(V\text{data}-Vdd)]^2$$

Among them, I is the drive current flowing through the drive transistor T0, i.e., a drive current for driving the organic light emitting diode O1, K is a constant, Vgs is the voltage difference between the gate and the source of the drive transistor T0, Vth is the threshold voltage of the drive transistor T0, Vdata is a voltage value of the data signal of the data line D1, and Vdd is a voltage value of the high voltage signal.

It may be seen from the above formula that the drive current I flowing through the organic light emitting diode O1 has nothing to do with the threshold voltage Vth of the drive transistor T0, which eliminates an influence of the threshold voltage Vth of the drive transistor T0 on the drive current I and ensures uniformity of brightness.

As shown in FIG. 80, the working process of the pixel circuit in a hold frame may include a first hold-reset phase, a second data writing phase, and a second hold-reset phase which occur sequentially.

In the first hold-reset phase t5, i.e., a third time period, signals of the second scan line S2 and the light emitting control line E1 are high-level signals, and signals of the first scan line S1, the initialization control line R1, the third scan line S3, and the fourth scan line S4 are low-level signals. A signal of the first scan line S1 is a low-level signal, the first transistor T1 is turned off, signals of the initialization control line R1, the third scan line S3, and the fourth scan line S4 are low-level signals, the third transistor T3, the fourth transistor T4, and the seventh transistor T7 are turned on, the first initialization signal Vi1 is written into the connection node N0 through the turned-on third transistor T3 to initialize the connection node N0 and clear an original data voltage in the connection node N0, a signal of the reset voltage terminal DR is written into the second node N2 through the turned-on fourth transistor T4 to initialize the second node N2 and clear an original data voltage in the second node N2. The second initial signal Vi2 is written into the anode of the organic light emitting diode O1 through the turned-on seventh transistor T7 to initialize the anode of the organic light emitting diode O1 and clear an original data voltage in the anode of the organic light emitting diode O1. Signals of the second scan line S2 and the light emitting control line E1 are high-level signals, and the second transistor T2, the fifth transistor T5, the sixth transistor T6, and the eighth transistor T8 are turned off.

In the second data writing phase t6, signals of the initialization control line R1, the third scan line S3, the fourth scan line S4, and the light emitting control line E1 are high-level signals, signals of the first scan line S1 and the second scan line S2 are low-level signals, and the data line D1 is written with an adjustment signal. A signal of the first scan line S1 is a low-level signal, the first transistor T1 is turned off, a signal of the second scan line S2 is a low-level signal, the second transistor T2 and the eighth transistor T8 are turned on, the adjustment signal of the data line D1 is written into the connection node N0 through the turned-on eighth transistor T8, the second node N2, the turned-on drive transistor T0, the third node N3, and the turned-on second transistor T2, signals of the initialization control line R1, the third scan line S3, the fourth scan line S4, and the light emitting control line E1 are high-level signals, and the third transistor T3, the fourth transistor T4, the fifth transistor T5, the sixth transistor T6, and the seventh transistor T7 are turned off.

In the second hold-reset phase t7, i.e., a fourth time period, signals of the second scan line S2 and the light emitting control line E1 are high-level signals, and signals of the first scan line S1, the initialization control line R1, the third scan line S3, and the fourth scan line S4 are low-level signals. A signal of the first scan line S1 is a low-level signal, the first transistor T1 is turned off, signals of the initialization control line R1, the third scan line S3, and the fourth scan line S4 are low-level signals, the third transistor T3, the fourth transistor T4, and the seventh transistor T7 are turned on, the first initialization signal Vi1 is written into the connection node NO through the turned-on third transistor T3 to initialize the connection node N0 and clear an original data voltage in the connection node N0, a signal of the reset voltage terminal DR is written into the second node N2 through the turned-on fourth transistor T4 to initialize the second node N2 and clear an original data voltage in the second node N2. The second initial signal Vi2 is written into the anode of the organic light emitting diode O1 through the turned-on seventh transistor T7 to initialize the anode of the organic light emitting diode O1 and clear an original data voltage in the anode of the organic light emitting diode O1. Signals of the second scan line S2 and the light emitting control line E1 are high-level signals, and the second transistor T2, the fifth transistor T5, the sixth transistor T6, and the eighth transistor T8 are turned off.

Figure 81:
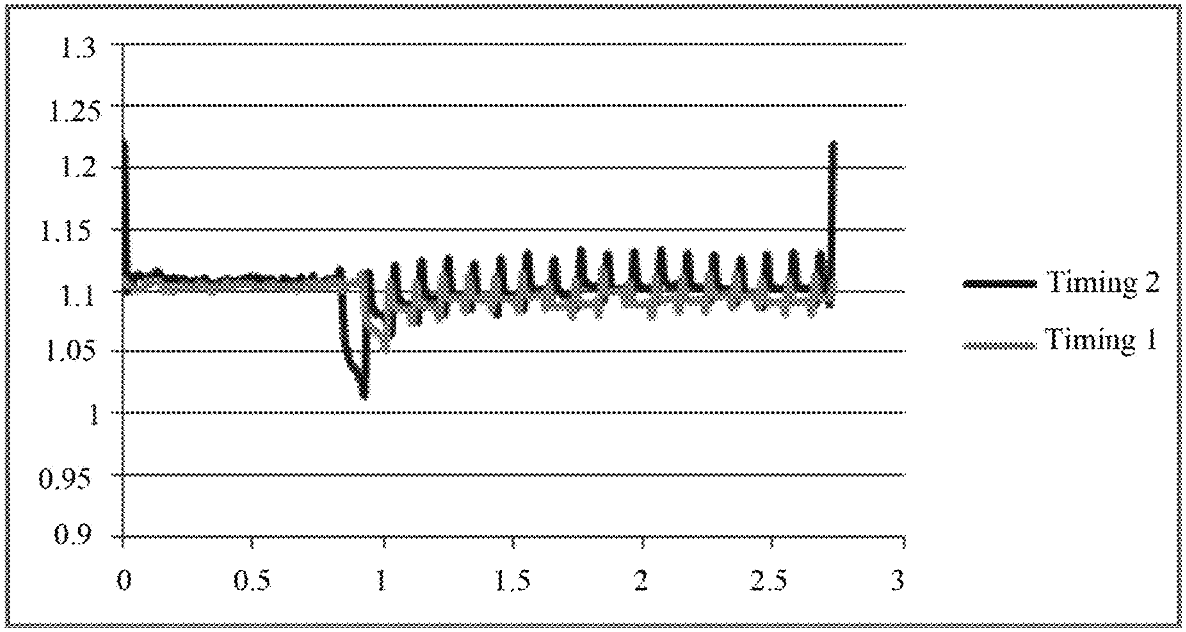
FIG. 81 is a comparison diagram of brightness waveforms at a moment of high and low frequency switching under different timings.

FIG. 81 is a comparison diagram of brightness waveforms at a moment of high and low frequency switching under different timings. As shown in FIG. 81, timing 1 is a working process of the pixel circuit provided in FIG. 80, and timing 2 is a working process of the pixel circuit when a signal of the second scan line in a hold frame is an inactive level signal. As shown in FIG. 81, compared with a brightness waveform at a moment of high and low frequency switching corresponding to timing 2, a brightness waveform at a moment of high and low frequency switching corresponding to timing 1 is relatively uniform as a whole and has relatively high stability, which improves a flicker phenomenon of the display substrate.

| | | Timing 2 | | Timing 1 | |
|---|---|---|---|---|---|
| | | Flicker parameter | Visual effect | Flicker parameter | Visual effect |
| Norl | 255 | −65.37 | Insensible | −71.91 | Insensible |
| | 128 | −60.13 | Insensible | −63.44 | Insensible |

-continued

| | | Timing 2 | | Timing 1 | |
|---|---|---|---|---|---|
| | | Flicker parameter | Visual effect | Flicker parameter | Visual effect |
| | 32 | −60.70 | Insensible | −54.56 | Insensible |
| | 16 | −59.46 | First brightness | −50.34 | Insensible |
| Nor2 | 255 | −57.31 | Second brightness | −72.76 | Insensible |
| | 128 | −56.22 | First brightness | −63.01 | Insensible |
| | 32 | −53.16 | Second brightness | −53.54 | Insensible |
| | 16 | −47.92 | Second brightness | −49.48 | Insensible |
| Nor5 | 255 | −54.95 | Second brightness | −70.48 | Insensible |
| | 128 | −51.76 | Second brightness | −59.83 | Insensible |
| | 32 | −48.37 | First brightness | −52.28 | First brightness |
| | 16 | −43.94 | First brightness | −48.33 | First brightness |
| Nor8 | 255 | −43.36 | First brightness | −62.21 | Insensible |
| | 128 | −41.65 | First brightness | −56.07 | Insensible |
| | 32 | −33.53 | First brightness | −38.76 | First brightness |
| | 16 | −31.17 | First brightness | −32.72 | First brightness |

As shown in the above table, Nor1, Nor2, Nor5, and Nor8 are different brightness standards, and 255, 128/32, and 16 are gray scales under different brightness standards. The smaller the Flicker parameter value is, the less obvious the flicker is. A visual effect refers to a flicker effect that may be seen by a human eye, insensible means that the human eye can't see flicker, and the first brightness and second brightness refer to flicker that may be seen by the human eye. A flicker degree of the first brightness is less than that of the second brightness. For timing 1 and timing 2, under a same brightness standard, the larger the gray scale value is, the smaller the Flicker parameter is. Compared with timing 2, timing 1 has a better visual effect under different brightness standards and different gray scales. Therefore, the pixel circuit according to the present disclosure may improve a display effect of the display substrate.

In some exemplary embodiments, when the working timing provided in FIG. 80 is suitable for pixel circuits provided in FIG. 6, FIG. 7, FIG. 12, and FIG. 14, a signal of the third reset signal terminal Re3 is an active level signal when a signal of the first reset signal terminal Re1 in FIG. 6, FIG. 7, FIG. 12, and FIG. 14 is an active level signal, and the signal of the third reset signal terminal Re3 is an inactive level signal when the signal of the first reset signal terminal Re1 is an inactive level signal, a signal of the second gate drive signal terminal G2 is an active level signal when a signal of the first gate drive signal terminal G1 is an active level signal, and the signal of the second gate drive signal terminal G2 is an inactive level signal when the signal of the first gate drive signal terminal G1 is an inactive level signal. A working timing of the first reset signal terminal Re1 in FIG. 6, FIG. 7, FIG. 12, and FIG. 14 is the same as that of the initialization control line R1 in FIG. 80, a working timing of the first gate drive signal terminal G1 in FIG. 6, FIG. 7, and FIG. 12 is the same as that of the second scan line S2 in FIG. 80, a working timing of the enabling signal terminal EM in FIG. 6, FIG. 7, FIG. 12, and FIG. 14 is the same as that of the light emitting control line E1 in FIG. 80, and a working timing of the first scan line S1 in FIG. 80 is not included in FIG. 6, FIG. 7, FIG. 12, and FIG. 14.

In some exemplary embodiments, when the working timing provided in FIG. 80 is suitable for the pixel circuit provided in FIG. 11, a signal of the third reset signal terminal Re3 is an active level signal when a signal of the first reset signal terminal Re1 in FIG. 11 is an active level signal, and the signal of the third reset signal terminal Re3 is an inactive level signal when the signal of the third reset signal terminal Re1 is an inactive level signal, a signal of the second gate drive signal terminal G2 is an active level signal when a signal of the first gate drive signal terminal G1 is an active level signal, and the signal of the second gate drive signal terminal G2 is an inactive level signal when the signal of the first gate drive signal terminal G1 is an inactive level signal. A working timing of the first reset signal terminal Re1 in FIG. 11 is the same as that of the initialization control line R1 in FIG. 80, a working timing of the first gate drive signal terminal G1 in FIG. 11 is the same as that of the second scan line S2 in FIG. 80, a working timing of the enabling signal terminal EM in FIG. 11 is the same as that of the light emitting control line E1 in FIG. 80, and working timings of the first scan line S1 and the third scan line S3 in FIG. 80 are not included in FIG. 11.

In some exemplary embodiments, when the working timing provided in FIG. 80 is suitable for the pixel circuit provided in FIG. 38*a*, a signal of the second light emitting control signal line EM2 is an active level signal when a signal of the first light emitting control signal line EM1 in FIG. 38*a* is an active level signal, the signal of the second light emitting control signal line EM2 is an inactive level signal when the signal of the first light emitting control signal line EM1 is an inactive level signal, a signal of the second reset control signal line Reset2 is an active level signal when a signal of the first reset control signal line Reset1 is an active level signal, the signal of the second reset control signal line Reset2 is an inactive level signal when the signal of the first reset control signal line Reset1 is an inactive level signal, a signal of the second scan signal line G2 is an active level signal when a signal of the first scan signal line G1 is an active level signal, and the signal of the second scan signal line G2 is an inactive level signal when the signal of the first scan signal line G1 is an inactive level signal. A working timing of the first reset control signal line Reset1 in FIG. 38*a* is the same as that of the initialization control line R1 in FIG. 80, a working timing of the first scan signal line G1 in FIG. 38*a* is the same as that of the second scan line S2 in FIG. 80, a working timing of the first light emitting control signal line EM1 in FIG. 38*a* is the same as that of the light emitting control line E1 in FIG. 80, and a working timing of the first scan line S1 in FIG. 80 is not included in FIG. 38*a*.

In some exemplary embodiments, when the working timing provided in FIG. 80 is suitable for the pixel circuit provided in FIG. 38*b*, a signal of the second light emitting control signal line EM2 is an active level signal when a signal of the first light emitting control signal line EM1 in FIG. 38*b* is an active level signal, the signal of the second light emitting control signal line EM2 is an inactive level signal when the signal of the first light emitting control signal line EM1 is an inactive level signal, a signal of the second scan signal line G2 is an active level signal when a signal of the first scan signal line G1 is an active level signal, and the signal of the second scan signal line G2 is an inactive level signal when the signal of the first scan signal line G1 is an inactive level signal, a working timing of the second reset control signal line Reset2 in FIG. 38*b* is the same as that of the initialization control line R1 in FIG. 80, a working timing of the first scan signal line G1 in FIG. 38*b* is the same as that of the second scan line S2 in FIG. 80, a working timing of the first light emitting control signal line EM1 in FIG. 38*b* is the same as that of the light emitting control line E1 in FIG. 80, and working timings of the first scan line S1 and the third scan line S3 in FIG. 80 are not included in FIG. 38*b*.

In some exemplary embodiments, when the working timing provided in FIG. 80 is suitable for the pixel circuit provided in FIG. 68, a signal of the third scan line S3 is an active level signal when a signal of the second scan line S2 in FIG. 68 is an active level signal, the signal of the third scan line S3 is an inactive level signal when the signal of the second scan line S2 is an inactive level signal, a signal of the fourth scan line S4 is an active level signal when a signal of the first scan line S1 is an active level signal, and the signal of the fourth scan line S4 is an inactive level signal when the signal of the first scan line S1 is an inactive level signal, a working timing of the second scan line S2 in FIG. 68 is the same as that of the initialization control line R1 in FIG. 80, a working timing of the first scan line S1 in FIG. 68 is the same as that of the second scan line S2 in FIG. 80, a working timing of the light emitting control line E1 in FIG. 68 is the same as that of the light emitting control line E1 in FIG. 80, and a working timing of the first scan line S1 in FIG. 80 is not included in FIG. 68.

In some exemplary embodiments, when the working timing provided in FIG. 80 is suitable for the pixel circuit provided in FIG. 72, a signal of the fourth scan line S4 is an active level signal when a signal of the first scan line S1 in FIG. 72 is an active level signal, the signal of the fourth scan line S4 is an inactive level signal when the signal of the first scan line S1 is an inactive level signal, a working timing of the third scan line S3 in FIG. 72 is the same as that of the fourth scan line S4 in FIG. 80, a working timing of the first scan line S1 in FIG. 72 is the same as that of the second scan line S2 in FIG. 80, and a working timing of the light emitting control line E1 in FIG. 72 is the same as that of the light emitting control line E1 in FIG. 80, and working timings of the first scan line S1 and the third scan line S3 in FIG. 80 are not included in FIG. 72.

In some exemplary embodiments, when the working timing provided in FIG. 80 is suitable for the pixel circuit provided in FIG. 75, a signal of the third scan line S3 is an active level signal when a signal of the second scan line S2 in FIG. 75 is an active level signal, the signal of the third scan line S3 is an inactive level signal when the signal of the second scan line S2 is an inactive level signal, a signal of the fourth scan line S4 is an active level signal when a signal of the first scan line S1 is an active level signal, the signal of the fourth scan line S4 is an inactive level signal when the signal of the first scan line S1 is an inactive level signal, a working timing of the second scan line S2 in FIG. 75 is the same as that of the initialization control line R1 in FIG. 80, a working timing of the first scan line S1 in FIG. 75 is the same as that of the second scan line S2 in FIG. 80, a working timing of the light emitting control line E1 in FIG. 75 is the same as that of the light emitting control line E1 in FIG. 80, and a working timing of the first scan line S1 in FIG. 80 is not included in FIG. 75.

In some exemplary implementation modes, working timings of pixel circuits of FIG. 79 and FIG. 80 may be combined, that is, a working timing of a hold frame as provided in FIG. 80 may be adopted for a hold frame in FIG. 79, or a working timing of a refresh frame as provided in FIG. 79 may be adopted for a refresh frame in FIG. 80.

In some exemplary implementation modes, when the working timing of the hold frame as provided in FIG. 80 may be adopted for the hold frame in FIG. 79, the signal of the fourth scan line in FIG. 79 is an active level signal during a partial time period of the hold frame, wherein the partial time period of the hold frame refers to a time period between time periods in which signals of adjacent second scan lines are active level signals.

In some exemplary implementation modes, when the timing of the refresh frame in FIG. 79 may be adopted for the refresh frame in FIG. 80, that is, a time period in which the signal of the first scan line in FIG. 80 is an active level signal may include a first time period and a second time period that are set at intervals and occur sequentially, and the signal of the initialization control line is an active level signal for a part of time between the first time period and the second time period.

An embodiment of the present disclosure also provides a drive method of a pixel circuit, which is configured to drive the pixel circuit described above. A working process of the pixel circuit in a refresh frame includes a first data writing phase, a working process of the pixel circuit in a hold frame includes a second data writing phase, the drive method of the pixel circuit may include following operations.

In the first data writing phase, a first transistor writes a signal of a connection node into a first node in response to a signal of a first scan line, a second transistor writes a signal of a third node into the connection node in response to a signal of a second scan line, and an eighth transistor writes a data signal into a second node in response to a signal of the second scan line.

In the second data writing phase, the second transistor writes a signal of the third node into the connection node in response to a signal of the second scan line, and the eighth transistor writes an adjustment signal into the second node in response to a signal of the second scan line.

The pixel circuit is the pixel circuit according to any one of the foregoing embodiments, and an implementation principle and implementation effects are similar, and details will not be repeated here.

In some exemplary implementation modes, the working process of the pixel circuit in the refresh frame may further include: a first refresh-reset phase, a second refresh-reset phase, and a light emitting phase which sequentially occur, the first data writing phase occurs between the first refresh-reset phase and the second refresh-reset phase.

In the first refresh-reset phase, the first transistor writes a signal of the connection node into the first node in response to a signal of the first scan line, a third transistor writes a first initialization voltage into the connection node in response to a signal of an initialization control line, a fourth transistor writes a signal of a reset voltage line into the second node in response to a signal of a third scan line, and a seventh transistor writes a second initial voltage into an anode of an organic light emitting diode in response to a signal of a fourth scan line.

In the second refresh-reset phase, the third transistor writes the first initialization voltage into the connection node in response to a signal of the initialization control line, the fourth transistor writes a signal of the reset voltage line into the second node in response to a signal of the third scan line, and the seventh transistor writes the second initial voltage into the anode of the organic light emitting diode in response to a signal of the fourth scan line.

In the light emitting phase, a drive transistor generates a drive current between the second node and the third node in response to a control signal of the first node, and a fifth transistor and a sixth transistor write a high voltage signal into the second node and write a signal of the third node into the anode of the organic light emitting diode in response to a signal of a light emitting control line.

In some exemplary implementation modes, the working process of the pixel circuit in the hold frame may further include a first hold-reset phase and a second hold-reset phase which sequentially occur at intervals, the second data writing phase occurs between the first hold-reset phase and the second hold-reset phase.

In the first hold-reset phase and the second hold-reset phase, the third transistor writes the first initialization voltage into the connection node in response to a signal of the initialization control line, the fourth transistor writes a signal of the reset voltage line into the second node in response to a signal of the third scan line, and the seventh transistor writes the second initial voltage into the anode of the organic light emitting diode in response to a signal of the fourth scan line.

Following points need to be noted.

The drawings of the embodiments of the present disclosure only involve structures involved in the embodiments of the present disclosure, and other structures may refer to usual designs.

The embodiments of the present disclosure and features in the embodiments may be combined with each other to obtain new embodiments if there is no conflict.

Other embodiments of the present disclosure will readily occur to those of skills in the art upon consideration of the specification and practicing contents disclosed herein. The present application is intended to cover any variations, uses, or adaptations of the present disclosure, which follow general principles of the present disclosure and include common sense or conventional technical means in the technical field that are not disclosed in the present disclosure. The specification and embodiments are to be considered exemplary only and the true scope and spirit of the present disclosure are indicated by the claims.

It should be understood that the present disclosure is not limited to precise structures already described above and shown in the drawings, and various modifications and changes may be made without departing from its scope. The scope of the present disclosure is limited only by the appended claims.

The invention claimed is:

1. A pixel circuit, which is disposed in a display substrate, wherein the display substrate comprises a first drive mode and a second drive mode, a refresh rate of the first drive mode is less than that of the second drive mode, content displayed by the display substrate comprises a plurality of display frames, in the first drive mode and the second drive mode, a display frame comprises a refresh frame, in the pixel circuit, a compensation control circuit comprises a first transistor, a gate of the first transistor is electrically connected with a first scan line, a first initialization circuit comprises a second transistor, a gate of the second transistor is electrically connected with an initialization control line, a drain of the second transistor is electrically connected with a first initial voltage terminal, a reset circuit comprises a third transistor, a gate of the third transistor is electrically connected with a second scan line, a drain of the third transistor is electrically connected with a reset voltage terminal; a data writing circuit comprises a fourth transistor; a gate of the fourth transistor is electrically connected with a fourth scan line, a drain of the fourth transistor is electrically connected with a data line, and a second initialization circuit comprises a seventh transistor; a gate of the seventh transistor is electrically connected with a third scan line, a drain of the seventh transistor is electrically connected with a second initial voltage terminal, and a light emitting control circuit comprises a fifth transistor and a sixth transistor, gates of the fifth transistor and the sixth transistor are electrically connected with a light emitting control line;

a signal of the second scan line is the same as a signal of the third scan line, and time when the signal of the second scan line is an active level signal comprises a first refresh time period, a second refresh time period, and a third refresh time period which sequentially occur at intervals, during the second refresh time period, a signal of the first scan line is an inactive level signal;

a voltage of a signal of the reset voltage terminal is a positive voltage, a voltage of a signal of the first initial voltage terminal is a negative voltage, and a difference between the voltage of the signal of the reset voltage terminal and the voltage of the signal of the first initial voltage terminal is greater than a threshold difference.

2. The pixel circuit according to claim 1, wherein during the first refresh time period, the signal of the first scan line is an active level signal, and signals of the initialization control line, the fourth scan line, and the light emitting control line are inactive level signals;

during the second refresh time period, the signals of the initialization control line, the fourth scan line, and the light emitting control line are inactive level signals;

during the third refresh time period, signals of the first scan line, the initialization control line, the fourth scan line, and the light emitting control line are inactive level signals.

3. The pixel circuit according to claim 2, wherein time when a signal of the initialization control line is an active level signal comprises a fourth refresh time period and a fifth refresh time period, the fourth refresh time period occurs between the first refresh time period and the second refresh time period, and the fifth refresh time period occurs between the second refresh time period and the third refresh time period;

during the fourth refresh time period and the fifth refresh time period, the signal of the first scan line is an active level signal, and signals of the second scan line, the fourth scan line, and the light emitting control line are inactive level signals.

4. The pixel circuit according to claim 3, wherein time when a signal of the fourth scan line is an active level signal occurs between the fifth refresh time period and the third refresh time period, and when the signal of the fourth scan line is an active level signal, the signal of the first scan line is an active level signal, and signals of the second scan line, the initialization control line, and the light emitting control line are inactive level signals;

a duration for which the signal of the fourth scan line is an active level signal is less than a duration of any one of the first refresh time period to the third refresh time period.

5. The pixel circuit according to claim 3, wherein time when the signal of the first scan line is an active level signal comprises a sixth refresh time period and a seventh refresh time period which sequentially occur at intervals;

the first refresh time period and the fourth refresh time period are located within the sixth refresh time period, the second refresh time period is located between the sixth refresh time period and the seventh refresh time period, and time when a signal of the fourth scan line is an active level signal and the fifth refresh time period are located within the seventh refresh time period;

during the sixth refresh time period and the seventh refresh time period, a signal of the light emitting control line is an inactive level signal.

6. The pixel circuit according to claim 1, wherein when a signal of the light emitting control line is an active level signal, signals of the first scan line, the second scan line, the fourth scan line, and the initialization control line are inactive level signals.

7. The pixel circuit according to claim 1, wherein in the first drive mode, the display frame further comprises at least one hold frame, in the hold frame, signals of the first scan line and the fourth scan line are inactive level signals;

the time when the signal of the second scan line is the active level signal comprises a plurality of first hold time periods which sequentially occur at intervals, and time when a signal of the initialization control line is an active level signal comprises a plurality of second hold time periods which sequentially occur at intervals;

the plurality of first hold time periods and the plurality of second hold time periods are alternately disposed, and a first first hold time period occurs before a first second hold time period.

8. A drive method of a pixel circuit, which is configured to drive the pixel circuit according to claim 1, wherein a working process of the pixel circuit in a refresh frame comprises: a first refresh phase, a third refresh phase, and a sixth refresh phase which sequentially occur, wherein a first refresh time period is the first refresh phase, a second refresh time period is the third refresh phase, and a third refresh time period is the sixth refresh phase;

in the first refresh phase, writing, by a first transistor, a signal of a third node into a first node in response to a signal of a first scan line, writing, by a third transistor, a signal of a reset voltage terminal into a second node in response to a signal of a second scan line, and writing, by a seventh transistor, a second initial signal into an anode of an organic light emitting diode in response to a signal of a third scan line;

in the third refresh phase and the sixth refresh phase, writing, by the third transistor, the signal of the reset voltage terminal into the second node in response to the signal of the second scan line, and writing, by the seventh transistor, the second initial signal into the anode of the organic light emitting diode in response to the signal of the third scan line.

9. The method according to claim 8, wherein the working process of the pixel circuit in the refresh frame further comprises: a second refresh phase, a fourth refresh phase, a fifth refresh phase, and a light emitting phase which sequentially occur, wherein a fourth refresh time period is the second refresh phase, a fifth refresh time period is the fourth refresh phase, time when a signal of the fourth scan line is an active level signal is the fifth refresh phase, time when a signal of a light emitting control line is an active level signal is the light emitting phase, and the light emitting phase occurs after the sixth refresh phase;

in the second refresh phase and the fourth refresh phase, writing, by the first transistor, the signal of the third node into the first node in response to the signal of the first scan line, and writing, by the second transistor, a first initial voltage into the third node in response to a signal of an initialization control line;

in the fifth refresh phase, writing, by the first transistor, the signal of the third node into the first node in response to the signal of the first scan line, and writing, by the fourth transistor, a signal of a data line into the second node in response to a signal of the fourth scan line;

in the light emitting phase, generating, by the third transistor, a drive current between the second node and the third node in response to a control signal of the first node, and writing, by the fifth transistor and the sixth transistor, a high voltage signal into the second node and a signal of the third node into an anode of an organic light emitting diode in response to a signal of the light emitting control line.

10. The method according to claim 8, wherein in the first drive mode, a display frame comprises: at least one hold frame, and a working process of the pixel circuit in the hold frame comprises: a plurality of first hold phases and a plurality of second hold phases, a first hold time period is a first hold phase and a second hold time period is a second hold phase;

in the first hold phase, writing, by the third transistor, a signal of the reset voltage terminal into the second node in response to a signal of the second scan line, and writing, by the seventh transistor, a second initial voltage into the anode of the organic light emitting diode in response to a signal of the third scan line;

in the second hold phase, writing, by the second transistor, a first initial signal into the third node in response to a signal of an initialization control line.

11. A display apparatus, comprising a pixel circuit according to claim 1.

12. A pixel circuit, which is disposed in a display substrate, wherein the display substrate comprises a first drive mode and a second drive mode, a refresh rate of the first drive mode is less than that of the second drive mode, content displayed by the display substrate comprises a plurality of display frames, in the first drive mode, a display frame comprises a refresh frame and at least one hold frame, in the second drive mode, the display frame comprises a refresh frame, in the pixel circuit, a first control circuit comprises a first transistor; a gate of the first transistor is electrically connected with a first scan line; a compensation control circuit comprises a second transistor; a gate of the second transistor is electrically connected with a second scan line; a first initialization circuit comprises a third transistor; a gate of the third transistor is electrically connected with an initialization control line; a reset circuit comprises a fourth transistor; a gate of the fourth transistor is electrically connected with a third scan line; a light emitting control circuit comprises a fifth transistor and a sixth transistor; gates of the fifth transistor and the sixth transistor are electrically connected with a light emitting control line, and the gates are electrically connected with the light emitting control line; a second initialization circuit comprises a seventh transistor; a gate of the seventh transistor is electrically connected with a fourth scan line; a data writing circuit comprises an eighth transistor; a gate of the eighth transistor is electrically connected with the second scan line, and a drain of the eighth transistor is electrically connected with a data line;

the display substrate further comprises a first drive chip and a second drive chip, wherein the first drive chip is configured to generate a data signal, the second drive chip is configured to generate an adjustment signal, and the first drive chip and the second drive chip are different chips;

a signal of the second scan line is an active level signal during a portion of the refresh frame and a portion of the hold frame, a signal of the data line is a data signal during a portion of the refresh frame, and the signal of the data line is an adjustment signal during a portion of the hold frame.

13. The pixel circuit according to claim 12, wherein signals of the third scan line, the fourth scan line, and the initialization control line are the same.

14. The pixel circuit according to claim 13, wherein in the refresh frame, when the signal of the second scan line is an active level signal, a signal of the first scan line is an active level signal, and signals of the third scan line and the light emitting control line are inactive level signals;

a duration for which the signal of the second scan line is an active level signal is less than a duration for which the signal of the first scan line is an active level signal, and is less than a duration for which a signal of the third scan line is an active level signal.

15. The pixel circuit according to claim 13, wherein in the refresh frame, time when a signal of the third scan line is an active level signal comprises a first time period and a second time period which sequentially occur at intervals;

during the first time period, a signal of the first scan line is an active level signal, and signals of the second scan line and the light emitting control line are inactive level signals;

during the second time period, signals of the first scan line, the second scan line, and the light emitting control line are inactive level signals;

a sum of a duration of the first time period and a duration of the second time period is less than a duration for which the signal of the first scan line is an active level signal.

16. The pixel circuit according to claim 13, wherein in the hold frame, a signal of the first scan line is an inactive level signal.

17. The pixel circuit according to claim 16, wherein in the hold frame, time when a signal of the third scan line is an active level signal comprises: a third time period and a fourth time period which sequentially occur at intervals;

during the third time period and the fourth time period, signals of the third scan line and the light emitting control line are inactive level signals, and time when the signal of the second scan line is an active level signal is located between the third time period and the fourth time period.

18. A drive method of a pixel circuit, which is configured to drive the pixel circuit according to claim 12, wherein a working process of the pixel circuit in a refresh frame comprises a first data writing phase, and a working process of the pixel circuit in a hold frame comprises a second data writing phase, the method comprises:

in the first data writing phase, writing, by a first transistor, a signal of a connection node into a first node in response to a signal of a first scan line, writing, by a second transistor, a signal of a third node into the connection node in response to a signal of a second scan line, and writing, by an eighth transistor, a data signal into a second node in response to a signal of the second scan line;

in the second data writing phase, writing, by the second transistor, the signal of the third node into the connection node in response to the signal of the second scan line, and writing, by the eighth transistor, an adjustment signal into the second node in response to a signal of the second scan line.

19. The method according to claim 18, wherein the working process of the pixel circuit in the refresh frame further comprises: a first refresh-reset phase, a second refresh-reset phase, and a light emitting phase which sequentially occur, the first data writing phase occurs between the first refresh-reset phase and the second refresh-reset phase;

in the first refresh-reset phase, writing, by the first transistor, a signal of the connection node into the first node in response to a signal of the first scan line, writing, by a third transistor, a first initialization voltage into the connection node in response to a signal of an initialization control line, writing, by a fourth transistor, a signal of a reset voltage line into the second node in response to a signal of a third scan line, and writing, by a seventh transistor, a second initial voltage into an anode of an organic light emitting diode in response to a signal of a fourth scan line;

in the second refresh-reset phase, writing, by the third transistor, the first initialization voltage into the connection node in response to the signal of the initialization control line, writing, by the fourth transistor, the signal of the reset voltage line into the second node in response to the signal of the third scan line, and writing, by the seventh transistor, the second initial voltage into the anode of the organic light emitting diode in response to the signal of the fourth scan line;

in the light emitting phase, generating, by a drive transistor, a drive current between the second node and the third node in response to a control signal of the first node, and writing, by a fifth transistor and a sixth transistor, a high voltage signal into the second node and a signal of the third node into the anode of the organic light emitting diode in response to a signal of a light emitting control line.

20. The method according to claim 18, wherein the working process of the pixel circuit in the hold frame further comprises: a first hold-reset phase and a second hold-reset phase which sequentially occur at intervals, the second data writing phase occurs between the first hold-reset phase and the second hold-reset phase;

in the first hold-reset phase and the second hold-reset phase, writing, by a third transistor, a first initialization voltage into the connection node in response to a signal of an initialization control line, writing, by a fourth transistor, a signal of a reset voltage line into the second node in response to a signal of a third scan line, and writing, by a seventh transistor, a second initial voltage into an anode of an organic light emitting diode in response to a signal of a fourth scan line.

* * * * *